United States Patent [19]
Van Huben et al.

[11] Patent Number: 5,864,875
[45] Date of Patent: Jan. 26, 1999

[54] DATA MANAGEMENT SYSTEM FOR PROBLEMS, RELEASES AND PARTS

[75] Inventors: Gary Alan Van Huben; Joseph Lawrence Mueller, both of Poughkeepsie, N.Y.; Darryl James McDonald, Austin, Tex.

[73] Assignee: International Business Machines Corporation, Armonk, N.Y.

[21] Appl. No.: 761,474

[22] Filed: Dec. 6, 1996

[51] Int. Cl.$^6$ ........................................................ G06 17/30
[52] U.S. Cl. .............................. 707/200; 707/8; 707/10; 707/201; 707/203
[58] Field of Search .................................. 707/8, 10, 200, 707/201, 203, 103

[56] References Cited

U.S. PATENT DOCUMENTS

| | | | |
|---|---|---|---|
| 5,201,047 | 4/1993 | Maki et al. | 395/600 |
| 5,321,605 | 6/1994 | Chapman et al. | 364/402 |
| 5,333,312 | 7/1994 | Wang | 395/600 |
| 5,333,315 | 7/1994 | Saether et al. | 395/600 |
| 5,333,316 | 7/1994 | Champagne et al. | 395/60 |
| 5,418,949 | 5/1995 | Suzuki | 395/600 |

OTHER PUBLICATIONS

Oliver Tegel, "Integrating Human Knowledge Into The Product Development Process" published in Proceedings of ASME Database Symposium Eng–Data Mgmt, Integrating the Engineering Enterprise ASME Database Symposium 1994, ASCE NY USA, pp. 93–100.

"Beyond EDA" published in Electronic Business, vol. 19, No. 6, Jun. 1993 pp. 42–46, 48.

*Primary Examiner*—Thomas G. Black
*Assistant Examiner*—Michael J. Wallace, Jr.
*Attorney, Agent, or Firm*—Lynn L. Augspurger

[57] ABSTRACT

A design control system suitable for use in connection with the design of integrated circuits and other elements of manufacture having many parts which need to be developed in a concurrent engineering environment with inputs provides by users and or systems which may be located anywhere in the world provides a set of control information for coordinating movement of the design information through development and to release while providing dynamic tracking of the status of elements of the bills of materials in an integrated and coordinated activity control system utilizing a repository which can be implemented in the form of a database (relational, object oriented, etc.) or using a flat file system. Once a model is created and/or identified by control information design libraries hold the actual pieces of the design under control of the system without limit to the number of libraries, and providing for tracking and hierarchical designs which are allowed to traverse through multiple libraries. Data Managers become part of the design team, and libraries are programmable to meet the needs of the design group they service.

18 Claims, 181 Drawing Sheets

MODEL STATUS: VALID    MODEL OWNER: FORD

| NAME | TYPE | LIB | VERS | LEVEL | STATUS |
|---|---|---|---|---|---|
| 0001 A ALU | SCHEM | CP_LIB | BASE | ENGIN | VALID |
| 0002 I ALU | VHDL | CP_LIB | BASE | ENGIN | VALID |
| 0003 O ALU | SYNTHES | CP_LIB | BASE | ENGIN | VALID |
| 0004 I ADDER | LAYOUT | TECH | HIPWR | QUAL | INVAL |
| 0005 A MULT_DIV | LAYOUT | TECH | LOPWR | QUAL | VALID |
| 0006 I MULT1 | GATE | TECH | LOPWR | QUAL | VALID |
| 0007 I DIV1 | GATE | TECH | LOPWR | QUAL | VALID |
| 0008 | | | | | |
| 0009 | | | | | |

FIGURE 2

File  Return  Filter  Owner  Status                                Help

235 — NAME  [          ]  ▷
236 — LIBRARY  [          ]  ▷
237 — TYPE  [          ]  ▷
238 — VERSION  [          ]  ▷
239 — LEVEL  [          ]

◁                                                                  ▷

MODEL STATUS: VALID            MODEL OWNER: FORD

| NAME | TYPE | LIB | VERS | LEVEL | STATUS |
|---|---|---|---|---|---|
| 0001 A ALU | SCHEM | CP_LIB | BASE | ENGIN | VALID |
| 0002 I ALU | VHDL | CP_LIB | BASE | ENGIN | VALID |
| 0003 O ALU | SYNTHES | CP_LIB | BASE | ENGIN | VALID |
| 0004 I ADDER | LAYOUT | TECH | HIPWR | QUAL | INVAL |
| 0005 A MULT_DIV | LAYOUT | TECH | LOPWR | QUAL | VALID |
| 0006 I MULT1 | GATE | TECH | LOPWR | QUAL | VALID |
| 0007 I DIV1 | GATE | TECH | LOPWR | QUAL | VALID |
| 0008 | | | | | |
| 0009 | | | | | |

240

FIGURE 5a
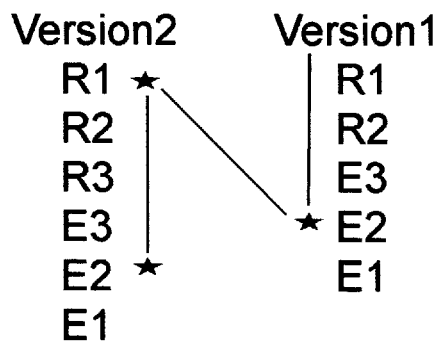
Starting at Version 2
Level E2
Search resumes at same
level in Version 1
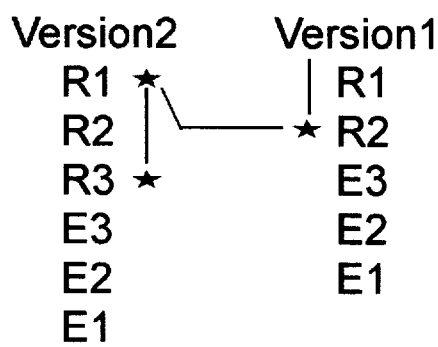
Starting at Version 2
Release Level R3
Search resumes at most
recent release level
in Version 1
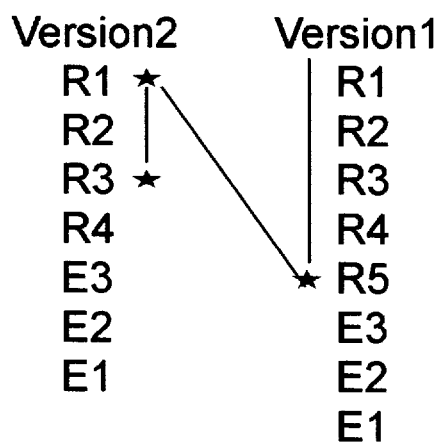
Starting at Version 2
Release Level R3
Search resumes at most
recent release level
in Version 1

Figure 11

| 11a | 11d |
|-----|-----|
| 11b | 11e |
| 11c | 11f |

Figure 12

| 12a | 12e | 12i |
|-----|-----|-----|
| 12b | 12f | 12j |
| 12c | 12g | 12k |
| 12d | 12h |     |

Figure 13

| 13a | 13c |
|-----|-----|
| 13b | 13d |

Figure 14

| 14a | 14c |
|-----|-----|
| 14b | 14d |

Figure 15

| 15a | 15d |
|-----|-----|
| 15b | 15e |
| 15c | 15f |

Figure 15d
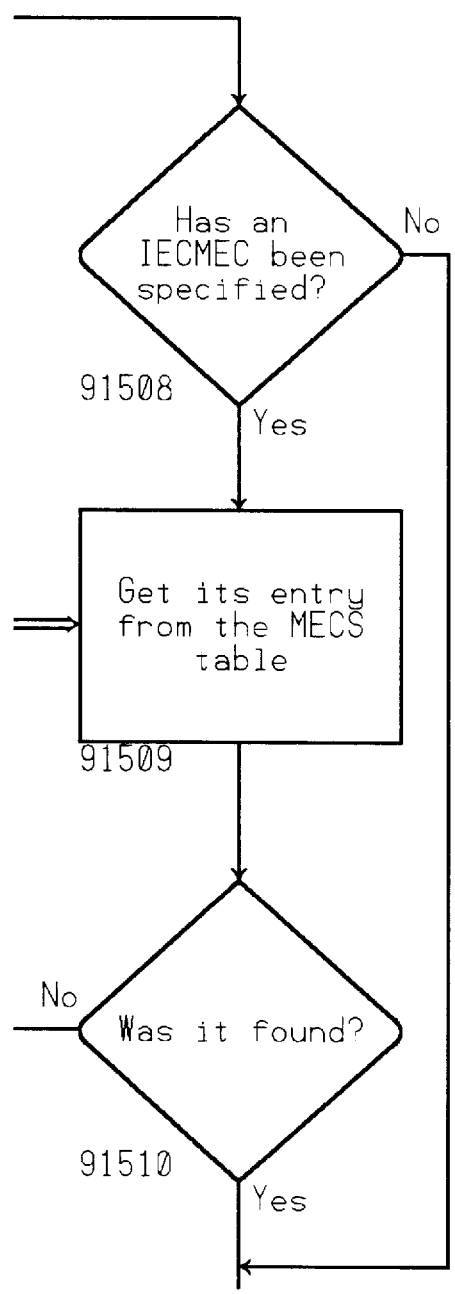
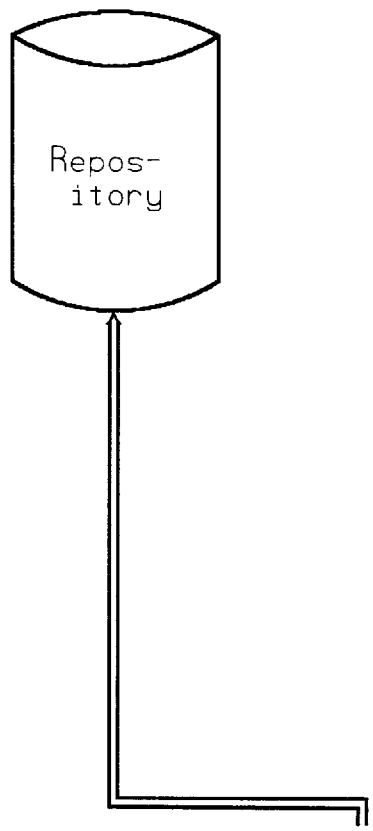

Figure 16

| 16a | 16c |
|-----|-----|
| 16b | 16d |

Figure 19

| 19a |
|-----|
| 19b |

Figure 20

| 20a | 20d |
|-----|-----|
| 20b | 20e |
| 20c | 20f |

Figure 21

| 21a |
|-----|
| 21b |

Figure 22

| 22a | 22c |
|-----|-----|
| 22b | 22d |

Figure 24

| 24a | 24c |
|-----|-----|
| 24b | 24d |

Figure 25

| 25a |
|-----|
| 25b |

Figure 26

| 26a | 26c |
|-----|-----|
| 26b | 26d |

Figure 27

| 27a | 27c |
|-----|-----|
| 27b | 27d |

Figure 29

| 29a | 29c |
|-----|-----|
| 29b | 29d |

Figure 30

| 30a | 30d |
|-----|-----|
| 30b | 30e |
| 30c | 30f |

| 31a | 31c |
|-----|-----|
| 31b | 31d |

Figure 32

| 32a | 32c |
|-----|-----|
| 32b | 32d |

Figure 33

| 33a | 33c |
|-----|-----|
| 33b | 33d |

Figure 34

| 34a | 34c |
|-----|-----|
| 34b | 34d |

Figure 35

| 35a | 35c |
|-----|-----|
| 35b | 35d |

Figure 36

| 36a | 36c |
|-----|-----|
| 36b | 36d |

Figure 37

| 37a | 37d |
|-----|-----|
| 37b | 37e |
| 37c | 37f |

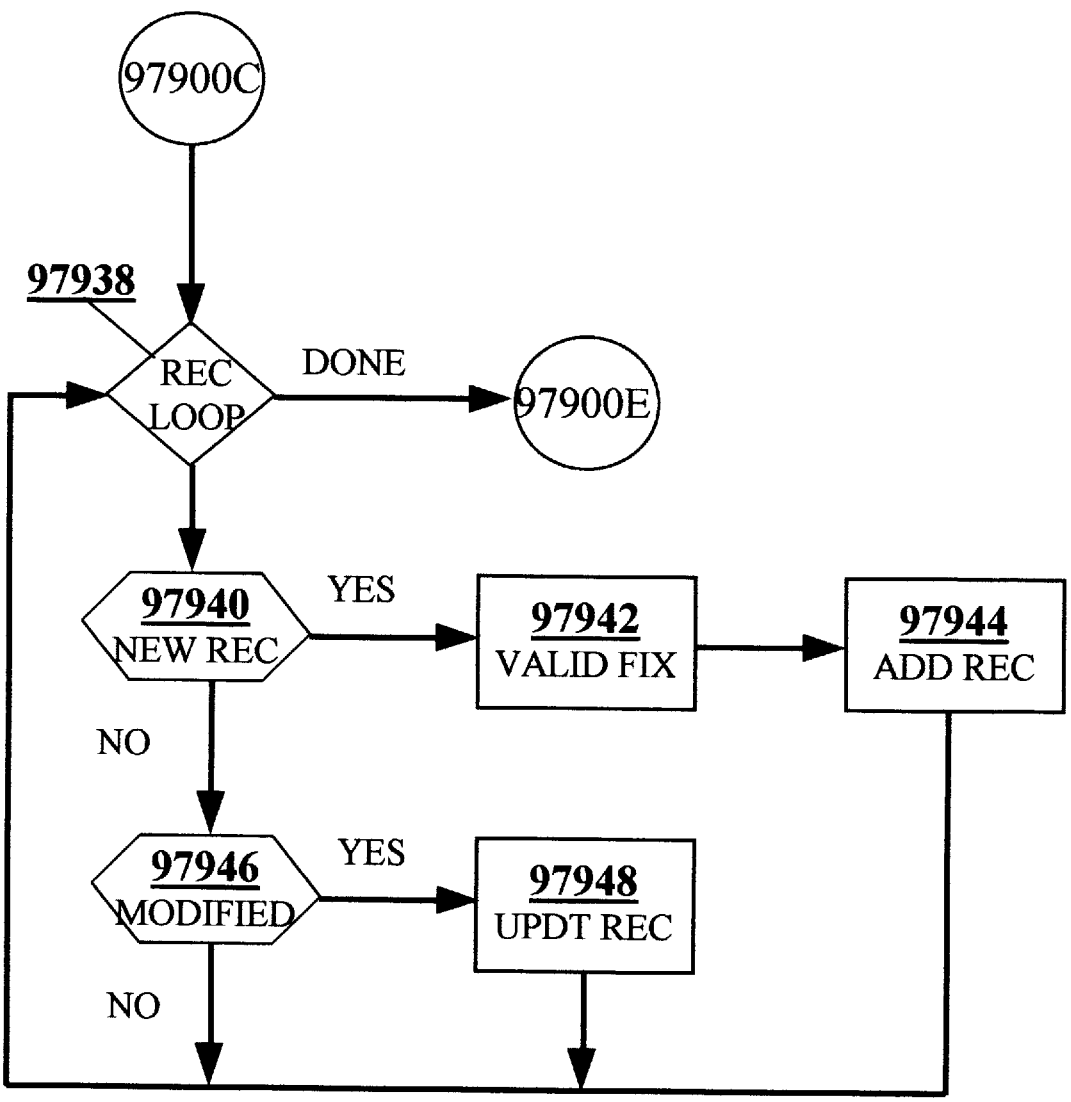

DATA MANAGEMENT SYSTEM FOR PROBLEMS, RELEASES AND PARTS

Note to U.S. Government Users—Documentation related to restricted rights—Use, duplication, or disclosure is subject to restrictions set forth in any applicable GSA ADP Schedule Contract with International Business Machines Corporation.

COPYRIGHT NOTICE AND AUTHORIZATION

This patent document contains material which is subject to copyright protection. (C) Copyright International Business Machines Corporation 1995, 1996 (Unpublished). All rights reserved.

The owner, International Business Machines Corporation, has no objection to the facsimile reproduction by any one of the patent disclosure, as it appears in the Patent and Trademark Office patent files or records of any country, but otherwise reserves all rights whatsoever.

FIELD OF THE INVENTION

This invention is related to a Computer Integrated Design Control System and Method for concurrent engineering, and particularly to methods useful in connection with the design, development and manufacturing of complex electronic machines such as computer systems and their complex electronic parts with proper tracking and release of problem solutions in a concurrent engineering design control data management system.

RELATED APPLICATIONS

The preferred embodiment of our claimed invention is described in detail herein. Our preferred embodiment may desireably interact with other inventions which may be considered related applications filed concurrently herewith, having inventors in common with this our preferred embodiment of this invention.

For convenience of understanding, these other applications describe various systems, methods and processes for data management particularly suited for use with this invention, our Data Management System for Problems, Releases and Parts for Computer Integrated Design Control which describes a method for managing problems, releases and multiple releases.

The related applications include the application entitled Data Management System and Method for Concurrent Engineering which provides greater detail about our Aggregation Manager for a Data Management system, and Data Management System for Concurrent Engineering, and Data Management System and Processes describing how various processes and utilities interact, and Data Management System having Shares Libraries.

All of these related applications are filed concurrently herewith, and their disclosures are incorporated herein by this reference. All are commonly assigned to International Business Machines Corporation, Armonk, N.Y.

GLOSSARY OF TERMS

While dictionary meanings are also implied by certain terms used here, the following glossary of some terms may be useful.

| | |
|---|---|
| AFS | Andrew File System - File Management System developed by Transarc Inc. and used on Unix/AIX Networks. |
| API | Application Program(ming) Interface. |
| ASC | Accredited Standards Committee (ANSI) |
| BOM | Bill of Materials |
| CIM | Computer Integrated Manufacturing |
| CR | Control Repository |
| CRC | Cyclic Redundancy Check |
| CLSI Compiler | VHDL Analyzer developed by Compass Design Systems |
| DCS | Design Control System. Our Design Control System incorporates Data Management System processes, including interactive data management systems which supply processes which may be applicable in general data management systems, such as a process manager, a promotion manager, a lock manager, a release manager, and aggregation manager and the other processes we describe herein as part of a Computer Integrated Design Control System and, where the context applies, Data Management System, is a Data Management System functioning within an overall integrated design control system. |
| DILP | Designer Initiated Library Process |
| DM | Data Manager or Data Management |
| DMCU | Data Management Control Utilities |
| DMS | Data Management System |
| DR | Data Repository |
| EC | Engineering Change |
| EDA | Electronic Design Automation |
| GUI | Graphical User Interface |
| PDM | Product Data Management |
| PIM | Product Information Management |
| PN | Part Number |
| RAS | Random Access Storage |
| sim | static inline memory |
| tape-out | Delivery of a coherent set of design data to manufacturing. Also known as Release Internal Tape (RIT) within IBM. |
| TDM | the Cadence Team Design Manager (most currently Version 4.4) |
| VHDL | Very High-level Design Language - A high level language comprised of standards supported by IEEE and the EDA industry. The language is widely used in the electronics and computer industry and by the military as an alternative to Verilog and ADA, other high level computer coding languages. |

BACKGROUND OF THE INVENTION

Problem

One of the biggest problems confronting businesses today is proper tracking of problem solutions in a data management system. This is especially noteworthy in a design or manufacturing environment where there are multiple components being iteratively processed and re-released to outside organizations. It is often desirable to record and track all problems fixed in a given release and ensure the proper fixes are applied to the correct releases.

In addition parts management can become quite burdensome in an environment where products share some parts, but require some unique parts. If this environment is one in which the parts have associated part numbers and data which needs to be managed, then lack of a robust release management system is certain to lead to mistakes.

Today's marketplace demands efficient highly automated tracking of such information with little tolerance for mistakes. There is a need for a robust solution which can be applied to many types of data management systems for design control in a concurrent engineering environment.

In the article entitled "Beyond EDA (electronic design automation)", published in Electronic Business Vol. 19, No. 6 June 1993 P42–46, 48, it was noted that while billions of dollars have been spent over the past (then and still last) five years for electronic design automation systems (EDA) and software to help companies cut their design cycle, a huge gulf remains between design and manufacturing. To eliminate the gulf and thus truly comply with the commandments, companies are extending the concept of concurrent engineering to enterprise wide computing. The concept, which calls for integrating all the disciplines from design to manufacturing is becoming the business model of the 1990s. Achieving an enterprise wide vision requires tying together existing systems and programs and managing the data that flows among them. Software that makes that linkage possible is largely in the class known by two names: product data management (PDM) or product information management (PIM). Mr. Robinson, the author, described the experiences of several companies with PIM and PDM, in particular Sherpa and Cadence.

The design of complex parts, such as integrated circuits, computers, or other complex machines in a complete manufacturing operation like IBM's requires computer capability, with computers capable of processing multiple tasks, and allowing concurrent data access by multiple users. The IBM System 390 operating system known as Multiple Virtual Storage (MVS) allows such things as relational database management methods, such as the TIME system described by U.S. Pat. No. 5,333,316, to be used to reduce design time. The TIME system is used within IBM for the purposes described in the patent during circuit design. However, these prior efforts treated design as directed to an entity and did not achieve the efficiencies provided by the system detailed in our description of our invention, which also can run under MVS, but also under other operating systems. Our detailed description of our invention will illustrate that we have furthered the objects of the invention of U.S. Pat. No. 5,333,316 by increasing the flexibility of a number of circuit designers who may concurrently work on designing the same integrated circuit chip and reducing the interference between chip designers. With the prior system, a user (a person, processor or program capable of using data in a relational database) was given a private copy of the master table. Alteration of a row in the user table was not automatically updated in the master table, because a lock mechanism prevented the row update, but that was an great improvement at the time, because no longer did multiple users have to wait for copying of a table, each time data from a user needed to be updated. This row locking and treatment of data has become widespread in the relational database field, and it has been enabled for use with multiple instances of a platform even on Unix machines today. We should note that also in the MVS art, there have been proposed various library systems, e.g. those represented by U.S. Pat. Nos. 5,333,312 and 5,333,315 and others which relate to IBM's Image Object Distribution Manager in the ImagePlus product line of IBM, and IBM's Office Vision are examples of systems enabling control of a source document while allowing access by multiple users. Implementation of these patented ideas enable synchronous and asynchronous copying of a document into a folder in a target library. These methods provide for check out of a document and its placement in a target library while locking the document in the source library to prevent changes while the checked out document is out. But these steps are only some of the many things that are needed to bring a product to a release state. Bringing a product to a release state is an object of the current developments relating to design control in a manufacturing setting.

Concurrent engineering is required among many engineers working in parallel and at different locations worldwide. Furthermore, as noted by Oliver Tegel in "Integrating human knowledge into the product development process" as published in the Proceedings of the ASME Database Symposium, Engineering Data Management: Integrating the Engineering Enterprise ASME Database Symposium 1994. ASCE, New York N.Y., U.S.A. p 93–100, specialists who are not working directly together are often needed for solving the demanding tasks that arise during the development of today's advanced products. During product development, assistance is required from other departments such as manufacturing, operations scheduling, etc. Even the vendors and customers should be integrated into the product development process to guarantee the product developed will be accepted in the market.

There is a need for integrators/coordinators/model builders and the designers to work together to create a next release. Information from different people in different forms must be collected aiming at a final good design. A problem occurring during product development is, how to know which people to contact for what kind of information, but that is only one. During all of the process concurrent engineering, particularly for the needs of complex very large scaled integrated system design, needs to keep everything in order and on track, while allowing people to work on many different aspects of the project at the same time with differing authorizations of control from anywhere at anytime.

For the purpose of the following discussion, need to say that we call our system a "Computer Integrated Design Control System and Method" because it encompasses the ability to integrate CIM, EDA, PDM and PIM and because it has the modularity making it possible to fulfill these needs in a concurrent engineering environment particularly useful to the design of complex very large scaled integrated systems as employed in a computer system itself. The making of these systems is a worldwide task requiring the work of many engineers, whether they be employed by the manufacturer or by a vendor, working in parallel on many complete parts or circuits which are sub-parts of these parts. So as part of our development, we reviewed the situation and found that no-one that we have found is able to approach the creation of "Computer Integrated Design Control System" like ours or employ the methods needed for our environment. Our methods are modular and fulfill specific functions, and yet make it possible to integrate them within a complete "Computer Integrated Design Control System".

A patent literature review, especially one done with retrospective hindsight after understanding our own system and method of using our "Computer Integrated Design Control System" will show, among certainly others, aspects of DMS systems which somewhat approach some aspect of our own design, but are lacking in important respects. For instance, after review of our detailed description, one will come to appreciate that in modern data processing systems the need often arises (as we provide) to aggregate disparate data objects into a cohesive collection. These data objects may reside at various levels of completion, spanning multiple versions and/or repositories in a hierarchical, multi-tiered data management system. Additionally, these data aggregations may need to be hierarchical themselves, in order to enable the creation of large groupings of data with varying levels of granularity for the data included therein. In such a data management system, the end-users of the data aggregates are not necessarily the "owners" of all or any of the data objects comprising the data aggregate, but they have a need to manage the particular collection. Management of a data aggregation may include creating the aggregation, adding or deleting data objects, moving the aggregation through a hierarchical, multi-tiered data management system and tracking the status of the data aggregation in real-time while maintaining the coherence of the data aggregation. Creation of a data aggregation or the addition of a data object to an existing data aggregate may need to be accomplished within the data management system or via data objects imported into the data management system through application program interfaces for the data management system.

With such a focus, when one reviews the art, one will certainly find, currently, data management systems which provide means for grouping components of a data system to facilitate the retrieval thereof. However, these data management systems are insufficient and lacking because they fail to address the above-referenced need for grouping disparate data items, just to mention one aspect of our own developments.

Another example, U.S. Pat. No. 5,201,047 to Maki et al. (issued Apr. 6, 1993) teaches an attribute based classification and retrieval system wherein it is unnecessary to implement an artificial code for indexing classifications. The patent teaches a method for defining unique, user-determined attributes for storing data which are capable of being readily augmented without necessitating the modification of the underlying query used for retrieval thereof. However, the Maki et al. patent requires that the data items being grouped share at least one common attribute to enable the grouping, and therefore fails to address the problems of managing data aggregates formed from disparate and unrelated data objects.

Other data management systems address the creation of data aggregates coupled to particular processes implemented in the data system. For example, U.S. Pat. No. 5,321,605 to Chapman et al. (issued Jun. 14, 1994) teaches the creation of a Bill of Resources table which represents the resources consumed in the performance of a given process. Attribute tables for the given resources are utilized to determine whether an additional processes which will consume some or all of the resources of a given process can be initiated. The patent to Chapman et al., requires that each process to be initiated have a particular Bill of Resources aggregate associated therewith. This tightly coupled construct does not permit the creation of data aggregates not related to a particular process implemented in the data management system. Furthermore, since a process must be contemplated in order to create a Bill of Resources table, Chapman et al. do not permit the creation of aggregates without foreknowledge of the process that requires the resource. Thus, in a manner similar to that described for Maki et al., Chapman et al. require that a relationship between the elements exist prior to the formation of the Bill of Resources grouping.

Also, unrelated DMS systems are known which are used for hardware implementations which enable related data in a computer memory, storage or I/O subsystem to be physically grouped in proximity to other such data so as to improve hardware performance, application performance, and/or to solve memory management issues are known. For example, U.S. Pat. No. 5,418,949 to Suzuki (issued May 23, 1995) teaches a fine storage management system for a database which achieves a high level of clustering on a given page and teaches loading related data from a secondary storage unit at high speed. The patent uses map files including a metamap file for defining page to page relations of data. These hardware implementations are not related to the present invention, as they involve the management of the physical contents of a data object rather than the management of aggregations of data objects as we perform the methods of our present invention. It is contemplated, however, that such known hardware techniques may be implemented in a system comprising the aggregation management features disclosed herein, thereby further augmenting the overall system efficiency.

During our development process we have viewed the development of others. Even the best of the EDA (electronic design automation) design houses don't have an integrated approach like we have developed.

For the purposes of this background, we will discuss some of the various approaches already used specifically viewing them in light of our own separate developments which we will further elaborate in our detailed description of our invention which follows later in this specification.

In the field of EDA, there are today two preeminent vendors of development software, Cadence Design Systems, Inc. and ViewLogic, Inc. Of course there are others, but these two companies may have a greater range of capability than the others. Also, there are in house systems, such as IBM's ProFrame which we think is unsuitable for use. It will not function well as a stand-alone DM point tool for integration into a foreign framework. But even the largest microelectronic systems are customers of the two named vendors which we will compare. Today, a DCS, it will be seen, without our invention, would require fitting together pieces of disparate systems which don't interact, and even such a combination would not achieve our desirable results.

For the purposes of comparison, after our own description of our environment, our "Computer Integrated Design Control System", we will discuss the features of the Cadence Team Design Manager Version 4.4 and ViewLogic's ViewData in Sections which compare with and refer to the Sections of our own preferred "Computer Integrated Design Control System" as set forth at the beginning of our detailed description of our invention. This comparison will show the shortcomings of these prior systems, as well as some changes which could be made to these prior systems to allow them to improve performance in our concurrent engineering environment by taking advantage of aspects of our own development as alternative embodiments of our invention.

Historically many attempts have been made to collect or group objects together in order to solve typical data management problems. These problems may include identifying all of the files used to create a model, or grouping files together to facilitate transport through a medium. The intent is usually to ensure the group remains together for a specified period of time.

The most common method in use today is to create a listing of files commonly referred to as a Bill of Materials. Many commercial products permit creation of such a BOM, but these BOM are static list BOM. For example, is one of the members of the BOM disappears or gets changed, the user is unaware that the original data set used to create the BOM is no longer valid.

We have created a new process which we call an Aggregation Manager which can be used in Bill of Materials applications but which overcomes prior disadvantages and also one which can be used in our Computer Integrated Design Control System.

SUMMARY OF THE INVENTION

Our invention provides a design control system usable in a concurrent engineering process which can cooperate in a distributed environment worldwide to enable a design to be processed with many concurrent engineering people and processes. The system we employ uses a a data management control program tangibly embodying a program of instructions executable by a supporting machine environment for performing method steps by an aggregation manager of a data management system having a library organization which receives a request of a user initiated from said displayed client screen and fulfills the request by providing a result via our data management system's aggregation manager.

Our invention provides an improved way to make or import a model, and provides a dynamic way to track the model during its course through its design phase. We provide a way to track the BOM.

In order to make a common model, we display for creation of a model one or more control screen sections as part of a control panel input screen allowing creation of a model by interactive user activity, by importing a file listing, by searching of a library of files in said data management system and importing a located file, or by use of an application program interface with a collection of model management utilities utilities. Our sections of said control screen panel include:

(a) a display screen section displaying a first field representing the name of an anchor name field of a model which is identical to the name of a data object which is serving as a named anchor;

(b) a display screen section displaying a second field representing a library where said named anchor resides;

(c) a display screen section displaying a third field representing the type of data object identified by said anchor name;

(d) a display screen section displaying a fourth field representing user entries for the version of said named anchor;

(e) a display screen section displaying a fifth field representing user entries for the level of said named anchor for use by a user or a third party tool for creating, modifying or deleting an aggregate collection of data objects, encompassing those used for items that are identified, tabulated, tracked, validated and invalidated, and promoted, as are bills of materials, by said data management system; and (f) a display screen section displaying a sixth field representing user entries for the status of said named anchor.

Our model thus consists of one anchor and one or more associated components, each of which is a data object in said data management system. This means that our components can belong to any level and version of any library in said data management system and said components are not restricted to the same library, level and version as the anchor, and our components can and do comprise multiple data types, including data generated by tools of said data management system and third party tools. Thus we further provide that each component is labeled as an input or an output of its associated anchor. Thus we provide that each one component may be an anchor to another different model, and when such a component is an anchor to another different model, said different model consists of said said such component acting as one anchor and further consisting of one or more associated components each of which is a data object in said data management system. In accordance with our invention our components components can belong to any level and version of any library in said data management system and our components are not restricted to the same library, level and version as the anchor, and our components can comprise multiple data types, including data generated by tools of said data management system and third party tools.

Each of our components has field identifiers like those of our anchor and each component is also labeled as an input or an output of its associated anchor. Each one component may be an anchor to still another different model, with each component being labeled as an input or output in relation to its anchor file. All components of a model are either static and thus does not move through said data management system but is tracked by the system or dynamic and moves through said data management system with its associated model as part of an action of promoting a model when a model is promoted, a dynamic member being labeled as an input or an output with respect to its associated anchor, while both anchors and components may be labeled as static.

With these facilities, concurrent engineering is enhanced, and after creation of a model, thereafter, our system provides continuously tracking the created model while allowing a user to modify it by adding components, deleting components, changing the status or deleting said created model, and allowing promotion of a model in our data processing system through the libraries of our data processing system.

This, along with many other changes have been made as detailed in the description of our invention which follows.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2 illustrates our preferred embodiment's data entry.

Figure 11:
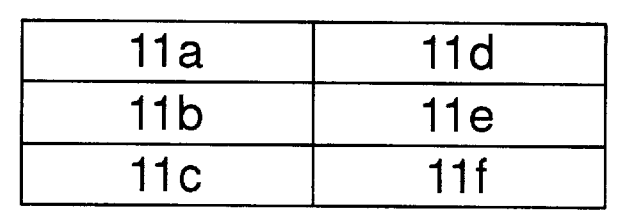

FIG. 11 shows how to layout FIGS. 11a thru 11f to obtain a unified view of the dataflow for the process shown in FIGS. 11a thru 11f.

Figure 13:
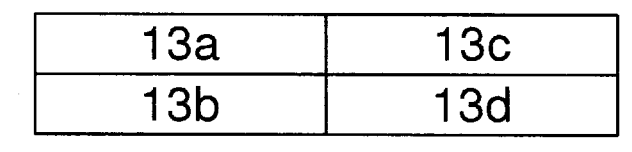

FIG. 13 shows how to layout FIGS. 13a thru 13d to obtain a unified view of the dataflow for the process shown in FIGS. 13a thru 13d.

Figure 14:
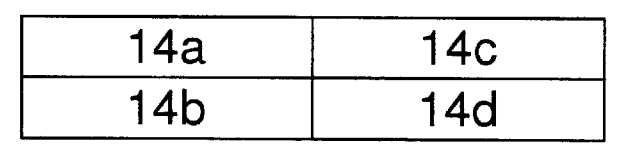

FIG. 14 shows how to layout FIGS. 14a thru 14d to obtain a unified view of the dataflow for the process shown in FIGS. 14a thru 14d.

Figure 15:
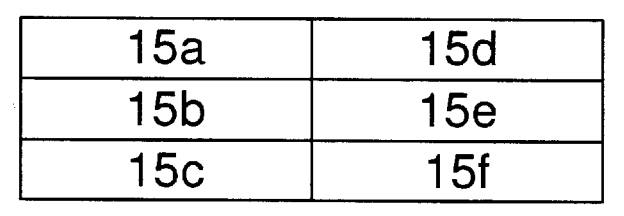

FIG. 15 shows how to layout FIGS. 15a thru 15f to obtain a unified view of the dataflow for the process shown in FIGS. 15a thru 15f.

FIGS. 15a thru 15f describe the QRPNDMOD Process when viewed as laid out as how in FIG. 15.

Figure 16:
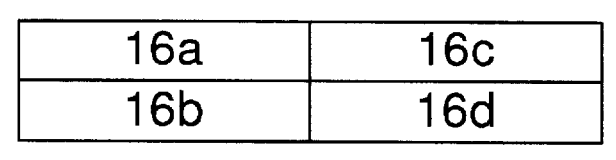

FIG. 16 shows how to layout FIGS. 16a thru 16d to obtain a unified view of the dataflow for the process shown in FIGS. 16a thru 16d.

FIG. 19 shows how to layout FIGS. 19a and 19b to obtain a unified view of the dataflow for the process shown in FIGS. 19a and 19b.

Figure 20:
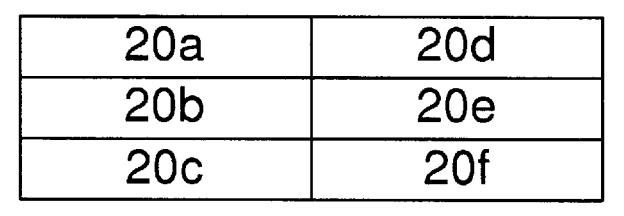

FIG. 20 shows how to layout FIGS. 20a thru 20f to obtain a unified view of the dataflow for the process shown in FIGS. 20a thru 20f.

FIG. 21 shows how to layout FIGS. 21a and 21b to obtain a unified view of the dataflow for the process shown in FIGS. 21a and 21b.

FIG. 22 shows how to layout FIGS. 22a thru 22d to obtain a unified view of the dataflow for the process shown in FIGS. 22a thru 22d.

Figure 24:
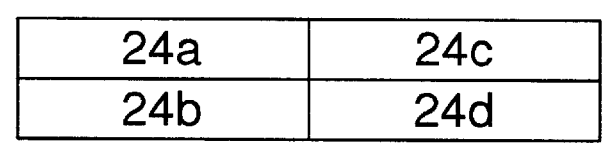

FIG. 24 shows how to layout FIGS. 24a thru 24d to obtain a unified view of the dataflow for the process shown in FIGS. 24a thru 24d.

FIG. 25 shows how to layout FIGS. 25a and 25b to obtain a unified view of the dataflow for the process shown in FIGS. 25a and 25b.

Figure 26:
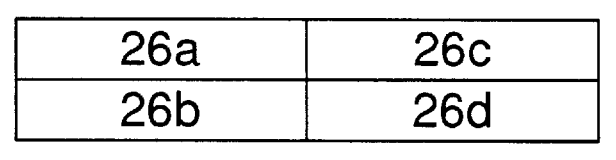

FIG. 26 shows how to layout FIGS. 26a thru 26d to obtain a unified view of the dataflow for the process shown in FIGS. 26a thru 26d.

FIG. 27 shows how to layout FIGS. 27a thru 27d to obtain a unified view of the dataflow for the process shown in FIGS. 27a thru 27d.

FIG. 29 shows how to layout FIGS. 29a thru 29d to obtain a unified view of the dataflow for the process shown in FIGS. 29a thru 29d.

Figure 30:
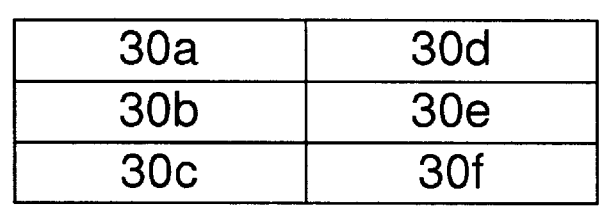

FIG. 30 shows how to layout FIGS. 30a thru 30f to obtain a unified view of the dataflow for the process shown in FIGS. 30a thru 30f.

Figure 31:
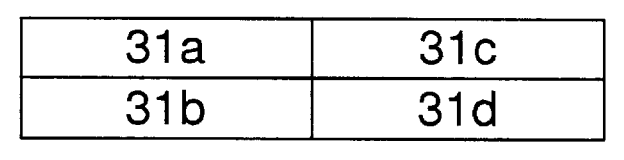

FIG. 31 shows how to layout FIGS. 31a thru 31d to obtain a unified view of the dataflow for the process shown in FIGS. 31a thru 31d.

Figure 32:
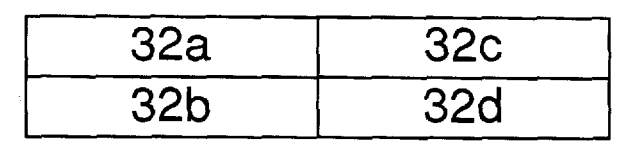

FIG. 32 shows how to layout FIGS. 32a thru 32d to obtain a unified view of the dataflow for the process shown in FIGS. 32a thru 32d.

Figure 33:
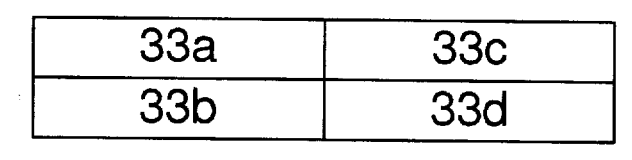

FIG. 33 shows how to layout FIGS. 33a thru 33d to obtain a unified view of the dataflow for the process shown in FIGS. 33a thru 33d.

FIG. 34 shows how to layout FIGS. 34a thru 34d to obtain a unified view of the dataflow for the process shown in FIGS. 34a thru 34d.

FIG. 35 shows how to layout FIGS. 35a thru 35d to obtain a unified view of the dataflow for the process shown in FIGS. 35a thru 35d.

Figure 36:
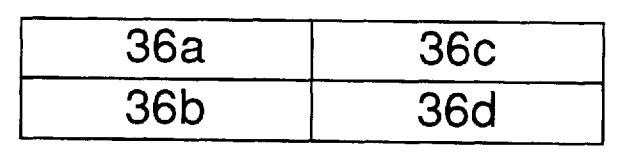

FIG. 36 shows how to layout FIGS. 36a thru 36d to obtain a unified view of the dataflow for the process shown in FIGS. 36a thru 36d.

FIG. 37 shows how to layout FIGS. 37a thru 37f to obtain a unified view of the dataflow for the process shown in FIGS. 37a thru 37f.

FIGS. 45b thru 45e illustrates the Single Fix Tracking Mode procedure.

FIGS. 45c thru 45e illustrates the EC Mode procedure.

DETAILED DESCRIPTION OF THE INVENTION

Overview (Section 1.0)

In order to introduce our Design Control System we will describe it as it can be applied to development of complex circuit design and development projects such as microprocessor design projects. The implementation of our Design Control System can be implemented in a variety of ways using many computing platforms as is suitable for a concurrent engineering project. While we will describe our preferred embodiment, it should be recognized that with this teaching all or part of our exact implementation of user interfaces, methods, features, properties, characteristics and attributes may vary depending on the platform chosen and the surrounding design system. All of these variances will nevertheless employ those routines which implement our processes and which meet our requirements.

Platform (Section 1.1)

The Design Control System (DCS) in our preferred embodiment, even though it can be implemented with other platforms, runs on a network of RS/6000's (workstation class "personal" computers) with an AIX operating system arranged in a Client-Server fashion. Each client and server in our preferred embodiment, is able to implement cross platform code via interpretation, and thus can implement programs written in cross platform languages like Java and VRML. In such situations, Java can interact with VRML by describing extension modes, acting as scripts, and describing the actions and interactions of VRML objects.

Figure 1:
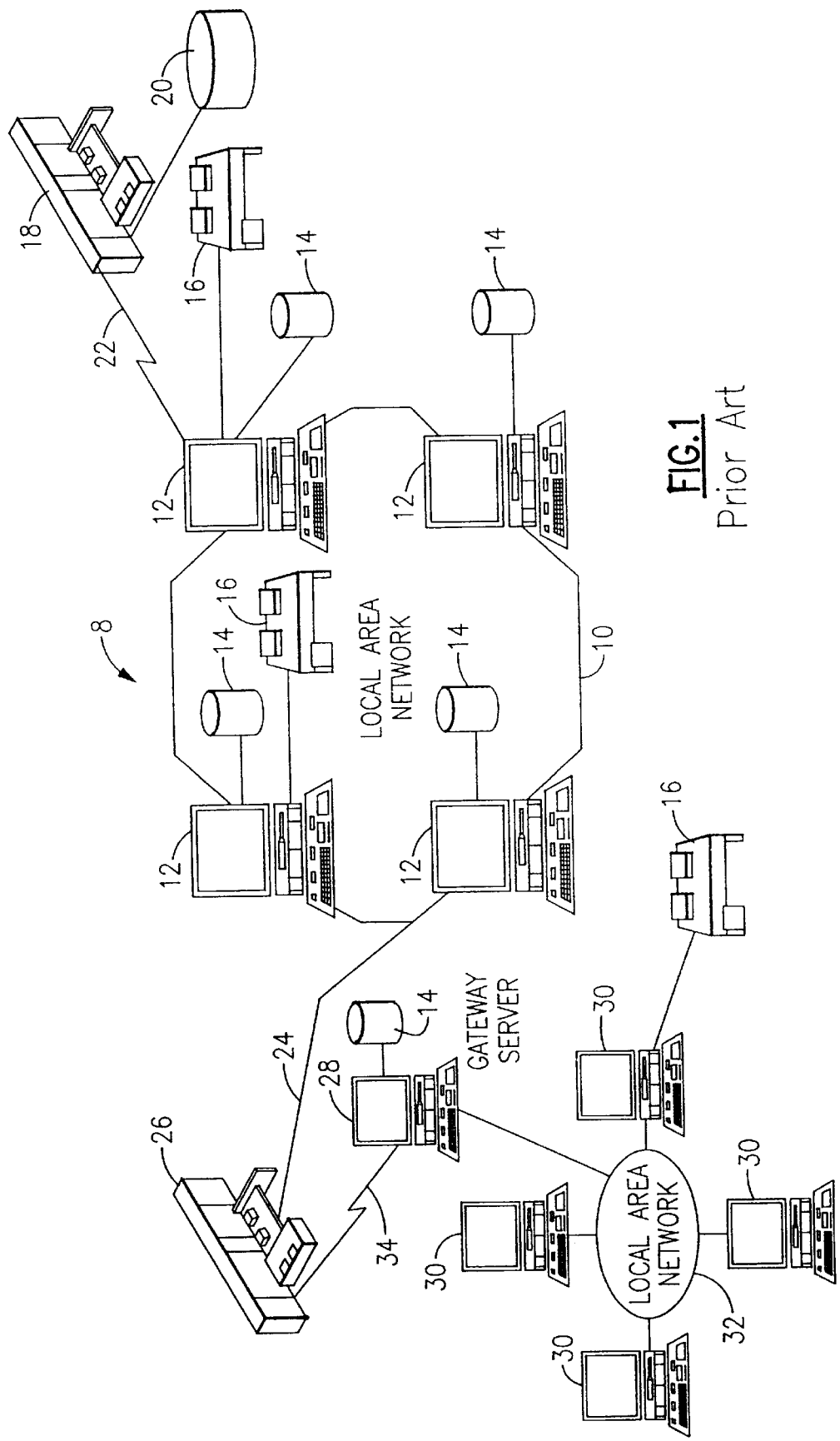
FIG. 1 illustrates a prior art system in which our present system can operate by changes made to the database and design control system, in accordance with our detailed description.

While more powerful situations are contemplated, the system can be installed in a prior art system, like that described in U.S. Pat. No. 5,333,312. Thus, as we show in FIG. 1, the prior art system of the earlier patent, can be employed in this application, by providing the system with new programs. However, such a system, as illustrated by FIG. 1 will be a data processing system 8, which may include a plurality of networks, such as Local Area Networks (LAN), 10 and 32, each of which preferably includes a plurality of individual computers 12 and 30 (which may be RS/6000 workstations or powerful PCs such as the IBM Aptiva's. As common in such data processing systems, each computer may be coupled to a storage device 14 and/or a printer/output device 16. One or more such storage devices 14 may be utilized, to store applications or resource objects which may be periodically accessed by a user within the data processing system 8. As we have said the system is provides with a repository, illustrated by main frame/server computer 18, which may be coupled to the Local Area Network 10 by means of communications links 22, and also to storage devices 20 which serve as remote storage for the LAN 10. Similarly, the LAN 10 may be coupled via communications links 24 supporting TCP/IP through a subsystem control unit/communications controller 26 and communications link 34 to a gateway server 28. Gateway server 28 is preferably an individual computer which serves to link the LAN 32 to LAN 10. The main system can be located anywhere in the world, and remotely from the various servers and clients coupled to it over communications links. The main system can accommodate hundreds of users making requests to the centralized repository (a large server 18, such as one of IBM's S1390 platforms or IBM's RISC System/6000 Scalable POWERparallel Systems (SP) platform for design control information. (AIX, S/390, RS/6000, RISC System/6000 and Scalable POWERparallel Systems are trademarks of International Business Machines Corporation, Armonk, N.Y.)

Since this repository 18 (a large server and its associated storage) is critical to the entire design team, it has the ability to remain available if a single server fails. In addition, the data is secured via a backup or archiving mechanism performed on a regular basis. Our DCS has important performance characteristics. It can handle a distributed computing environment with data being transmitted over LANs and telephone lines linking distant locations in real time. Users at one site experience no noticeable delays accessing data physically located at another site. Due to the complexity of the design, maximum throughput is attained by transferring only the control data necessary to carry out the specific task. For large projects design control information can be physically segregated by library, version and level to minimize the bottleneck caused by too many users accessing the same physical server. In the case of the design data, the physical data is tracked via pointers whenever possible, so as to minimize the amount of file movement between servers. Although, the "official" control information is centralized in one place, the DCS permits certain data to be cached locally on the users machine to improve performance by reducing traffic to the Design Control Repository. For example, much of the control information for private libraries can be cached locally in order to maximize performance for private library accesses. For public libraries, the DCS allows the user to take "snapshots" of a library in which the image of the library is refreshed locally. The user continues to work with his local image of the library until he deems it necessary to refresh the image. The amount of control data that is actually cached is dependant on the environment and the actual implementation. Many of the performance issues are discussed further in the Sections to which they pertain.

Libraries and Design Control Repository (Section 1.2)

The Design Control System has two important components. The Design Control Repository contains the control information for all components of the design. This includes such things as the names of all the pieces, the type of data, the level, the version, the owner, and any results which are deemed quality control records. These results indicate the "degree of goodness" of the design component and they are used by the DCS to make decisions regarding the type of actions which can be performed on a piece of data. This repository can be and is preferably implemented in the form of a database (relational, object oriented, etc.) or using a flat-file system. The actual implementation is usually based on the environment.

As we have said, and as illustrated by the machine to person interface depicted by FIG. 2, our program of instructions executable by a supporting machine environment for performing method steps by an aggregation manager of a data management system having a library organization which receives a request of a user initiated from said displayed client screen as illustrated by FIG. 2 and fulfills the request by a providing a result which provides a dynamic way to track a model during its course through its design phase via our data management system's aggregation manager.

In order to make a common model, we display for creation of a model one or more control screen sections which provide our control information components 235, 236, 237, 238, and 239 as part of a control panel input screen allowing creation of a model by interactive user activity, by importing a file listing providing the data of screen sections 235, 236, 237, 238, and 239, by searching of a library of files in said data management system and importing a located file containing the data of screen sections 235, 236, 237, 238, and 239, or by use of an application program interface with a collection of model management utilities which provides the data of screen sections 235, 236, 237, 238, and 239. These data fields of our control screen which when created by a user comprise data entered in the form boxes (a form is a screen section entry field for representing a model) illustrated in FIG. 2, and when retrieved or otherwise obtained by the system by importing a file listing providing the data of screen sections, by searching of a library of files in said data management system and importing a located file containing the data of screen sections, or by use of an application program interface with a collection of model management utilities, all provide the data of a control screen panel sections which include:

(a) a display screen section displaying a first field representing the name (235) of an anchor name field of a model which is identical to the name of a data object which is serving as a named anchor;

(b) a display screen section displaying a second field representing a library (236) where said named anchor resides;

(c) a display screen section displaying a third field representing the type (237) of data object identified by said anchor name;

(d) a display screen section displaying a fourth field representing user entries for the version (238) of said named anchor;

(e) a display screen section displaying a fifth field representing user entries for the level (239) of said named anchor for use by a user or a third party tool for creating, modifying or deleting an aggregate collection of data objects, encompassing those used for items that are identified, tabulated, tracked, validated and invalidated, and promoted, as are bills of materials, by said data management system.

Furthermore, while, as in the other cases for entry section fields, the same screen does not have to, but can, display an additional field which displays status information. Thus, as illustrated by FIG. 2, the system provides a display screen section displaying a sixth field representing user entries for the status of said named anchor. Now each field can be display separately and various combinations can be made, but all fields are provided by and used by our system. At any time, the entire model schema can be displayed, as it is in the field 240, which displays several models names, as well as their anchor, type, library, version, level and status (which is dynamically tracked by our system).

Our model thus consists of one anchor (with a name 235) and one or more associated components, each of which is a data object in said data management system. This means that our components can belong to any level and version of any library in said data management system and said components are not restricted to the same library, level and version as the anchor, and our components can and do comprise multiple data types, including data generated by tools of said data management system and third party tools.

Now once a model is created of otherwise identified, it becomes part of our system. Indeed the second component is our Design Libraries. They hold the actual pieces of design under the control of the system. There is no limit to the number of libraries under the management of the Design Control Repository, and hierarchical designs are allowed to traverse through multiple libraries. The libraries are managed by Data Managers (Librarians) who are members of the design team. All major facets of the libraries are programmable so they can be tailored to the needs of the design group they service. Certain design groups require more data control than others, so the flexibility exists to widely vary the degree of data control. Libraries are categorized as Public or Private. Both can be shared, but the main difference is that a private library is managed by the actual designer. It's used to hold his daily updates and often will have no formal control. The DCS achieves this by defaulting all control information to a simple non-restrictive form. For example, any designer can create private libraries on their own. They automatically become the owner and have the right to make additional designers "backup" owners. As the owner they can edit, save, modify, or delete any data in their library. The DCS automatically establishes all the proper AFS and AIX permissions. Owners of private libraries control who can access their data with the system accommodating the use of default "access groups" (such as AFS groups) so the designer doesn't have to enter the userids of all his team members each time he creates a new library. Since Private Libraries are considered working areas, data control checks are minimized in order to maximize performance. For example, when a new data element is created, the DCS does not check the Control Repository to make sure the owner has the proper authorities, locks, etc. Instead, a designer is permitted to work in a completely unrestricted fashion in his own work space. All controls are placed on public libraries. The only control checking required is to ensure there are no data conflicts within the Private Library. It is acceptable for two Private Libraries to contain the same design data, so no checks across libraries are done. Public Libraries are the official project data repositories. All data delivered to external customers comes from Public Libraries. Public Libraries are overseen by Data Managers who configure the libraries with varying degrees of control. Typically the libraries are organized with a level structure whereby the lowest levels have the least amount control. Control gets more stringent as the levels increase, and the highest level denotes data released to manufacturing. Almost every attribute concerning data integrity is programmable by the Data Manager. Through a Data Manager Utility, they configure the structure (the number of levels and versions, including the connections between them), the various authorities, the required criteria to enter each level, and the types of Library Controlled Processes required at each level. The system can handle numerous public libraries, and each public library can service unlimited users. In accordance with our preferred embodiment of our DCS architecture we provide an Automated Library Machine (ALM). More than merely a repository for data, the ALM is a userid capable of accepting, executing and dispatching tasks without any human intervention. This enables the designers to make requests of the ALM to promote data or run library processes without the need for a Data Manager to process it.

In order to improve throughput, the ALM can dispatch parallel tasks if the operating system (i.e. AFS) supports it and the situation allows it.

This concepts improves efficiency, and increases security, since the ALM is the only user that requires writable permissions to the data repositories. The physical location of the data residing in Public Libraries is determined by the Data Manager. The DCS along with the Data Manager (and his alternates) are the only means of writing data into or removing data from these physical locations. As a means of safety, the Data Manager does have the ability to access and overwrite data in these physical locations without using the DCS (i.e. thru the OS). This is necessary in the unlikely event the control information gets out of sync with the physical data, and the Data Manager has to manually complete a transaction. Physical locations are defined through the Data Manager Utility for setting up Public Libraries. More details on this are available in the Data Manager User Interface Section 15.

Data Types (Section 1.3)

Data may be identified by a filename (anchor name 235) and a filetype (236). The DCS automatically segregates all data by "type". Types are very useful to associate a piece of data with a tool or process. For example, UNIX/AIX uses extensions to qualify data such as using a ".ps" extension to denote a postscript file. The Cadence Design Management System uses Cell Views to segregate the various types of data within a particular Cell (design component). This segregation is a fundamental building block to Design Control Systems since certain types of data require more design control than other types. Our DCS allows each individual type to be controlled on a level and version basis within a library. The DCS is capable of tracking any data type from any point tool, even third party vendors.

Levels (Section 1.4)

Each Public Library consists of n levels which are established by the Data Manager. The naming of the levels (239) are arbitrary, but each denotes a degree of quality of the design. Data moves into out of levels via a "promotion" mechanism. There are two types of levels in the DCS, Engineering (or working) and Release Levels.

Figure 3:
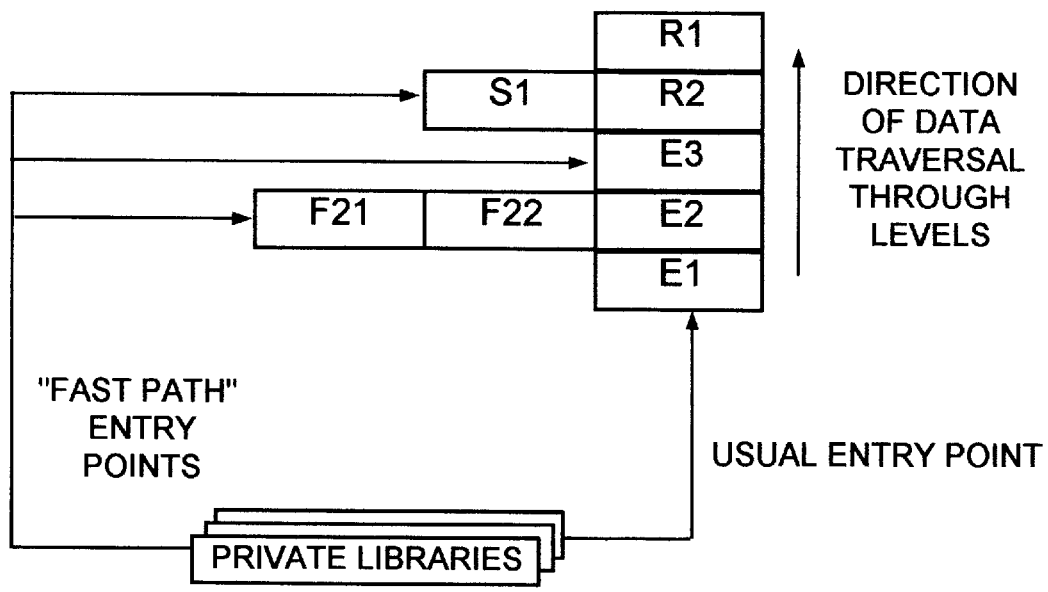
FIG. 3 illustrates our preferred Design Control System Level Structure.

FIG. 3 shows a typical level structure with 3 Engineering Levels denoted E1, E2 and E3, two main Release Levels denoted R1 and R2, a Sideways Release Level S1, and a Fast Path Stream consisting of F21 and F22. Data can be promoted into E1, F21, E3 and S1 from outside of the library, but it can only enter R2 from E3, E1, E2 and E3 are arranged in a serial fashion. The normal promotion path is for data to enter E1 (the least controlled level) and migrate up through E2, E3 and finally into R2 (the most tightly controlled level). The external paths into F21 and E3 are known as "fast paths" and exist to accommodate emergency updates to pieces of design residing at the higher levels. There are two different types of fast path arrangements:

Fast Path Entry means there is no fast path level associated with the Engineering level, just a "doorway" through which data can enter. Level E3 is an example of this where the user simply promotes data from the private library into E3. The DCS will run any pre-processes defined at E3, but any criteria that would normally be necessary to traverse through E1 and E2 is bypassed.

Fast Path Levels are staging areas where data is promoted into, and promoted through, in order to reach the target Engineering Level. There can be any number of Fast Path levels for any given Engineering Level. If there's more than 1, it's known as a Fast Path Stream since the data must migrate through all the Fast Path Levels before reaching the Engineering Level. F21 and F22 constitute a stream, which could've contained more than 2 levels. We have provided at least one level to provide an area where all the processing normally run at the E1 and E2 levels can be run to ensure that the fast path data meets all the same criteria.

Release Levels are handled in a different manner. R1 is the oldest release level and it's frozen, which means its contents can't be updated any longer. It contains a static snapshot of a design delivered to an external customer. R2 is now the active Release Level which is the destination of any data promoted from E3. The Data Manager programs the connection of E1 to E2 to E3 to Rn. The DCS automatically freezes the previous Release Level and connects E3 to the new Release Level whenever the Data Manager creates a new one. Unlike main Release Levels, Sideways Release Levels are always active and there can be n Sideways Levels for each Release Level. The purpose of the Sideways Levels is to hold post tape-out updates such as microcode patches to hardware under test. Since the Release Level corresponding to that level of hardware is probably frozen, and a new iteration of design is propagating through the Engineering Levels, the only path into a Sideways level is directly from a Private Library. The Data Manager has the ability to reconfigure the Engineering Levels at any time based on these rules:

- The connections between levels can be changed at any time. (i.e. E1→E2→E3 can be changed to E1→E3→E2.)
- A level can be removed as long as no data resides in that level.
- A level can be added at any time.
- The Data Manager can create a new Release Level at any time. Existing frozen Release Levels can be removed as long as no data resides in that level. A frozen level can become an active level again if no data resides in the current active Release Level. The DCS performs a "thaw", a step which removes the current Release Level (R2) and connects the previous level (R1) to E3. As shown in FIG. 3, the DCS supports the normal promotion path to E1 as well as "fast paths" into E2 and E3. The following minimum checks are performed at all entry points:
  - The owner attempting to send data to a Public Library must possess the update lock. If no lock exists, the sender obtains the lock by default. If another user has the lock and the sender is a surrogate, he can obtain the lock (the system immediately notifies the original owner). If the sender is not a surrogate, the action is halted, until ownership is properly transferred.
  - If the level to which the data is being promoted to has any entry criteria, it is checked to ensure the data passes the criteria.

Versions (Section 1.5)

Figure 4:
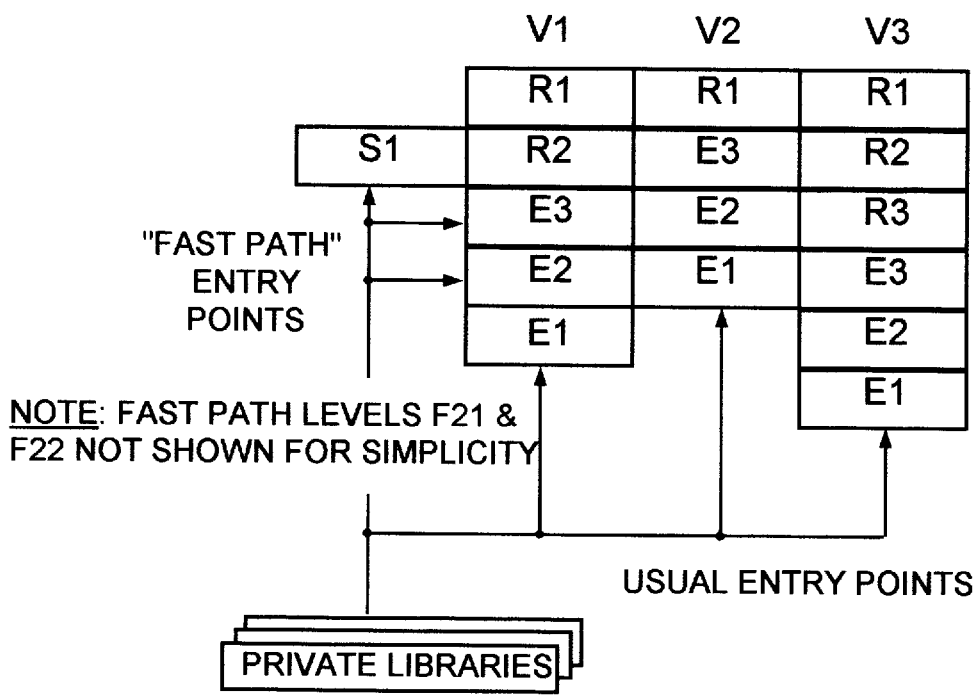
FIG. 4 illustrates our preferred Design Control System Level Structure with Versions.

Each public library consists of n versions which are defined by the Data Manager. The concept of versions exist to support parallel design efforts. All versions have the same Engineering (Working) Levels, but have different Release Levels depending on the frequency of tape-outs for that version. Data in separate versions is permitted to traverse the levels at independent rates. For example, if a piece of design has 2 versions, 1 version may exist at E1 while the other version exists at E3. FIG. 4 is an extension of FIG. 3 in which library structure has been expanded to show 3 versions, V1, V2 and V3. In theory there's no limit to the number of versions just as there's no limit to the number of levels. Versions can be independent or dependent. Independent versions are isolated and must ultimately contain the entire set of design components. Dependent versions are based on previous versions (which the Data Manager specifies when creating a new version). By supporting the concept of dependent versions, only the incremental data necessary for a new design variation needs to be libraried in the new version. The Library Search mechanism will be able to construct a complete design Bill of Materials by picking up data from both versions.

Library Search (Section 1.6)

Our preferred embodiment of the DCS provides support for "Library Searches". This allows data, which is used in multiple iterations of the design, to exist in only one place. In other words, if a design component is changed, only that component needs to be re-libraried at a lower level. A full model can still be constructed by starting the search at the lowest level where the component is known to exist. The library search mechanism will pick up the latest pieces at the lowest level, then search through the next highest level to pick up more pieces, and so on until it reaches the highest level where all components reside. In addition to searching through levels, the mechanism also searches through versions. The user provides a starting library level, version and either a single type or a list of types. If the version is based on a previous version, and all the necessary design components can't be located in the starting version, the mechanism searches the previous version based on the following two rules:

1. If the search begins at an Engineering Level in one version, it resumes at the same Engineering Level (not the lowest level) in the previous version.
2. If the search begins at a Release Level (including a Sideways Level) in one version, it resumes at the latest Release Level in the previous version. This may be older or more recent in time than the released data in the current version.

Figure 5B:
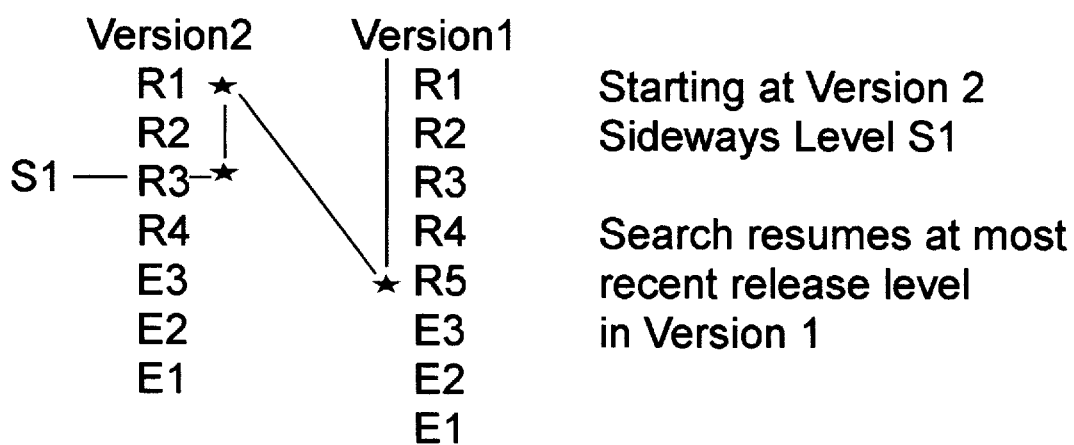
FIG. 5 (illustrated in parts FIGS. 5a and 5b) illustrates our preferred Design Control System Library Search Examples.

FIG. 5 shows examples of the Library Search Mechanism. The library search utility is available to designers, Data Managers and third party tools. The interface is both command-line and menu driven to accommodate any environment. In addition to the required parameters of type, level and version, the user has the option of specifying the name of a data object. These additional options exist:

Noacc

This allows the utility to use a temporary cached copy of the search order information for performance reasons. Since this information may be obsolete, the absence of the option results in the actual Design Control Repository being accessed and the search performed from within it.

File

Write the results into an external file.

Various Sorts

They control the way the output is sorted and displayed.

Nosearch

Only list data found at the starting level.

First/All

Indicates whether to include all existences of a particular design component or only the first one in the search order.

Select

Presents a selection list of all candidates so the user can choose those of interest.

Noversion

Prevents the search from tracing back across version boundaries.

Levels

Displays the search order based on the existing level structure.

Versions

Displays the search order based on the existing version structure.

Locks (Section 1.7)

In order to properly control shared data, the DCS supports several types of locking mechanisms. Two of the locks exist to control groupings of files that may comprise a model build. These are known as move and overlay locks. The user can set one of these locks using a utility which allows him to control the scope of the lock based on certain fields. The user can enter specific data or a wildcard, indicating "ALL", for Name of Design Components Type of Design Components Level of Design Components Version of Design Components Library Name By specifying only a library name and four wildcards, the user is requesting that all data in the library be locked. By filling in all five entries, a specific design component will be locked. Various degree of locking exist in between those extremes.

If the information corresponds to a Bill of Materials (BOM) and the user wants to set the lock on the entire BOM, a BOM Flag will exist allowing him to specify this action. Regardless of how these fields are filled in, all locks will be set individually so they may be removed individually. A lock does not have to be removed the same way it was set. The user will also specify the type of lock, Move, Overlay, or Update (Ownership). The following definitions exist:

Move Locks mean the data can't be overlaid by the same data at lower levels, nor can it be promoted to a higher level. This provides a method for completely freezing an Engineering Level while a model build or large scale checking run is in progress.

Overlay Locks are a subset of move locks. The data can't be overlaid by the same data from lower levels, but it can be promoted to higher levels.

Update (Ownership) Locks are the means by which a designer takes ownership of a piece of data. Update locks are designed to prevent multiple designers from updating the same design component in an uncontrolled way, thus resulting in data corruption or lost information. There are two types of Update locks, permanent and temporary.

Figure 6:
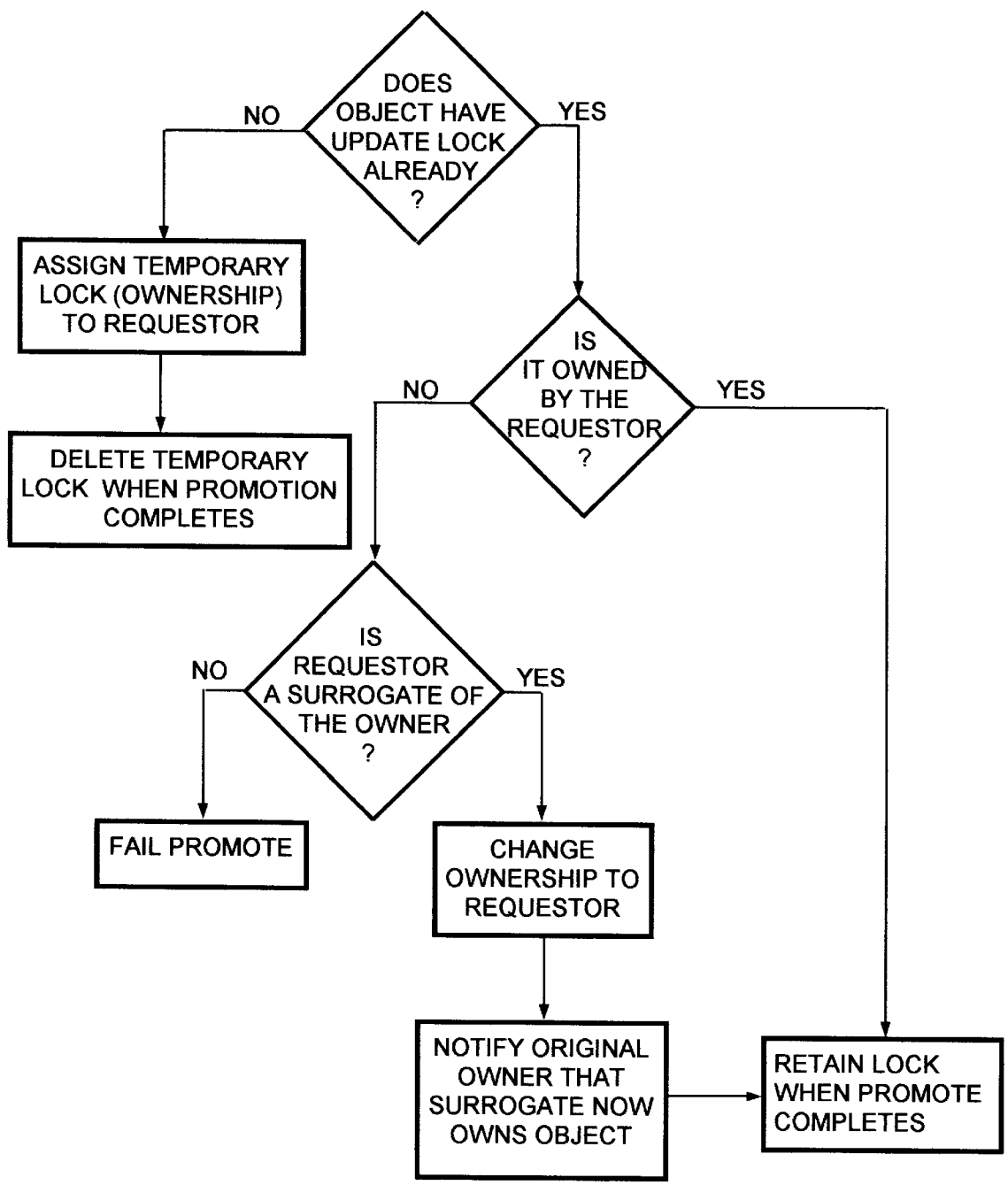
FIG. 6 illustrates our preferred Mechanism for Update Locks.

A permanent Update lock exists when the designer specifically requests to own a piece of data. This is done through a utility, and the DCS keeps track of this ownership. Other designers may copy and modify the data in their private libraries, but any attempt to promote that data into the public library will fail, unless the designer is a designated surrogate of the owner. The only way these locks are removed are by the owner resigning the lock or a surrogate assuming the ownership of the data, and the corresponding lock. A temporary Update lock exists to facilitate sharing a piece of data among multiple designers. The user can either request a temporary Update lock in advance (i.e. when he begins editing the data), or he can wait until he initiates the promote into the public library. The DCS will first check to see if anyone has a permanent Update lock, and if so, it will only allow the promotion to continue if the user is a designated surrogate. If nobody has a permanent Update lock, then the DCS will issue a temporary Update lock for the time the data remains "en route" to the final promote destination. Once it arrives safely, the temporary Update lock is removed and the data can be claimed for ownership by someone else. Surrogates are "alternate" owners of data. For example, a project may be arranged such that each piece of design is owned by a primary designer, but also has a backup owner (designer) to take over the design during vacations, emergencies, etc. In this case, the owner can tell the DCS that the backup designer should be a surrogate, thus giving him the right to take ownership of a design component. The surrogate can either use the locking utility to specifically take ownership prior to making any updates, or he can wait until he initiates a promotion. The DCS will check to see if the design component is currently owned, and if so, check to see if the user is a defined surrogate. If both are true, it will give the user the chance to "take ownership" and allow the promote to continue. The original owner would be notified that his surrogate has taken ownership. FIG. 6 illustrates the lock mechanisms for Update locks.

Bill of Materials Tracker (Section 1.8)

The DCS has a built-in Bill of Materials (BOM) Tracker to facilitate tracking many design components in large projects. The main objective of the BOM Tracker is to group certain design components to make it easier to promote them through the library and track their synchronization. This is crucial for data sets that contain some source and some derived files from that source. The following features exist in the BOM Tracker:

It supports automatic data grouping, based on the design component name, with the notion of required and optional data types. One example might be a grouping which consists of a graphical symbol denoting the I/O of a design component, the corresponding piece of entity VHDL and the architectural VHDL. Any changes made to the symbol should be reflected in the entity, so the entity would be required. A change may also be made to the architecture, but it's not always necessary, so the architectural VHDL would be optional. When a promote is initiated to a public library, or between levels of a public library, the DCS checks to see whether a data grouping is defined for the data type being promoted. If so, then all required data types are checked to ensure they exist. In addition, any optional data types are checked for existence and they are also picked up. The entire grouping is promoted to the target level. If a required data type does not exist, the promotion fails. Automatic data groups are programmed into the DCS by the Data Manager. Since they are BOMs, all rules of BOM tracking, invalidation and promotion exist or the members of the grouping.

BOMs are used for two main reasons. First they are used to group many smaller pieces of data into larger more manageable chunks to facilitate movement through the library and increase data integrity by reducing the risk of data getting out of sync. The other main reason is to track the components of a model (i.e. simulation, timing, noise analysis, etc.). The DCS offers a very flexible user interface for creating BOMs in order to satisfy the various scenarios. The use can manually create BOMs by selecting pieces of design interactively, filling in search criteria and initiating a library search, or importing a simple text list. In addition, an API exists for point tools to create a BOM listing and pass it into the DCS.

The power of the BOM Tracker is augmented wih our automatic invalidation routine. Once a BOM is created, the DCS constantly monitors for a change to the BOM. If any member is overlaid or deleted, a notification is sent to the owner of the BOM indicating that the BOM is no longer valid. The owner can continue to work with his model, but he is aware that he's no longer using valid data. Even though a BOM is invalid, it can still be moved through the library. This accommodates the occasion where a piece of a model had a relatively insignificant change. If the model builder deems it unnecessary to re-build the model, this feature allows him to continue his work and even move the BOM through the library.

Status on BOMs is and should be accessible in two ways. The first is by automatic notification (e.g. e-mail) to the owner as soon as a BOM is invalidated. The second is by means of displaying the BOM either interactively or in report form. This listing shows the overall status of the BOM, and all members of the BOM with their individual status.

The BOM Tracker also supports the concept of a "support" object. This can be a design component, a piece of information, documentation, etc., that can be associated and promoted with a BOM but never causes BOM invalidation.

BOMs are hierarchical in nature and a BOM can be nested within a larger BOM. Whenever a piece of data is overlaid or deleted, the DCS looks to see if that piece belonged to a BOM. If so, it immediately checks to see if the BOM belongs to other BOMS. It recursively checks all BOMs it encounters until it's at the top of the hierarchy. All BOMs found will be invalidated (if they are currently valid) and the owners notified.

BOMs support move and overlay locks. The user can set a move or overlay lock on a BOM, and the DCS will set individual locks on all the members. If a member is a BOM, all of its members will receive individual locks. These locks can be removed by using the main lock utility and specifying the top-level BOM or filling in the desired fields to individually reset locks.

The DCS supports the concept of a BOM promote, which means the user can request that all the contents of the BOM be promoted simultaneously. This increases data integrity by helping to ensure a matching set of design data traverse through the library in sync.

BOMs can contain members who reside at different levels, different versions and even different libraries. The DCS will only promote those members which exist in the current library, and refide in an Engineering Level below the target level. If a member exists in a different version and is also below the target level, it will also be promoted.

There is separate authorizations for creating and promoting BOMs. This is set up by the Data Manager, so they can have complete flexibility in controlling who can create and move BOMs.

Promotion Criteria and Promotion Mechanism (Section 1.9)

Figure 7A:
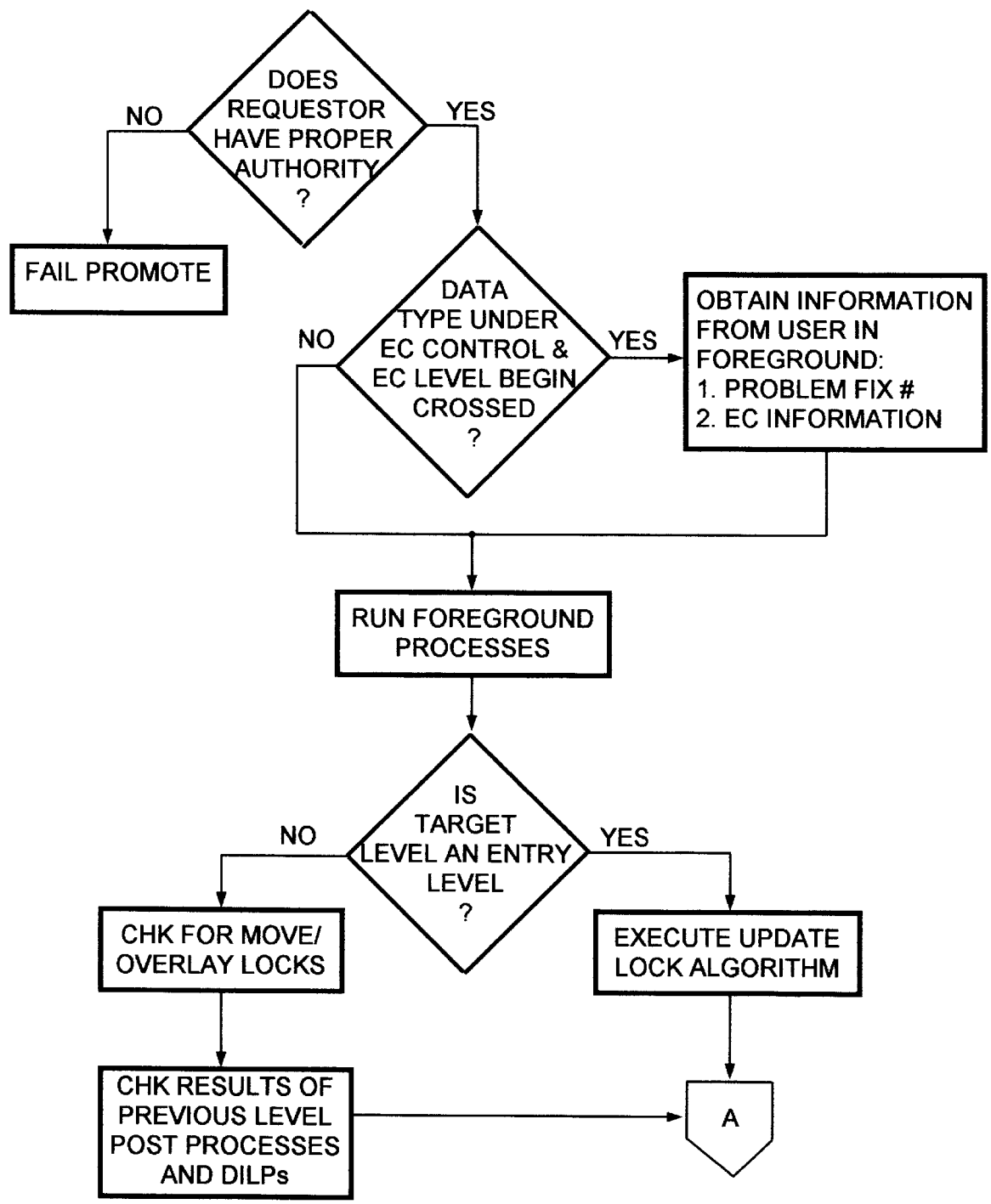
FIG. 7 (illustrated in parts FIGS. 7a and 7b) illustrates our preferred Promotion Mechanism.
Figure 7B:
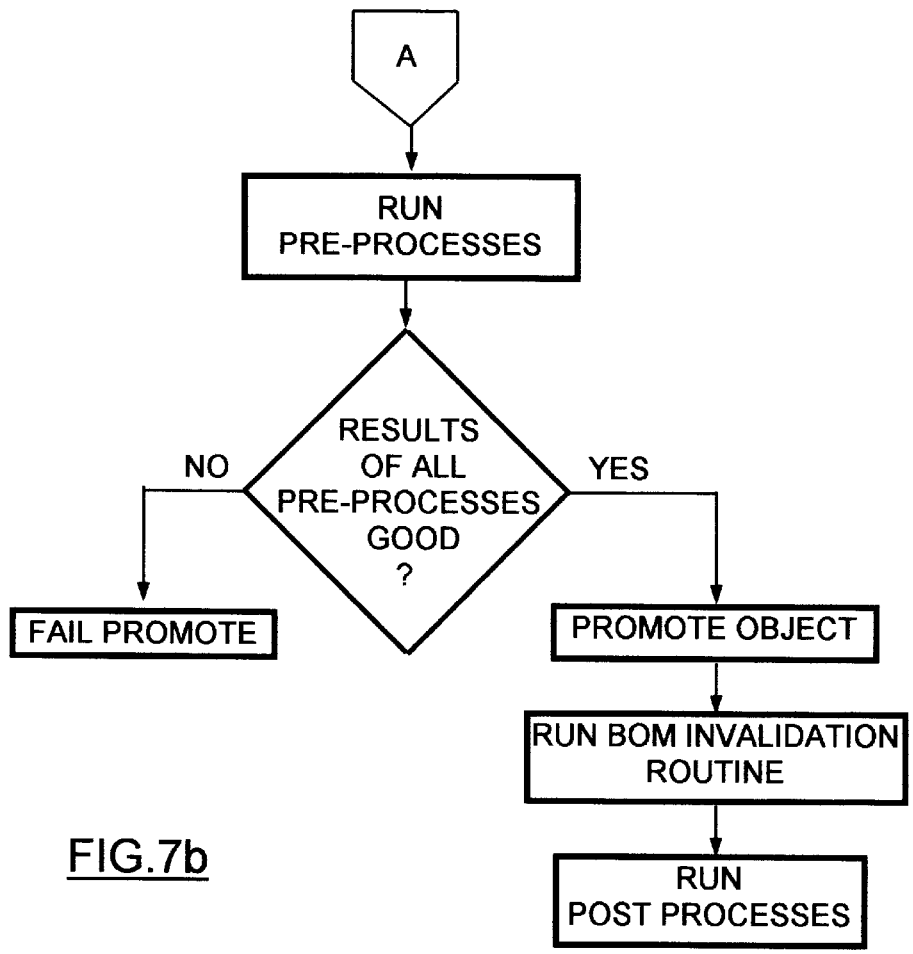

An important aspect of the DCS is that it provides a method for the design to traverse to different levels of goodness. As the design stabilizes at the higher levels, the number of pieces which need to be moved and tracked can be very large. The DCS uses the concept of promotion criteria and robust mechanisms to first determine what data can be promoted, then carry out the task in an expedient manner. The DCS supports two variations, "move" and "copy", promotes. In a "move" promote, data appears to the user like it only exists at the target level once the promote completes. The user is unable to access the copy that existed at the previous level. For example, if a design component is at level E2 and the user promotes it to E3, when the promote is finished and the user refreshes his image of the library, he sees the data at E3 only. In a "copy" promote, the data still appears at the previous level. The user can access it at either location. As new iterations of the same design component are promoted into a level, the old component is not truly overlaid. It is moved off to the side so it can be restored in an emergency. Promotion criteria usually exists in the form of library process or pseudo-process results, but in general it can be any condition that must be met by the the object(s) being promoted. It is defined by the Data Manager and can exist for any design component at any level and version. Certain design components don't undergo any formal checking or evaluation in the design process, so they may never have any promotion criteria. Other pieces may undergo the majority of checking so they may have lots of criteria. The objective of the DCS is to track actual results for each design component and use the promotion criteria to determine if the design can attain the next level of goodness. When a design component is overlaid or deleted, all corresponding results are deleted too. The DCS supports an emergency override mechanism which allows the Data Manager to promote data which does not meet the criteria. Invoking an emergency override cause a log entry to be written indicating criteria has been bypassed. The Data Manager determines which results are necessary for which types of design at each Engineering and Release Level. These results may get recorded through "library controlled" or "external" processing. At the time the promote is initiated (whether it be against individual design components or BOMs), the mechanism illustrated by FIG. 7a and FIG. 7b is invoked to determine what pieces should be promoted. There are three types of promote transactions:

1. Promotion of an Individual Design Component
2. Promotion of a Group of loosely-coupled Design Components
3. Promotion of a Group of tightly-coupled Design Components (i.e. BOMs)

Basically, the same mechanism is employed in all three cases, but cases 2 and 3 require additional optimization for high performance. In case 1, each step in the mechanism is executed once and the promotion either succeeds or fails. Case 2 is initiated by a user selecting a group of objects to be promoted. They may or may not have any relation to each other. In this case some optimization is done, but each object is basically treated as if it were initiated as an individual promote. For example, the authority check only needs to be done once since the same user is requesting the promotion for all the objects. However, since each object can have unique locks, criteria, processes defined, etc., most of the steps need to be repeated for each object. Case 3 is the most complicated because the DCS offers a great deal of flexibility. The actual implementation is dependant on the platform of the DCS and the type of control mechanism in place (file-based, object oriented database, relational database, etc.). If the user community wants to eliminate flexibility in return for increased performance, the DCS can enforce rules such as no library processing allowed for members of a BOM. In this scenario, the entire algorithm would be executed on the BOM itself to ensure the proper authority is in place, it meets the promotion criteria, and any processing that's defined is executed. However, each member could bypass some of the checks thus saving a significant amount of time. If the user community opts for flexibility, some optimization can still be performed. For example, if a BOM contains 10 members and the mechanism calls for five checks on each member, there doesn't need to be 50 requests for information. Depending on the platform, it may be optimal to either make one large request for each member (ten total requests) and obtain all five pieces of information in the request. In other cases it may be optimal to initiate a request for a piece of information, but solicit it on behalf of all ten members (five total requests). Since these BOMs can be extremely large, the various kinds of optimizations and trade-offs between flexibility and performance determine the exact implementation. As a convenience feature the DCS supports a multiple promote feature which allows the user to request a promote through multiple levels. For each level the promotion mechanism is followed as stated above. For example, when initiating a promote, the user can specify to move data from E1 to E3 with a single invocation. However, the DCS will internally break it into two separate promotes with the full mechanism being run for the E1 to E2 promote, then again for the E2 to E3 promote.

Library Controlled Processing (Section 1.10)

The concept of Library Controlled Processing allows tasks to be launched from a public library, against one or more design components, with the results being recorded against the components. This is an automated method to ensure that tasks, and checks deemed critical to the level of design are run and not overlooked. Since some of these tasks could be third party tools, the actual implementation can vary in sophistication. In its simplest form, Library Controlled Processing consists of the following constituent parts:

Foreground Processing

This is the conduit by which the user enters any information required to run the tool. Menus may be presented or the user may interact in some other way.

Pre-Processing

This refers to a library controlled process that is launched prior to the data being promoted to the target level. The process must finish and complete successfully, based on the promotion criteria of that process, if the promote is to continue. For example, if a pre-process is defined at level E2, then when the promote to E2 initiates, the process is launched and the promote "suspends" until the process completes. Once it finishes, the result is compared against the criteria to ensure it's satisfactory. The promote then resumes.

Post-Processing

This refers to a library controlled process that is launched after the data arrives at the target level. The results of the process are used as promotion criteria to the next level.

Designer Initiated Library Processes (DILP)

This is very similar to a post process, but instead of the DCS launching the process, it's manually launched by the designer. DILPs usually exist to retry Post-Processes which failed. This eliminates the need for the user to re-promote the data just to initiate the processing. If a DILP is used to recover a failing Post-Process, and the DILP is successful, the good result will overwrite the bad result from the Post-Process. Just because DILPs are primarily used to recover failing Post-Processes, the DCS doesn't make this a restriction. The Data Manager can set up DILPs as stand-alone processes with no corresponding Post-Process. DILPs that exist to recover failed Post-Processes are optional in that they are not counted as required promotion criteria. Stand-alone DILPs can be optional or mandatory, with mandatory DILPs being required to run successfully in order for the data to promote to the next level. The DCS allows the Data Manager to designate which DILPs are mandatory and which are optional.

Level Independent Pseudo Processes

These are special types of process which are more like process results than actual processes. They exist as a means to record information outside of the scope of results from Library Controlled Processes or External Data Processing. For example, suppose a Library Process exists to run a layout checking program which checks for wiring and ground rule violations. Ultimately the program will return some pass/fail result, such as a return code, which the DCS uses as the process result. The tool may also return other useful information which the designer wants to save, such as the number of wires or cells in the design. Pseudo processes provide a repository for this kind of data. Like DILPs, these can be used as mandatory criteria for promotion, or they can be optional and used solely for information. They can even serve as status indicators for design components progressing through a lengthy process at a particular level. The concept of level independence means the checking program could be run at the E2 level, but the pseudo process results can be stored at E3. In short, the DCS allows a pseudo process to be defined at any level, and it can be set by a process running at the same level, any other level or completely outside of the library. The DCS provides an API for setting level independent pseudo processes. The API can be used by designers, Data Managers or third party tools, and employs a "process search" similar to a library search. This means the API allows the user to specify the name of the process, the data type, level and version. The DCS will use this as a starting level and search for all matching pseudo processes defined at or above this level by following the same library search mechanism as in FIG. 5. A flag also exists to disable the search and set the result for the process specified at that level and version.

Any number of any type of process can be defined by the Data Manager for a given data type at a particular level and version. In addition, processes can be chained together in independent or dependent sequences. In a dependent sequence, each process must complete successfully before the next process in the chain can initiate. For example, when compiling VHDL, the entity must always be compiled prior to the architecture. Thus two compiles could exist as a dependent sequence where the entity is compiled, the result checked, and if successful, the architecture is compiled. In an independent chain, the first process initiates, and when it completes, the next process runs regardless of the outcome of the first process. Processes can also execute using input data other than the object used to initiate the promotion. Using the VHDL compile example, the actual object being promoted could be a simulation BOM which contains that entity and architecture VHDL. The DCS provides a robust system for the Data Manager to define the processes which should be run, and the type of data they should run on. Certain library controlled processes require special resources such as large machines, extra memory capacity, etc. Therefore, the DCS allows the Data Manager to specify a particular machine or pool of batch machines where the tasks can execute. Either the task is transferred to the specific machine or a request is queued up in the batch submission system. In the event that a task must run on a completely different platform, the DCS provides hooks to launch a library controlled process from one platform which initiates a task on a different platform (i.e. a mainframe). The results are returned back to the original Automated Library Machine and processed. This Cross-Platform capability allows the DCS to encompass a broad and sophisticated methodology utilizing tools on many platforms. Regardless of how the process is launched, the results must ultimately get recorded within the DCS. To accomplish this the DCS provides an Application Program Interface (API) through which third party tools can communicate. When the task completes the API is used to convey the results and the pedigree information back to the DCS. The DCS provides both an interactive means and a report generator to view process results. FIG. 7a and FIG. 7b illustrate the method by which promotions and library controlled processing interact.

External Data Processing (Section 1.11)

External Data Control is very similar to the Designer initiated Library Process in that the user launches a task against some design component(s). However, unlike DILPs which require that the design components be under the control of a Public Library, this type of processing is done on data in Private Libraries and designer's work spaces. External processing is the mechanism whereby the DCS captures the results of the process along with pedigree information concerning the input data, output data and any necessary software support or execution code. This pedigree information is stored along with the design component for which the designer initiated the process. When the designer promotes that component at a later time, the DCS checks the pedigree information to ensure nothing has changed. It then checks to see if the external processing matches any of the defined library processes which are required for the promote. If so, and the external processing results meet the criteria, the library process results are set (as if the library process just ran automatically) and the promote proceeds. If no matching process can be found, the external results continue to be saved with the design component as they process may match that at a later level. The concept of External Data Processing exists to increase productivity by allowing the designer to save, and later apply, results obtained during the normal course of design rules checking to the "official" results the DCS uses to determine the level of goodness. Overall data integrity can easily be breached if a proper mechanism for calculating pedigree information is not implemented. For this reason it's imperative for the DCS to ensure that all the proper input, output and software data are included in the pedigree information. External Data Processing occurs in two phases. In the first phase, the designer runs some tool or process and if the results are acceptable, he runs a utility to designate the data for external processing. The role of the utility is to create the Pedigree information which contains a listing of the input and output data, the results, and some type of data identification code for each member of the Pedigree and the Pedigree itself. A simple identification code is a cyclic redundancy check. The utility can be independent of or incorporated into the actual third party tool. The second phase consists of librarying the data and the results. The designer invokes a special form of a promote which first does the following:

1. Check the data identification code (i.e. CRC) of all members in the Pedigree

2. Check the data identification code of the Pedigree itself.

These 2 steps are designed ensure the same data used to generate the result is indeed being libraried. The identification code of the Pedigree ensures that the contents of the Pedigree weren't manually altered. From this point on, the normal promotion mechanism in FIG. 7a and FIG. 7b is followed with one exception. The boxes where Foreground, Pre and Post Processing occur are all bypassed. Rather than simply checking existing results to see if they meet criteria, the DCS makes a list of all Pre-processes for the target level and Post processes for the previous level. It then checks the Pedigree information for evidence that equivalent processes were run and achieved acceptable results. If any processes exist in the DCS for which no corresponding Pedigree results exist, or any Pedigree result does not meet the prescribed criteria, the promote fails.

Authorities (Section 1.12)

The DCS permits the Data Manager to establish a wide variety of authorities which gives him great flexibility in managing the library. Each type of authority can be defined very loosely (the user is authorized for all design components, at all levels, in all versions) to very tightly (the user is authorized on an individual design component basis). The utility for granting authorities works in one of two modes:

- In one mode the Data Manager is offered a screen in which he can fill in the design component name, type, level, version, user ids, and the type of authority. For any field, except for the user ids, he can default it to "ALL".
- In the other mode an authority profile can be called up and executed. An authority profile allows the Data Manager to pre-define the types of authorities for a given type of job. For example, profiles may exist for Designer, Technical Leader, Model Builder, etc. This information is contained in an editable ASC file in which the Data Manager defines the kinds of authority to varying degrees of restriction. Once the profiles are created, the Data Manager uses this mode to either add/delete users to/from the profile and process the changes within the DCS.

Authorities exist for the following tasks:

Setting Locks (Move, Overlay, Update, ALL)

Promoting design components and/or BOMs into levels (Engineering Levels, Release Level.

Creating BOMs

Initiating Library Processes

Setting Pseudo Process Results

Data Manager GUI User Interface (Section 1.13)

The DCS contains a robust Data Manager interface which is used to "program" the library. It's configured as a series of sub-menus arranged under higher level menus. Each sub-menu has fields to fill in and may employ Predefined Function (PF) keys for additional features. Graphical elements such as cyclic fields, radio buttons, scrollable windows, etc. may be used to further enhance usability. Utilities exist to:

Define the library properties

The user is afforded a means to enter the path of the repository where the data resides, the userid of the Data Manager and any alternates, the userids of any Automated Library Machines, and whether the library is under Design Fix or Part Number and EC control. If the library is under any type of control, additional entries are made for the data types which should be tracked by Part Number, the data types which should be tracked by Design Fix number, the EC control level, and a field for a generic problem fix number. For any ALMs, the DCS will automatically add the proper authorities (including operating system authorities) to permit the ALM to store data and record results.

Define the structure (levels, versions and their interconnections)

This is the means by which the Data Manager adds and deletes levels and versions. It also enables him to defined the interconnections of the levels, and the dependance of versions on other versions. A minimum interface consists of one screen for level structure and one for version structure. The level structure screen displays the current structure.

Define the types of data which will be under library control

For all data types known to the DCS, this enables the Data Manager to select those managed in this particular library. The screen displays all known data types in the system with a flag indicating whether it's being tracked by this library. Each data type also has a field for an alternate storage location. This solves the problem caused by certain data types that can be very large. Therefore, problems may arise in trying to store these data types along with the all the other types in a particular level. By specifying an alternate storage location, these large data types can be further segregated.

Manage Library Controlled Processes

For each level, the Data Manager can add, modify or delete processes. For each process information is required about the type of machine it can run on, any necessary arguments, the result criteria, disposition instructions for the output, whether it's dependent on another process, and whether it should be deferred. The DCS provides Process Specific Boilerplates which can be used to manage process configurations for an entire project. Necessary and required information for each process can be programmed into the DCS, so when a Data Manager attempts to define that process to his library, some of the fields appear with default data already filled in. He can override any of the data.

The information for each process can be entered/edited individually on a menu containing all the above fields or a utility exists to load "process groups" which are pre-defined library controlled processes. The Data Manager simply selects a process group and attaches it to the appropriate data type, level and version. The process groups are ASC based files which contain the necessary process information in a prescribed format. They can be created using any ASC editor.

Set up authorities.

See the previous Section 1.12 for details.

Define automatic data groupings (Subset of BOM Tracking)

This enables the Data Manager to define a data group which consists of a master object and member objects. Each member object can be required or optional. For each master object entered, the user must enter a list of member objects with their required/optional flag. In addition, an Erase-To-Level flag exists which determines the outcome of the following scenario: a data group, comprised of optional members, exists at a level. The same data group, without some of the optional members, exists at the next lowest level. Upon promotion of the lower level data group, the DCS will either erase the members of the upper level data group or leave them, depending on the Erase-To-Level flag. By leaving them in place, it allows members of newer data groups to join with members of older data groups.

Design Fix Tracking (Section 1.14)

One of the most powerful aspects of our DCS is provided by the process used to track fixes to design problems. This is accomplished by tightly or loosely coupling the DCS to a problem management database. Typically, a problem is found and entered in the problem tracking database. Once the design components are identified which require updating, the DCS is used to attach the problem number to those design components. Ideally this should be done prior to the design components entering the library, but it can be done as part of the promote. It's often redundant to track all design components with problem numbers, so the DCS can be programmed to only enforce Design Fix Tracking on certain data types. Whenever a promote is initiated, the DCS checks to see if the library is in Design Fix Tracking mode (which means some data types require Fix problem numbers to enter the library), and looks to see if any of the data types included in the promotion are being tracked. For those that are, a screen displays all known problem fix numbers for that design component. The user can select existing one or add a new one to the list. At this time, the DCS will check to see if the EC control level is being crossed (or bypassed via a fast path promote). If so, it will attempt to associate the problem fix number to an EC identifier. If it can't automatically determine this association, the user is prompted to enter the EC identifier for the selected problem fix number.

If the designer chooses to do the association in advance, a utility exists which allows him to enter a problem fix number or choose a default number. The status is immediately reflected as "working". Once the promotion is initiated the status will switch to "libraried". The DCS offers utilities to view or print reports showing which design components exist for a problem or which problems are fixed by a design component. The report generator allows the user to enter the problem number and see which design components are associated to it. Or the design component can be specified to see which problems it fixes. Finally, and EC identifier can be specified and all problem numbers and design components associated with the EC can be displayed.

Part Number/EC Control(Section 1.15)

In addition to tracking design fixes, the DCS can track the design by part number and/or EC. For projects which assign part numbers to various design components, the DCS provides utilities to generate and associate these part numbers to the design components. In addition, the DCS supports Engineering Changes where successive tape-outs are assigned an EC identifier. All design components participating in an EC are associated with the EC identifier. Since part numbers are assigned to specific design components, the DCS uses the links between components design fixes and EC's to track the association of part numbers to ECs. The DCS uses the concept of a PN/EC control level to permit the Data Manager to determine at which level PNs and Design Problem numbers get associated with EC numbers. As design components cross this level, the DCS checks to see whether a problem number or PN exists for the component. If so, and the system is able to determine which EC that number is associated with, it automatically connects the component to the EC. Otherwise, if no EC information can be found, the user is asked to enter it. The rules for Design Fix and EC control are as follows:

One EC can contain multiple Design Fixes;

Any single Design Fix # (number) can only be associated with a single EC;

One design component can have many Design Fix numbers, but they must all belong to the same EC; and Variations of a design component can exist in multiple ECs, but each must have a unique set of Design Fixes.

Figure 8A:
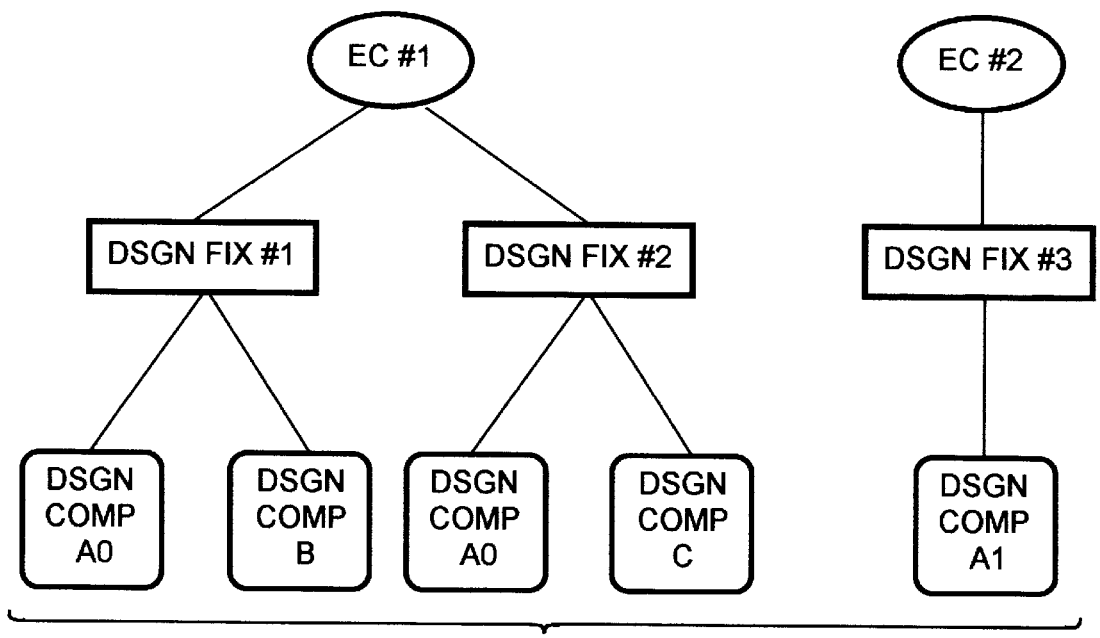
FIG. 8 (illustrated in parts FIGS. 8a and 8b) illustrates our preferred Design Fix Management and EC Control.
Figure 8B:
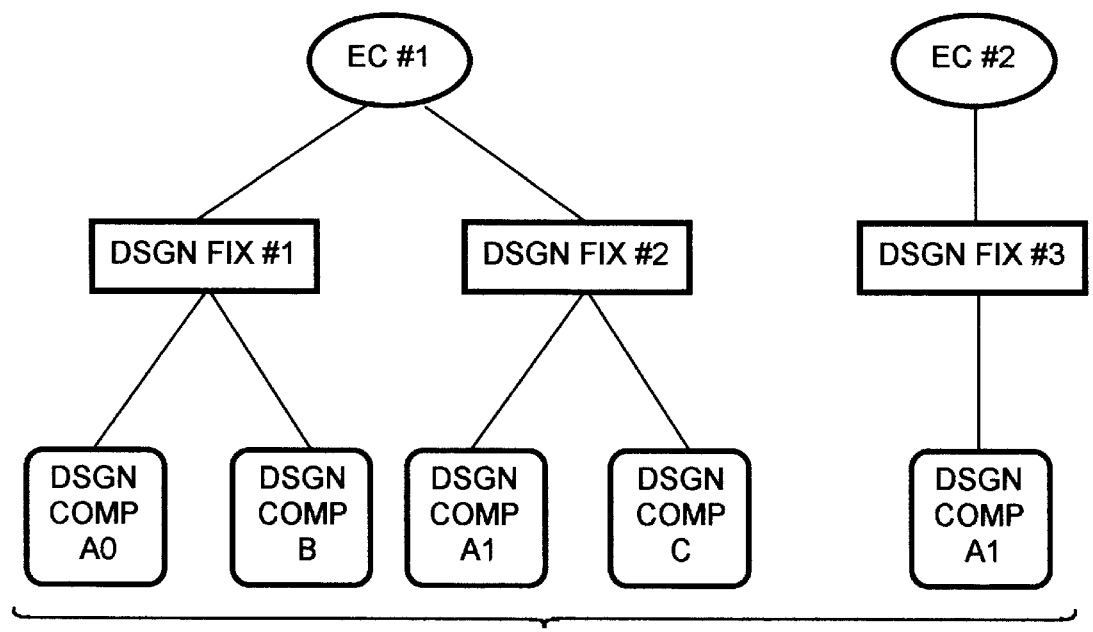

FIG. 8a illustrates a legal example. It shows two EC's where the first contains two design fixes and the second contains a single design fix. There are three design components, of which the one denoted A0 is associated with Design Fix #1 and Design Fix #2. Design component A1 is a different variation of design component A0. The example shows how the two versions of design component A must belong to separate ECs. In FIG. 8b the rules have been violated since design component A1 is associated with Design Fix #2 which belongs to EC #1. The DCS detects this condition and alerts the user to either move Design Fix #2 over to EC #2, or detach design component A1 from Design Fix #2. In addition to tracking all the part number and EC information the DCS is capable of generating a variety of reports including one listing all the part numbers for a given EC. This report can be sent to manufacturing in advance so the foundry can manage their resources.

RAS and Security (Section 1.16)

The DCS is designed in such a manner that provides maximum security for the control data. None of this data is present in simple ASC files residing in a writable repository. All updates to this information must be made through the proper utilities by authorized people. Libraried data only exists in repositories where the Data Managers or owners of the data have write permission. This prevents other users from modifying another designer's data outside of the DCS. Nearly continuous availability is achieved by implementing the DCS in the following manner:

If the primary DCS server fails, the system can be brought up on another server with minimal human intervention. The physical locations of all libraries are determined by the Data Manager which permits the data to be strategically located throughout the network to improve availability.

Multiple paths exist to request information from the Control Repository. They provide alternate routes in the event of network or router problems.

Archiving and backing up data is accomplished with the following features:

The Design Control Repository can be archived onto tape or backed up to another repository by the Data Manager as often as deemed necessary. In the event of corruption, this back up copy can be restored into the primary repository.

All libraries can be archived to tape or backed up to alternate repositories defined by the Data Manager as often as deemed appropriate.

The DCS provides a utility which checks to see if a backed-up or archived copy of the Design Control Repository is in sync with a backed up or archived copy of a library. During the archiving procedure, the system assigns unique identification codes (i.e. CRC codes) to each data object. These codes are used during the recovery to ensure the data was not tampered with while dormant on the back-up repository.

The system provides a method for restoring individual data objects from backed-up or archived repositories in the event the data object is deleted from the active library.

GUI User Interface (Section 1.17)

The User Interface consists of all the menus, dialog boxes, and screens by which the designers interact with the DCS. They all have the following characteristics in common:

They are user friendly with convenient on-line help.

They share a common look and feel to make it easy for the user to find common features.

When something fails or the user makes an entry error, the system clearly indicates the error with an English description of the problem, and suggestions on how to fix it.

A command line interface exists to perform any operation that can be done through the graphical user interface.

Various designer utilities exist to.

Initiate promote requests. The minimum interface requires the user to enter the name of a design component or select from a list, enter the level from which to begin the promote, the target level where the promote should terminate, a flag indicating whether it's a BOM promote, and the version.

Send results from External Data Processes to a library. This utility allows the user to enter the name of a Pedigree and the target level and version to which the Pedigree information should go.

Set up and manage a private library. The utility has fields where the user can specify the name of the library (if one is to be created), the library path where the repository will reside, the userids of the owners, and either the userids or authorization groups of those who can access it. These properties can be called up for modification at any time. Whenever the owner or access fields are altered, the DCS automatically updates the authority records within the Design Control Repository as well as the operating system (i e. AFS) permissions of the directory where the library resides.

Create and monitor a Bill of Materials. The utility offers two modes of operation. In the first, the user identifies the Bill of Materials, and enters the names of all design components to be added as members. This same utility will display any existing information for a BOM, so members can be modified or deleted. For each member, the user must indicate whether it's an input, output or support member. For an existing BOM, a function exists to revalidate all members, but this can only be done by the BOM owner. The second mode builds the BOM by reading all the information from an ASC text file written in a prescribed format. This mode can be used by designers, Data Managers, and third party tools. Regardless of how the BOM is created, a newly created BOM will result in the valid flags being set for all members. The user who creates the BOM using the first mode is automatically the owner, whereas the input file used for the second mode contains the owner information.

View process and pseudo process results. The user specifies the design component, data type, level and version. He can specify the exact process or obtain a list of all processes. For each process, the display shows the result (if it exists), the date and time it was set, how it was set (library controlled process, external process, or manually) and the criteria. These results can only be changed by the Data Manager.

Associate design problem numbers to design components. The designer uses this to pre-associate problem fix numbers to design components before they are promoted into the library. This way technical leaders and other designers can determine if a particular problem is being worked on. The interface requires the user to identify the component by name and type. Since it's not in the public library yet, it has no level or version. The user must also supply the problem fix number. The DCS automatically assigns the "working" status to it. Later, when the designer wants to promote the component, the problem fix number will appear on the selection list, and after the promote completes, the status will change to "libraried". The DCS allows the Data Manager to define a generic problem number which designers may select to associate with miscellaneous design changes that have no corresponding design problem.

WWW/Internet Access (Section 1.18)

The DCS provides a mechanism which permits access to all process and pseudo process results through the World Wide Web. Key quality control indicators can be exported out of the DCS into an accessible format by users on the WWW. Usually these results would exist in a secure repository which could only be accessed by WWW users who are working on the project. In addition to accessing information, the ALMs can receive special e-mail requests from users to perform these tasks:

Generate various status reports on topics such as PN-EC and Design Fix Tracking, Process & Pseudo Process Results, or BOM information. The DCS would generate the report on the fly and return it to the user's Internet or e-mail address.

If the user has the proper authority, he can submit e-mail requests to add pseudo-process information into the DCS. The contents of the mail would contain a specifically formatted command which the DCS can interpret to set the appropriate results. This could be used by people remotely connected to a project (such as the chip foundry) to send status information directly to the DCS.

The DCS permits an authorized user to send commands through the Internet Common Gateway Interface (CGI) to query information from the DCS or invoke Designer Initiated Library Processes (DILPs).

Actors & Objects (Section 1.19)

Figure 9:
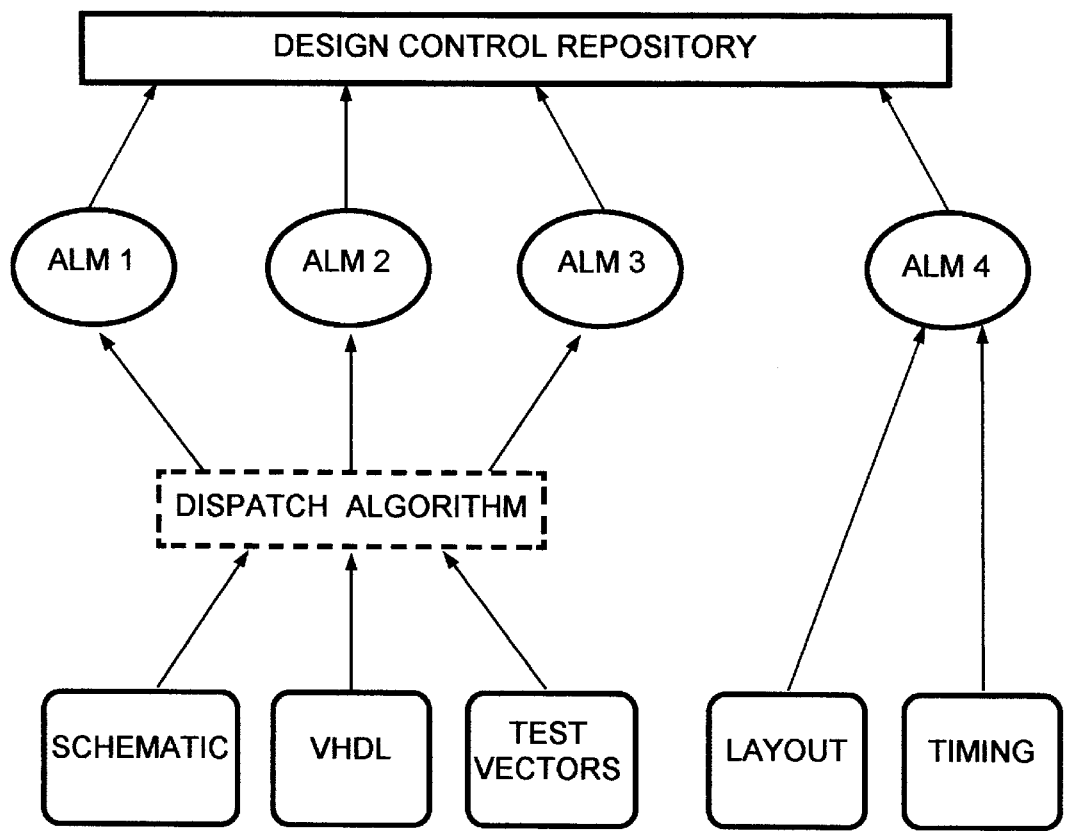
FIG. 9 illustrates our preferred DCS Using an Actor/Object Environment.

In the event of a project where a single large design team or multiple smaller ones, require their data to reside in a single repository, the potential exists for a performance bottleneck in the Automated Library Machine. The DCS offers a feature called Actors & Objects to combat this. Actors & Objects allow the Data Manager to define an alternate structure in which designers tasks are dispatched to a pool of Automated Library Machines (Actors). No design data is stored on any of them; they merely execute the tasks then store the results and data into the Design Control Repository (Object). The Data Manager can control the types of jobs each Actor is allowed to perform by creating Actor Lists. These lists contain information which the DCS uses to determine which ALM to route a particular job to. FIG. 9 shows an Actor/Object environment with four Actors. Jobs involving the data type of layout and timing are segregated to ALM4. All remaining work is sent to ALMs 1 through 3. The DCS determines which to use based on an mechanism which tries to find either a free ALM or choose one that may be able to spawn a parallel process (assuming the operating system supports it).

Importing and Tracking Data (Section 1.20)

Internally the DCS tracks all data by component name, data type, level, version, library and most importantly a file reference fileref) number. These six attributes give every piece of data in the system a unique identity. In a private library, all data is tagged with a DCS identifier as part of the filename, but the identifier may or may not be unique. This is because private libraries don't have a concept of levels, versions or file references. They are merely working areas for the designer, and only require the data to be identified by name and type. The system permits the designers to have multiple copies of a design component by using iteration numbers to distinguish between recent and older data. However, even though the concepts don't apply, the DCS still assembles an identifier and tags the data. There are two methods by which a piece of data can appear into a private library.

1. The designer creates the data from within the private library using some tool (Schematic editor, text editor, circuit simulator).
2. The data is created by some tool completely outside of the private library, but the designer wishes to import it into the library.

In either case, the tool (or user) chooses the filename. By default, this is the design component name. In the first case, the designer will be asked to specify the data type either prior to, or during invocation of the tool. In the second case, the user will be prompted for the data type during the import. In both cases of a data type entry requirement the DCS will automatically default the version, level and file reference number in order to assemble a uniform identifier code. This code will be appended to the design component name and will become the new name of the object. Upon promotion from a private library into a public library, the DCS will automatically assign a real file reference number to the object. Based on the destination version, and level, the DCS will assemble a new identifier and rename the object accordingly. The file reference number remains the same for the life of the object. As the object traverses through the levels of the library, the level is the only piece of the identifier that changes. In addition, the DCS maintains the same identifier information internally. This is considered the official tracking information and is always updated first during a promotion or installation of a new object into a public library. The object renaming is done afterwards. Appending the identifier to the object name serves two purposes:

It increases data security by providing a way for the DCS to check data integrity during promotions. The information contained internally must match the external identifier at the start of a promote. A mismatch signifies possible tampering of the data outside of the DCS, and the Data Manager is alerted to the mismatch.

It provides an alternate way for a user or another tool (such as the library search mechanism) to ascertain the version, level, and data type of an object simply by looking at it. This contributes to the availability by providing a means to locate and access data even if the Design Control Repository is unavailable (i.e. server down).

Figure 10:
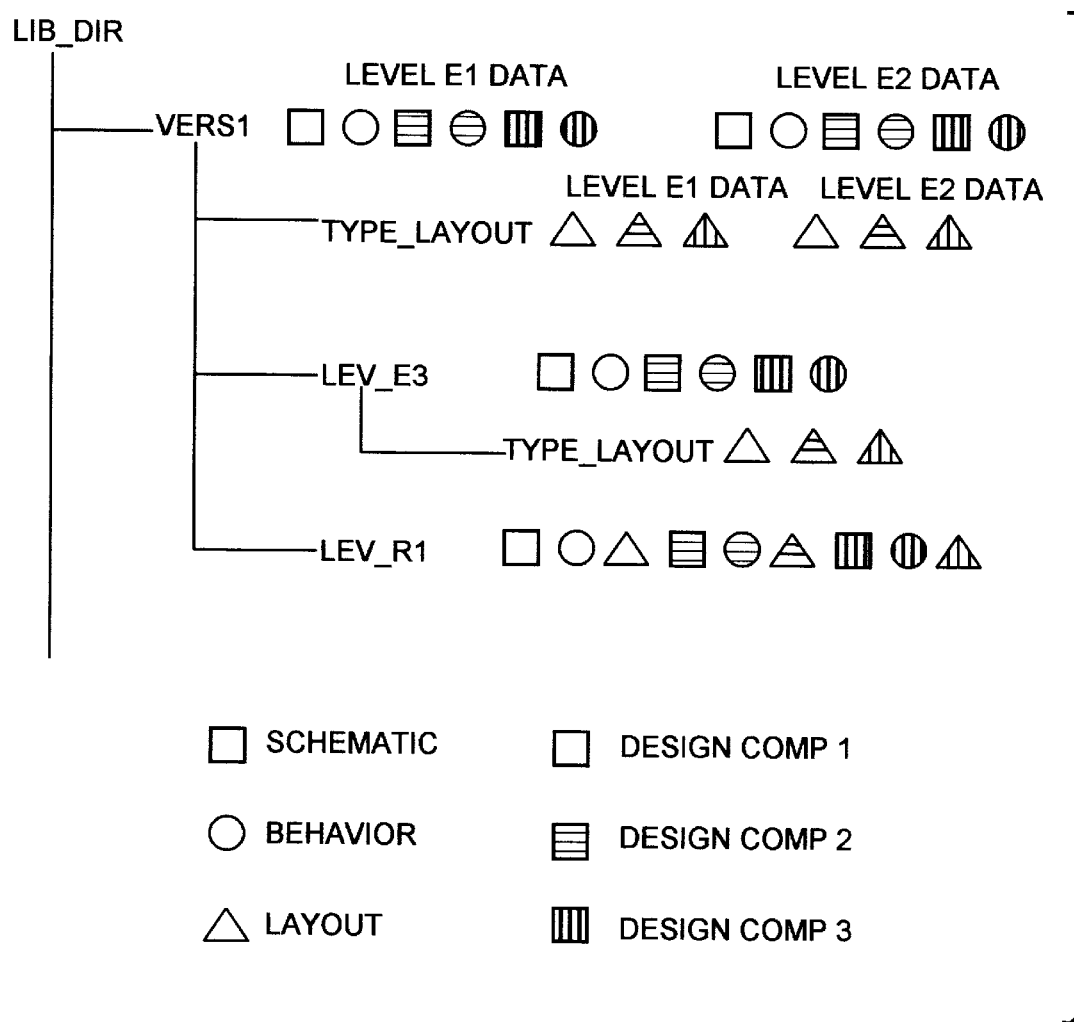
FIG. 10 illustrates our preferred Example of Location Independent Data Tracking.
Figure 11A:
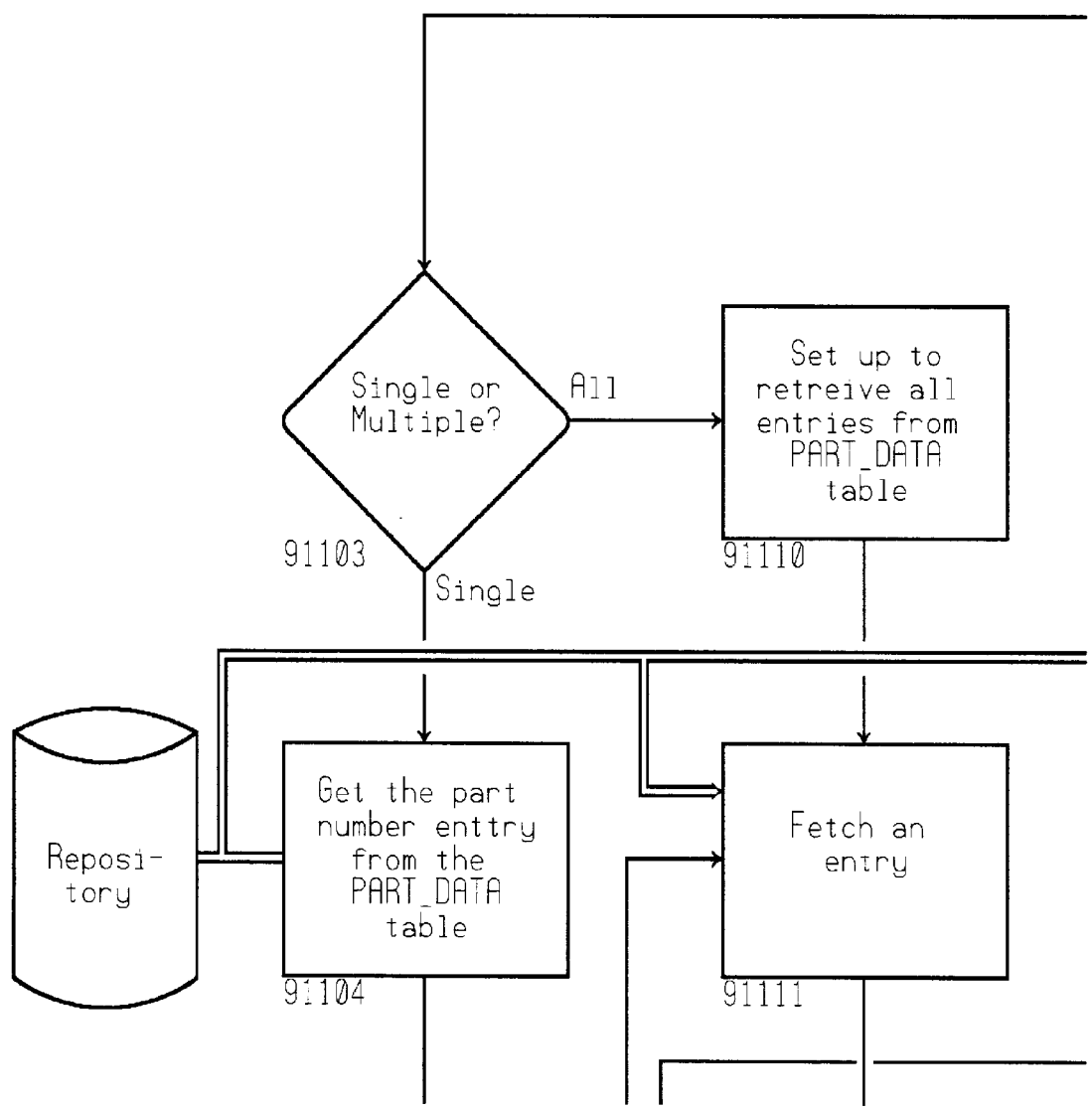
FIGS. 11a thru 11f describe the QRPNDLST Process when viewed as laid out as how in FIG. 11.
Figure 11B:
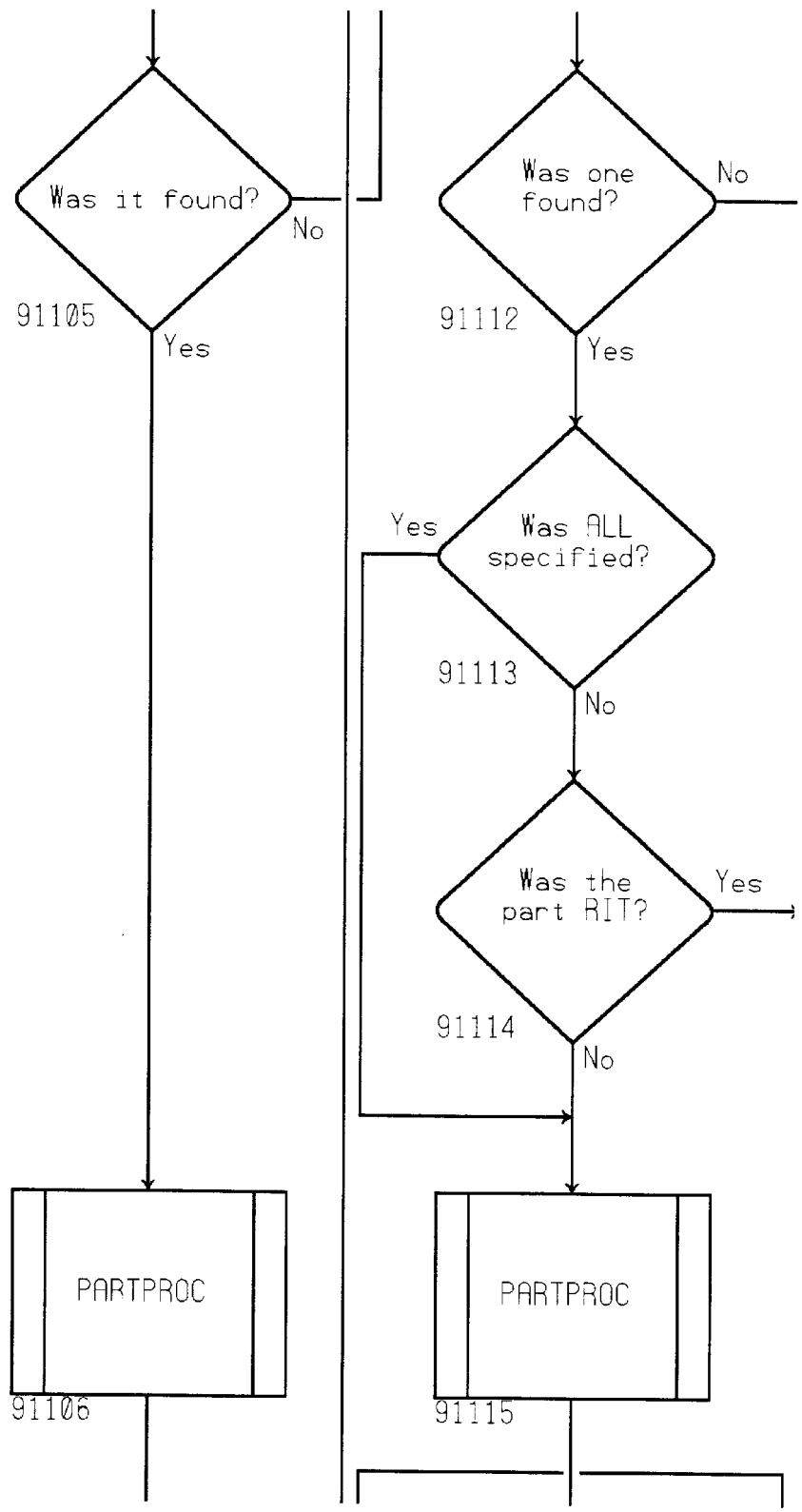
Figure 11C:
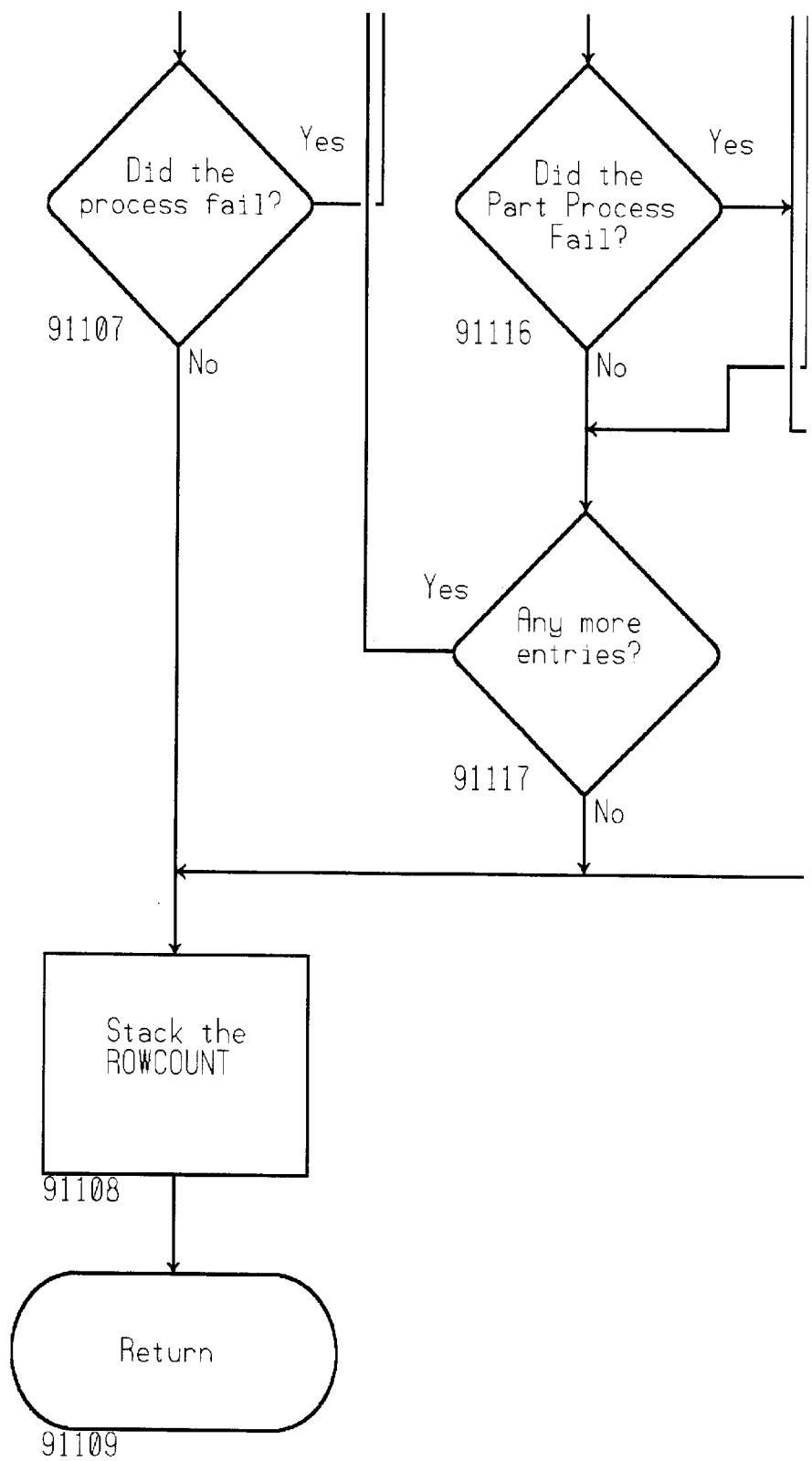
Figure 11D:
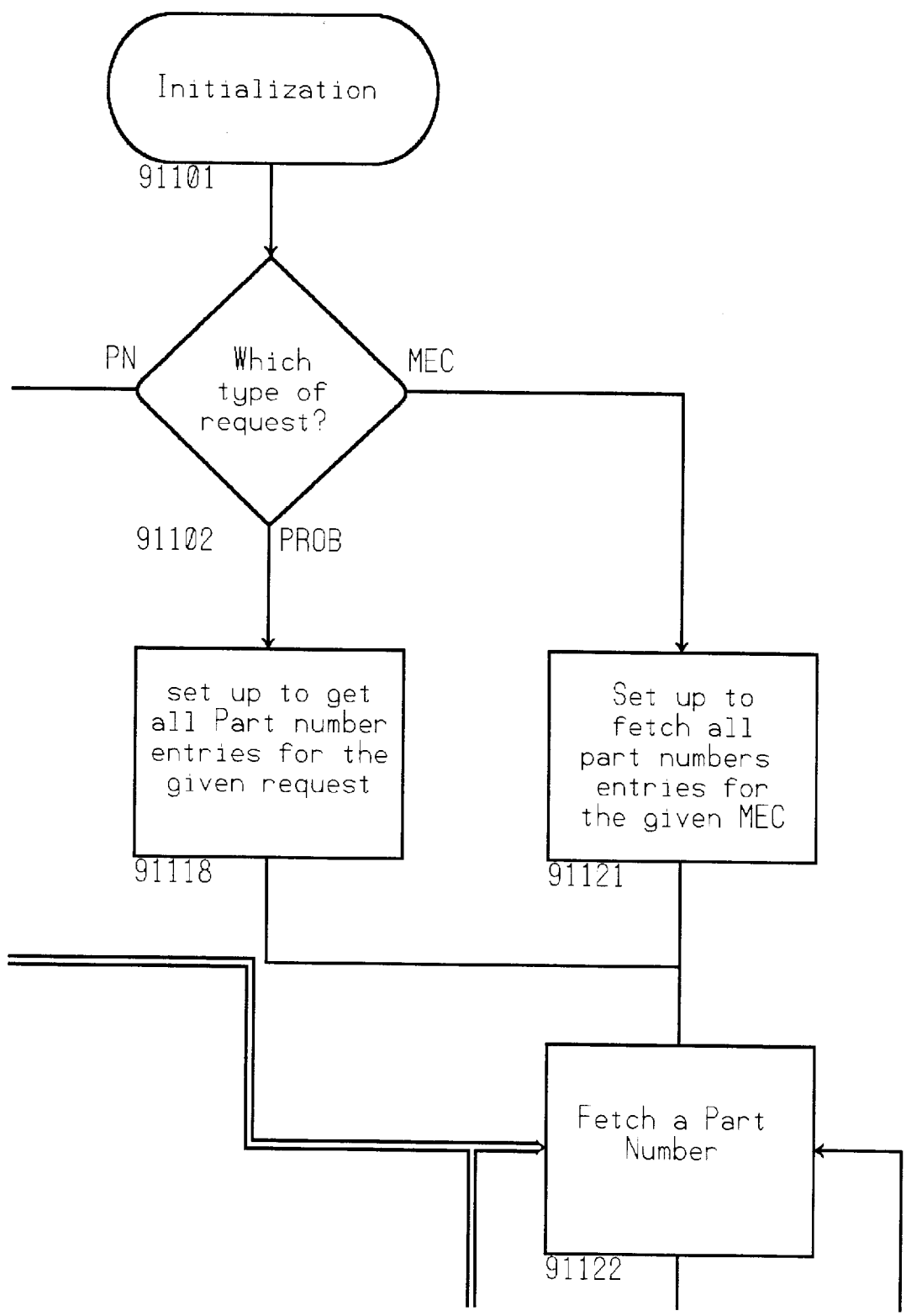
Figure 11E:
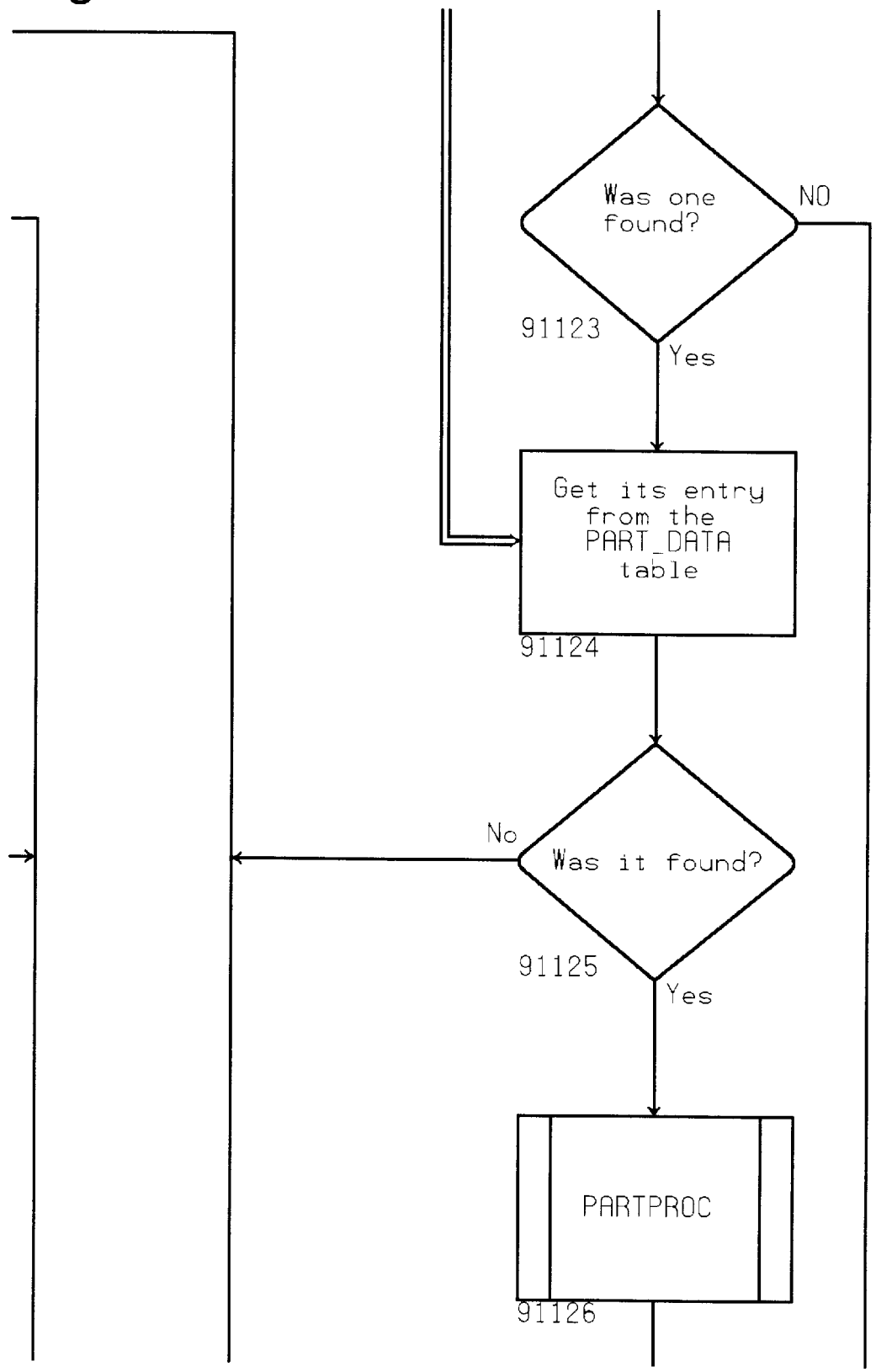
Figure 11F:
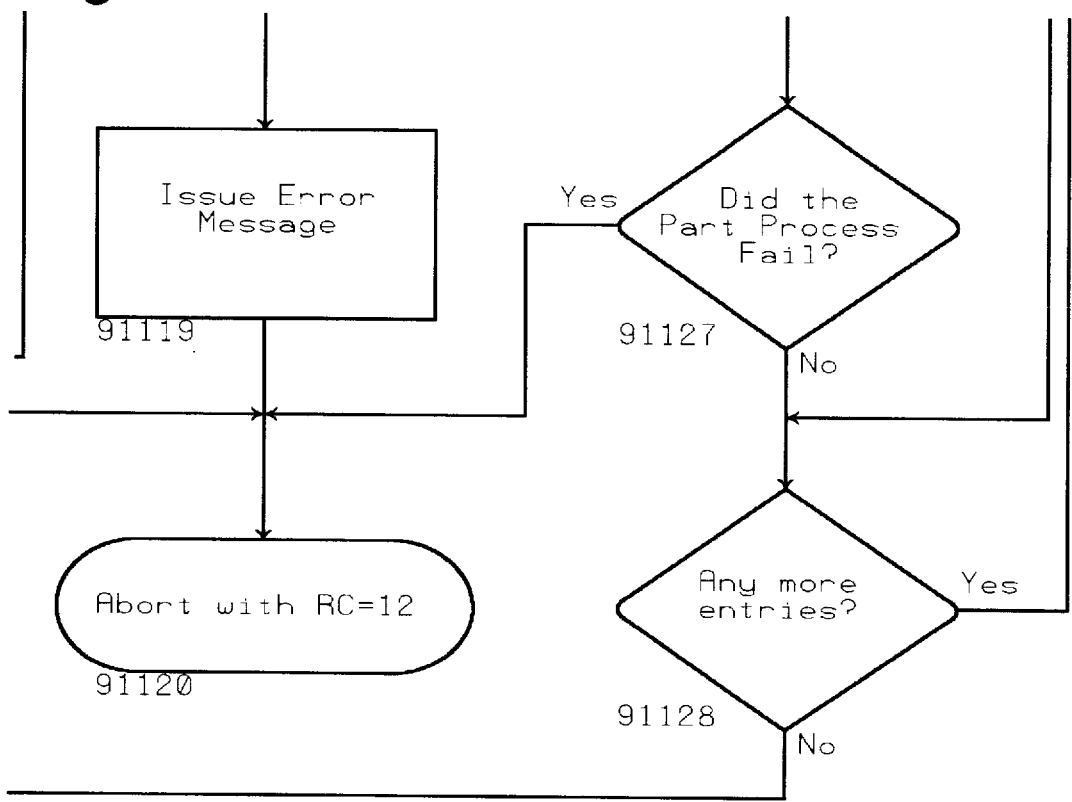
Figure 12A:
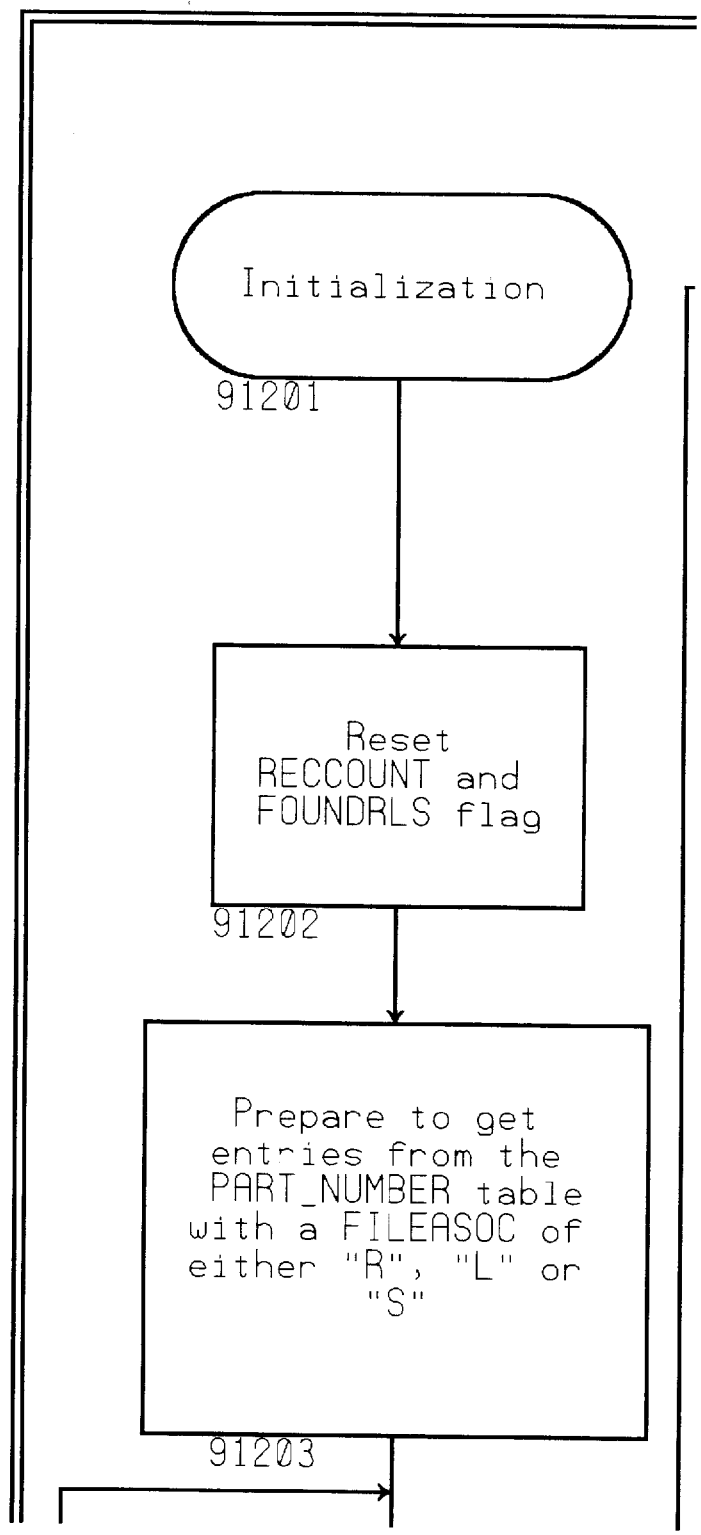
FIGS. 12a thru 12h describe the PARTPROC Process when viewed as laid out as how in FIG. 12.
Figure 12B:
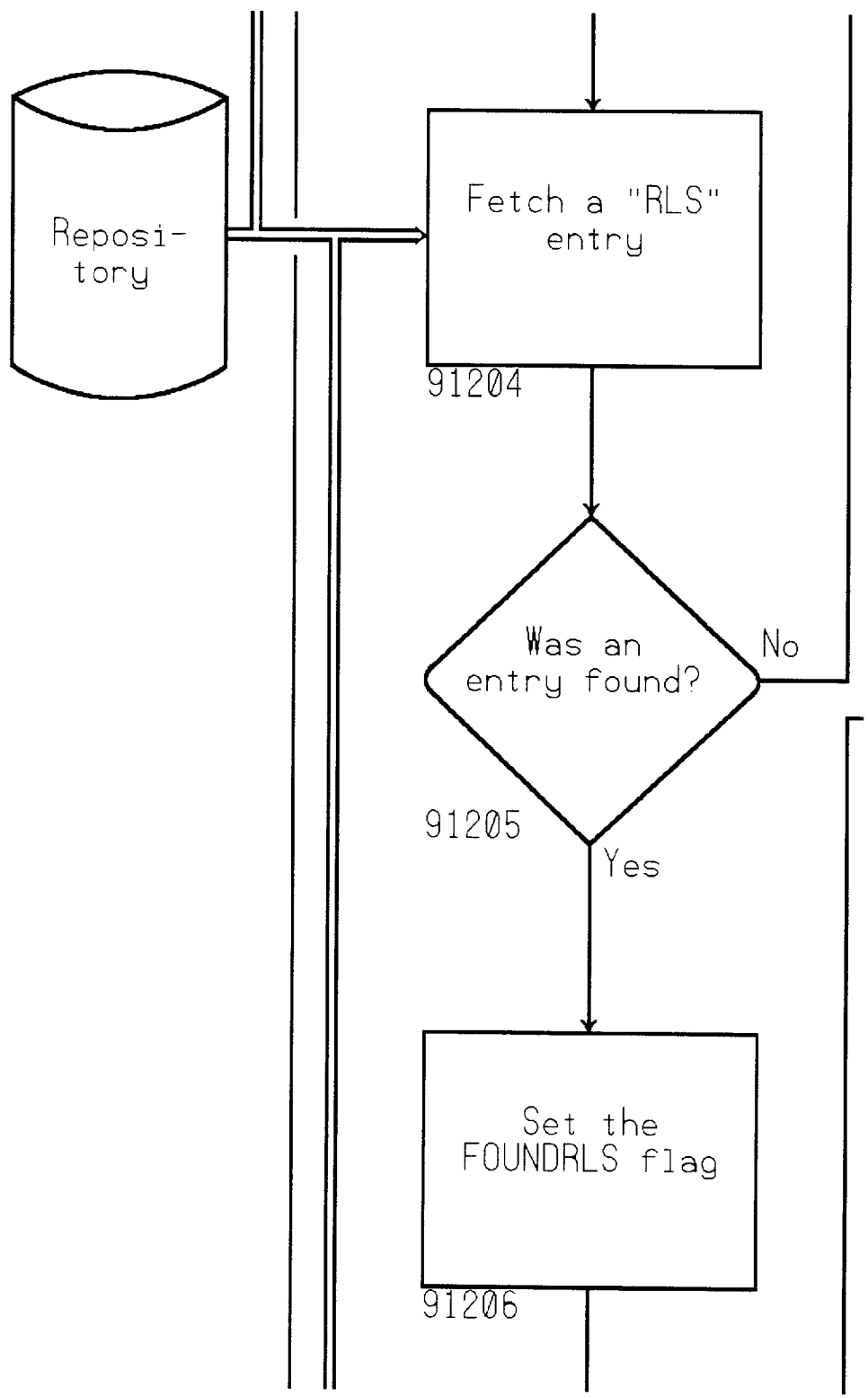
Figure 12C:
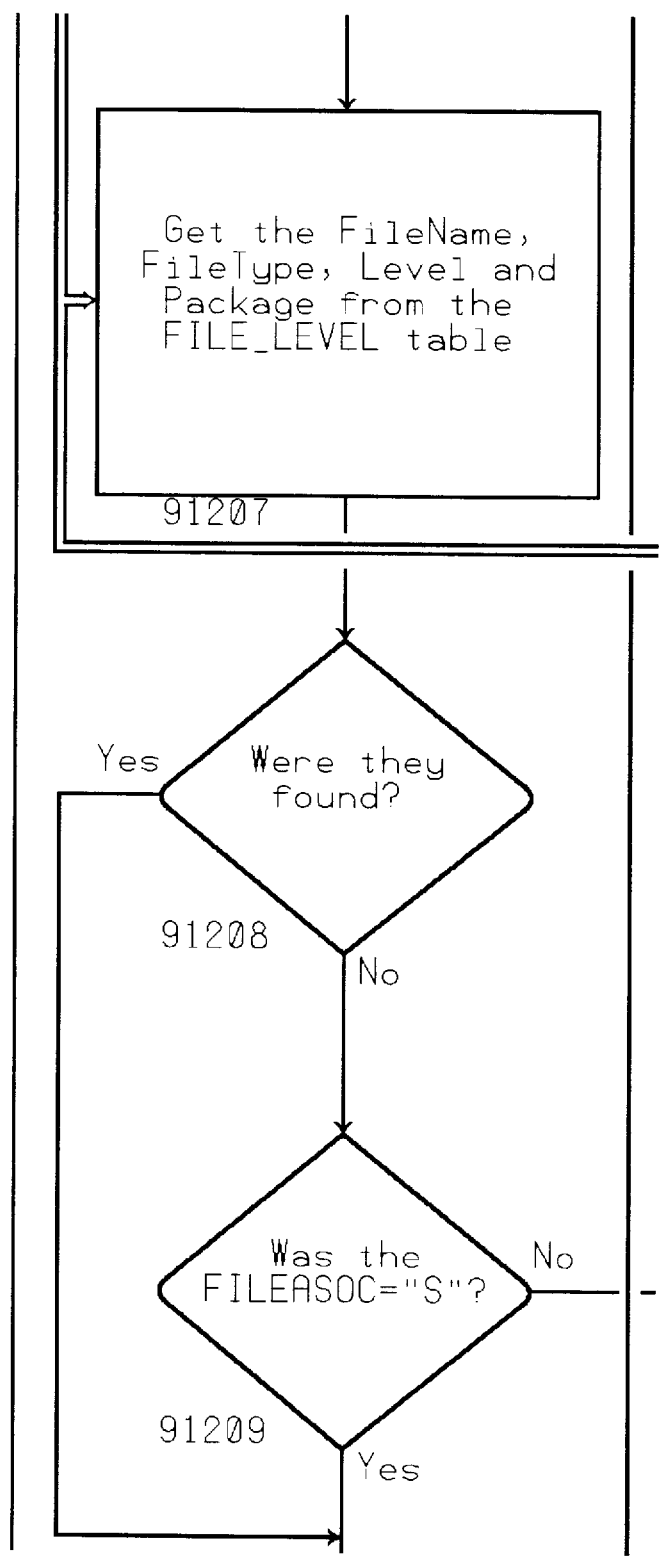
Figure 12D:
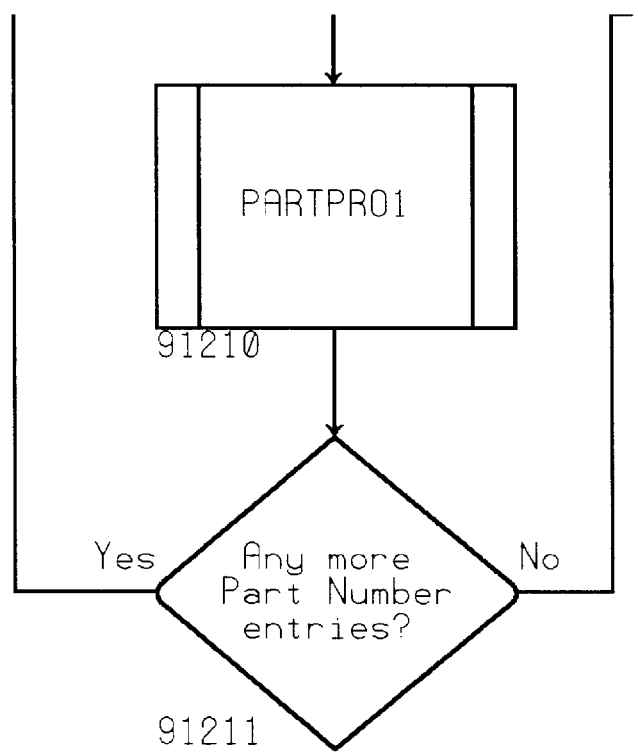
Figure 12E:
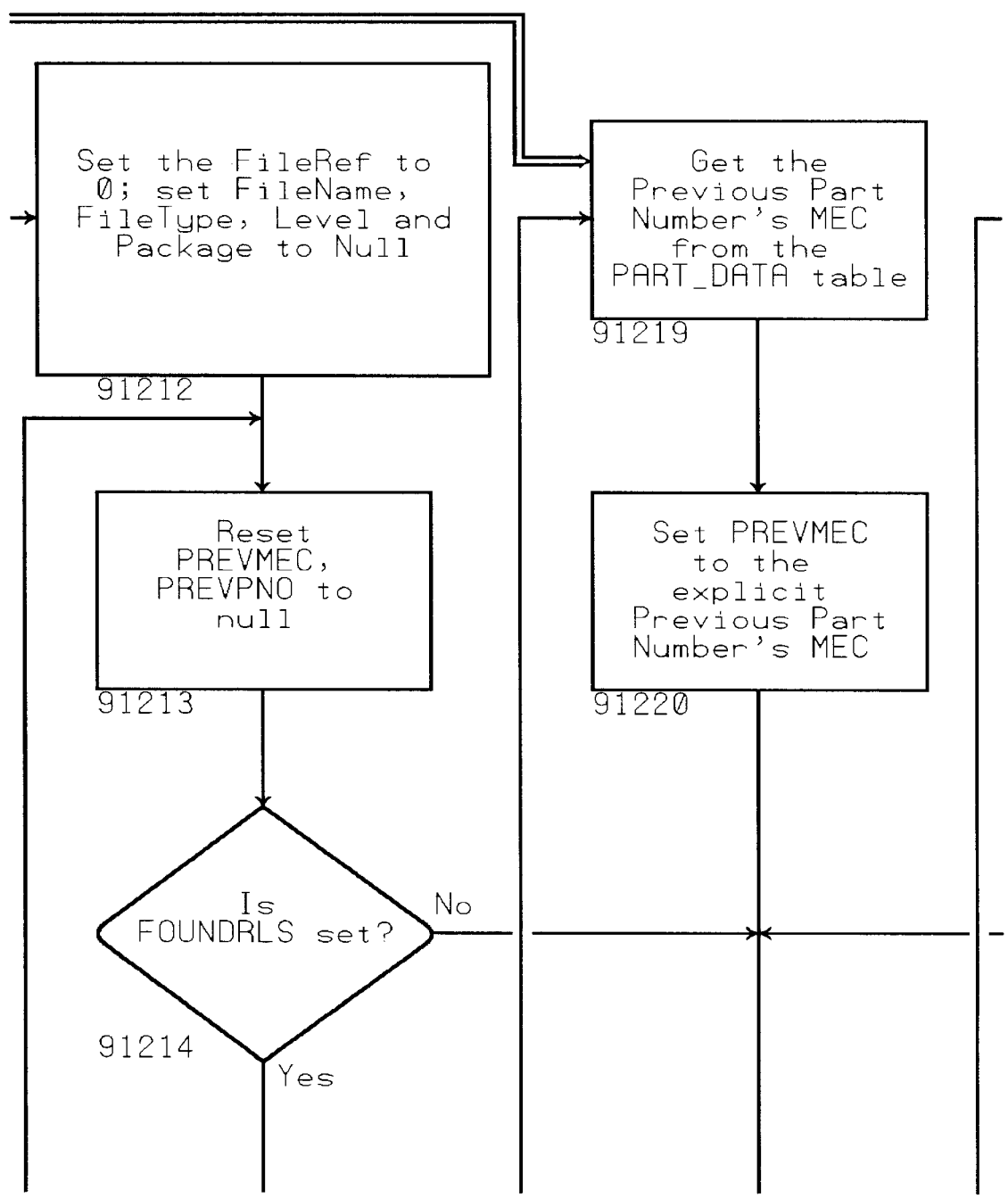
Figure 12F:
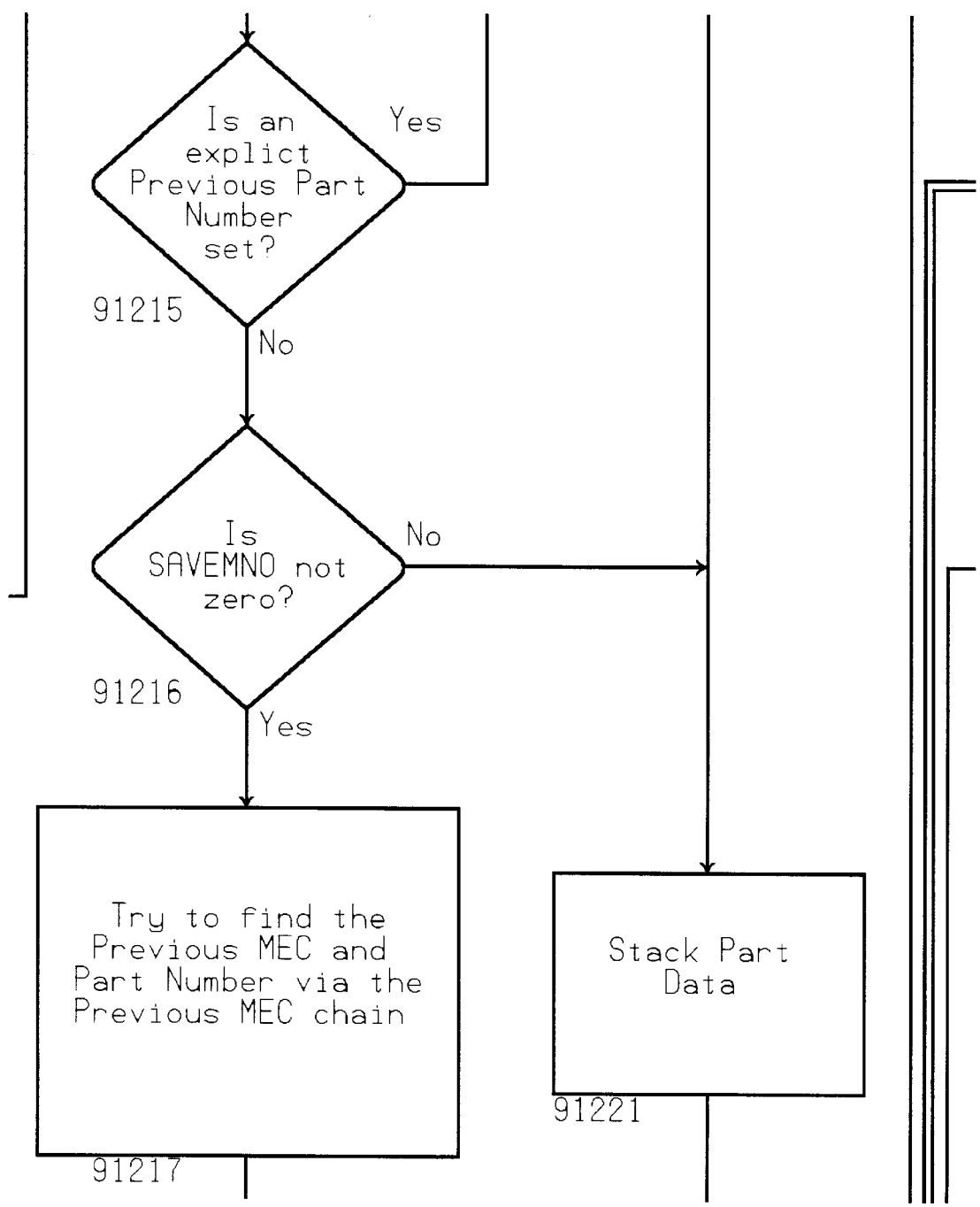
Figure 12G:
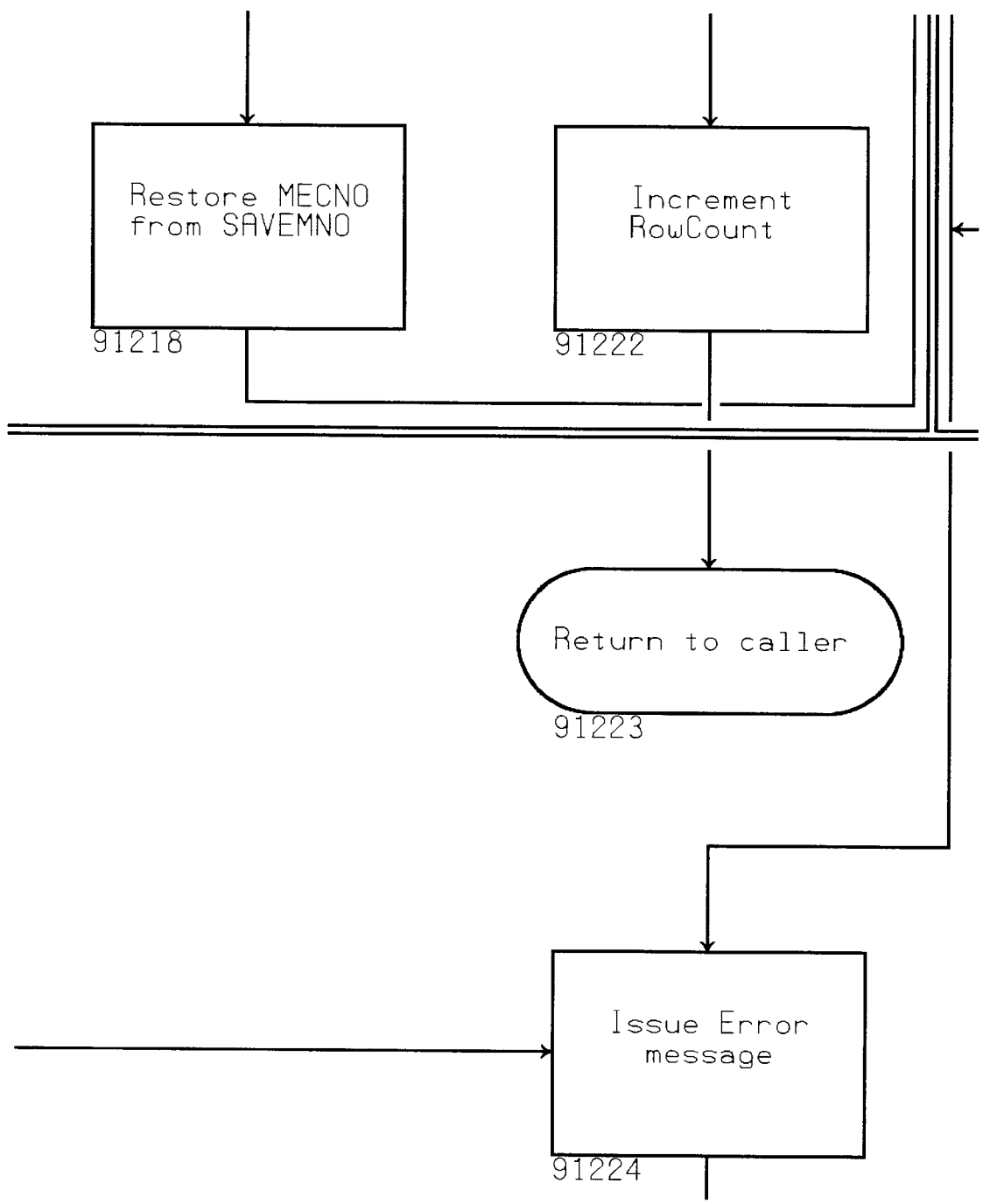
Figure 12H:
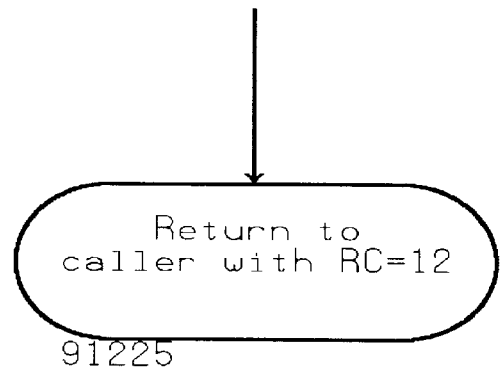
Figure 12I:
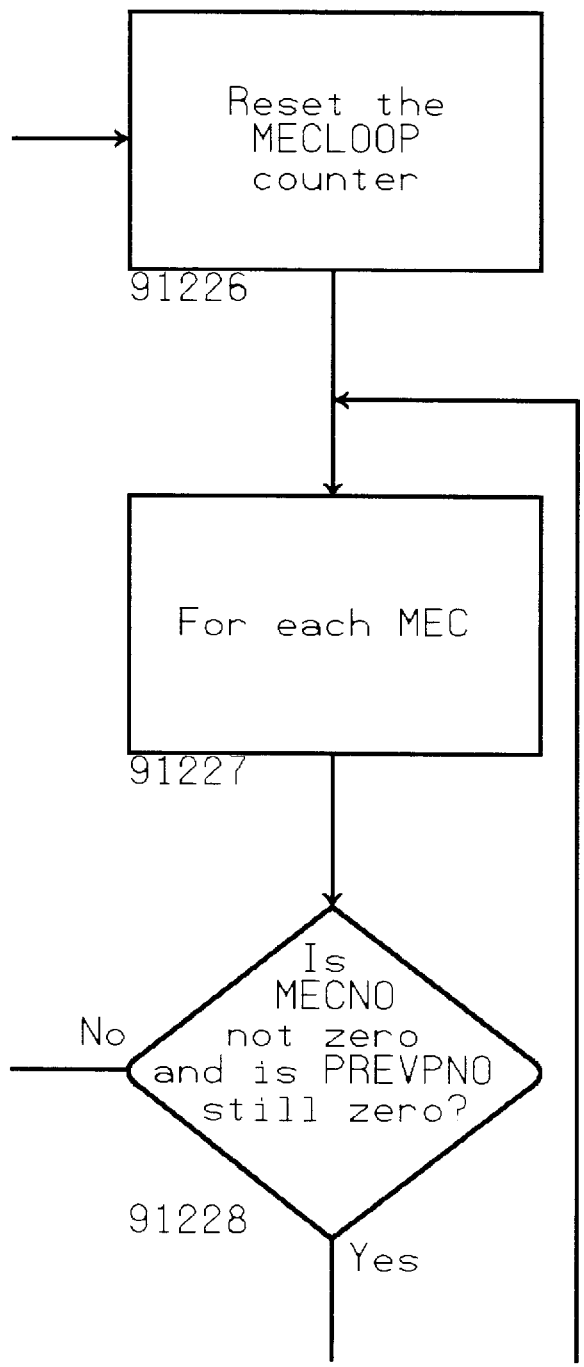
FIG. 12 shows how to layout FIGS. 12a thru 12h to obtain a unified view of the dataflow for the process shown in FIGS. 12a thru 12h.
Figure 12J:
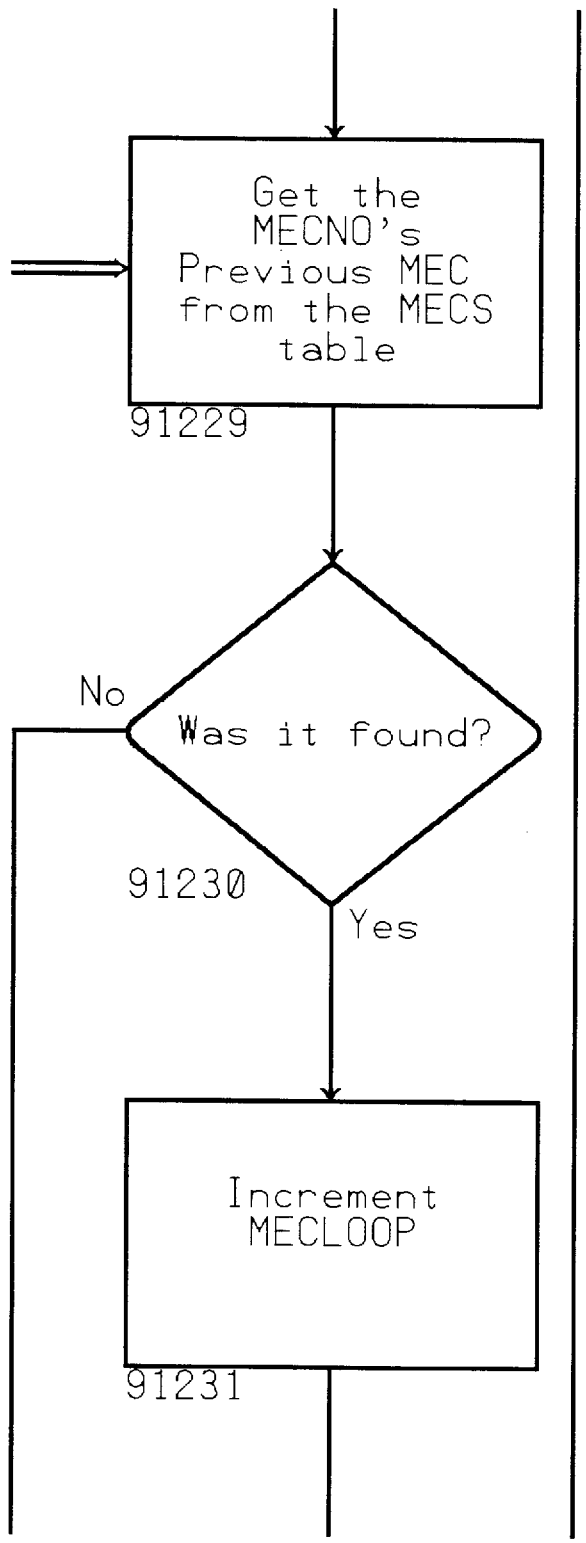
Figure 12K:
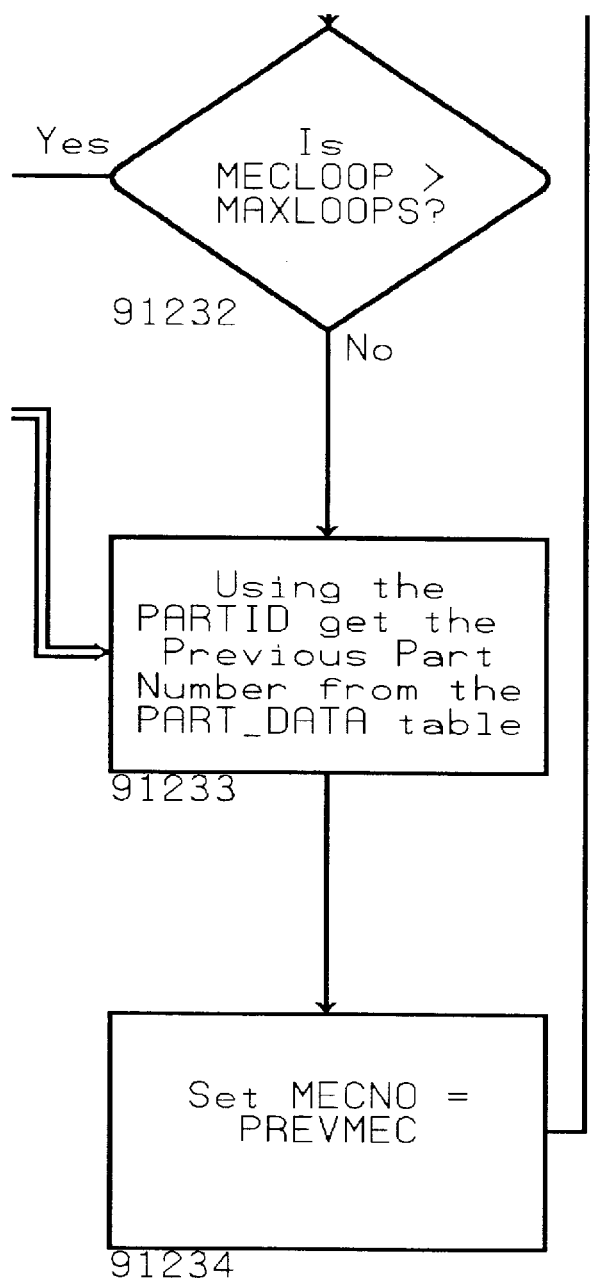
Figure 13A:
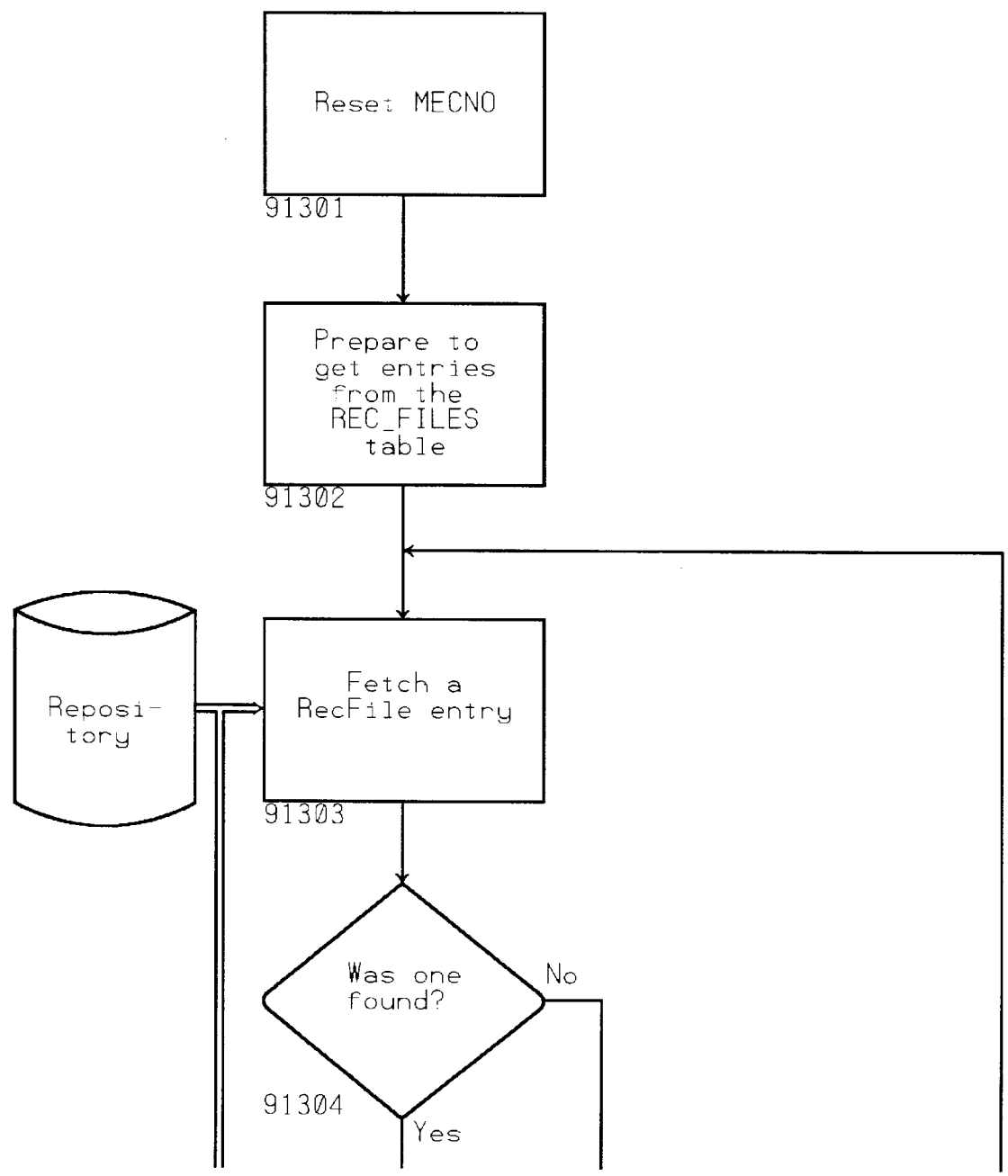
FIGS. 13a thru 13d describe the PARTPRO1 Process when viewed as laid out as how in FIG. 13.
Figure 13B:
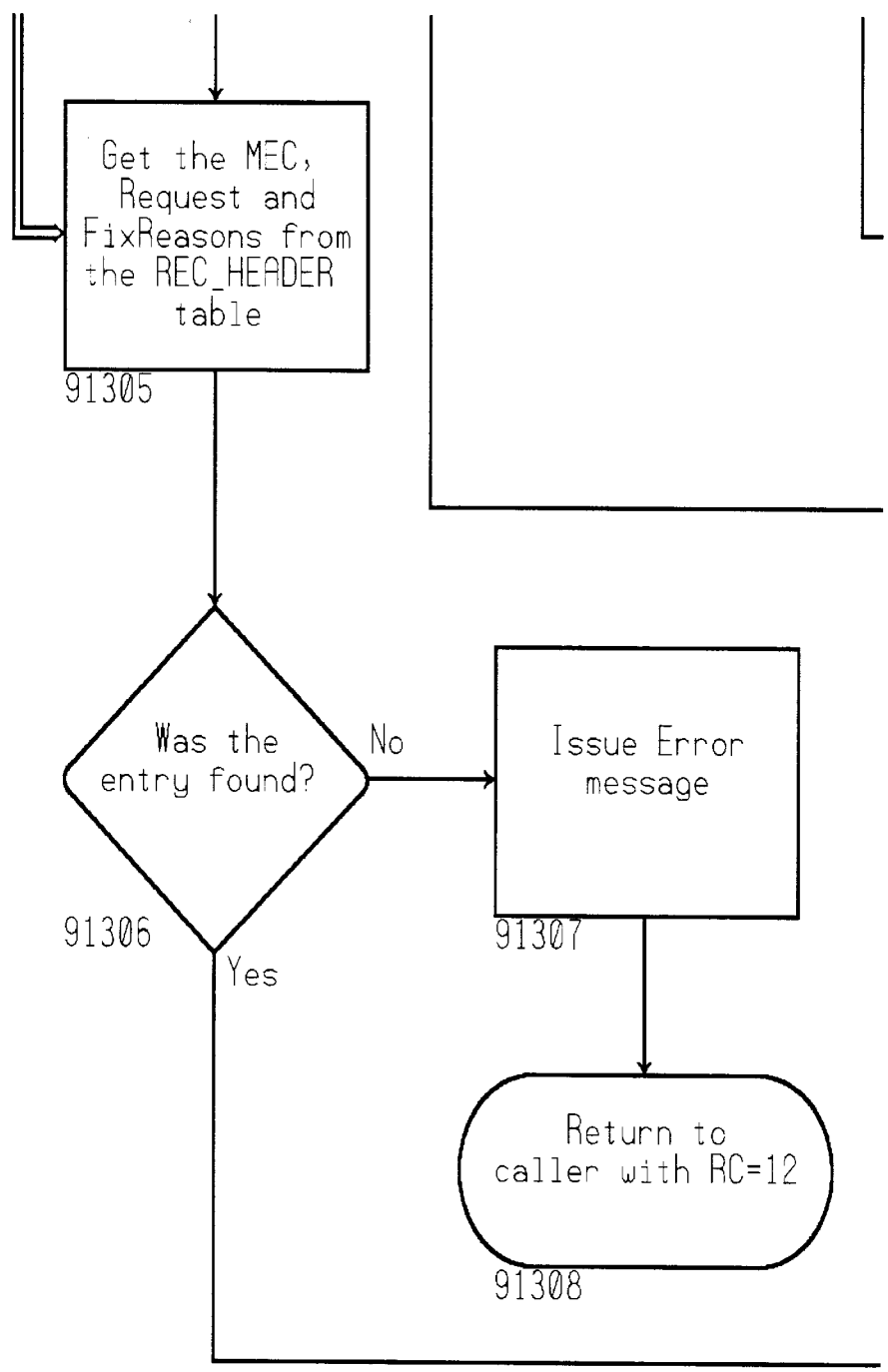
Figure 13C:
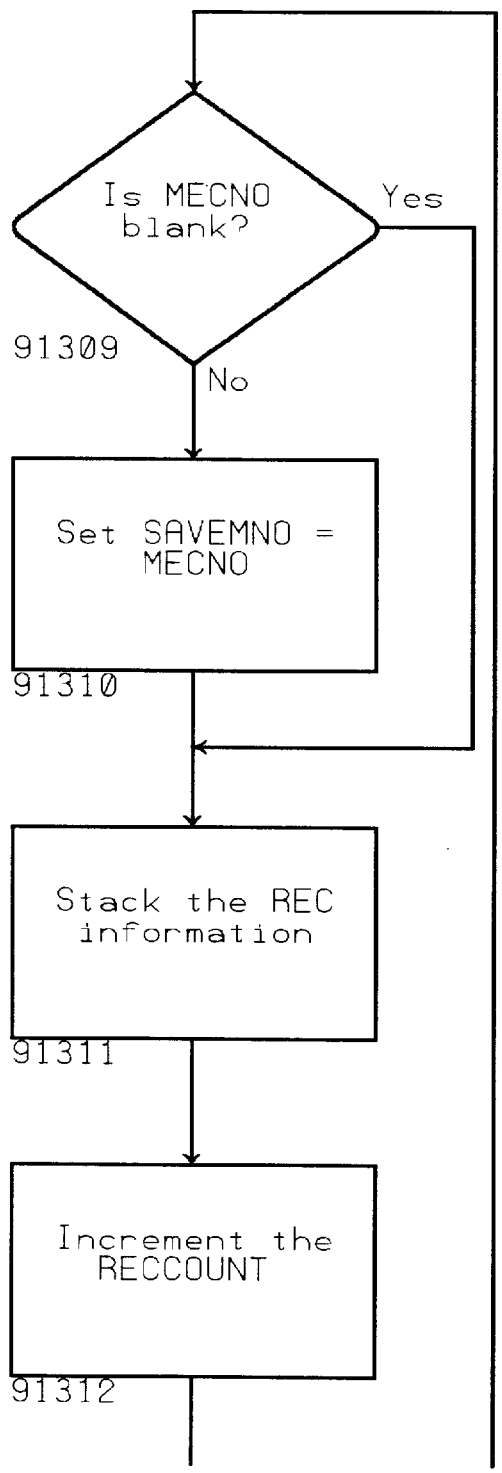
Figure 13D:
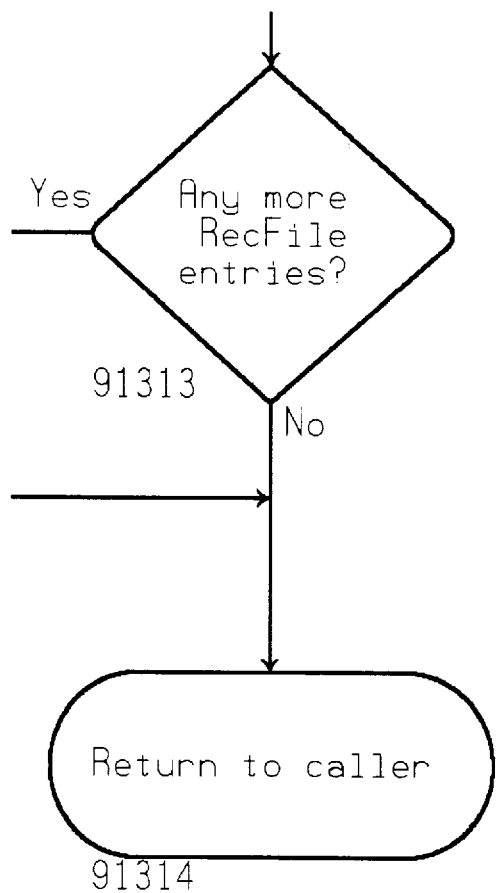
Figure 14A:
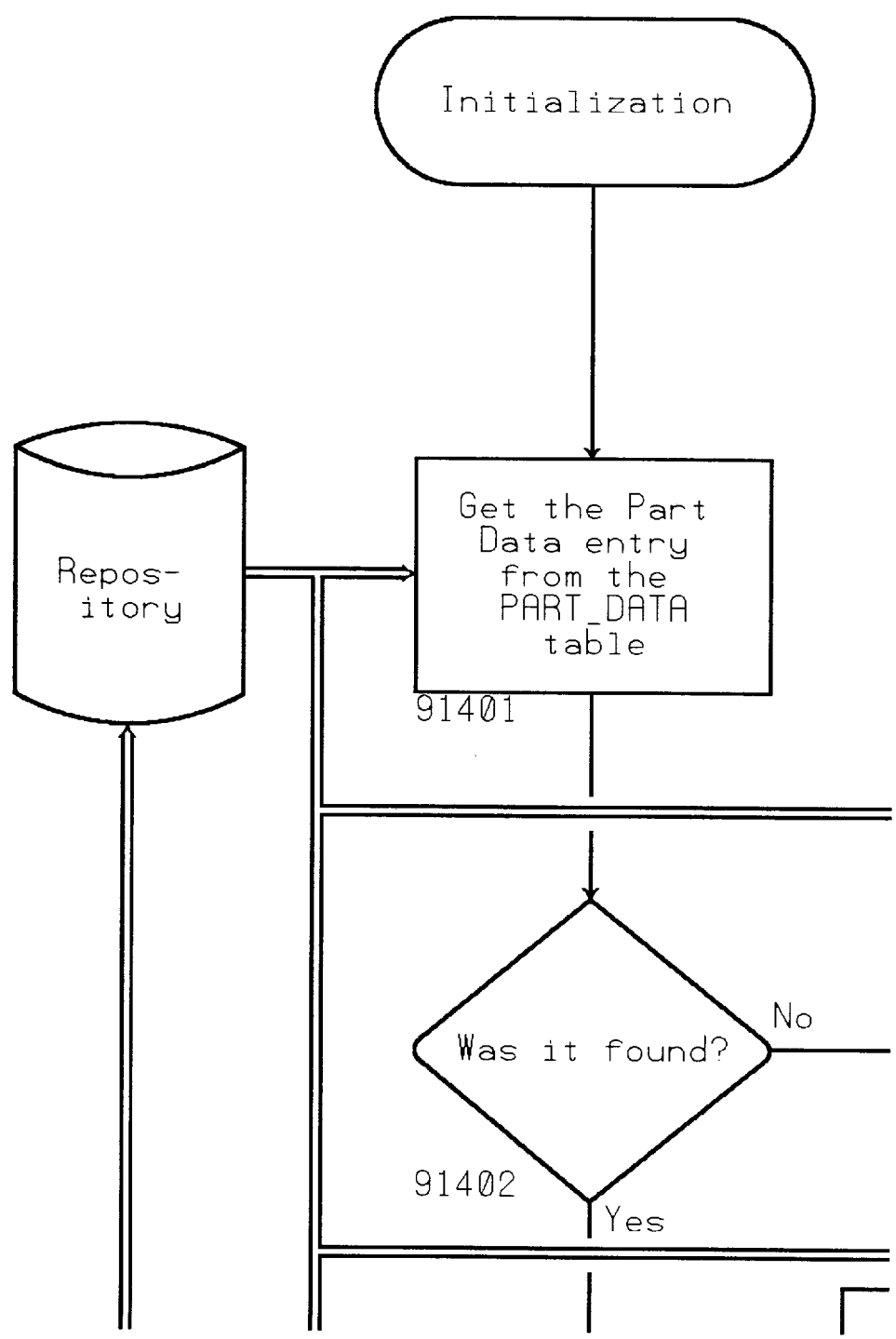
FIGS. 14a thru 14d describe the QRPNDIEC Process when viewed as laid out as how in FIG. 14.
Figure 14B:
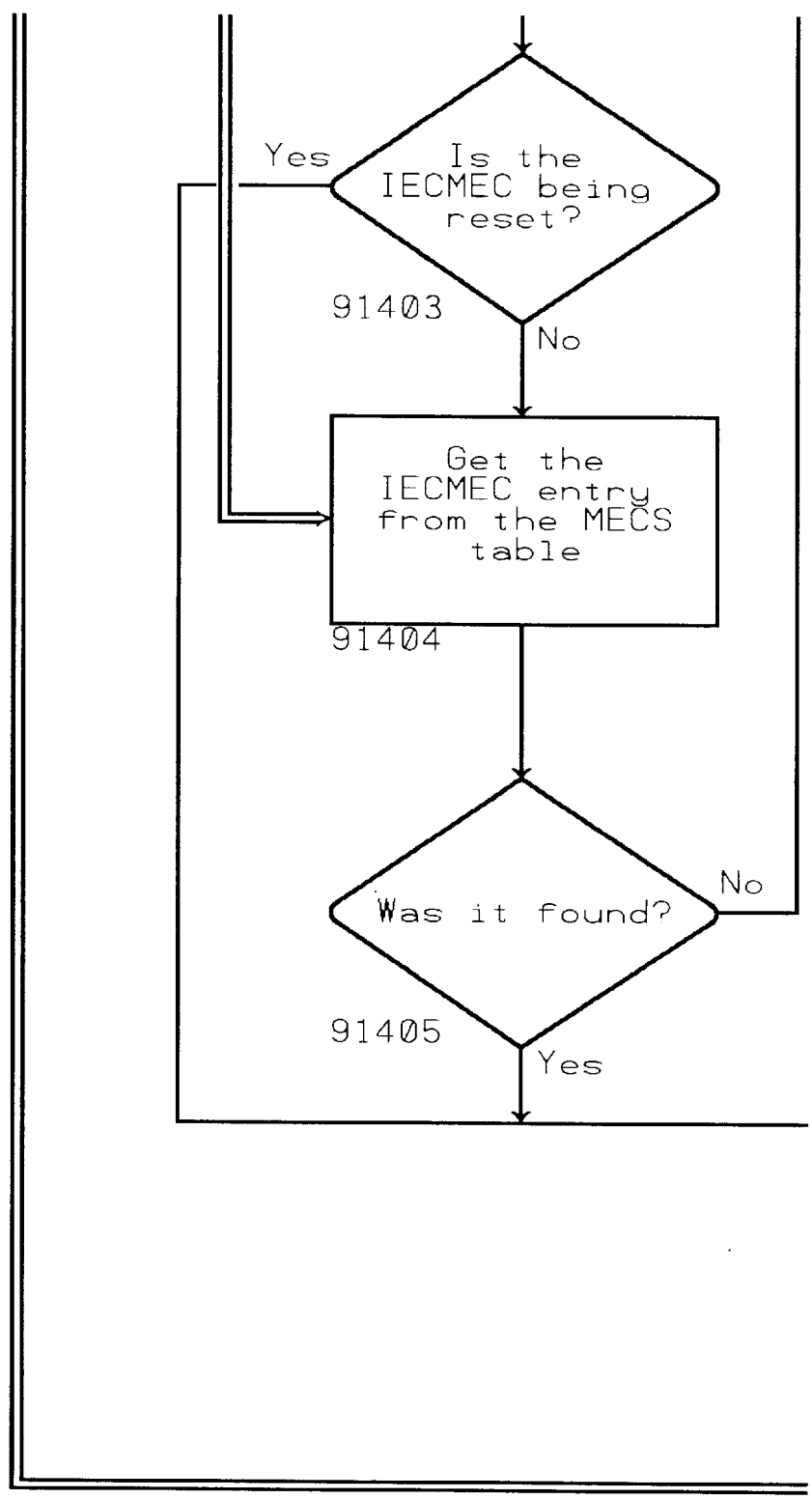
Figure 14C:
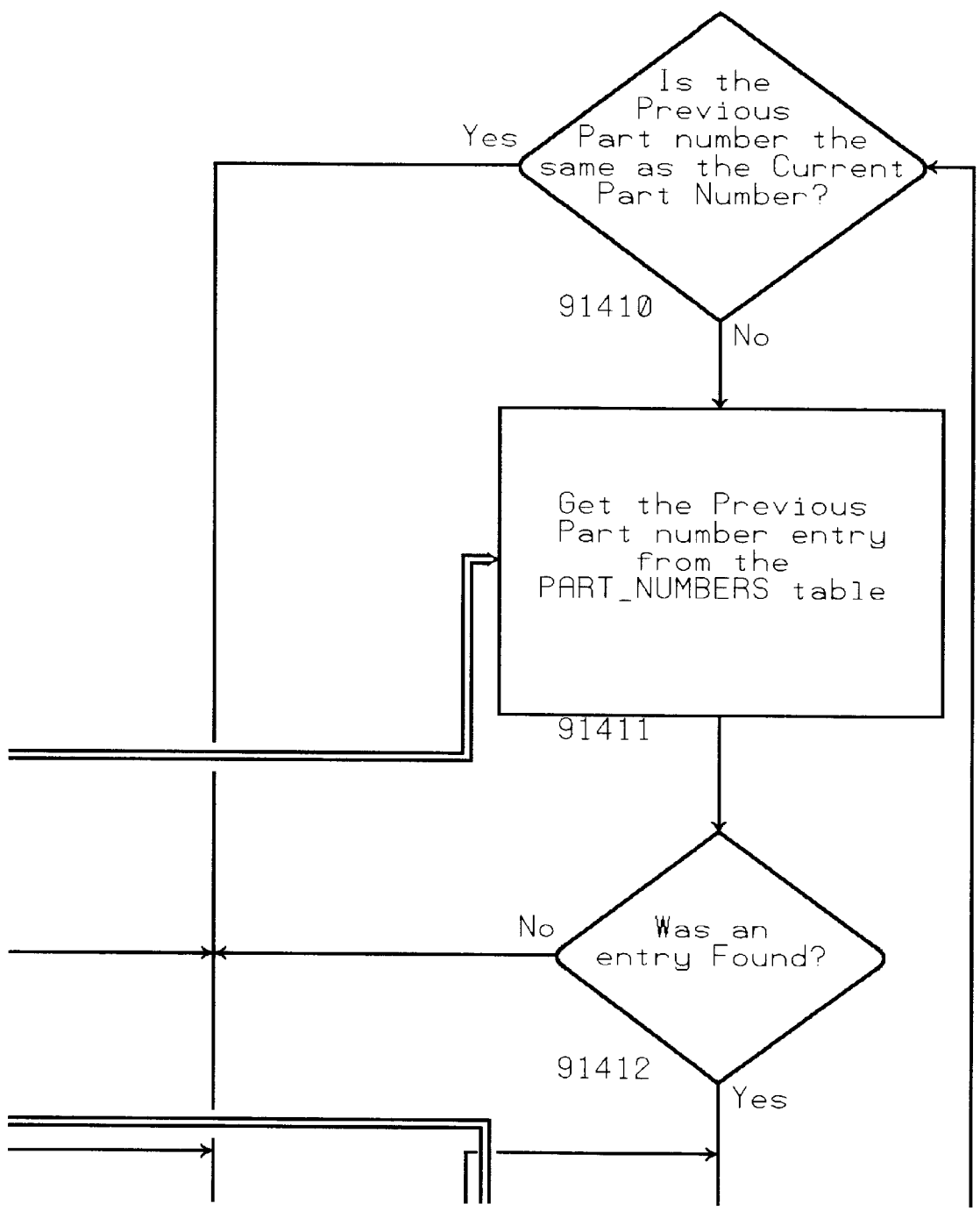
Figure 14D:
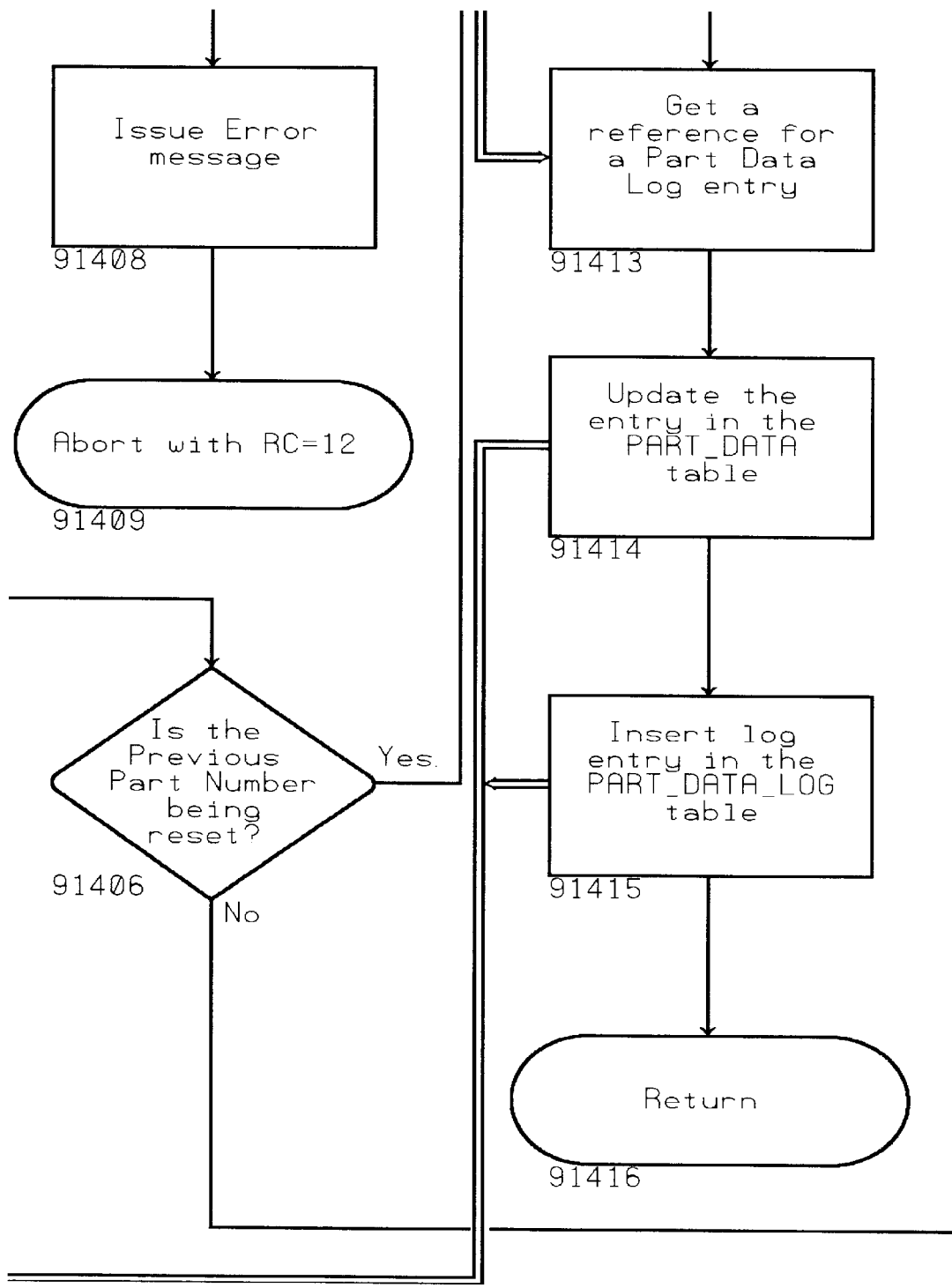
Figure 15A:
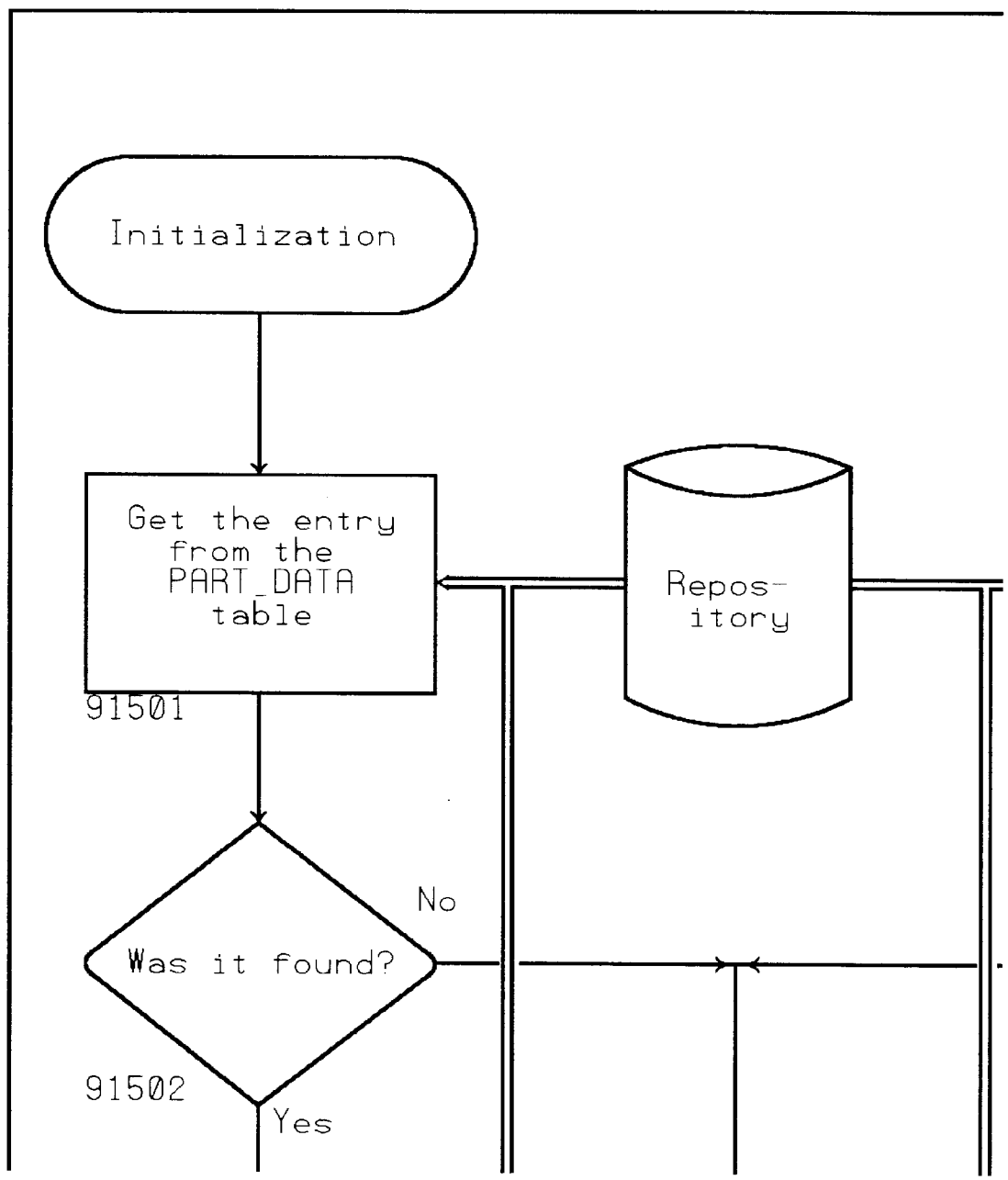
Figure 15B:
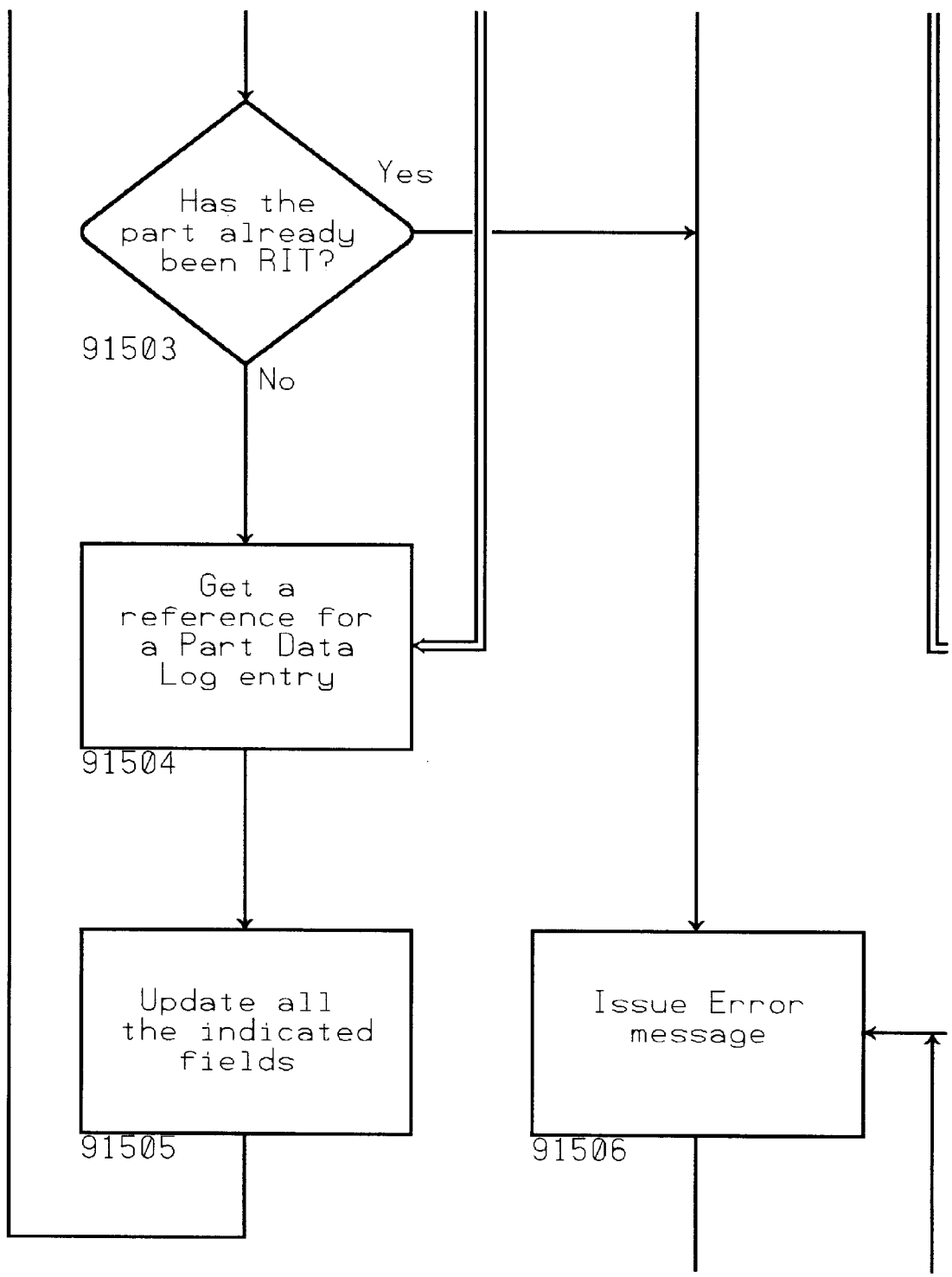
Figure 15C:
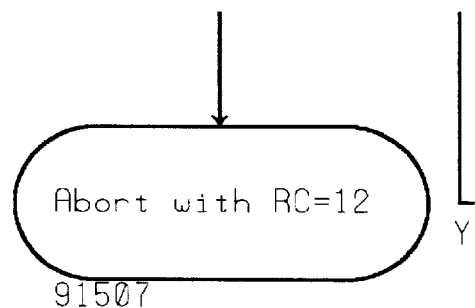
Figure 15E:
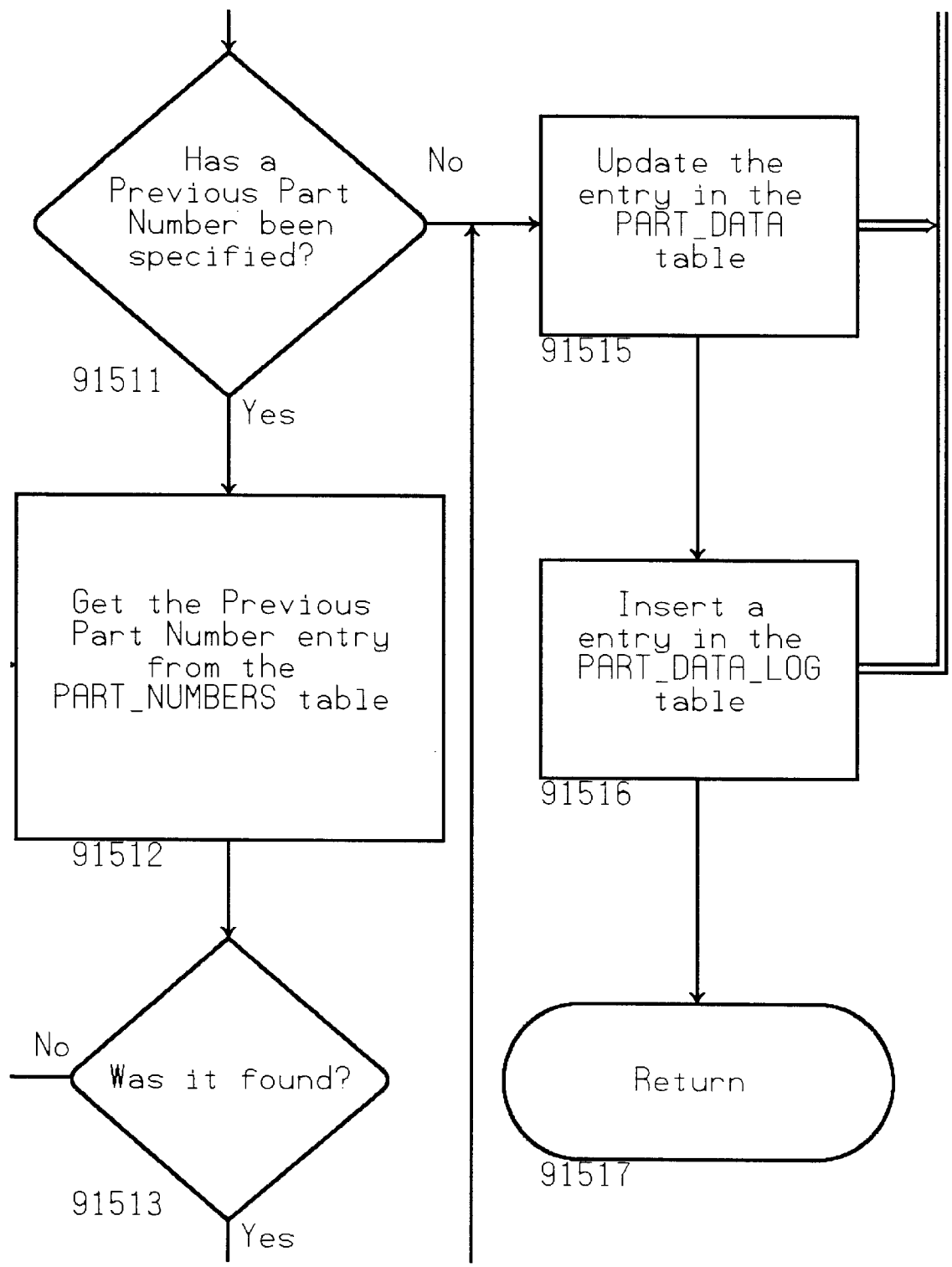
Figure 15F:
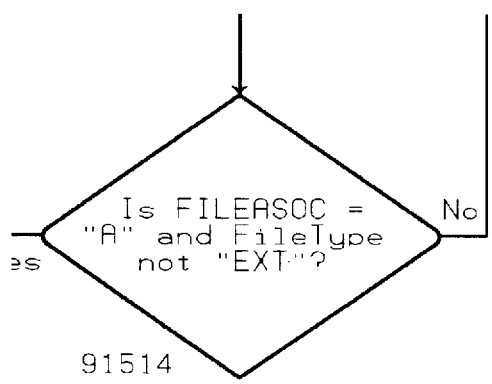
Figure 16A:
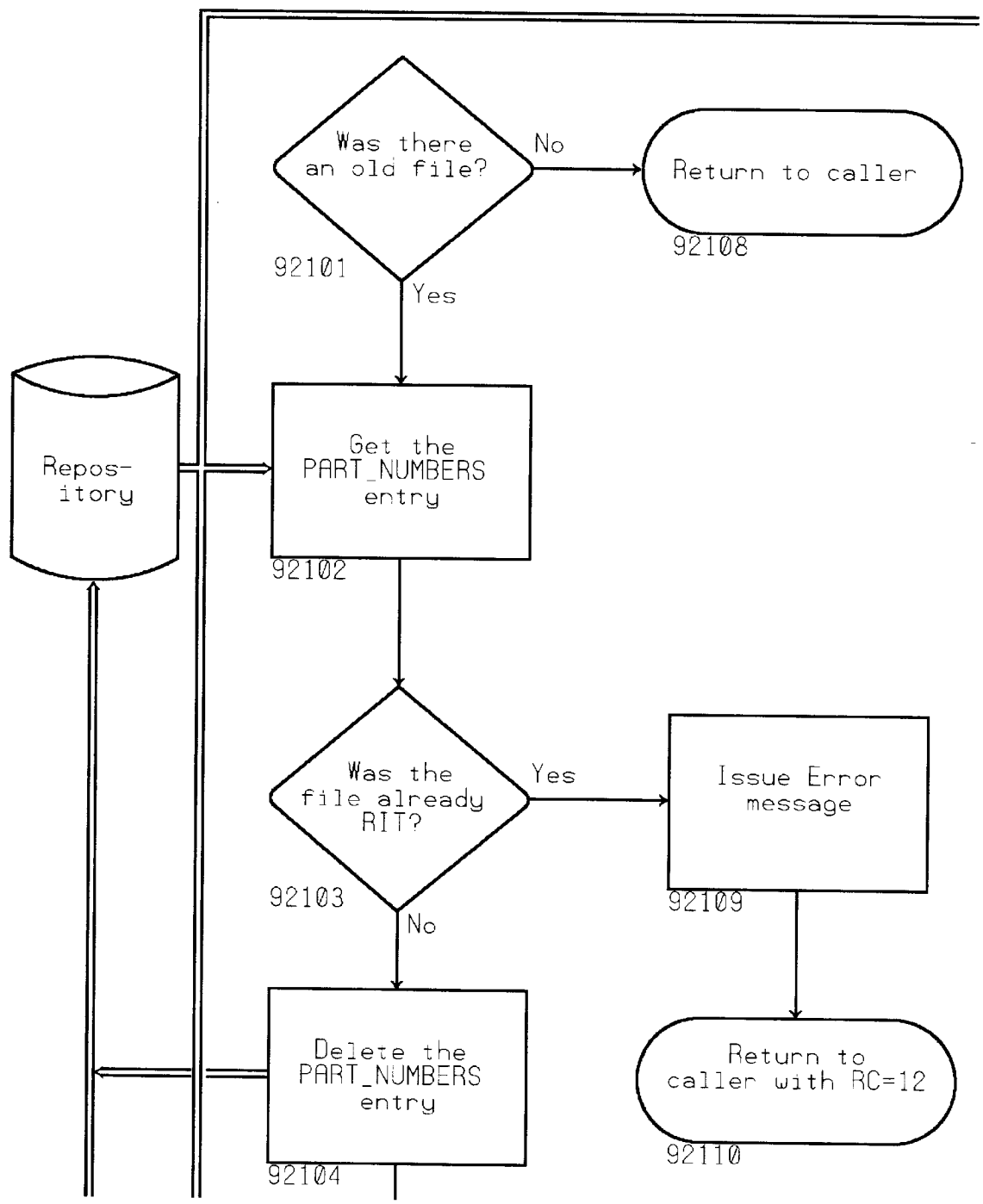
FIGS. 16a thru 16d describe the PNODIS Process when viewed as laid out as how in FIG. 16.
Figure 16B:
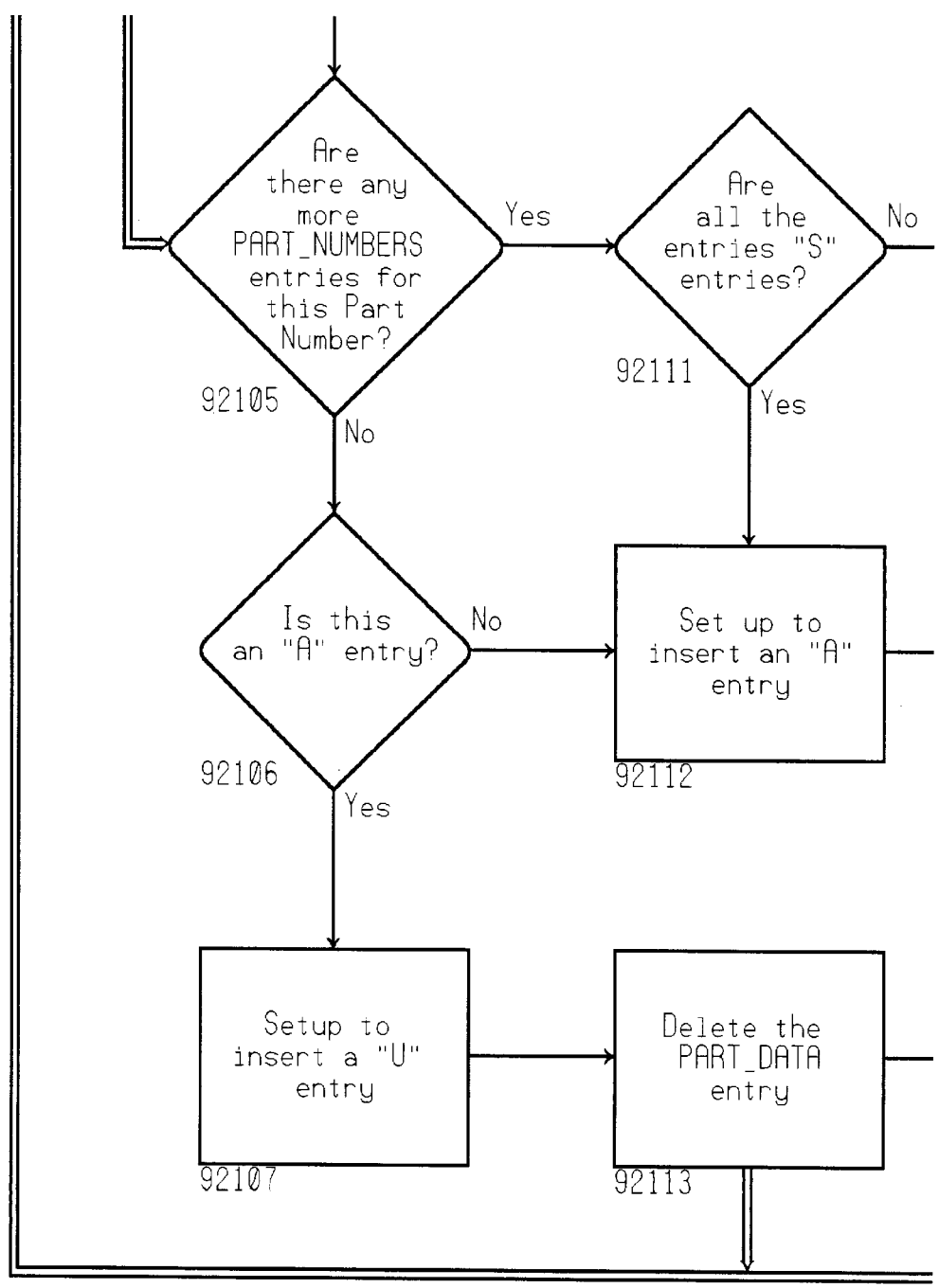
Figure 16C:
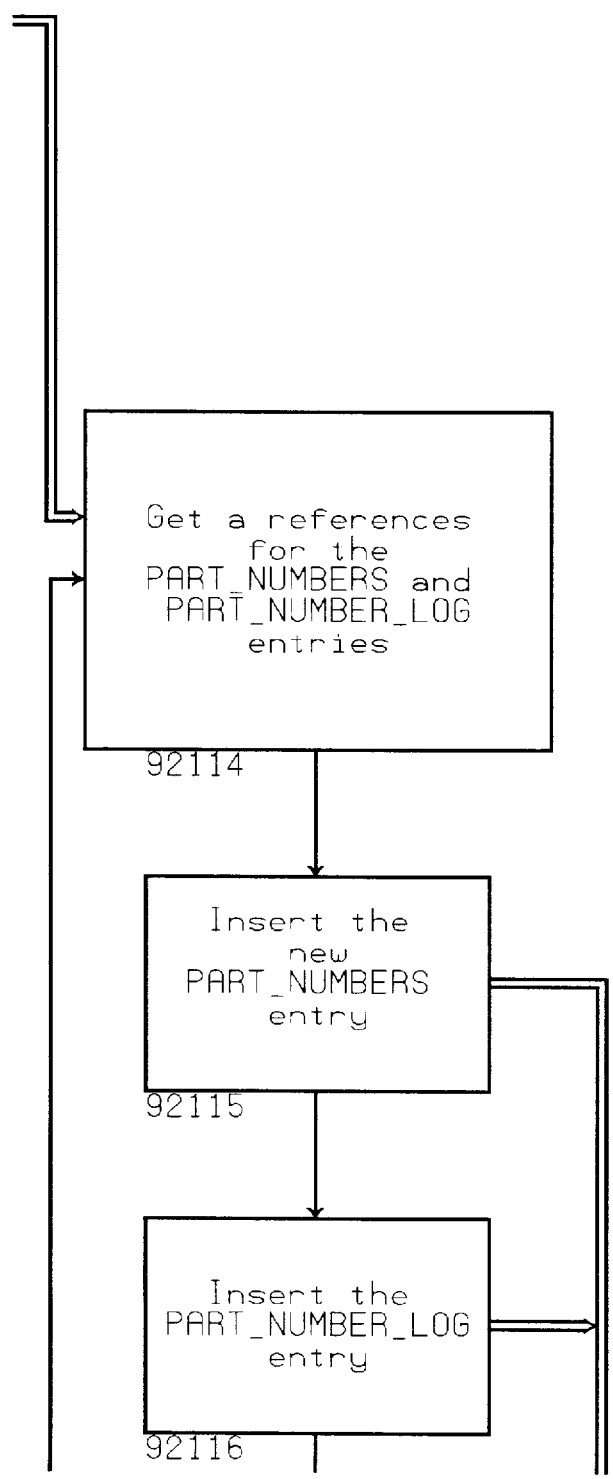
Figure 16D:
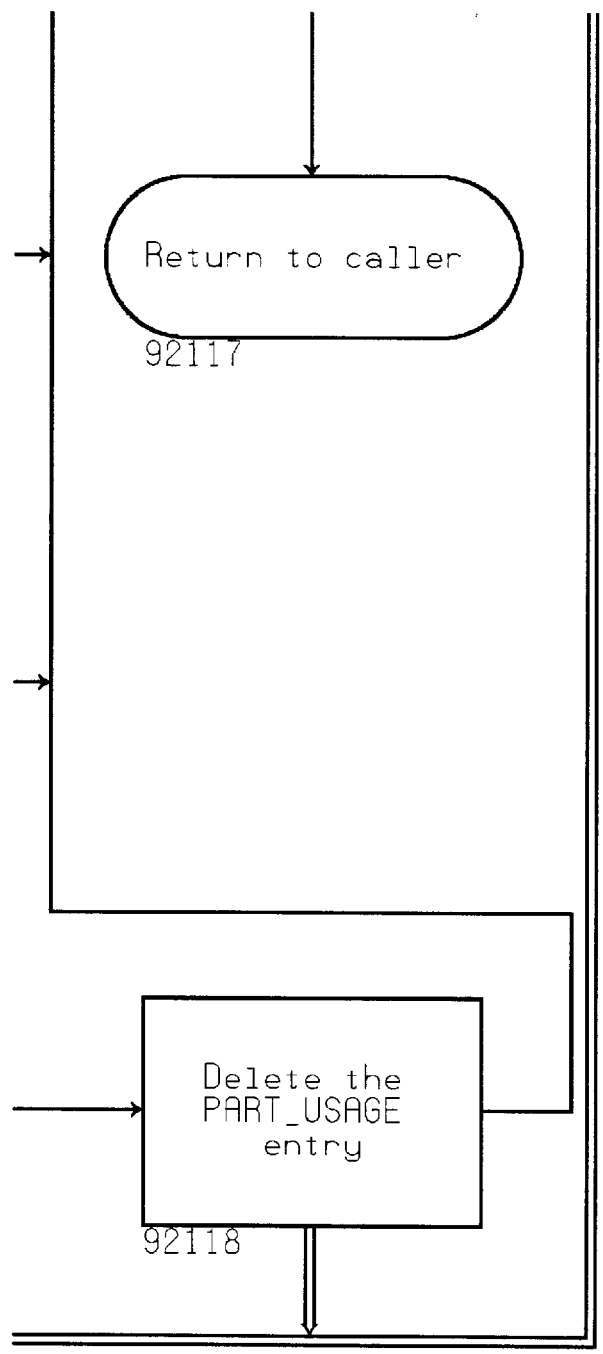

One major advantage to this tracking scheme is it's independent of the physical location of the data. The DCS permits the Data Manager to establish as many repositories as he needs down to any level of granularity. For example, all data for a library could reside in one physical directory, the data could be segregated by version only, or there could be seperated directories for each type of data. This level of flexibility allows the Data Manager to optimize the library to a given environment. For example, he can define his repositories in such a way that the data which moves most often is located on a single volume on his fastest server. Data which never moves (i.e. Release Level data) can be located on slow servers or spread out over multiple servers. As the Data Manager defines his library structure, he can specify the locations for every level of each version. In addition, if he has specific data types that he wishes to further segregate, he can specify a location for them. Finally, the DCS supports a feature called Automatic Component Grouping in which all data types for a given component name will automatically be located in a subdirectory off of the level directory. FIG. 10 illustrates a portion of a library directory structure with different levels of storage granularity. LIB_DIR is the primary directory for all data in the library. Under it, data is segregated by version where version 1 data resides in the subdirectory VERS1. At this point the diagram illustrates three examples of further segregation. In the VERS1 directory are are the schematics and behaviors which comprise level E1 and E2 for all 3 design components. Although they are physically mixed together, their unique identifiers allow the DCS and users to tell them apart. The diagram shows the circuit layouts to be further segregated by data type. So they reside in subdirectory TYPE_LAYOUT Once data reaches level E3, it is segregated by level and type. LEV_E3 contains all the schematics and behaviors for the E3 level, but the layouts reside in the TYPE_LAYOUT directory under LEV_E3 The final example shows data segregated only by level with no regard to type. This is seen in the release level repository LEV_R1 By offering this kind of flexibility, the DCS permits the Data Manager to group the data in the most advantageous way. In addition, the Data Manager could invoke Automatic Component Grouping, which would result in further subdirectories under VERS1, LEV_E3 and LEV_R1 to segregate the pieces by component name.

Note: This is unnecessary in the TYPE_LAYOUT directories since the only difference between the objects is the component name. In order to boost performance, every time a structural change is made to a library which involves repositories, the DCS automatically generates a master cross reference between library/level/version/type and physical location. This table is used by mechanisms such as the library search engine to locate data without requiring extensive querying of the Design Control Repository. It also enables library searches to occur in the event the Design Control Repository is unavailable.

Preferred Embodiment for Managing Problems, Releases and Parts (2.0)

This embodiment presents a method for tracking a coherent collection of data objects in a computer environment for purposes of releasing the collection to an external organization. The objects are tracked in a controlled manner which permits all objects to inherit all the necessary information to permit the external organization to prepare in advance for the release. In addition, a means is provided to enable the owners of the data objects to ensure the proper quality level is met prior to the release. The embodiment works in a client/server domain and permits data to span multiple computer platforms.

The present embodiment contains various algorithms and utilities to address three major aspects of data management. First, our embodiment incorporates a system for managing problem fixes. The fix management algorithm allows data to be associated with problem identifiers which are typically alphanumeric ids.

Utilities exist for a user to perform fix planning by associating a problem id to one or more data objects at the time of problem discovery. The Data Control Repository tracks the association in a planned state until such time that the fix is actually promoted into the Data Management System. The Library Manager interacts with the Fix Manager to track the problem id/data relationship and update the status in real time until the problem is marked closed.

Our embodiment employs the concept of Programmable Fix Management which allows the Data Manager to determine whether all data in the system should be tracked or only selected data types. The Data Manager can also specify a Fix Management Control Level which activates the Fix Manager when data crosses it, or Automated Library Processes may be used to perform Fix Management on different data types at different levels. The system also offers three modes of operation:

No Fix Tracking Disables all problem fix tracking for all data objects.

Collection Mode Forces all selected data types to be tracked under a single, default problem id.

EC Mode Allows each data object to have a unique set of problem ids. In this mode multiple pieces of data can be associated with the same problem or a single piece of data can resolve multiple problems.

In addition to interacting with users to attach data to problem ids, our preferred embodiment also offers an interface which permits an independent Problem Management System to transfer additional information, besides the problem ids, into the DMS. This transfer is done automatically with the aid of an Automated Library Machine or Auto-Reader service machine. This capability coupled with various utilities in the present embodiment permit a user to query the Control Repository to find information such as the list of problems fixed by a particular piece of data, including the problem descriptions, severities, escape analysis and current status. This information can be combined with other DM information about the file such as the current level, version, process results, and owner. The system also allows corequisite problems to be identified to help ensure all related problems are indeed fixed in the same release.

The second major aspect addressed by our embodiment is Part Number (P/N) Control. The preferred embodiment maintains a pool of Part Numbers which are assigned in a controlled manner to selected data types. The P/N Manager ensures the same P/N is never assigned to two different pieces of data. In a similar fashion to the Fix Management system, the P/N Control system also permits the Data Manager to select which data types will be involved in P/N tracking, and at what level P/N assignment is required.

Utilities also exist to view all the data associated with a P/N including the level, version, owner and process results of the data. At the same time the user can extract Fix Management information about the part to see which problems the part fixes, the problem description, escape analysis, severity, etc. Our system also permits the same P/N to be associated with data objects residing at multiple working levels, as long as they are iterations of the same object. However, once the P/N crosses into a Release Level, it is automatically frozen. This implies that the same P/N can't exist across multiple versions. The preferred embodiment expands this paradigm one step further by allowing a single piece of data to have multiple P/Ns associated with it. This concept, known as extent P/Ns, is a useful feature in environments where one abstract object in a Data Management System represents multiple physical entities each with different P/Ns. Utilities also provide a mechanism to associate attributes, such as technology information, projected and actual release dates, P/N histories or other pertinent manufacturing data with P/Ns.

The final aspect that our embodiment addresses is Release Control, also known in the preferred embodiment as Engineering Change (EC) Control. Our embodiment defines a Release as a collection of data objects which must be delivered to an external customer as a cohesive unit. The preferred embodiment discusses an environment where pieces of a design are packaged into a release for delivery to manufacturing. It would be apparent to one skilled in the art how these concepts could be applied to other business applications such a inventory control, distribution and insurance claim processing.

The Release Control system maintains a pool of Release or EC numbers which are associated to problem fix numbers and Part Numbers via close interaction between the Fix Manager, P/N Manager, Release Control Manager and Library Manager. Although most association is done automatically during file movement through the Data Management System, various utilities exist to perform manual associations. The Release Control, Part Number and Fix Management tools aid the Data Manager in planning and tracking large deliverables. It permits the user to view all the problems, data and Part Number information included in the entire release.

One of the most powerful features of the Release Control system is the EC Collision Avoidance Mechanism, or ECAM. ECAM constantly monitors all the Problem Fix, Part Number and EC information in the Control Repository looking for a known set of violations or illegal conditions. For example, it can detect if a data object, P/N or fix is associated with multiple releases. It also ensures that any released problem ids, Part Numbers or data ids (File Reference Numbers) are never reused in a different release. The system also permits the Data Manager to assign an EC Number to a Release Level. ECAM polices the library to ensure only data associated with the desired EC actually resides in that level.

To assist in coordinating the delivery of a Release, our embodiment allows a Release Date to be defined for any Part Numbers in the DMS. As the Release Date approaches, various notifications are sent to the desired recipients. In our preferred embodiment, one type of notification, denoted an IEC, is sent to manufacturing at a predetermined interval prior to the Release Date. An IEC contains a list of all the Part Numbers, along with any other pertinent information, included in that release. This enables manufacturing to plan their resources accordingly and react to any design changes in advance.

Problem Fix Manager

Our embodiment contemplates a means by which specific iterations of a data object are tracked and associated with unique identifiers. The preferred embodiment envisions these identifiers as Problem Fix Identifiers, where the IDs correspond to a problem entry in a design or manufacturing defect database. One skilled in the art would appreciate how this concept could be expanded to include other areas such as insurance claim numbers, document revision control, or any other field where objects must be modified in an iterative fashion in order to address a specific problem, request, or enhancement.

The present embodiment allows objects in multiple Libraries to collaborate together to fix a particular problem. Objects related in this manner are said to be co-requisite fixes. The preferred embodiment maintains one master requisite (REC) table where each unique Problem ID has one or more REC entries in the table. Each REC entry corresponds to a different Library participating in the fix. In our preferred embodiment, each REC has a Title, Owner, Release Number, and Escape Analysis data.

Associated to each REC is one or more data objects (files) which contain the fixes to the problem. Each object or file is known as a RFI, and a separate RFI table exists to hold these entries. Each RFI entry consists of the File Name, PFVL Information, Release Number, Status and Superseded Flag.

Our embodiment further contemplates the association of Problem IDs to Release Numbers or Engineering Change Numbers ECs. The preferred embodiment permits files to be iterated numerous times in order to fix multiple problems, then released to manufacturing as a coherent group of objects. Once again, one skilled in the art could envision how such a concept could be employed in other areas which require a group of items to be processed together. For example, the Problem IDs could be insurance claim numbers requiring payment checks to customers, or mail orders requiring release to the shipping dept. The preferred embodiment presents a centralized pool of EC Numbers from which all new EC Numbers must be taken. This insures that two Data Managers can't accidentally define the same EC Number for use in their respective Libraries.

Our preferred embodiment employs mechanisms to enable the user to associate Problem IDs to EC Numbers and track this association. These EC or Release Numbers are recorded in the REC table. The DMS enforces a rule that permits a particular file to be released only once under a single EC Number. Since the file to EC association is an indirect one (files are associated to problems, and problems are associated to releases), the DMS contains numerous checks to ensure a file isn't connected to two problems in different ECs. Additionally, the system also ensures that a Problem possessing multiple REC entries has different EC Numbers associated with each REC. The present embodiment further assists in managing ECs by permitting the Data Manager to associate Release Levels to EC Numbers. Upon making this association, the system ensures that only files connected to the proper EC are promoted into the corresponding Release Level. This association can be performed for specific Library File Types (LFTs) or for all LFTs defined for the current Library. Architecturally, our embodiment supports either method, although the preferred embodiment contemplates the former mode in order to allow different subsets of LFTs to exist at different Release Levels.

Our embodiment offers a plurality of methods to track and manage problems and ECs. The Data Manager has the choice of three different Fix Tracking Modes for any Library:

None No File/Problem/EC/Association is performed

Single Fix Tracking All Files are automatically connected to a default Problem ID and EC Number. The Data Manager controls these IDs, and the users have no interaction with the system.

EC Mode Users specify the File-Problem Association and the Problem-EC Association. Many utilities exists to view, edit and audit these associations to ensure they don't violate any rules.

Regardless of which mode is used to control Problem tracking, the Data Manager can further restrict the Library File Types which are subjected to the tracking. For example, certain LFTs may not make sense to associate to Problems or ECs. The DMS includes Fix Management flags for each LFT established by the Data Manager. By turning these switches on and off, the Data Manager can control the LFTs being tracked. This facility is provided by our Data Management Configuration Utility.

Our embodiment also employs a concept known as Programmable Fix Tracking whereby Library Processes can be used to perform the File to Problem and Problem to EC Associations. These LPs override the Fix Management flags and allow LFTs to participate in Fix Management only under specific conditions (such as promotion to a particular Level and Version) or manually via a Designer initiated Library Process. The Problem Fix Management utilities described below can all interface with our Library Process Manager to permit an LP author to write Library Processes which perform Problem Fix Management functions.

If a file requires multiple iterations to fix the same problem, the file may exist at multiple Library Levels. In this case, the DMS uses a Superseded Flag to denote whether a particular File Reference is superseded by a more up-to-date iteration at a lower level. The lowest level file is the active or non-superseded file. The DMS restricts certain operations for superseded files since failure to enforce the restriction would allow the possibility of an incomplete fix being released.

Additionally, since the same file may exist at multiple Levels, one of three scenarios may ensue:

The files at each Level may have exactly the same set of Problem IDs associated to them.

The files may have some Problem IDs in common and some unique IDs associated to them.

The files may have no Problem IDs in common.

In the first two cases the DMS ensures all files have the same EC number since one or more Problem IDs are in common. In the last case, the files may or may not have the same EC Number. The last case can be used to Pipeline ECs through the DMS in a sequential fashion.

Our embodiment also employs the concept of Problem Fix Planning. This permits users to manage file to problem association at the moment the problem is detected, even before the fix is implemented. This mode of operation is optional and under user control. Files belonging to users not utilizing this planning function, simply enter and proceed through the Library with a Status of Unplanned (or Implicit). This status is recorded in the RFI table.

However, for those utilizing this feature, utilities exist to allow them to associate one or more files to a problem while the files are outside the Library. Whenever a problem is discovered, a RFI entry is made with a status of Planned When the time arrives to promote the modified data object into the Library, the user may select one or more of the Problem IDs currently in a Planned state. Upon entering the Library, the status is converted to Libraried. This planning features reduces file association errors by requiring the user to enter the Problem ID only once when the problem is detected (and fresh in the user's mind). Once a file has been released the status can be changed to Done so the ID no longer appears on any selection screens. By utilizing three different statuses, a supervisor or coordinator can easily discern the Work in Progress (WIP) for a given release. They can report on number of problems found, outstanding problems waiting to be fixed, percentage of problems fixed, and can ensure all problems found are fixed prior to releasing the EC.

Release Manager

The present embodiment contemplates the idea of a Release Stream which is characterized by a grouping of lower level components into a higher level physical package. Often the manufacturing environment supports incremental Engineering Change Order (ECO) capability. For example, a higher level package may be a PC Board or Multi-Chip Module, and the lower level components are Integrated Circuit Chips. The initial release requires information about all the lower level parts as well as the high level package, but an ECO may only require the "changed" information (ie. a list of parts that changed). In order to accurately support this type of manufacturing process, our embodiment permits these types of Release Streams:

New Build or Initial Release Means a new high level package will be built from scratch. The high level package may contain all new components or it may pick up some existing parts from different Release Streams.

Regular EC Means the high level package will be a delta of an existing high level package. The manufacturing process will use information about the previous Release as a starting point, and apply the changes for the current Release.

Parallel Path or Make From EC Very similar to a Regular EC except the current Release is not based on the previous Release, but some older Release. For example:

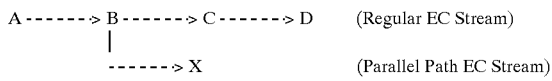

A is an Initial Release with Regular ECs B, C, and D. These are Regular ECs since they are always based on the previous Release. Release X is a Parallel Path EC since it is based on a Release other than the most recent Release. Many manufacturing environments can process both streams in parallel.

PIP (Print If Possible) Is a special EC variation where surface or temporary interconnects on the high level package are replaced by permanent buried connections. For example, a PC Board may be "patched" severing a printed circuit connection and soldering wires between components. If at some time, a new PC Board is manufactured with the "patched" interconnects embedded in the PC layout, our embodiment treats this as a PIP. In this case both variations of the PC Board (the one with the surface wire, and the one with the patch embedded in the layout) use the same Part and EC Numbers since they are logically and functionally identical.

Our embodiment prohibits regular EC Numbers from spanning multiple Libraries. Instead it contemplates the use of System Engineering Change (SEC) Numbers to hierarchically group a collection of lower level EC Numbers. For example, a regular EC Number may be used to release a PC Board containing ICs and other electronic components. A SEC can be used to enumerate and collate all the PC Boards necessary to build a personal computer. Utilities exist to create collections of ECs into SECs and to create listings of all the data objects in each EC. These listings can be combined to show all objects in the SEC.

Part Number Manager

In addition to tracking data as generic objects, our DMS also provides a means to track data requiring Part Number control. Like EC Numbers, our preferred embodiment presents a Part Number pool from which all new Part Numbers are assigned. This eliminates the possibility of two different parts accidentally being assigned to the same Part Number. The Data Manager controls which objects in the Library participate in Part Number control by selecting the LFTs using our Data Management Configuration Utility.

Usually Part Numbers are assigned to one or more LFTs representing design components such as chips, schematics, cards, MCMs, boards, etc. In these cases there is an actual design representation corresponding to the P/N. However, our embodiment also permits other types of P/Ns which correspond to physical entities for which there is no design counterpart tracked in the DMS. These physical entities are known as Extents, and they typically exist on higher level assemblies such as MCMs, SCMs and boards. For example, an MCM may have six signal planes within its substrate, and manufacturing requires a P/N for each plane. Our preferred embodiment denotes these six P/Ns as Extent Part Numbers, and has the ability to assign, track, and release them in the same manner as component Part Numbers.

Since Extents are closely related to the manufacturing process, and very technology dependent, our preferred embodiment contemplates the use of technology rules files to personalize an assembly part tracked in a technology-independent Control Repository. For example, the Control Repository holds the P/N of an MCM along with its technology code. This technology code has an associated rules file which contains Content information that describes the detailed physical structure necessary to manufacture it (such as the number of signal planes). This structure also contains Content Parts, other than Extents, which are only used in manufacturing and not tracked in the DMS. During the process of assigning Extent Part Numbers, the rules file is consulted to determine what types of parts constitute that type of assembly. In this example, since six signal planes are required, the system will assign six Part Numbers in the DMS and track them along with the main assembly part. There are also other types of Content Parts, such as Technology Reference Parts which are included in the Content Data, but not tracked by the DMS. In summary, this Technology Independent Manufacturing Extent Release System (TIMERS) allows the same generic tables to be used for all types of P/Ns (components, assemblies, extents) regardless of the underlying technology or manufacturing process.

An independent mechanism exists to associate Part Numbers to EC Numbers. Our preferred embodiment employs Library Processes to perform this association, but one skilled in the art would appreciate how this code could be incorporated into the file movement mechanism of a DMS. These Library Processes process any data objects which actually contain P/N information and attach those P/Ns to the EC corresponding to the data object. In addition, a special LP operates on a Netlist or any type of assembly design schematic which contains the P/N Bill of Materials. The purpose of this LP is to record all the usage data for all the parts on the assembly. Once all this information is captured in the Control Repository, the DMS can build a Bill of Materials to support a Release Stream.

This Part Number-EC Association also serves as a type of check and balance system to ensure that a particular data object being released to manufacturing is assigned to the correct EC. Our embodiment contemplates a means of comparing the File→Part Number→EC association against the File→Problem Fix→EC association to prove that a particular data object is connected to the proper Part Number, Problem Fix information and EC Number. Within each method of association are rules which must be adhered to at all times in order to preserve a legal association. The system is designed in such a manner that this audit will uncover illegal associations. Thus, by performing the audit prior to releasing the Bill of Materials to manufacturing, errors in Part Number, Release and Problem Fix Management can be corrected in a cost effective manner.

Once all the File→Problem→EC and File→Part Number→EC associations are stable, our embodiment incorporates a means for creating a Release Bill of Materials known as an IEC. The IEC contains all the information required by manufacturing to process any of the aforementioned Release Streams properly. This information may include the names of all the components in the EC, their Part Numbers, technology information, usage count, type of component, Previous Part history etc. The DMS allows the Data Manager to enter an Estimated Release Date early in the release cycle, then automatically generates the IEC, at a specified time, based on the Problem Fix Management data in the Library at the time. As the current data approaches the Estimated Release Date, appropriate downstream users are notified and any changes to the IEC data are automatically tracked and sent. This early warning and notification system enables manufacturing or other downstream customers to schedule time, resource, materials, etc. for the pending Release. The Data Manager is also warned as the Estimated Release Date approaches so they can ensure all verification activity is completed in preparation for the Release or change the Release Date if more time is needed to solve problems.

A further mechanism, related to Release Streams, is a Commodity Bridge. This mechanism permits a completely new assembly (with no prior manufacturing history) to use components derived from an unrelated Release stream. The new assembly may directly pick up released components, or it may contain modified components (which are released with, the assembly) that are EC'd from components in a different Release. In either case, our embodiment employs the bridge to accurately obtain all current and previous Part information for the new assembly. This also allows the same algorithm to generate IEC data because all types of assemblies (Regular EC, Parallel Path EC, Commodity Bridged Releases) that contain parts from other ECs are guaranteed to have a complete EC tree to traverse. Our embodiment allows the Data Manager to establish the Commodity Bridge or change it at any time, using a Release Management application discussed in a later section.

The following describe the various utilities which exist to create, view, and edit the different types of File, Problem and EC Associations. In addition, many of the utilities perform audits or checks to ensure all the Release rules are being enforced. Our embodiment contemplates the ability to invoke any of these utilities via a menu system, from a command line interface or from an Application Program Interface.

Problem Fix Management Applications

Figure 37:
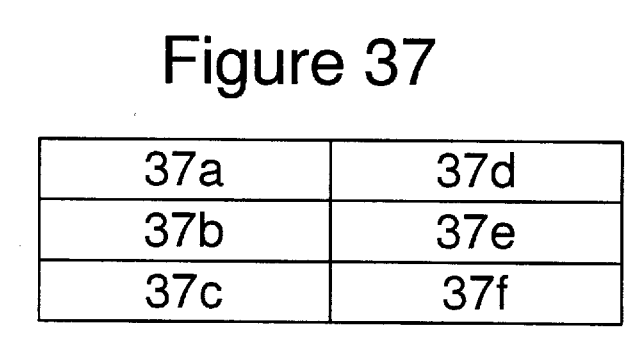

A utility exists which enables a user to switch all the active file entries for a particular fix number from a managed to an unmanaged status. In our preferred embodiment, the user invokes the Initialize Fix sub-menu within the Fix Management menu hierarchy or passes the Init option to the FixMan interface. The command line interface allows the user to pass an optional fix number, otherwise the user is prompted to enter it. The QRRFIGET procedure is invoked to query all the file entries in the Control Repository associated with the fix number. The program loops through all the entries and removes those which are in a Superseded state, or already in an Unmanaged state. The QRRFIMOD, described in FIG. 37, is then invoked on each of the remaining entries to modify their status from the current state to Unmanaged.

A utility exists which enables the user to specify a particular file, and change the status for the fixes associated with the file. The user may specify all fixes or a subset of the fixes. The menu system offers the Set Status sub-menu which prompts the user for the Filename, PFVL information, the desired status, and a list of fix numbers (of the keyword ALL). The command line interface permits the user to pass all this information to FixMan via the Set option. The routine begins by invoking QRRFIGET to query all the fixes associated with the desired file. This form of the query returns fix information for the specified file as well as iterations of the same file at other Levels. The program loops through all the entries in search of entries which meet all the following criteria:

1. Either the users specifies ALL as the fix list, or the fix number returned by the query matches one of the numbers in the list.
2. The entry is not Superseded.
3. The existing status on the entry is different from the desired status.

If all the conditions are met, the code will check for the following illegal status changes:

A desired status of Libraried or Done is not allowed for a non-libraried file.

A desired status of Planned is not allowed for a libraried file.

Any entry exhibiting either of these conditions will not be modified, and the user is notified about the file that can't be modified. Assuming the entry can be modified, QRRFIMOD is employed to modify the status. As each entry is processed, the program tracks the fix list to see if the user entered a fix which is not associated with any of the entries returned by the Control Repository. If so, the user is also notified.

Figure 38A:
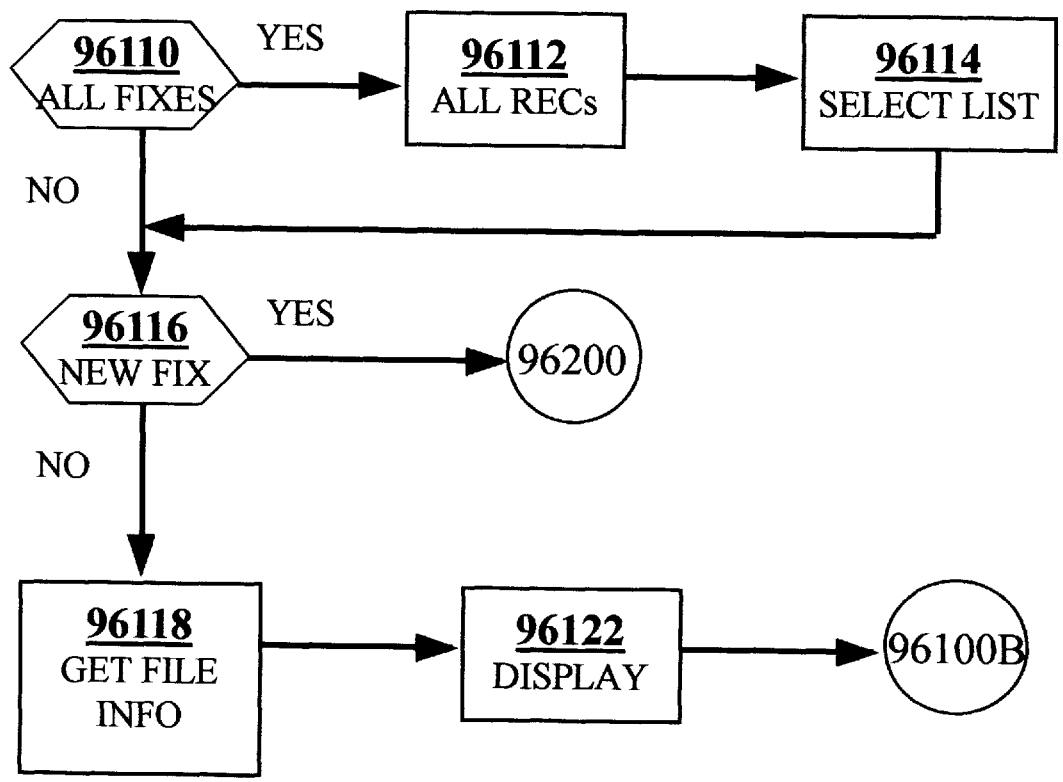
FIGS. 38a thru 38c illustrates the utility to edit objects associated with Problem Fixes IDs.
Figure 38B:
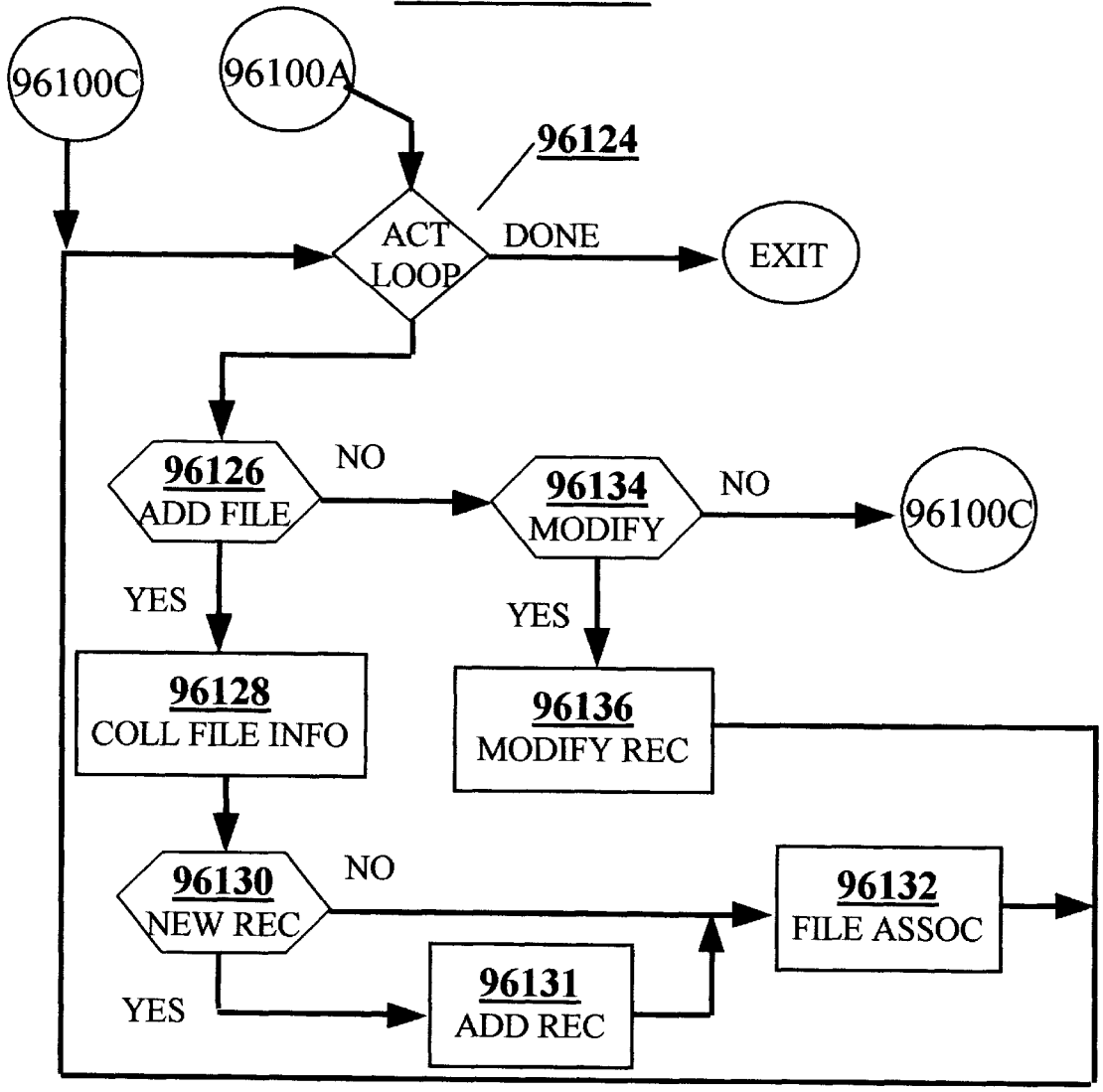

A utility exists to edit file entries associated with a Problem Fix number. The user may employ the Edit Files Associated to Fix sub-menu, or pass a fix number through the command line interface using the Fix option. Our embodiment permits the keyword ALL to be substituted for a fix number in order to obtain a list of all fixes in the Control Repository. The procedure is illustrated with FIG. 38 and begins with Step 96110 in FIG. 38a. This step tests to see if the user wants to work with ALL Fixes or just a single fix number. If ALL Fixes are desired, control proceeds to Step 96112 which performs a QRRECGET to acquire ALL RECs from the Control Repository. This list is then passed to Step 96114 which uses it to generate a Selection List for the user to pick from. Since a single fix number may have multiple RECs (ie. the REC spans multiple libraries), this step ensures only one line is displayed for each fix number. Whether the user selects the fix from Step 96114 or enters a fix number at the beginning of the routine, control eventually proceeds to Step 96116. This step checks to see if the Fix number is a brand new REC, or is a REC with no files connected to it. If either of these is true, it's considered a New Fix, and control proceeds to the Load New Files routine described in FIG. 39.

Otherwise, if any files are connected to the fix, Step 96118 is employed to Get the File Information for all the RECs comprising the fix. This is accomplished with the QRRFIGET function. Next, Step 96122 is employed to Display the resulting file entries on the screen. This includes the name of each file, it's PFVL, and the current state. If the entry is Superseded, the current state will show as Superseded, otherwise the current state will be it's current status (Unmanaged, Planned, or Libraried). In addition, this screen supports a filter function to hide the Superseded entries from view, or allow any combination of the other statuses to be viewed. By default, Done files are excluded since they usually pertain to released entities which are no longer being tracked.

The display screen is interactive and allows the user to perform several actions on the visible entries. Step 96124 in FIG. 38b establishes an Action Loop which monitors the user's input. Any invalid action prompts the user to select a valid action. Upon selecting a valid action, the following steps are performed. Although these steps are described in an If-Then-Else structure, it would be obvious to one skilled in the art that a Case/Select structure would also be appropriate.

At this point control proceeds to Step 96126 which tests to see if the user wants to Add a File to the existing list of file associations. If so, Step 96128 Collects the File Information from the user via a dialog box. The user must enter the File Name, PFVL information and the status. The program checks to see if this is a libraried file and tests the Fix Management flag for the Library File Type. If the LFT is not under Fix Management, the user is notified, and control returns to the top of the Action Loop. Otherwise, if the file is Libraried, this step queries the Control Repository for the File Reference number. Next, Step 96130 uses the PFVL information to compare all the REC entries comprising the fix to determine if a New REC Entry is required. One example would be a fix number that's only associated with files from Library A, but the user wants to add a file from Library B. In this case, Step 96131 invokes the QRREC-ADD function, described in FIG. 33, to Add the New REC into the Control Repository. Regardless of whether a New REC has to be added, control eventually proceeds to Step 96132 which performs the File Association. Our preferred embodiment uses two functions, QRRFIADD and QRRFI-MOD to attach file entries to a REC associated with a particular fix number. It should be noted that the functions performed by these two queries could easily be combined into a single query to improve performance. Control would then return to the top of the Action Loop.

If the user did not select Add File, then control would branch from Step 96126 to Step 96134 which tests for Modified REC Info This would include any changes made to the Owner, Title, or Escape Action Code(EAC) of the REC.

Figure 34:
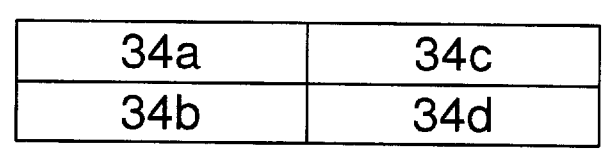

If any of these fields is modified, Step 96136 captures the changes and employs QRRECMOD, described in FIG. 34, to Modify the REC table in the Control Repository. Control then returns to the top of the Action Loop.

Figure 38C:
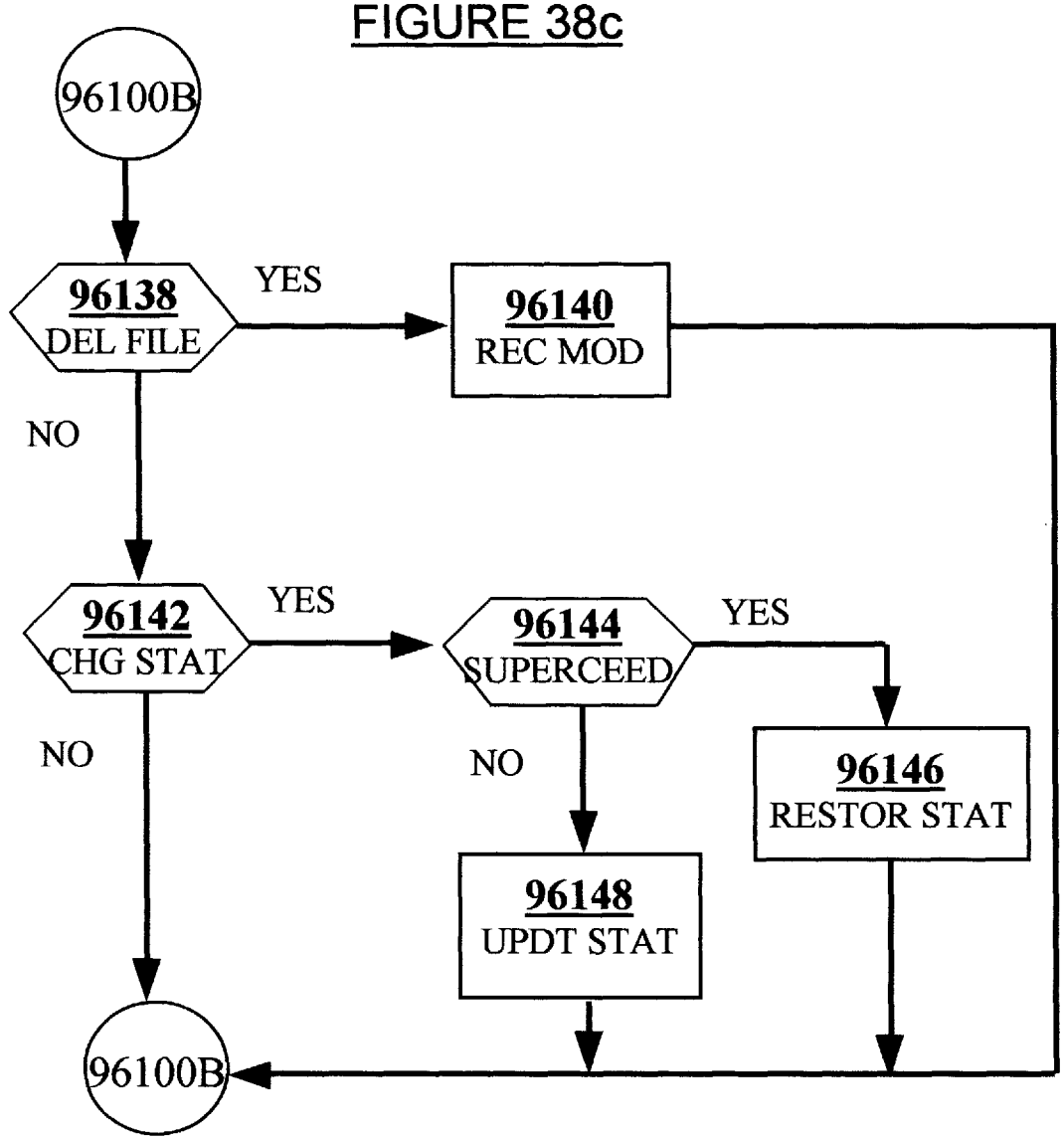
Figure 39:
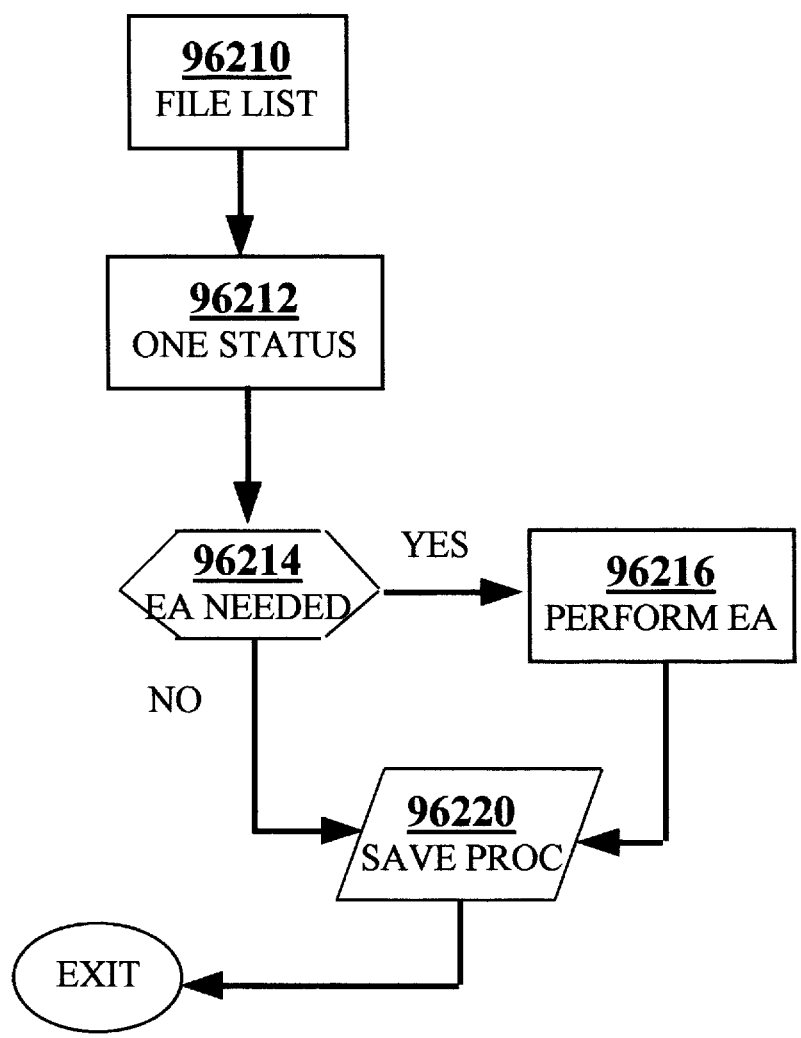
FIG. 39 illustrates the utility to associate a list of objects to one or more Problem Fix IDs.

If Step 96134 tests negatively, then control branches to Step 96138 in FIG. 38c which tests to see if the user wants to Delete a File from the existing list of file associations. If so, Step 96140 is invoked to Disassociate the File from the REC. This is done via the QRRFIDEL function, described in FIG. 36. Control then returns to the top of the Action Loop.

If the user does not elect to disassociate a file, then control branches from Step 96138 to 96142 which checks to see if the user wants to Change the Status of an existing entry. As stated previously, if this tests negatively, the user entered an invalid action and is prompted to enter a valid one. Assuming the test is positive, control proceeds to Step 96144 which checks to see if the selected entry is Superseded. If so, then Step 96146 will attempt to Restore the Original Status. This can only be done if there is no other active entry for the same file. Since our embodiment only permits one iteration of a file to be active at any one time, Step 96146 will not allow a Superseded entry to be reinstated concurrently with an active entry. On the other hand if there are no other entries for the selected file, or the other entries are also Superseded, then the selected entry will be reinstated as the active entry, and the original status (which is always retained in the table) is restored and displayed.

Otherwise, if the selected entry is an active entry, the user is prompted for the new status. The only restriction is that the user may not select Planned for a Libraried file or Libraried or Done for a non-Libraried file. Our preferred embodiment uses the QRRFIMOD function to Update the Status in Step 96148. Control is then returned to the top of the Action Loop. The Action Loop in Step 96124 of FIG. 38b is repeated until the user selects the exit choice which ends the routine.

A utility exists which enables the user to associate a list of files to one or more fixes with a batch type of invocation. The preferred embodiment contemplates a sub-menu entitled Load a List of Files which prompts the user for the name of the file serving as the list, the fix number(s) and the status. The user may also invoke the utility through the command line interface by passing the Load option along with the name of the list, the fix number(s), and the status. Both methods also offer the means to supply an EC number using the Mecmod option. Our preferred embodiment requires the list of files to contain one record for each file to be associated. Each record is comprised of the File Name, the PFVL information, and an optional File Reference number for any libraried files. Upon invocation of the utility, Step 96210 in FIG. 39 reads the File List and checks to ensure File References are only provided for Libraried files. Our embodiment also permits the user to substitute the keyword Edit for the list file information on the command line interface. Step 96210 will detect this and allow the user to interactively enter the listing of files to associate.

As the File List is read into a data structure, each LFT is remembered and a query is made to the Control Repository to check the Fix Management flag for all the LFTs. Any LFT not under Fix Management is omitted from the data structure unless the LP option is passed. This allows a Library Process to override the Package Control Data. Next, Step 96212 checks to ensure one and only One Status is passed to the algorithm. This check is primarily for the command line interface since this also serves as an API for third party tools. Next, Step 96214 tests to see if Escape Analysis is Needed. The sub-menu offers a push button to enable the user to request Escape Analysis, and the command line interface offers an EA option. If the test is positive, Step 96216 is employed to Perform the Escape Analysis on each fix number provided by the user. Our preferred embodiment interfaces with a third party Escape Analysis tool geared towards chip design, but one skilled in the art would appreciate that any Escape Analysis tool could be invoked as long as the corresponding EA field in the REC is formatted to accept the output from the tool.

Regardless of the outcome of Step 96214, control eventually reaches Step 96220 which invokes the Save Procedure described in FIG. 45. This routine is responsible for associating the files to the fixes. Upon return from the procedure, the utility exits.

A utility exists to edit fix numbers associated with a file. It can be accessed through the sub-menu entitled Edit Fixes Associated to Files, or via the command line interface which only requires the name of the file and its PFVL information. The user may optionally pass the status indicators to filter the fix information presented. Absence of any status indicators results in Unplanned, Planned, and Libraried fixes being displayed. Upon invocation, the algorithm in FIG. 40 is employed. It begins with Step 96310 which Gets the Fix Information First, the Package Control Mode is queried to ensure the Library is running under Single Fix Tracking or EC Mode. If not, it's an error and the utility terminates. Additionally, the Fix Management flag corresponding to the File Type of entered file is checked to ensure that LFT is being tracked. If the above criteria is met, the QRRFIGET function is employed to query the fix information. The Control Repository returns fix information for the all Levels of the file, not just the Level included in the PFVL information. This is done to aid the user in visualizing the Problem Fix situation for the file. This information is loaded into a data structure which is used in Step 96312 to Display the Fix Information on the screen. Our preferred embodiment displays each fix on a single line with the Status, Level, Problem Description, and a flag indicating whether Escape Analysis has been performed.

Once the screen is displayed, an Action Loop is established in Step 96124 to interact with the user. The present embodiment offers a plurality of features and actions through which the user can view and edit the Problem Fix information. Although the following interaction is depicted through a series of If/Then/Else statements, one skilled in the art would appreciate the use of a Case/Select structure as an alternative.

The Display Screen in Step 96312 offers the feature where the user can employ a search feature. Step 96314 checks if the Search feature is invoked. If so, Step 96316 employs the Search Routine which requests a fix number from the user and a direction. The program will search through all the fixes being displayed, in the desired direction, until the requested fix is found. If found, the display is redrawn with the desired fix highlighted. The search will begin at the line just below the cursor, or at the first line if the cursor is outside of the data field. If the requested fix number is not located, a message informs the user and the data field of the display remains unchanged. The program returns to the top of the Action Loop.

Figure 40A:
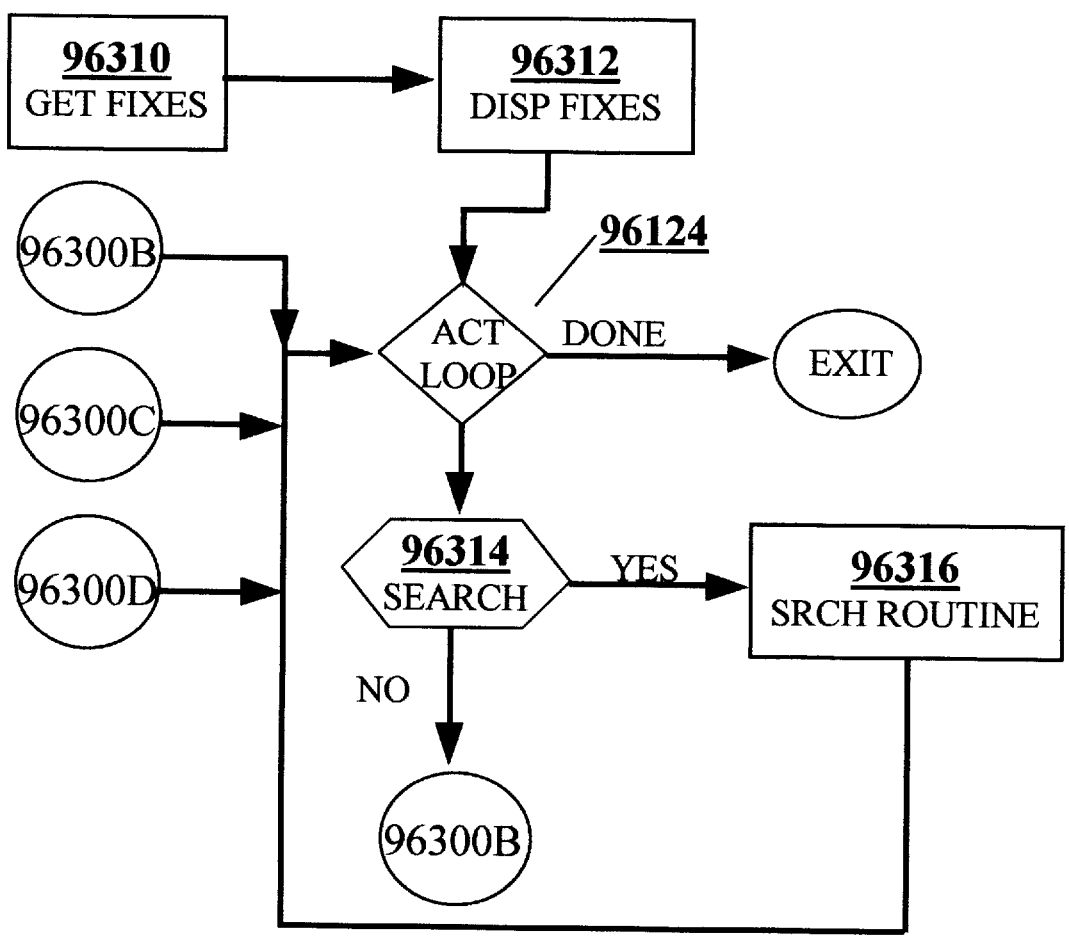
FIGS. 40a thru 40d illustrates the utility to edit Problem Fix information associated with objects.
Figure 40B:
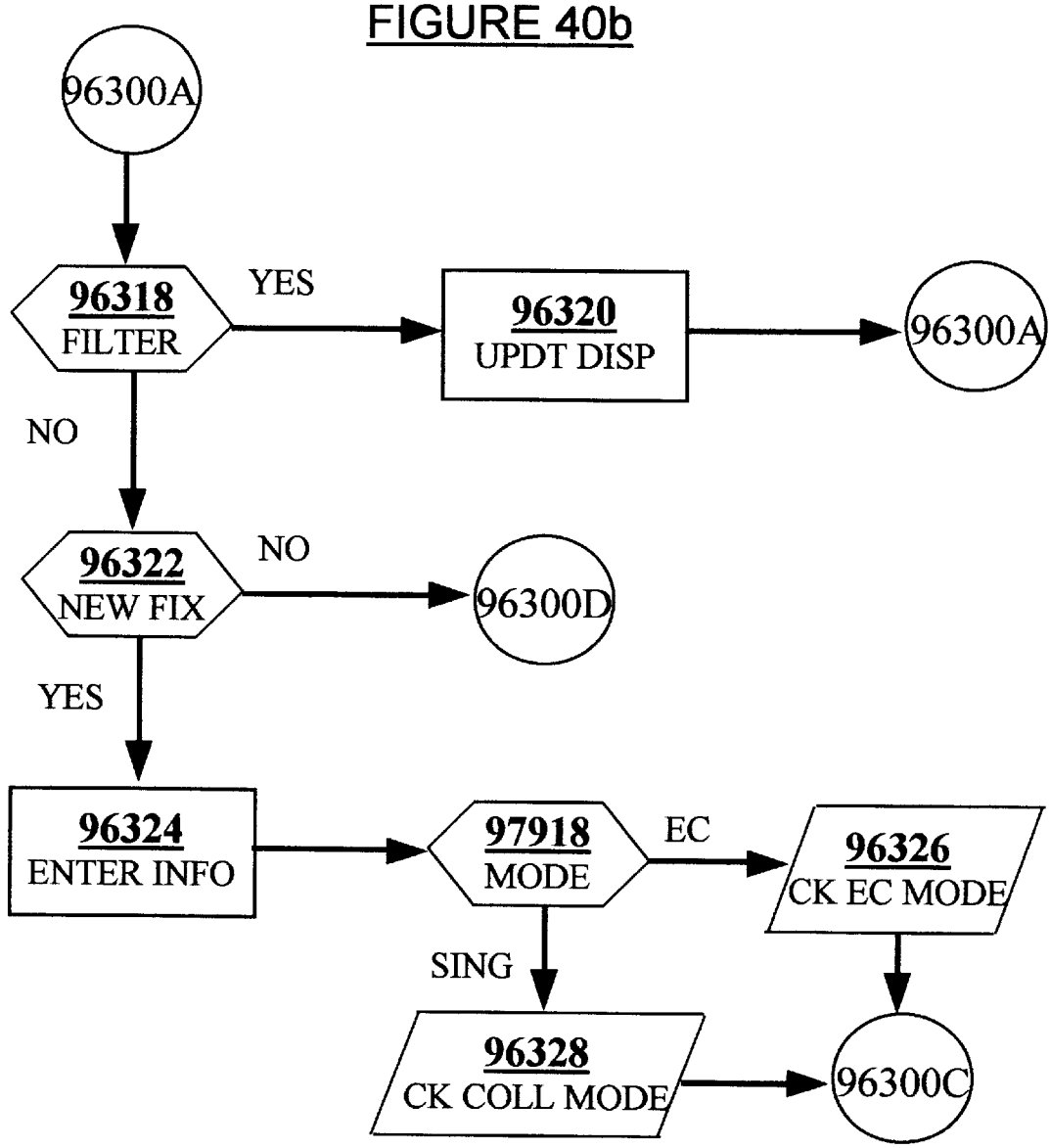
Figure 40C:
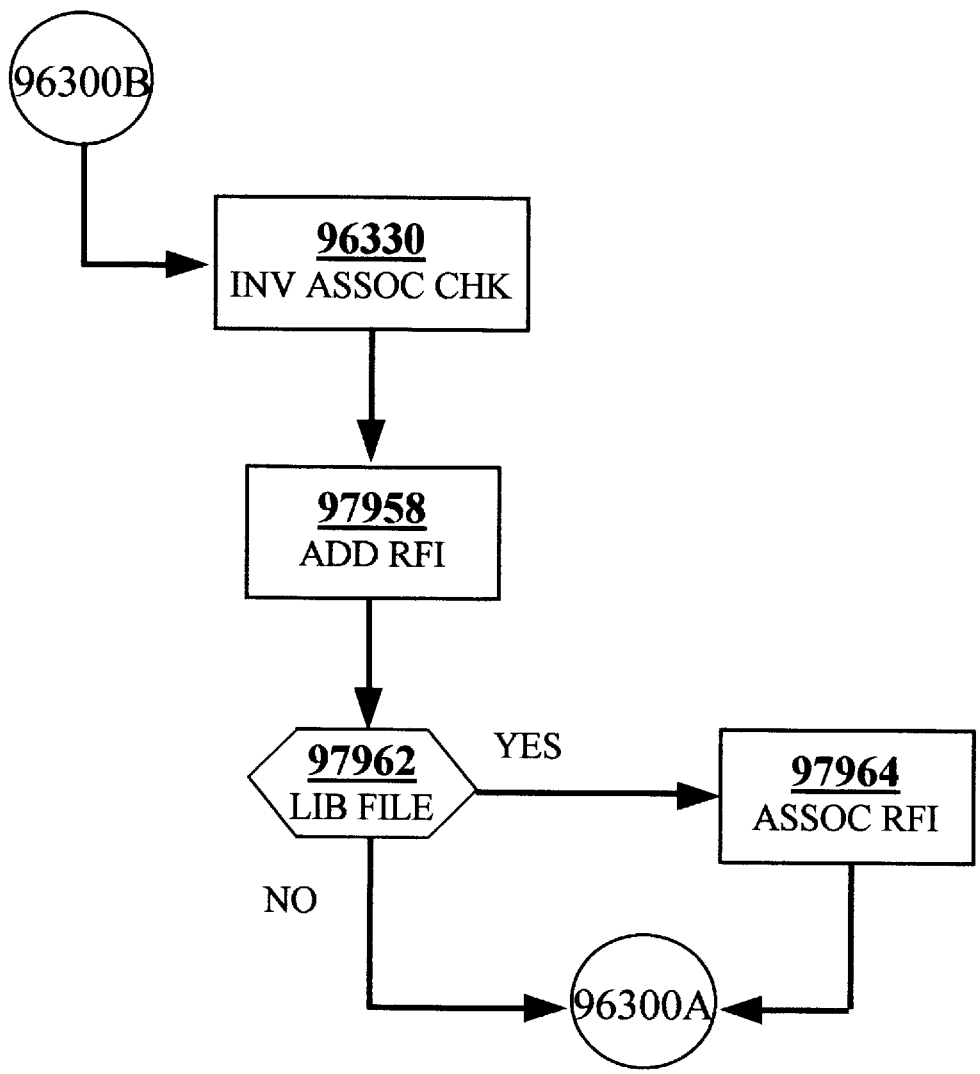

If the test in Step 96314 fails, control proceeds to Step 96318 in FIG. 40*b* which tests to see if the user invoked the Filter feature. If so, Step 96320 acts as a toggle by checking the state of the current display. If it's currently filtered, the routine Updates the Display to show all the information initially shown in Step 96312. If the current display is the entire list of fixes, then the user is prompted for the filter criteria. The user may include or exclude any combination of Problem Fix Numbers, Status, Levels, and Escape Analysis flags. Once entered, the program applies the criteria to the overall list of fixes and Updates the Display to reflect the filtering. Control then returns to the top of the Action Loop in Step 96124.

If the test in Step 96318 fails, then Step 96322 tests to see if the user is associating a New Fix to the file. If so, Step 96324 requires the user to Enter the Necessary Information. This includes one or more Problem Fix Numbers, Status, and Level.

Note: The user is not restricted to associating fix data to the level of the file entered at the time of invocation.

Next, the Package Control Mode queried in Step 96310 is used in Step 97918 to determine the branching. If the Mode is EC Mode then Step 96326 invokes the EC Mode procedure in FIG. 45*c*. Otherwise, Step 96328 invokes the SF Mode procedure in FIG. 45*b*. Upon return from either sub-routine, control proceeds to Step 96330 in FIG. 40*c*.

Step 96330 performs an Invalid Association Check which looks for the following violations for each Fix Number entered.

The user may enter status of Libraried or Done for Libraried files only.

The user may enter status of Planned for non-Libraried files only.

Ensures this Problem Fix Number is not already associated to the same file, but at a different Level in an active (non-Superseded) state, or in a Private Library in a Planned state.

Ensures this Problem Fix Number is not already associated to this file at the same Level.

Ensures the entered file exists at the entered Level.

Figure 35:
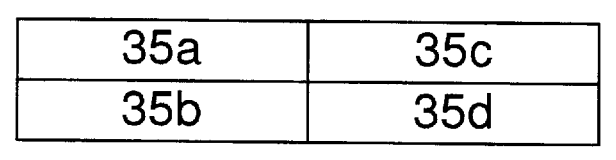

Provided the above violations are absent, Step 97958 Adds the RFI entry to the REC Table. The QRRFIADD function, described in FIG. 35, is used to add the file entry to the Fix Number. If the file is not Libraried, the association is complete. Otherwise Step 97962 will test positive for a Libraried File, and Step 97964 will invoke the QRRFIMOD function to Associate the RFI Entry. At this point control returns to the Action Loop.

Figure 40D:
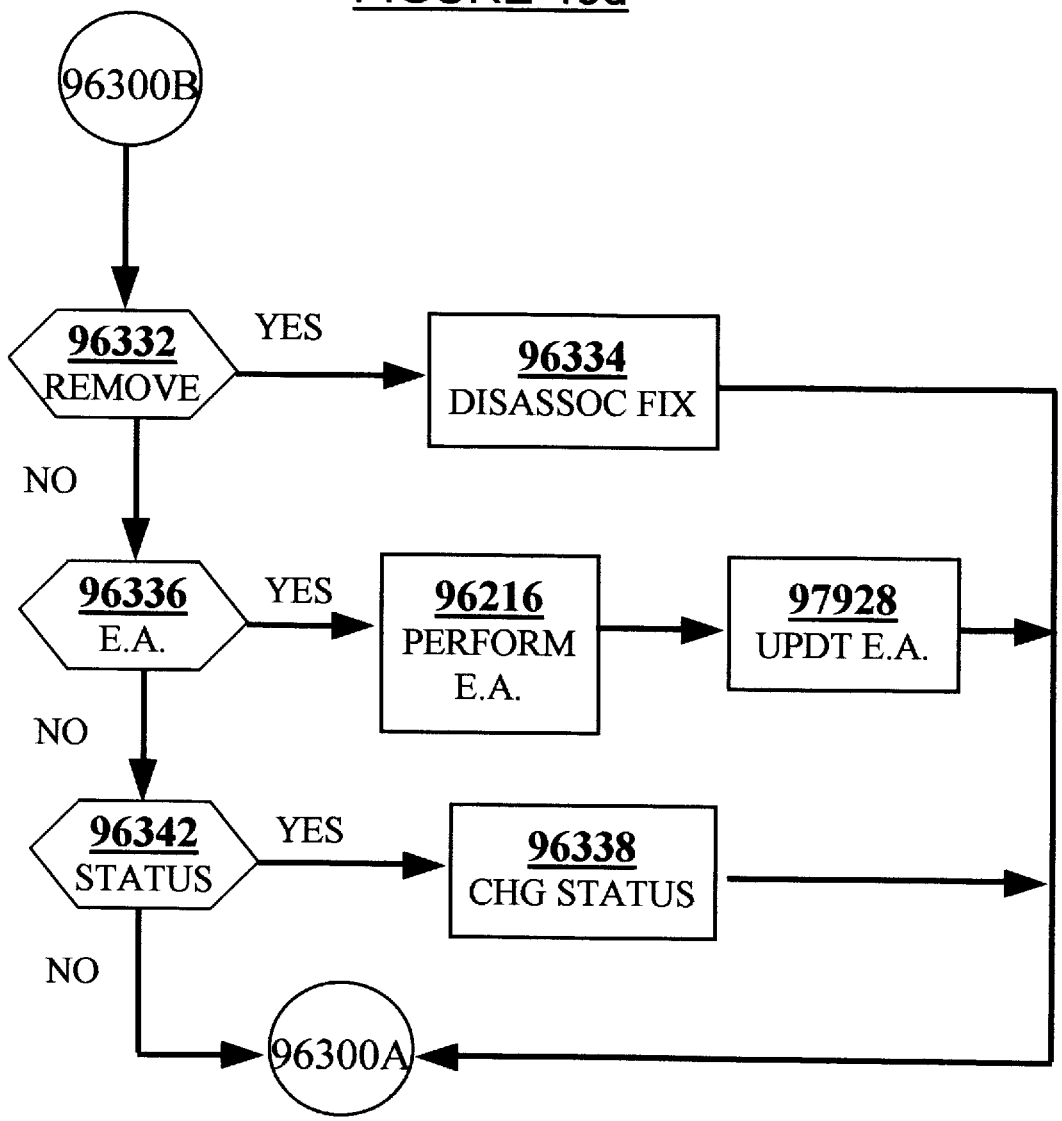

Returning to Step 96322, if the action is not a New Fix, then Step 96332 in FIG. 40*d* tests to see if the user wants to Remove a Fix Number. If so, Step 96334 invokes the QRRFIDEL function to Disassociate the Fix from the file. Control then returns to the top of the Action Loop.

If the test in Step 96332 fails, then Step 96336 checks to see if the user wants to perform Escape Analysis on one of the displayed fixes. If so, Step 96216 is employed to Perform the Escape Analysis, followed by Step 97928 which Updates the Escape Analysis Data data in the REC Table of the Control Repository. Control is then returned to the top of the Action Loop.

If the test in Step 96336 fails, then Step 96342 checks to see if the user is modifying the Status. If so, Step 96338 is employed to Change the Status. This step checks to ensure the status entered by the user is legal for the current file. If the current file is non-Libraried, the only legal status is Planned whereas Libraried and Done are reserved for Libraried files. The QRRFIMOD function is employed to change the status.

Control eventually returns to the Action Loop which continues indefinitely until the user intentionally exits. At this point the utility exits.

Figure 41:
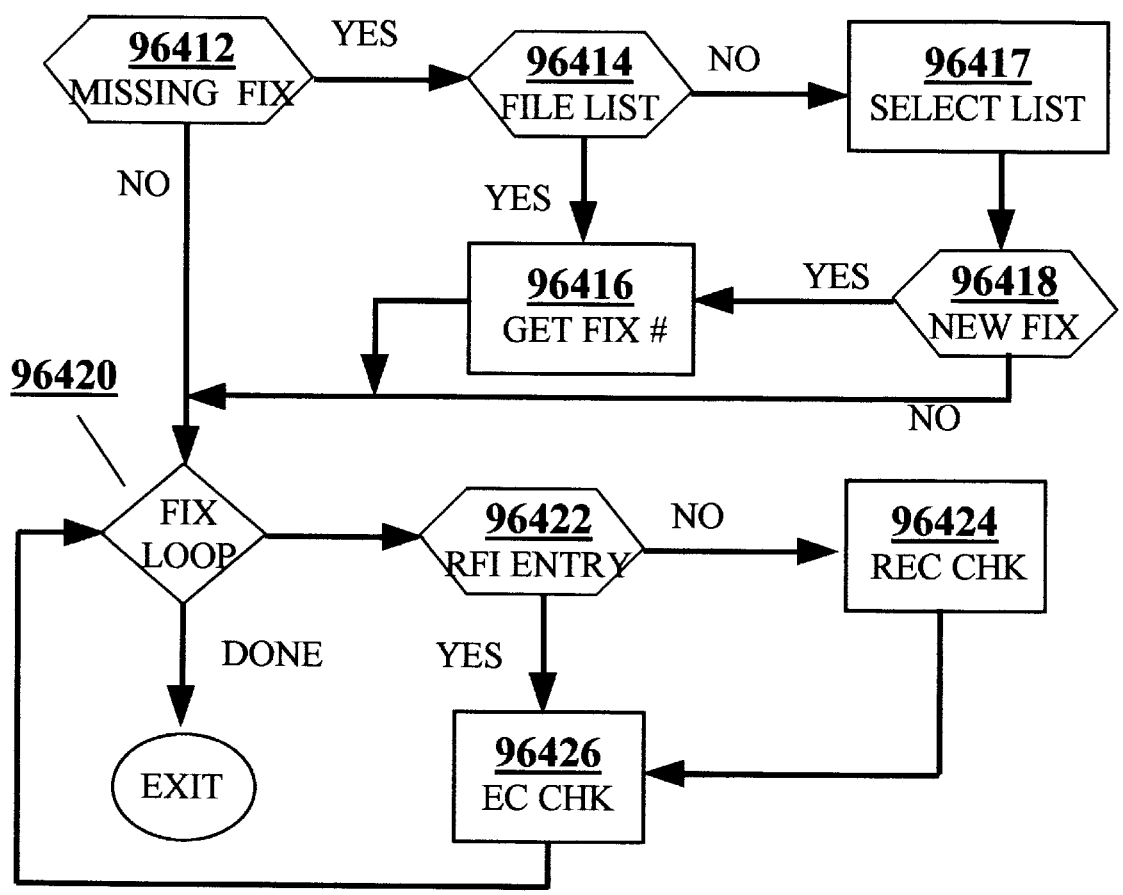
FIG. 41 illustrates the Problem Fix Mgmt API to track info against objects moving through a DMS.

The present embodiment contemplates the interaction of the Problem Fix Manager with our Library Manager. FIG. 41 illustrates the algorithm employed to interface with the Promotion Algorithm in the Library Manager disclosure. Although the preferred embodiment depicts interaction with the aforementioned Promotion Algorithm, one skilled in the art would appreciate how interaction can exist with any third party data movement algorithm.

Upon invocation Step 96412 checks for a Missing Fix Number. Usually one or more Problem Fix Numbers will be passed in from the calling routine, but in the event of their absence, control proceeds to Step 96414. This step checks to see if the routine was initiated against one specific fife or against a File List. The preferred embodiment contemplates an interface where the calling program passes the file name and PFVL information for one file, or the List keyword followed by the name of a file list. As previously stated, one or more Problem Fix Numbers may be passed in as well. Optionally a list of statuses can be passed in and used as a filter for any display screen.

If a file list is employed, Step 96416 interacts with the user to Get the Problem Fix Numbers. The user may enter one or more numbers, but all of them will be associated to all of the files in the list. The user is also given an opportunity to track the fix (ie. they will switch to Libraried status during the promotion), or retain it in an Unplanned state. If a file list is not employed, then Step 96417 performs a QRRFIGET to obtain all the fixes associated with the file being processed. These are filtered to retain only those in a non-superseded state and whose status match either the default list (Planned, Unplanned, Libraried), or the combination passed in by the calling program. This information is presented in a Select List which is similar in form to the display screen described in Step 96312. The user may select one or more entries from the list. The present embodiment offers similar features such as the search and filter utilities described in Step 96312. In Addition, a means exists to switch to the Edit Fixes Associated to Files routine previously described.

The user may either select an existing entry or request to associate a new fix number. If Step 96418 detects a New Fix Number is being associated, then Step 96416 interacts with the user to acquire the Problem Fix Number and performs the necessary checks. If the user selects an existing entry with an Unplanned status, the user is given the opportunity to begin tracking the fix.

Control eventually reaches Step 96420 which established a Fix Loop for all fixes entered or selected. Step 96422 checks to see if a RFI Entry already exists with the same fix number for the file being processed. If so, its status is checked to ensure it's anything but Done. A fix in a Done state can't be used to move a file through a DMS. The user is informed to use the Problem Fix Editing utilities to change the status. If no RFI exists, the REC Table is Checked, in Step 96424, to see if the Problem Fix Number exists. If it doesn't, then the preferred embodiment performs the Valid Fix check described in Step 97942. Control eventually reaches Step 96426 which performs an EC Check. If more than one REC is connected to an EC, they must all be connected to the same EC. Otherwise, this would indicate the user is selecting fix numbers from multiple ECs which is illegal for a file movement operation. Failure of any of these checks aborts the routine and returns control to the calling program. Otherwise, control returns to the top of the Fix Loop until all the fix numbers are processed. The program then exits and returns control to the calling program along with the list of selected fix numbers, their status, and the EC number. The preferred embodiment expects this information to be collected in the foreground portion of the Promotion algorithm, then transmitted to the background where the actual file-to-fix association is made.

The present embodiment also contemplates an Application Program Interface (API) to interact with our Library Process Manager. This permits a Library Process to perform the Problem Fix Management functions on any PFVL, regardless of the setting of the Fix Management flags in the Package Control Data. The preferred embodiment contemplates this API being invoked from the foreground portion of a Library Process.

Upon invocation, the program checks the Package Control Mode. If the Library is running in Single Fix Tracking mode, the default Problem Fix Number is acquired from the Control Repository and returned to the calling LP. If the Library is not under any Problem Fix Management, a failing return code is returned. Otherwise, the algorithm depicted in FIG. 41 is employed beginning with Step 96417, Select List. Upon exit, the routine returns the list of selected fix Numbers, the status, EC number, and Package Control Mode to the calling LP.

FIG. 45 illustrates the Save procedure which begins by establishing a File Loop in Step 97910. The File Loop may be primed with a data structure containing the list of files, or an external file of the same format as that described in Step 96210. For each file in the loop, Steps 97912 and 97914 are employed. Step 97912 tests for one of the following Error Cases:

If the desired status is Planned, the current file may not be a libraried file.

If the desired status is Libraried or Done, the current file must be libraried.

All files in the list must belong to the same Library.

If any of the above conditions are violated, the procedure terminates, and the calling utility exits with a notice indicating the reason for termination.

If no Error Case exists, Step 97914 queries the Control Repository for the File Reference number if the current file is a Libraried file. Once all files have been processed, control proceeds to Step 97916 which queries the Control Repository for the Fix Management Mode of the current Library. Since all files must belong to the same Library, this step is only executed once. If the FM Mode is set to None, then the procedure terminates with an error indicating that the calling utility is inappropriate for that type of Library.

Figure 45A:
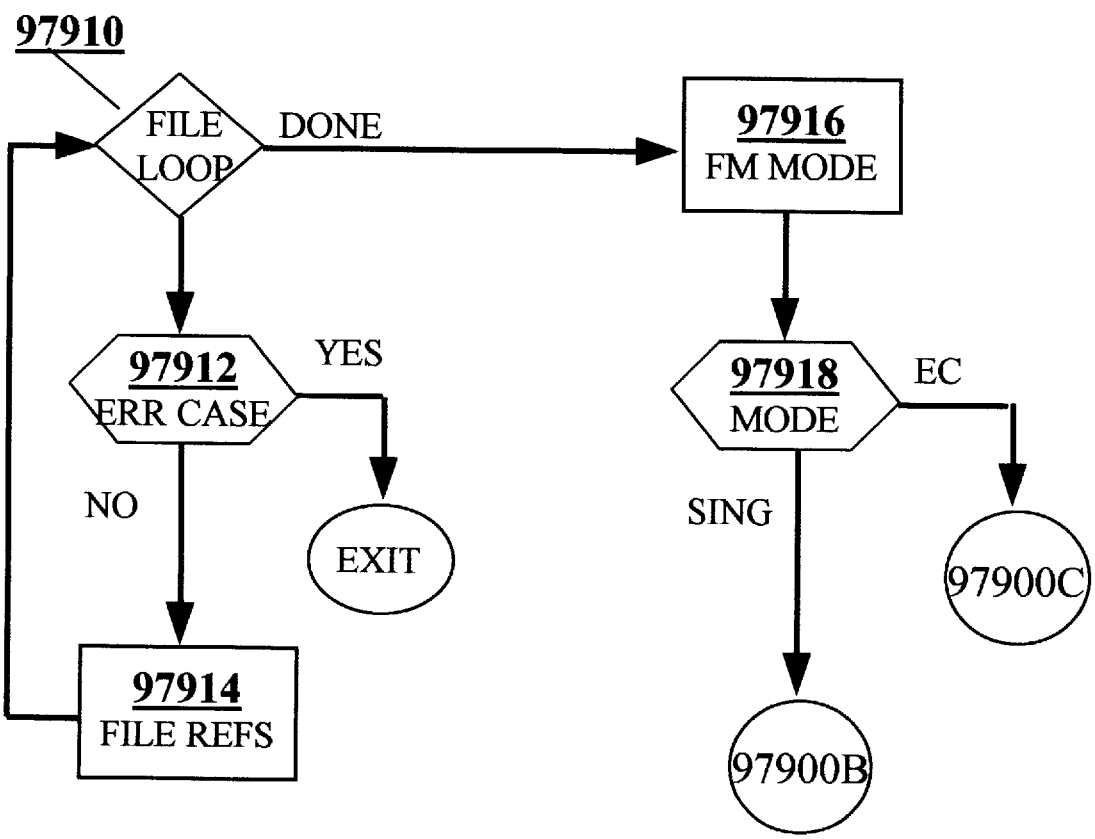
FIG. 45a illustrates the procedure to associate objects to fixes.

Step 97918 checks the Mode and branches to the appropriate sub-routine. If the Mode is Single Fix Tracking, then control proceeds to the SF Mode procedure described in FIG. 45b. Otherwise, if the Mode is EC, then the EC Mode procedure described in FIG. 45c is employed.

Figure 45B:
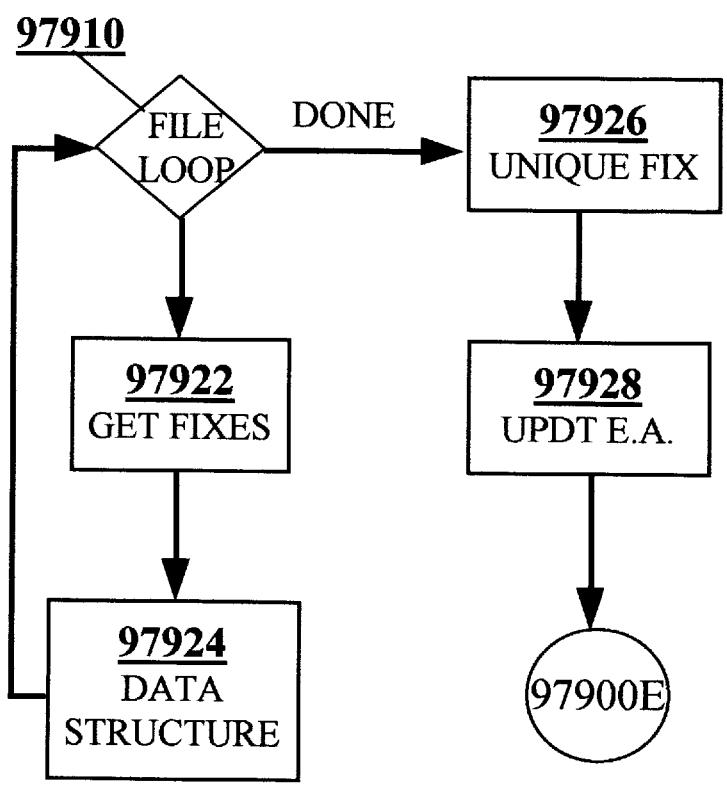
Figure 45C:
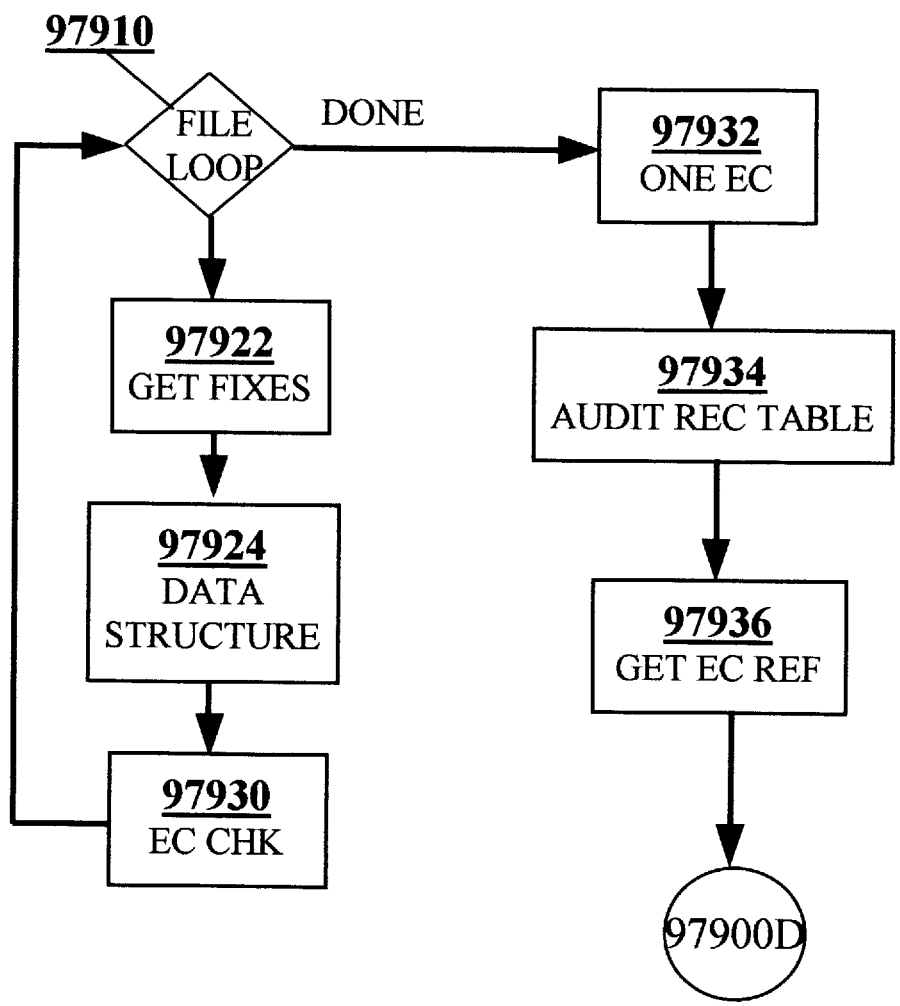
Figure 45E:
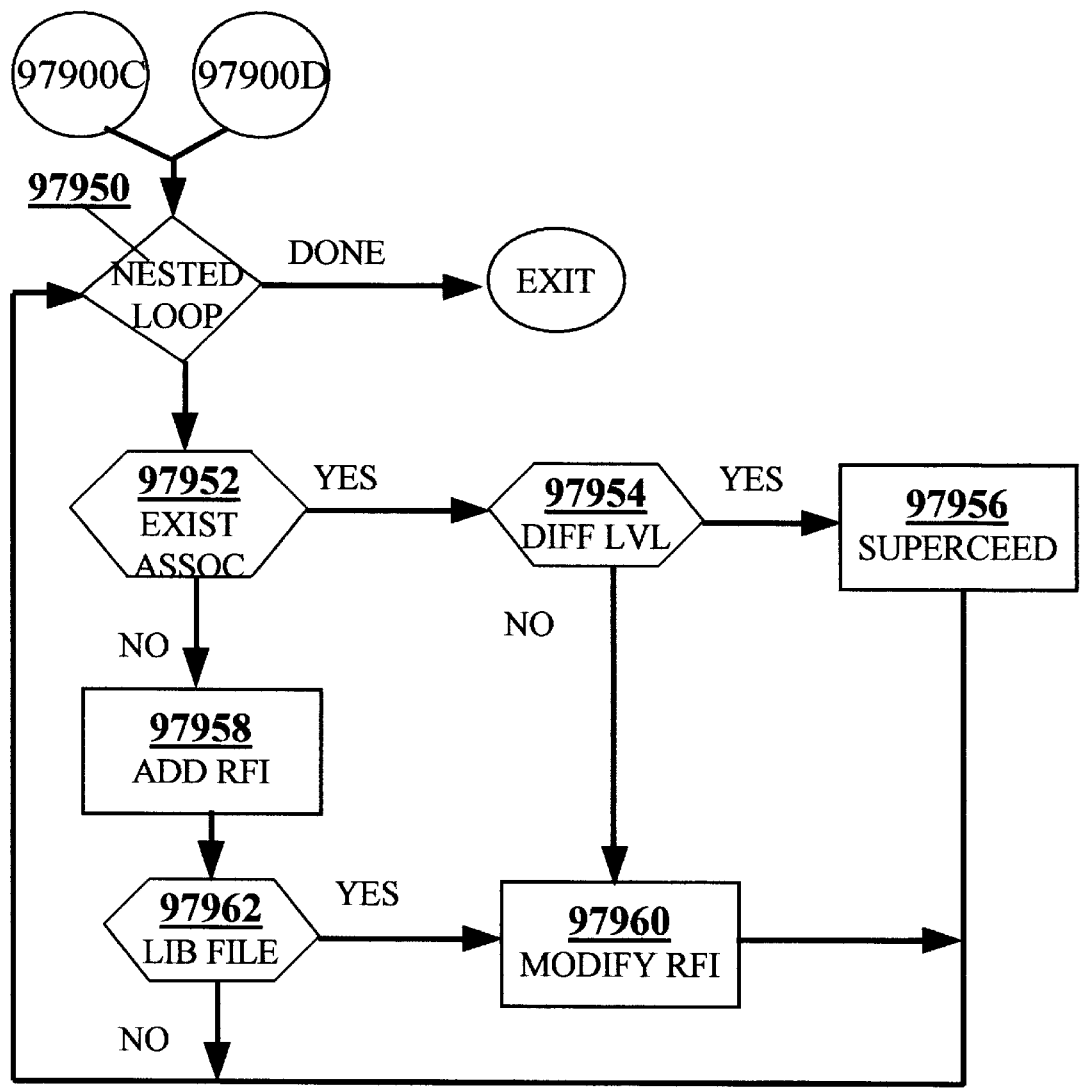

Upon return from either routine, control proceeds to Step 97950 in FIG. 45e. This step establishes a Nested Loop consisting of an outer loop of all the files being processed and an inner loop of all the fix numbers entered by the user. Step 97952 checks the Data Structure created in Step 97924 to see if the current fix number and file have an Existing Association. If not, then Step 97958 invokes the QRRFI-ADD function to Add the File to the RFI Table of the current REC. Step 97962 tests the file to see if it's a Libraried File. If so, Step 97960 invokes the QRRFIMOD function to Modify the RFI Entry to include the File Reference number.

Returning to Step 97952, if the file/fix number association already exists, Step 97954 checks the File Reference number of the current REC. If it doesn't match the File Reference number of the current file, this indicates the current REC is associated with the same file but at a Different Level. In this case, Step 97956 Supersedes the file using the QRRFIMOD function. Otherwise, if the File References match, then the current REC entry corresponds to the current file so Step 97960 checks to see if the status entered by the user is different from the current status. If so, it Modifies the RFI Entry using the QRRFIMOD function.

Eventually, control returns to the Nested Loop which repeats until all the fix numbers and all the files have been processed. Upon completion of the Nested Loop the Save procedure returns control to the calling routine.

FIG. 45b depicts the SF Mode procedure which begins with the File Loop from Step 97910. For each file being processed, Step 97922 and 97924 is performed. Step 97922 invokes the QRRFIGET function to Get all the Fixes presently related to the current file. Since multiple iterations of this file may be present at different Levels, this query can return multiple entries. Step 97924 examines each result and filters out any Superseded entries. Any remaining entries whose fix numbers match the one supplied by the user are stored into a Data Structure. This structure includes the RFI Reference Number, the File Reference number, and the Status.

Upon completion of the File Loop, Step 97926 checks to ensure the user supplied a Unique Fix Number, and that number matches the Single Fix Tracking number defined by the Data Manager for the current Library. An attempt to use any other Fix Number is an error condition which terminates the procedure. Next, Step 97928 checks to see if any Escape Analysis data was previously collected, and if the new data is different from the existing EA data for the REC. If so, the QRRECMOD function is employed to Update the Escape Analysis data. Control is then returned to the calling routine.

FIG. 45c depicts the EC Mode routine which begins by establishing a File Loop in Step 97910. In a similar fashion to the SF Mode procedure, Steps 97922 and 97924 are employed to Get all the Fix information corresponding to the current file and sort the matching non-superseded fixes into a Data Structure. Additionally, Step 97930 is invoked to perform an EC Check which ensures that all fixes associated with the current File Preference number belong to the same EC.

Upon completion of the File Loop, Step 97932 tests to see if the user supplied an EC, and if so, it must match the EC acquired in Step 97922. This ensures that the One EC is the correct EC for the current set of fixes. Step 97934 is then employed to Audit the REC Table. Since the REC Table may contain multiple entries for a given fix number, our embodiment preserves data integrity of a Release by performing the following check. For each fix number entered by the user, all relevant entries are pulled from the REC Table. If any entry has an EC, it's compared against the EC established in the previous steps. Any entry that doesn't match this Master EC is an error since it indicates that the same file would ultimately be associated with more than one EC. Next, Step 97936 invokes the QRMECGET function to Get the EC Reference Number from the Control Repository.

Control eventually proceeds to Step 97938 in FIG. 45*d*. Here, a REC Loop is established to process each fix number entered by the user. First, Step 97940 checks to see if the current REC is a New REC. During Step 97934 the program keeps track of any fix number which has no entries in the master REC Table. This information is used to perform the test in Step 97940. If it is a New REC, then the present embodiment employs Step 97942 to test for a Valid Fix. The preferred embodiment contemplates the DMS interacting with a large Problem Fix Database where the current project may only use a subset of the existing Problem Fix numbers. Furthermore, step 97942 checks to make sure the current REC is a member of this subset. One skilled in the art would appreciate this could be an optional step if the environment allows the user to enter any fix number. Next, Step 97944 Adds the REC to the Control Repository. If the EC Mod option is active, then the EC entered by the user is also attached to the REC. Otherwise, the REC is added with no EC entry. Control then proceeds to the top of the REC Loop.

Returning to Step 97940, if the fix number corresponds to an existing REC, then Step 97946 tests to see if any of the REC data is Modified. This consists of checking to see if the EC Reference number obtained in Step 97936 matches the EC Reference associated to the REC. It also checks to see if the Escape Analysis data changes for the current REC. If either is true, then the QRRECMOD function is used to Update the REC in Step 97948. Control is returned to the top of the REC Loop until all the fix numbers have been processed. Control is then returned to the calling routine.

Figure 42A:
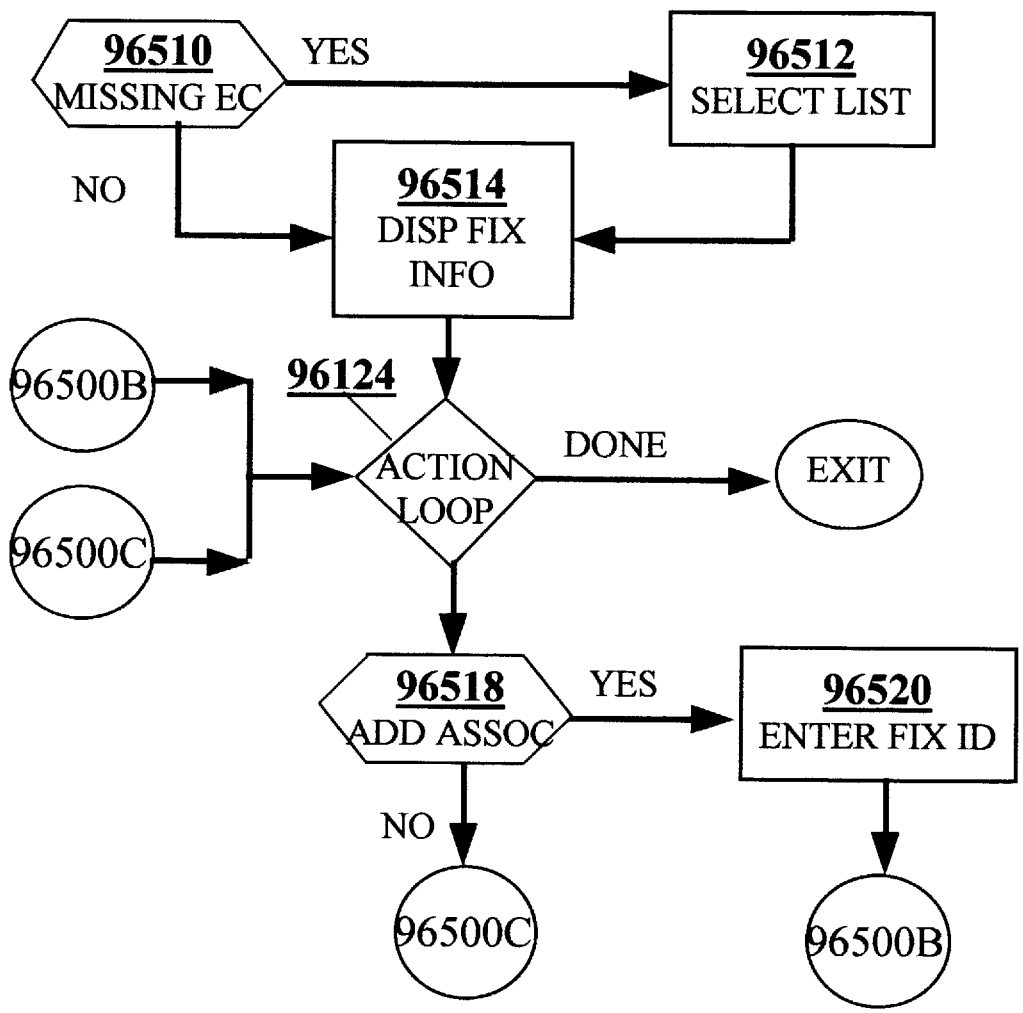
FIGS. 42a thru 42c illustrates the utility to associate Problem Fix info to Release streams.
Figure 42B:
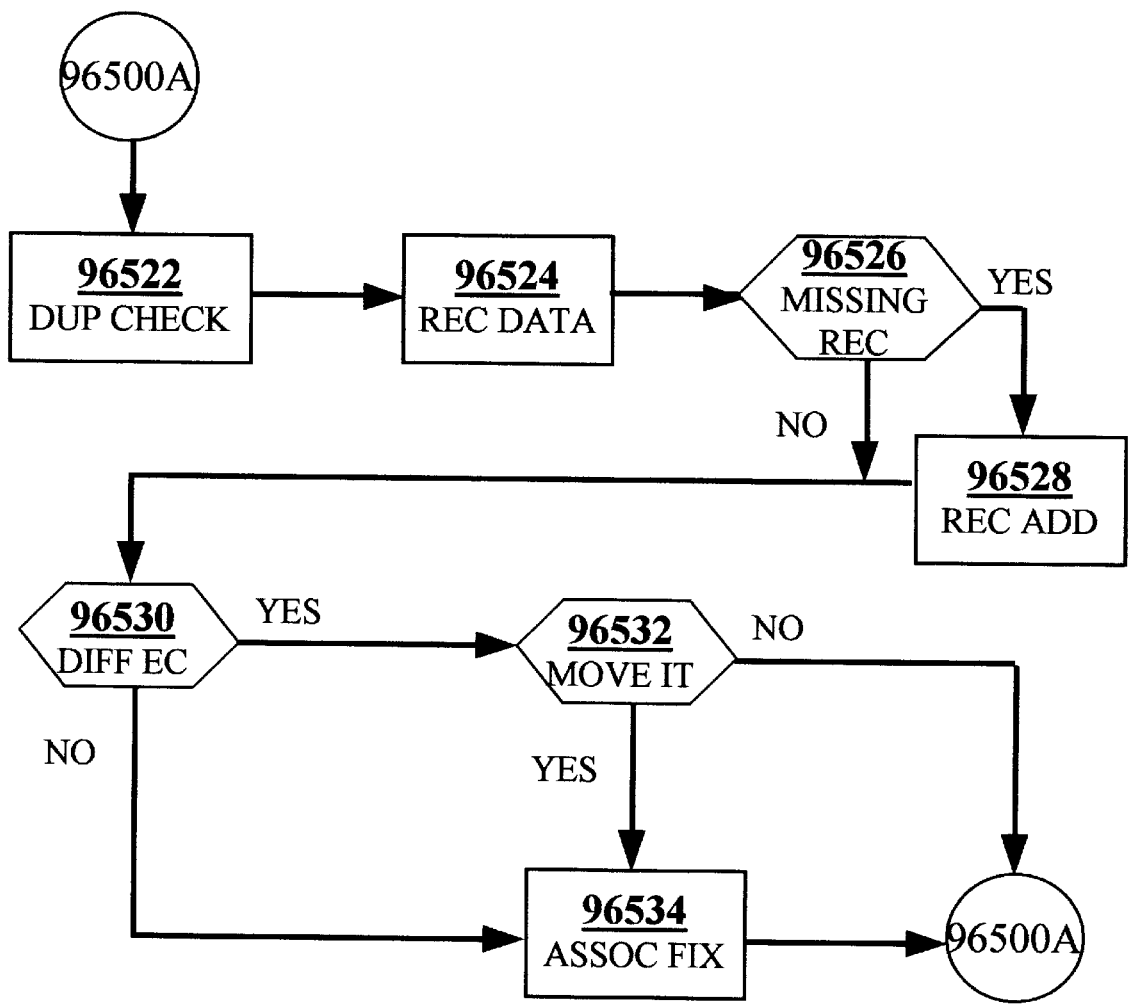

A utility exists to allow a user to associate and disassociate Problem Fix Numbers from Releases (ECs). The routine can be invoked through the command line or via sub-menus. The only required parameter is the Library name, but the EC Number can also be passed in for convenience. The algorithm is illustrated in FIG. 42, and it begins by checking for a Missing EC Number in Step 96510, in FIG. 42*a*. Since the EC Number is an optional run-time parameter, the user may elect to omit it. In this case, Step 96512 performs a QRMECGET to acquire all the ECs for this Library. It then displays them in a Selection List which permits the user to select one EC to work with.

Control eventually proceeds to Step 96514 which performs a QRRECGET against the selected EC. The Control Repository returns all the Problem Fix data associated with the selected EC, and Displays the Fix Info. Our preferred embodiment depicts a screen with one line for each Fix Number. The line contains the Problem Fix Number, the Problem Summary, and the Owner.

This display screen interacts with the user by offering a series of actions that may be performed. Although the actions are presented using an if-then-else structure, it would be appreciated by one skilled in the art that a case or select structure may be preferable. Step 96124 establishes the necessary Action Loop.

Step 96518 checks to see if the user wants to Add a New Association. If so, Step 96520 prompts the user to Enter the Fix ID of the problem. Upon entering the number, Step 96522, in FIG. 42*b*, performs a Duplication Check to ensure the new number isn't already associated to the EC. If so, the user is informed that the number is already in the displayed list.

Next, Step 96524 attempts to extract REC Data for the Problem Fix Number from the Control Repository. Step 96526 reviews the returned information and looks for a Missing REC. There are two possible cases:

1. The Problem Fix Number has no REC data at all.
2. The Problem Fix has REC entries for other Libraries.

If either of these conditions are true, Step 96528 Adds a New REC entry. In our preferred embodiment, the routine will perform one additional check if Case 1 resulted in branching to this step. In this situation, the Problem Fix number is checked against a database of open Problem Fix numbers for the project to ensure the user entered a valid number. If it already has any REC entries, this implies the Problem Fix Number is valid.

Control eventually reaches Step 96530 which checks to see if the selected REC is already associated to a Different EC. If so, the user is asked for permission to Move It in Step 96532. If the user elects to cancel, the routine returns to the Action Loop Otherwise, control branches to Step 96534 which Associates the Fix to the EC. Our preferred embodiment uses the QRRECMOD function to perform this task. Control then returns to the top of the Action Loop.

Figure 42C:
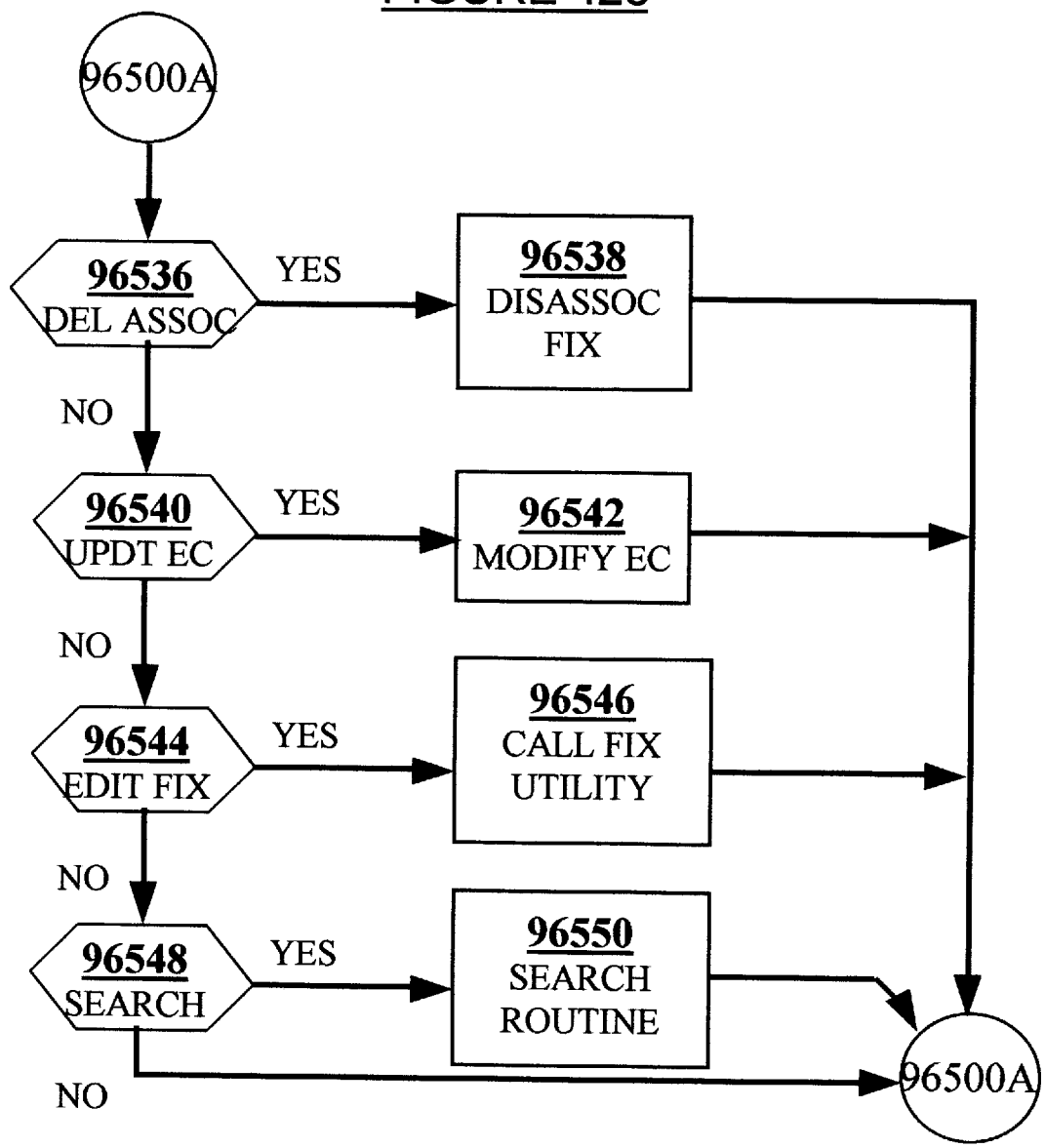

Returning to Step 96518, if the test fails, then Step 96536, in FIG. 42*c*, checks to see if the user wants to Delete a Fix Associated to the EC. If so, then the user indicates the Problem Fix Number, and Step 96538 employs the QRRECMOD function to Disassociate the Problem Fix from the EC. This is done by storing a 0 in the EC field of the REC Table. Control then returns to the top of the Action Loop.

If the test in Step 96536 fails, then Step 96540 checks if the user Updated any EC Info. This includes the EC description or the Commodity Bridge. If a change is detected, Step 96542 employs the QRMECMOD function, described in FIG. 28, to update the proper field of the EC Table. Control then returns to the top of the Action Loop.

If the test in Step 96540 fails, Step 96544 tests to see if the user wants to Edit a Problem Fix. If so, it indicates the fix to be edited, and Step 96546 invokes the Problem Fix Utility described in FIG. 38. The final test, in Step 96548, checks to see if the user wants to Search for a particular Problem Fix. This can be useful if the list of Problem Fix numbers is extremely large. In this case, Step 96550 employs a Search Routine which acquires the desired number from the user and attempts to locate it in the list of displayed problems. If it's found, it highlighted to aid the user in locating it. Control then returns to the top of the Action Loop.

If the test in Step 96548 fails, then the user entered an invalid action. Regardless of the user interaction, control returns to the top of the Action Loop and repeats until the user intentionally exits. This also exits the routine.

Figure 43:
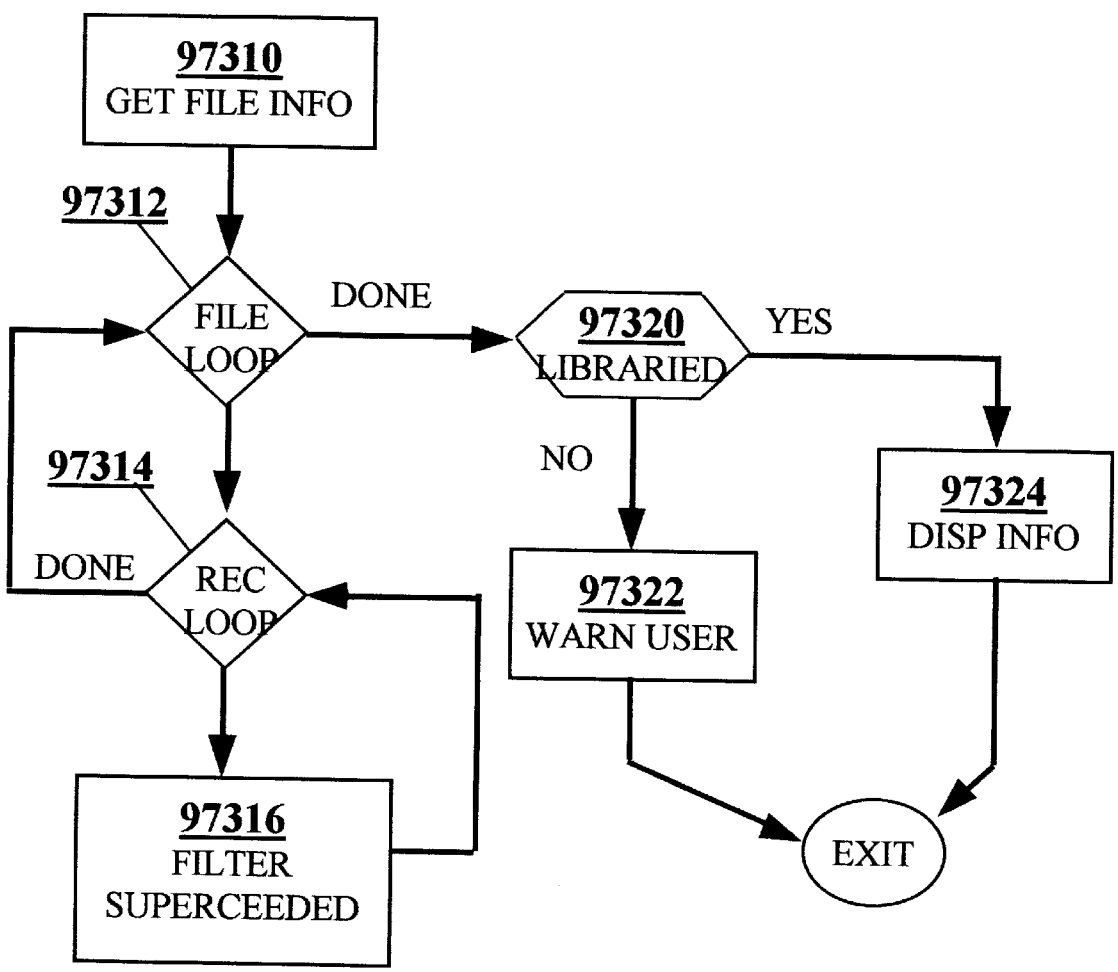
FIG. 43 illustrates the utility to display Problem Fix and EC info for a Part Number.

Our embodiment also provides a utility to display EC and Problem Fix information for a user supplied Part Number or file. The utility can be invoked via sub_menus or from the command line. If the user requests information for a Part Number, the program expects the P/N to be passed as a command line argument, or presents a dialog box if invoked via a sub-menu. FIG. 43 illustrates the algorithm which begins with Step 97310 to Get the File Info. The QRPNDLST function, described in FIG. 11, is invoked to return all file information, corresponding to the P/N, from the Control Repository. Each file may have multiple fixes associated with it, so the program establishes a nested loop, consisting of Step 97314 REC Loop within Step 97312 File Loop to process all the data. As the program loops through all the REC entries, it Filters any Superseded entries in Step 97316. Once the nested loop is exhausted, the last entry's File Reference number is examined in Step 97320. If it's not a Libraried file, Step 97322 Warns the User that the requested Problem Fix and EC information can't be resolved. Otherwise, if the file is Libraried and not Superseded, Step 97324 Displays the Information This includes the Fix and EC data along with the file name and PFVL info corresponding to the entered P/N. Upon exit from the display screen, or the user warning, the utility exits.

Figure 44:
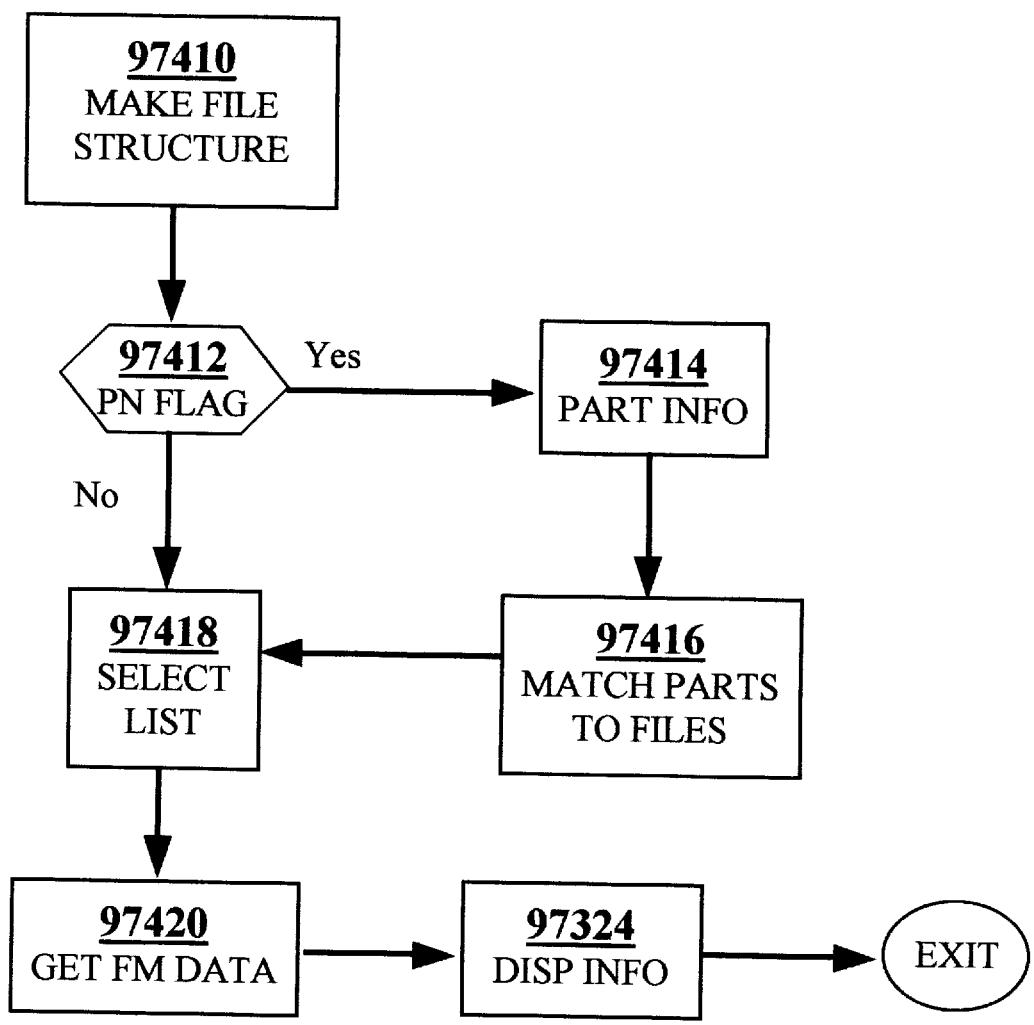
FIG. 44 illustrates the utility to display Problem Fix and EC info for a data object.

If the user requests the Problem Fix and EC information for a file, the program expects the file name and PFVL information to be passed in on the command line. If invoked from a sub-menu, a dialog box is presented to acquire this information. The preferred embodiment allows the user to request information for all Levels and/or Versions of a particular file. FIG. 44 illustrates the algorithm which begins with Step 97410 to Make a File Structure. The QRFILLST function is invoked to query all the file information from the Control Repository. The file name, PFVL and File Reference information is stored into a data structure.

As the file information is loaded into the data structure, our embodiment checks the Part Number Flag, in Step 97412, for each Library File Type encountered. If any LFT is under Part Number tracking, then Step 97414 employs the QRPNOGET function to query all the Part Info from the Control Repository. Next, Step 97416 loops through the returning part data in an attempt to Match Parts to Files. This is done by checking to see if any of the File Reference numbers match any of those in the data structure. It also skips over any part entries which are not in a Libraried or Released state. For all entries which meet the above criteria the Part Number is stored into the data structure.

Eventually control arrives at Step 97418 which may present a Select List to the user. This occurs if none of the entries in the data structure exist at the Level and Version requested, or if the user requested info for all Levels/Versions. The user may select one of the closest entries or abort the utility. Upon selecting a single file, Step 97420 Gets the Fix Management Data using the QRRFIGET function. This returns all the Problem Fix and EC information associated with the selected File Reference number. The program employs Step 97324 to display the same information as shown in FIG. 43. Upon exit from the display screen, the utility exits.

Part Number Manager Applications

Figure 46A:
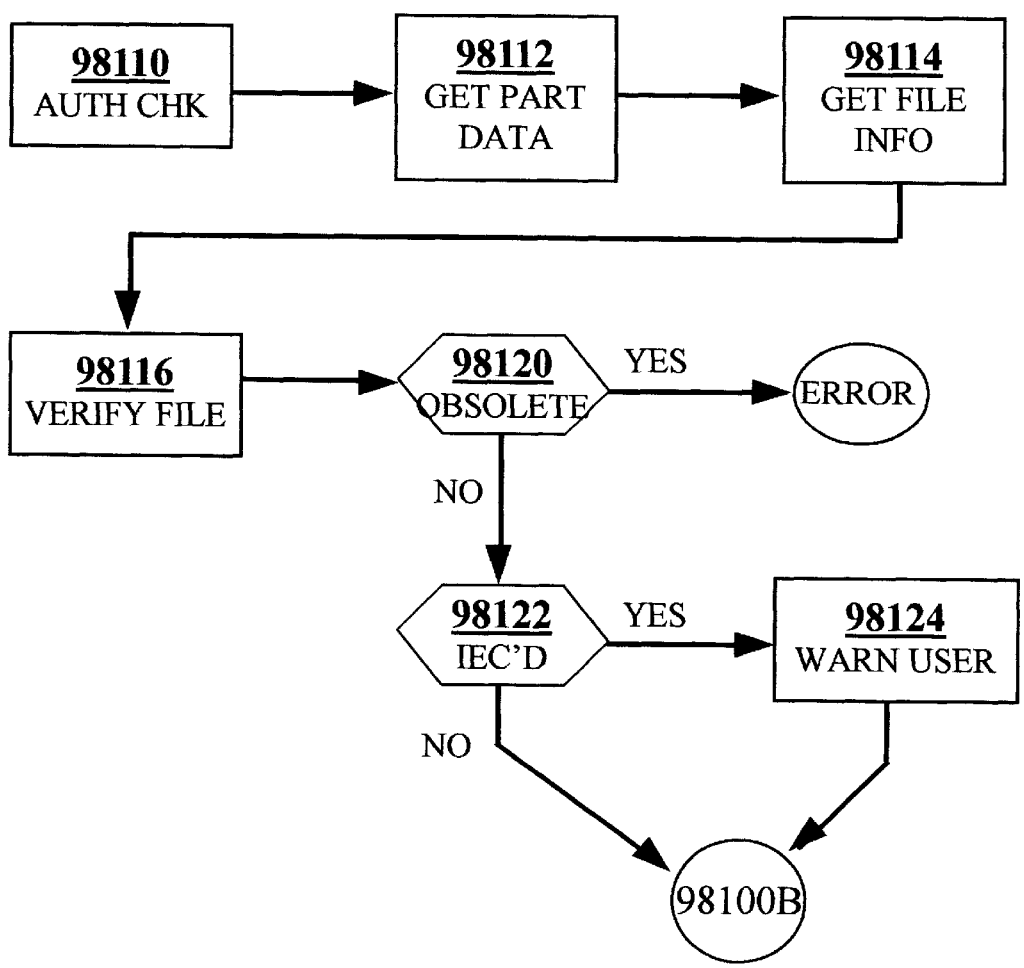
FIGS. 46a thru 46b illustrates the utility to obsolete Part Numbers.

A utility exists to obsolete a Part Number so it can't be used again. The utility can be invoked from a sub-menu or the command line and only requires a Part Number to be entered or passed in. FIG. 46 illustrates the algorithm which begins with Step 98110 in FIG. 98110a. It performs an Authorization Check to ensure the user is an authorized Data Manager. Our preferred embodiment does not permit regular users to perform this function.

Next Step 98112 employs the QRPNOGET function to Get the Part Data. In addition, the QRPNDLST function returns the status of the part. Step 98114 invokes the QRFILGET function to Get the File Info if Step 98112 indicates the part is connected to a Libraried file.

Control proceeds to Step 98116 to Verify the File. This consists of ensuring only one entry was returned from QRPNDLST function. The user is shown the file information and asked to verify that the Part Number is connected to or assigned to the expected file. Upon verification, Step 98120 tests to see if the status is already Obsolete. If so, it's an error condition and the utility exits, informing the user that the part is already Obsolete.

Otherwise, Step 98122 tests to see if the part is IEC'd. If so, Step 98124 is employed to Warn the User that an IEC has already been released with this Part Number in its listing. Therefore, the receivers of the IEC should be contacted. It should be noted that one skilled in the art could contemplate further automation of this step to notify all affected parties and generate a corrected version of the IEC.

Figure 46B:
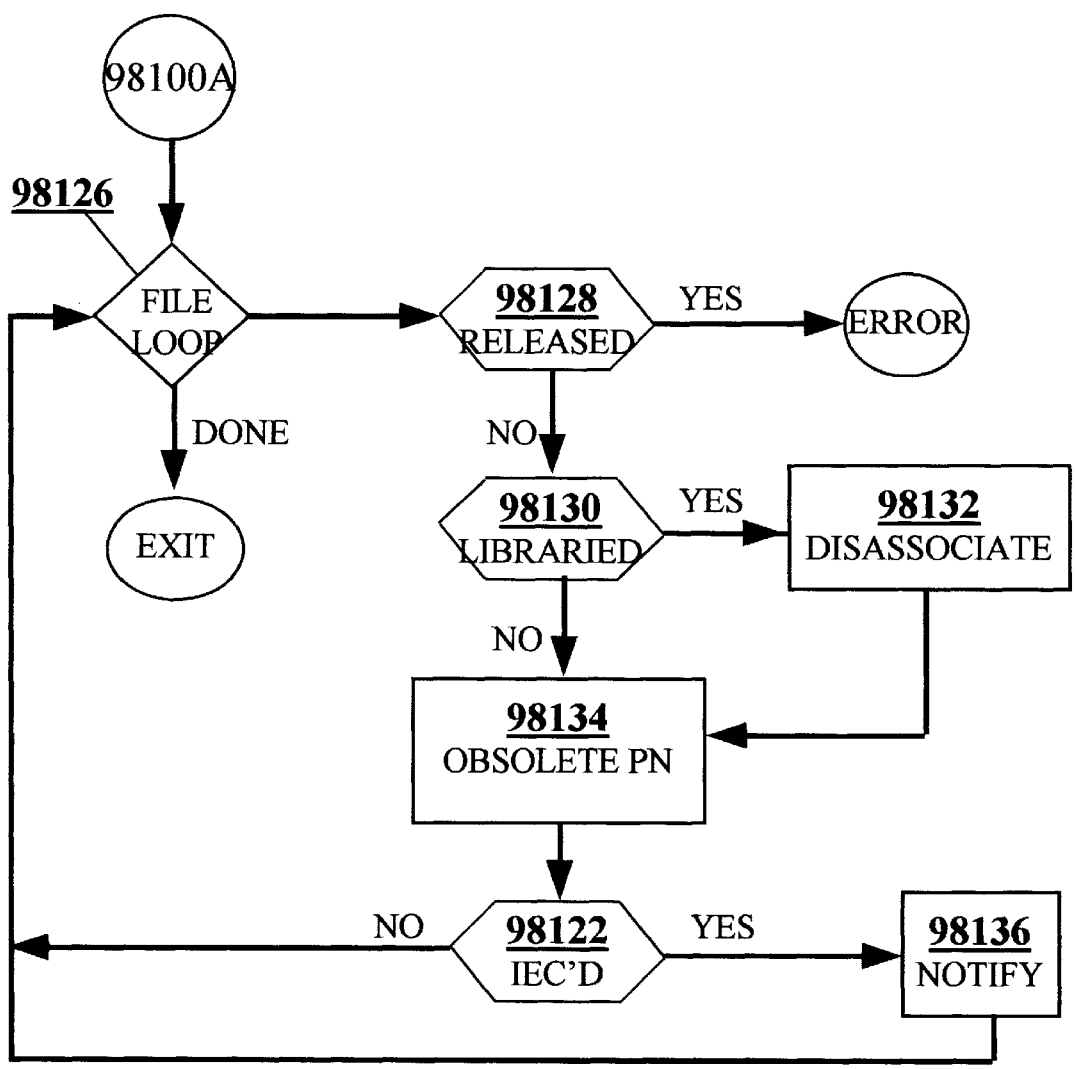

Control proceeds to the File Loop in Step 98126 of FIG. 46b. The loop is established to process all the file entries returned from the QRPNOGET function. Step 98128 tests the entry to see if it's marked as Released. If so, the user is notified that the part must first be removed from Release status before it can be obsoleted. The program then exits.

If the entry is not Released, Step 98130 tests to see if it's Libraried. If so, then Step 98132 is employed to Disassociate the file from the Part Number. This is done via the QRP-NODIS function, described in FIG. 30. Our embodiment does not permit any Libraried files to be associated with an Obsolete Part Number. Control eventually proceeds to Step 98134 where the QRPNOOBS function, described in FIG. 31, Obsoletes the P/N.

Step 98122 is again checked to see if the part is IEC'd. If so, our preferred embodiment provides a means to record the e-mail addresses of all users participating in the verification, physical design, and manufacturing processes who are impacted by an IEC change. Step 98136 Notifies all these users.

Upon completion of the File Loop, the utility exits.

A utility exists to display Part Number information. It can be invoked from the command line or via sub-menus in one of three ways:

1. Request information for a particular P/N
2. Request information by Problem Fix Number
3. Request information by EC Number Regardless of the invocation method, the required information must either be passed on the command line, or if the utility is invoked via menus, a dialog box will acquire it. In the third case, our preferred embodiment permits the Library to be entered in place of an EC number. This results in the QRMECGET displaying a selection list of all ECs for the Library.

Once the requested data is entered, the program employs the QRPNDLST function to query the part data from the Control Repository. The function accepts a Part Number, Problem Fix Number, or EC Number. Since it's possible for a Problem Fix or EC to have multiple P/Ns connected to it, the second and third methods of invocation result in all the data returned by QRPNDLST being displayed in the form of a selection list. Once a single Part Number is isolated, all the Part Data is displayed. In our preferred embodiment, this information includes the file name, PFVL information, owner, technology info, estimated release date, actual release date, EC Number, previous P/N, previous EC number, IEC date, higher level package info.

The user is also given the opportunity to see the Problem Fix information. If desired, each entry displays the REC Number Problem Fix number, EC Number, Superseded flag and Status.

Figure 47:
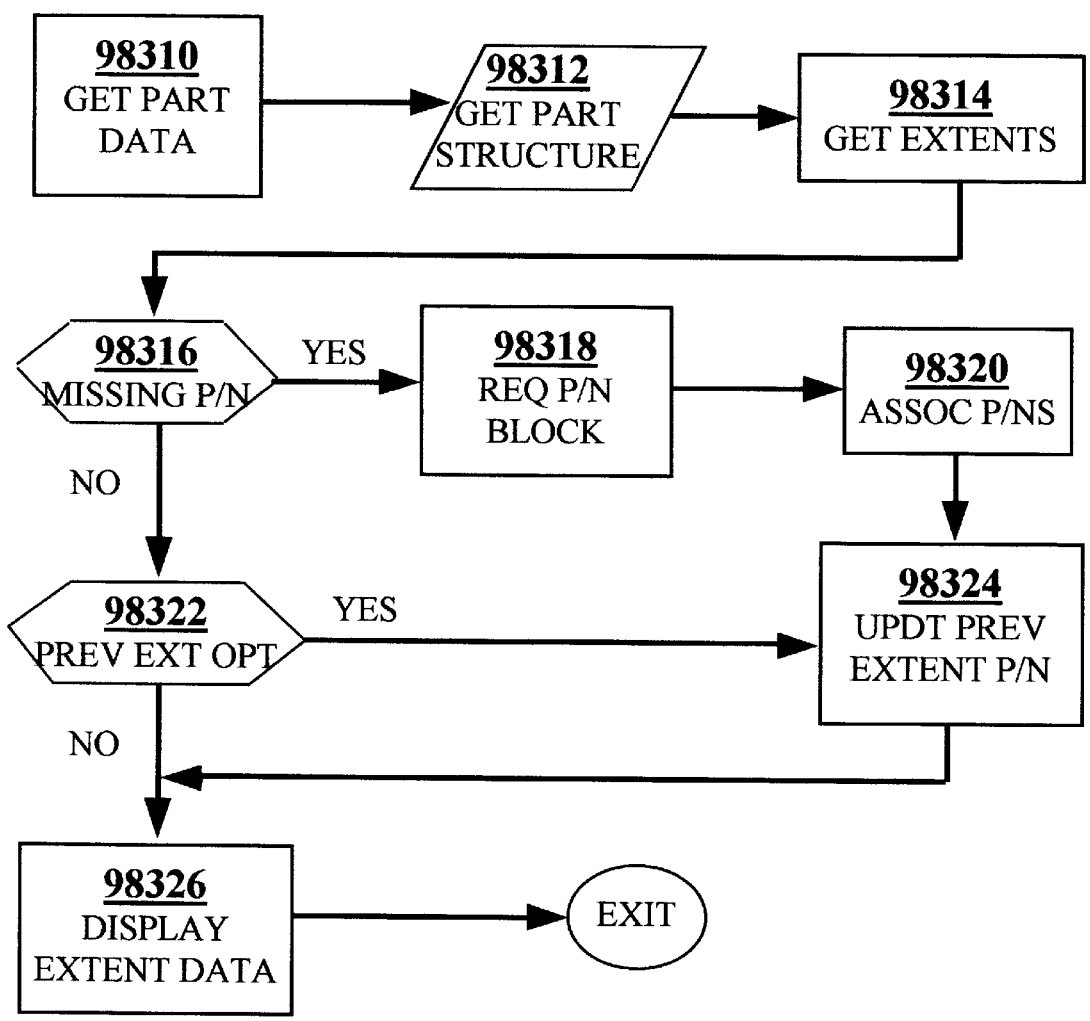
FIG. 47 illustrates the utility to view and assign Extent Part Numbers.

A utility exists to view and assign Extent Part Numbers for a parent Part Number. The utility can be run from the command line or via sub-menus, and the only required parameters are the parent Part Number and the Library where the Part Number resides. The algorithm is illustrated in FIG. 47 and begins with step 98310, Get Part Data. Here, the program employs the QRPNDGET function to query the control repository for the part data. From the information returned, the program can deduce whether the current P/N is for a high level package such as a Board, and whether the part has been Pipped. Next, Step 98312 invokes the Get Part Structure subroutine described further in FIG. 48. The purpose of this routine is to return the technology information and EC number for the part.

Step 98314 is designed to Get the Extents for the current Part Number. In the preferred embodiment, a high level package such as a Board or Multi Chip Module (MCM) which has been Pipped will possess two sets of Extent Part Numbers to cover the Pipped and non-Pipped versions of the substrate. In this case, both sets of Extents are returned. This step combines the part-specific data returned from the previous step with technology specific information kept in external rules files. The combined information shows all the Extent Part Numbers associated with the parent part. If the parent part does not have any Extents, this step informs the user and exits the program.

Next, Step 98316 loops through all the returned data looking for any Missing Extent P/Ns. The preferred embodiment supports a Display Only option, which would result in this step terminating the program with a message informing the user some or all of the Extents are missing P/Ns. Assuming the option is not passed at run-time, the user is prompted to continue with assigning the missing Part Numbers, and control proceeds to Step 98318 which Requests a Block of Part Numbers from the Control Repository. Our embodiment employs a master Part Number pool to ensure that no two parts in the DMS can be assigned the same P/N. All new P/N assignments are done using only P/Ns available in this pool. The Control Repository keeps track of which P/Ns are available, currently assigned but not in use, assigned and in use, and Released to manufacturing.

Step 98320 grabs the required number of P/Ns necessary to replenish the missing P/Ns and Associates these P/Ns to the corresponding Extent technology information. A routine is then invoked to recursively perform a QRPNDLST function on the parent P/N and each Extent P/N. This function extracts all the Part Data from the Control Repository, and compares it to the information currently being updated. The comparison is used to create a new Part Data structure consisting of a record for each Extent, where each record contains fields for the Part Number, IEC Date, Estimated and Actual Release Dates, Owner, and Technology Information. The QRPNDMOD function, described in FIG. 15, is then called to modify only those fields whose values changed. In our preferred embodiment, the program specifically checks to see if the Previous P/N field has been modified for an IEC'd part. This is an illegal condition and the program terminates with a message to the user.

Control then proceeds to Step 98324 which checks to see if the parent P/N corresponds to an assembly which permits the use of previous extents to be carried forward to the current assembly. If so, this step runs a routine which Updates the Previous P/Ns for each Extent. This is accomplished by querying the Control Repository for all the Extent Part Numbers associated with the parent's Previous P/N. The Extent IDs are used to match the Part Numbers from the Previous Extent Data to the current Extent Data, and create a data structure containing the following information for each Extent:

Extent ID

Current Part Number

Previous Part Number

A loop is established to pass this info to QRPNDMOD for each Extent.

Returning to Step 98316, if there aren't any Missing Extent P/Ns, control proceeds to Step 98322 which tests for a special option known as the Previous Extent Option. In our preferred embodiment, this option may only be passed for Board Assemblies, and is only used for recovery purposes. The intent is to call Step 98324 in order to routine routine which updates all the Previous Extent Part Numbers.

Regardless of whether there are any missing Extent P/Ns, control eventually leads to Step 98326 which Displays the Extent Data to the user. In the preferred embodiment, the display contains one line for each Extent. Each line displays the Extent ID, current Extent Part Number, and the Technology Information.

Figure 48:
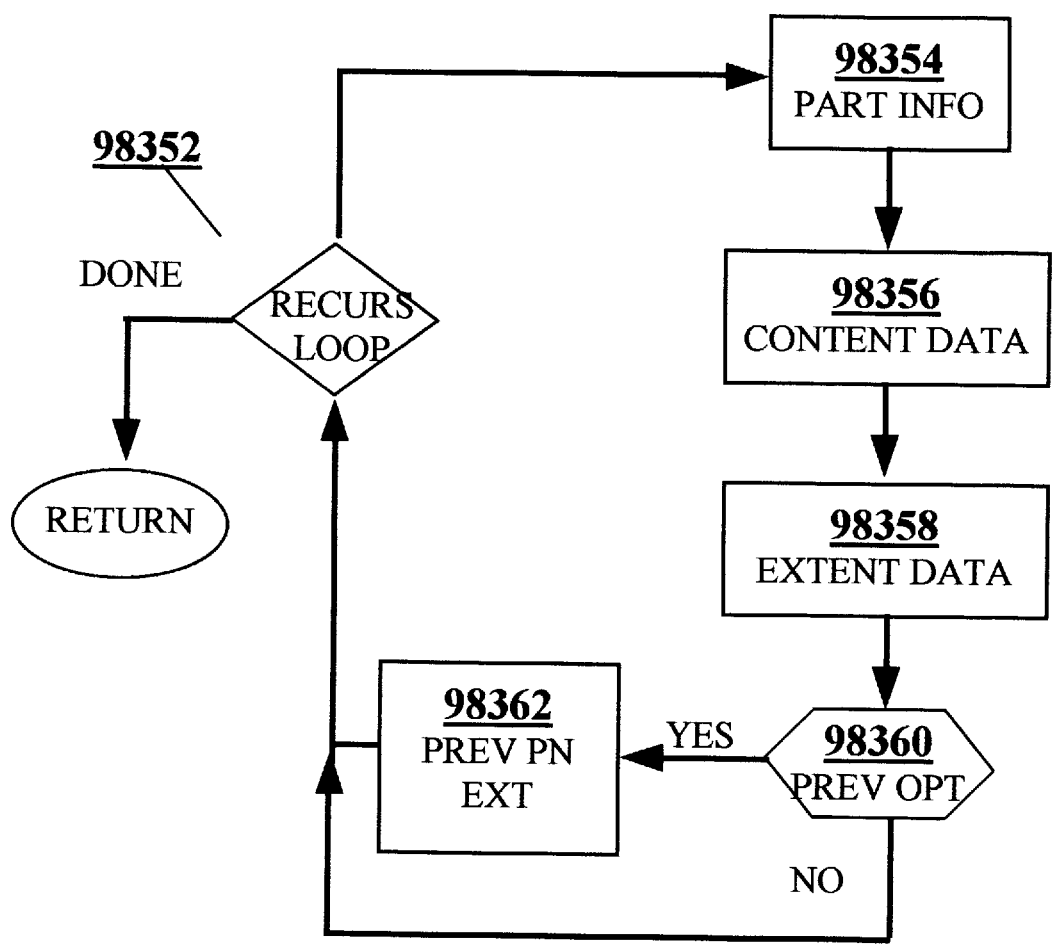
FIG. 48 illustrates the procedure to get Extent structures.

FIG. 48 displays the algorithm for the Get Part Structure routine used in Step 98312. This routine is designed to be used in multiple Part Number applications within the present embodiment, so it offers run-time parameters which determine how it extracts and presents the part data. Our embodiment supports complex assemblies that possess hierarchical levels of parts. Thus the routine is designed to run recursively such that a single invocation from a calling program can extract all the necessary part data for an assembly part (ie. Board, MCM, etc.). Step 98352 is included to denote that all other steps in this algorithm are executed within a Recursive Loop.

Step 98354 is designed to get the Part Info one of three different ways. If this routine is invoked via the IEC Check utility, then a special option is passed which tells this routine to use the part data already in a pre-assembled data structure. Otherwise, the part data must be extracted from the Control Repository. Our preferred embodiment provides two methods, QRPNDLST and QRPNDGET. The first time the routine is called, QRPNDLST is used, but each recursive call invokes the routine with a Recursive option which switches to QRPNDGET for better performance. This step returns the EC and technology information for the current P/N.

Next, Step 98356 uses the information returned from Step 98354 to find the appropriate rules file and check the Content Data. These files contain information about how the assembly is physically organized, such as the number and type of Extent Part Numbers. As long as there are any Extent Parts, Step 98358 is employed to Get the Extent Data. This step invokes the QRPNUGET function and sorts the returned data into one data structure for usage data and one for extent data. By using the previous Content Data as a structural template, this step constructs an image of all the Extent and Usage data which is returned to the calling program.

Step 98360 then checks the Previous Extent Option to see if it was passed. If so, the Previous Part Number captured in Step 98354 is used as a starting point for Step 98362 to extract all the Previous P/N Extent Data, using QRPNUGET. Once that information is stored into a data structure, QRPNDLST is used to retrieve the next Previous P/N. This drives QRPNUGET, and the loop continues until there are no further Previous P/Ns to work on. With each successive call to QRPNUGET, the Extent Data is made available to the calling program.

Steps 98354 to 98362 continue until there's no further part data, associated with the original P/N, to process. Upon completion, all Usage and Extent data is available in a data structure which can be used and manipulated by the calling program in a variety of ways.

A utility exists to display all the unused Part Numbers for a particular file. The only required parameters are the file name and Library File Type. The routine can be invoked via a sub-menu which presents a dialog box to collect the required parameters, or through a command line interface. Our preferred embodiment uses the QRPNOGET function to return all corresponding part data. The program loops through all the returning data and filters out any Released, Obsolete, Superseded or Libraried entries. All entries that are Assigned are displayed to the user.

A utility exists to permit certain Part Number attributes to be modified. The preferred embodiment offers a menu driven utility which requires the user to invoke it through one of three means by entering:

1. A Part Number
2. An EC Number
3. A Problem Fix Number

Since the second and third method may result in multiple Part Numbers, a secondary selection screen is displayed, and the user may select one or more Part Numbers to work with. Upon selection, the user has the option of Viewing and Editing any of the following attributes:

Owner
Estimated Release Date
Previous Part Number

The utility also allows the designer to change the Estimated Release Date for each individual Part Number, or make a global change to all Part Numbers selected. The utility calls on the QRPNDGET and QRPNDLST functions to extract the information displayed to the user.

Regardless of the method of invocation the underlying algorithm follows these rule:

1. Any user is allowed to view the information
2. Modifications to the Part Number attributes can only be made by the current owner of the Part Number, or a valid Data Manager.

These checks are performed in the underlying QRPND-MOD function. The user may exit the utility at any time.

Figure 49:
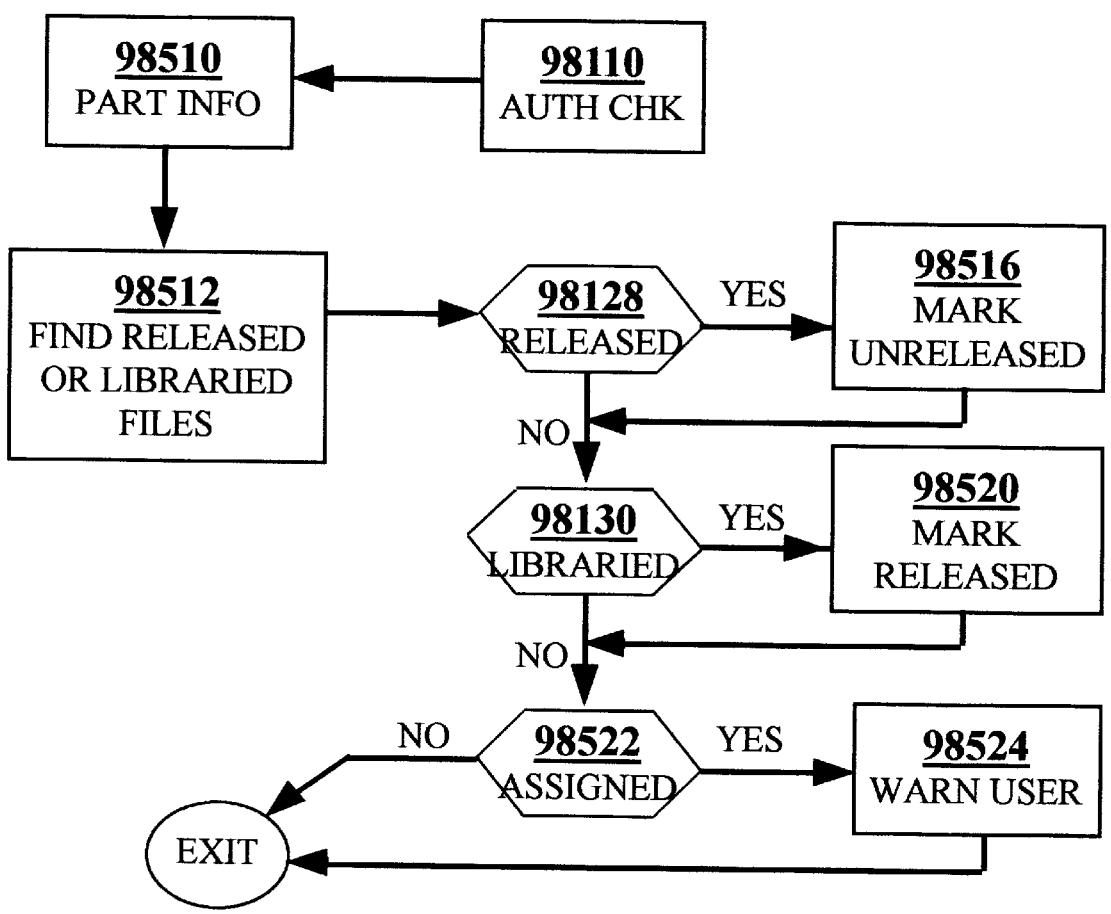
FIG. 49 illustrates the utility to manually mark a Part as released.

A utility exists to Manually Mark a Part as Released. The utility requires a Part Number to be entered either through a dialog box resulting from a sub-menu, or directly through the command line interface. FIG. 49 illustrates the algorithm which begins with Step 98110 which performs an Authorization Check to ensure the user is an authorized Data Manager. Our preferred embodiment does not permit regular users to perform this function.

Next, Step 98510 employs the QRPNOGET function to return all Part Info associated with the entered P/N. Step 98512 Finds Released or Libraried Files by looping through the returned information analyzing the status of each entry. If any entries are Libraried or Released, the QRFILGET function is used to acquire the file name and PFVL information for the associated File Reference number.

For any entries that are Released, Step 98128 tests positive and control proceeds to Step 98516 to Mark the Part as Unreleased. This step uses the QRPNOUNR function, described in FIG. 32, to remove the Released status. Control eventually proceeds to Step 98130 which tests to see if any entry is Libraried. If so, Step 98520 gives the user the opportunity to confirm that the associated file is the one they want to mark as Released. Upon confirmation, the File Reference number is passed to the QRFILRIT function, described in FIG. 26, which Marks the Part as Released.

If none of the entries are Libraried or Released, then Step 98522 tests to see if any files are Assigned to the Part Number. If so, Step 98524 Warns the User that the P/N is Assigned, but not Libraried so it can't be changed to a Released status. Otherwise, the user is informed that no suitable candidates for Release status were found, and the utility exits.

Figure 50:
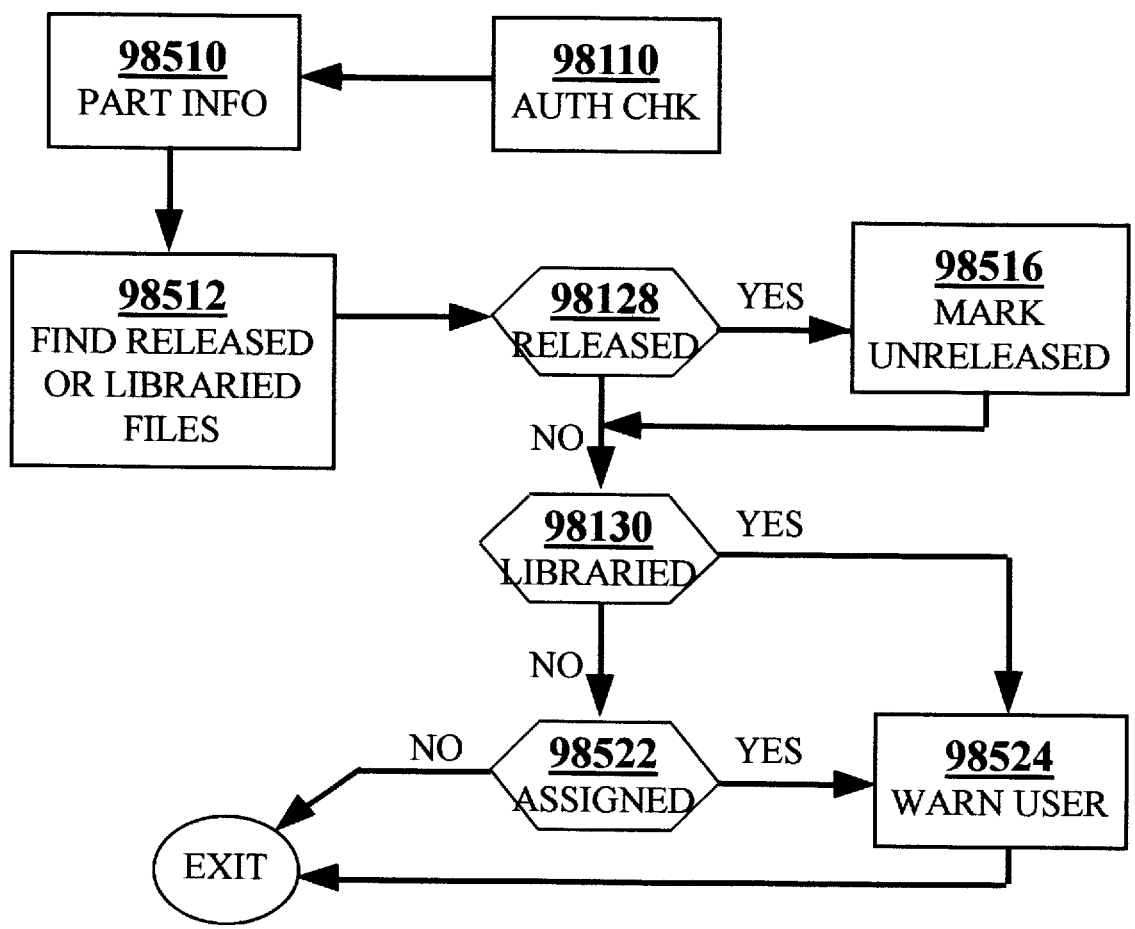
FIG. 50 illustrates the utility to manually remove the released status of a Part.

A utility also exists to Remove the Released Status of a Part. This algorithm for this utility is shown in FIG. 50 and is almost identical to the previous utility. The only difference is the absence of Step 98520. Instead, if no entries are Released but one or more is Libraried, the user is notified that the part does not have a Released status to be removed.

Release Manager Applications

Figure 51:
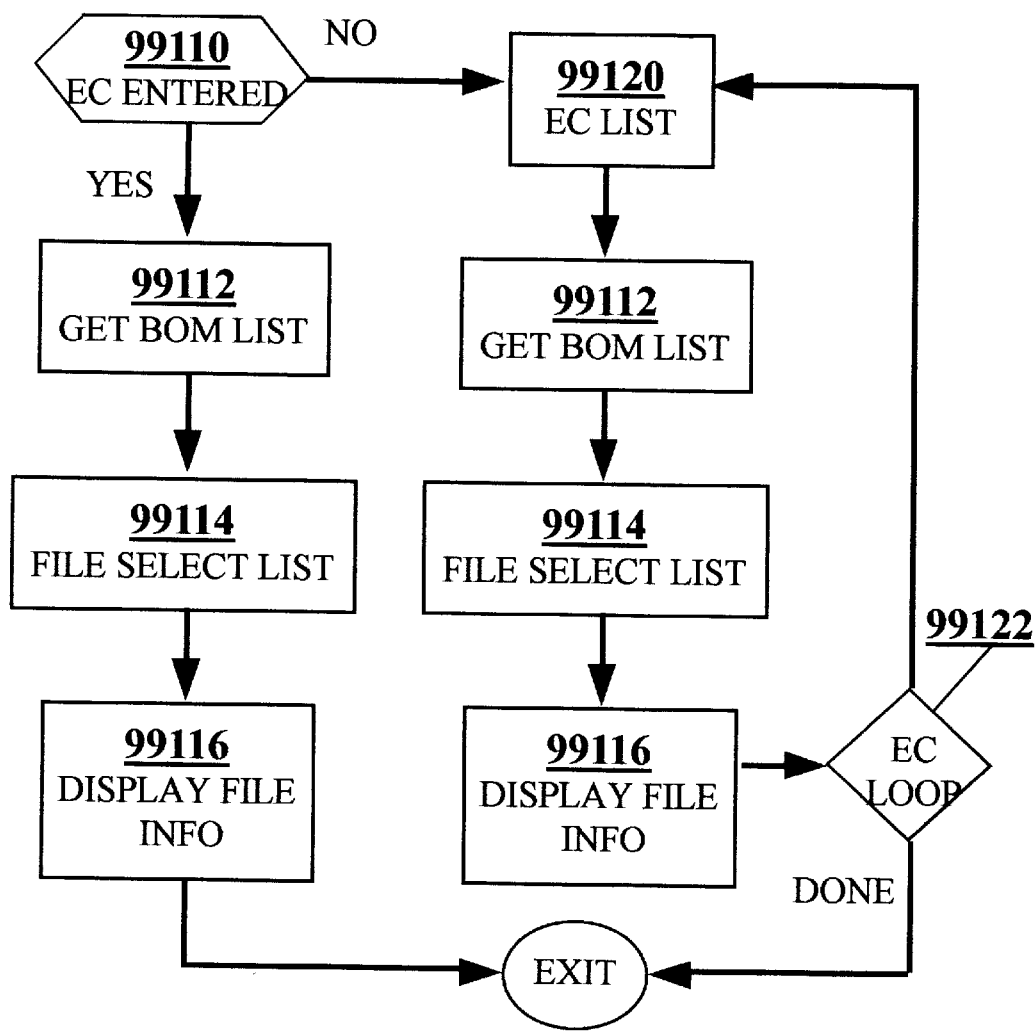
FIG. 51 illustrates the utility to display a Bill of Materials for a Release (EC).

A utility exists to show the Bill of Materials for a given EC number. The utility may be invoked through a sub-menu or from the command line. Either the EC Number may be specified or the Library name can be used to obtain a selection list of ECs. Additionally, a Library File Type may be used to further filter the displayed data. Lastly, the user may request to see a full Bill of Materials, or only the changes since the previous release. FIG. 51 illustrates the algorithm which begins with Step 99110 which tests to see if an EC Number was entered. If so, Step 99112 Gets the BOM List using the QRBOMGET function, described in FIG. 23. This function supports the optional Library File Type filter and a parameter to return a full BOM or a delta.

Next, Step 99114 displays a File Select List with all the files returned from the previous step. Their names and PFVL information are shown, and the user is given the opportunity to select one to obtain additional information. In addition, the BOM may be written to an external file.

Upon selecting a specific file, Step 99116 Displays the File Info. In our preferred embodiment, the following information is returned from QRBOMGET for each file in the BOM:

File Name, PFVL Info, File Reference, Part Number (If exists), Problem Fix Info, EC Number, and Physical Location.

The display remains until the user exits the utility.

Returning to Step 99110, if the Library name is entered instead of the EC Number, then Step 99120 employs the QRMECGET function to return a selection EC List. Upon selecting an EC, Steps 99112 thru 99116 are executed exactly as if a single EC Number was entered. Upon completion, Step 99122 establishes an EC Loop to allow the user to recursively call Steps 99112 thru 99116 for multiple ECs. This loop continues until the user requests to exit the utility.

A utility exists to display the current release structure for a given Library. It uses the QRMECGET and QRMLVGET functions to extract all the EC information from the Control Repository. This includes any Release Levels which have EC Numbers assigned to them. Using this information, the routine builds a series of linked list data structures in which each structure begins with a base release and forms a tree which can be traversed to find the next release.

The user display operates in two view modes. In the General Tree view, the data from the linked lists is arranged in a tabular format with each row representing a Release Level and each column representing a Version. Each "cell" of the table holds the associated EC Number. All EC Numbers currently unassigned to a Release Level are shown in a separate listing. The default view will only show the EC Number assigned to the Main Release Levels. The user may select a Main Release Level, and the display changes to a slightly different view showing all the Sideways Levels derived from the selected Release Level. Accompanying the Sideways Level Name is the EC Number.

The other view mode is known as the Detailed Tree view where the linked list data structures are basically written to the display. In our preferred embodiment the user sees a series of structures similar to:

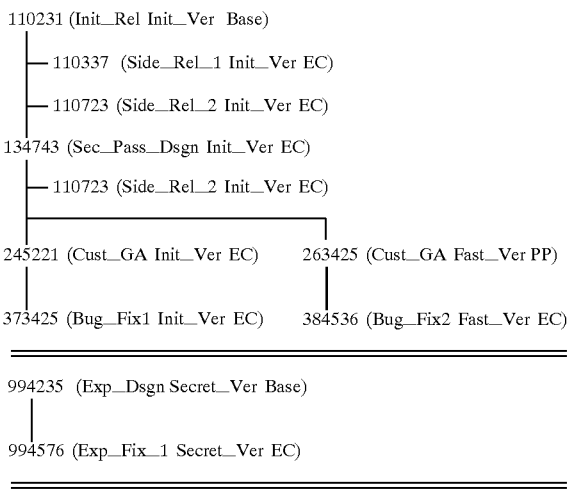

The above example shows 2 independent Versions of design (110231 and 994235). Within an independent stream, all the dependent ECs are shown with dashed line connections. Every EC Number has corresponding information shown in parenthesis. Our preferred embodiment shows the Release Level assigned to that EC (which can be blank), the Version, and the type of release (Base, EC or Parallel Path). One skilled in the art could easily see how additional information could be included depending on the use model.

An additional feature of the utility allows the user to select an individual EC Number and view the detailed information about that EC. This would include the Description, Type, Previous EC, Manufacturing Information, Commodity Bridge, Problems Fix Numbers associated to the EC. etc. A further feature allows the user to specify an EC Number, and the display highlights the EC within the proper release tree. The purpose of the feature is to aid the user in locating a particular EC if the release structure requires several screens to display. Since this utility simply assists the user in visualizing information stored in the DMS, the user may exit at any time.

A utility exists to permit users to perform an IEC Check on Libraried data, in advance of a pending IEC Generation. This utility may be launched from the command line, or via sub-menus, and enables the user (usually the Data Manager) to ensure all the criteria is met for a successful IEC Generation. The required parameters are a Part Number and EC Number, which usually pertain to a higher level package such as a Card, Board or MCM. This routine can also be run against lower level parts if manufacturing requires an IEC for these parts.

Figure 52A:
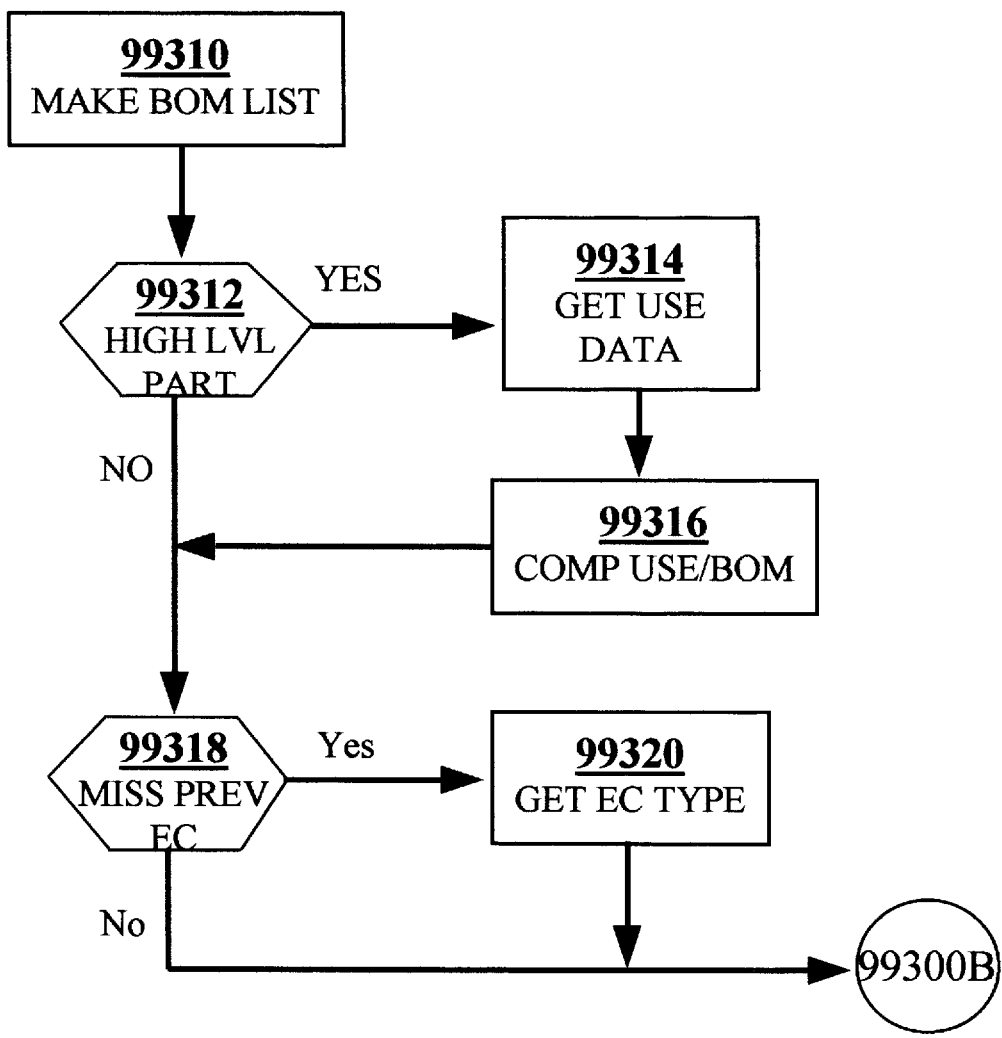
FIGS. 52a thru 52b illustrates the utility to run an IEC Check on a Release (EC).

The algorithm begins with Step 99310 in FIG. 52*a*. This step employs the QRPNDLST function to return all the parts associated with the given EC Number. The program loops through all the Part Data and Creates a Bill of Materials which is stored in a data structure. As the program loops through the returned data, it checks to see if any of the returned parts match the given P/N. If not, a separate QRPNDLST query is made for that P/N.

Since this routine can be exercised against high or low level parts, Step 99312 checks to see if the given part is a Component Part. In our preferred embodiment, this can be accomplished by examining the usage flag in the technology rules data. If the usage flag indicates this part is a Component Part, then Step 99314 is employed to Get the Usage Data. This is easily accomplished with the QRPNUGET function which returns a list of all the parts associated with a particular assembly Part Number. Next, Step 99316 Compares the Usage Parts List to the BOM list created in Step 99310.

Eventually control reaches Step 99318 which checks to see if the assembly Part Number information returned by QRPNDLST is Missing Its Previous EC Number. If so, Step 99320 invokes the QRMECGET function against the given EC Number, in order to obtain the Type of EC.

Figure 52B:
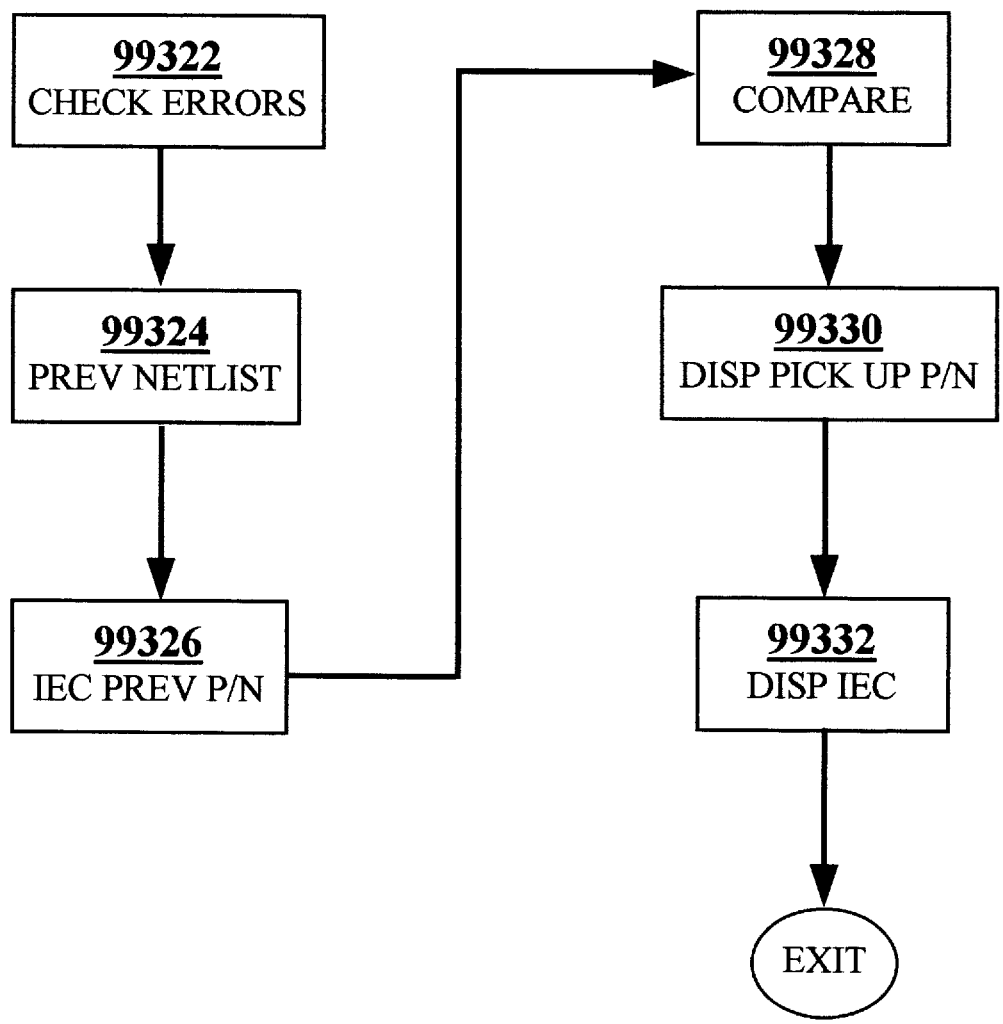

At this point the program proceeds to Step 99322, in FIG. 52*b* to Check for IEC Errors. This is accomplished by looping through the BOM data structure and looking for any of the following:

A component P/N missing its owner data.

A component P/N missing its ID (name) field.

A component P/N connected to multiple ECs.

A component P/N where ALL libraried files are in a Superseded state.

The P/N is a Component part (according to the technology rule) but no usage data was returned in Step 99314.

A Component P/N has a usage count associated with this high level part, but the corresponding file is not in the same EC as the high level part.

High level part (assembly P/N) is not in the given EC.

High level part is not a New Build, but there's no Previous EC information.

A component P/N has no previous EC information, and is not a new part.

A component P/Ns previous part has not yet been IEC'd

Any of the above errors result in an error message being displayed to the user.

Our embodiment contemplates a further check known as a Previous Part Number comparison. Step 99324 uses the current P/N query its Previous P/N from the Control Repository. It then locates the corresponding high level netlist known as the Previous Netlist. This netlist may a combination of text files or a graphical schematics which instantiate all the parts in this piece of design. This step entails reading the list of parts into a data structure.

Next, Step 99326 sifts through the current IEC data and extracts all the IEC Previous P/Ns into a data structure. These Previous P/Ns came from the QRPNDLST function in Step 99310, and they are derived from the Release Stream structure of the current Library.

Finally, Step 99328 performs a Comparison between the two data structures. First, the assembly Previous PIN from QRPNDLST is compared against the netlist Previous P/N from Step 99324. Then a loop is established to check each component part in the assembly to ensure that the Previous P/Ns from the IEC data match those from the Previous Netlist. As it loops through each part, the program also keeps track of any parts that are identified in the IEC, but are absent from the netlist. If either check uncovers a problem, the user is notified that the most likely cause is that the wrong file was used as the Previous Netlist, or there's a problem with a Commodity Bridge.

Upon completing all error checking, Step 99330 Displays the Pick-Up Parts. These are any parts that are included in the high level package, but came from a different EC. One such example could be a clock oscillator which is used in multiple products. The program suggests that the user should verify any Pick-Up parts listed to assure they should be included in this Release.

Next, Step 99332 Displays the IEC for this EC (Release). This permits the user to see the IEC listing before it's sent to manufacturing. Since this listing only contains parts in this EC, it is an known as an Incremental EC (IEC).

Figure 53:
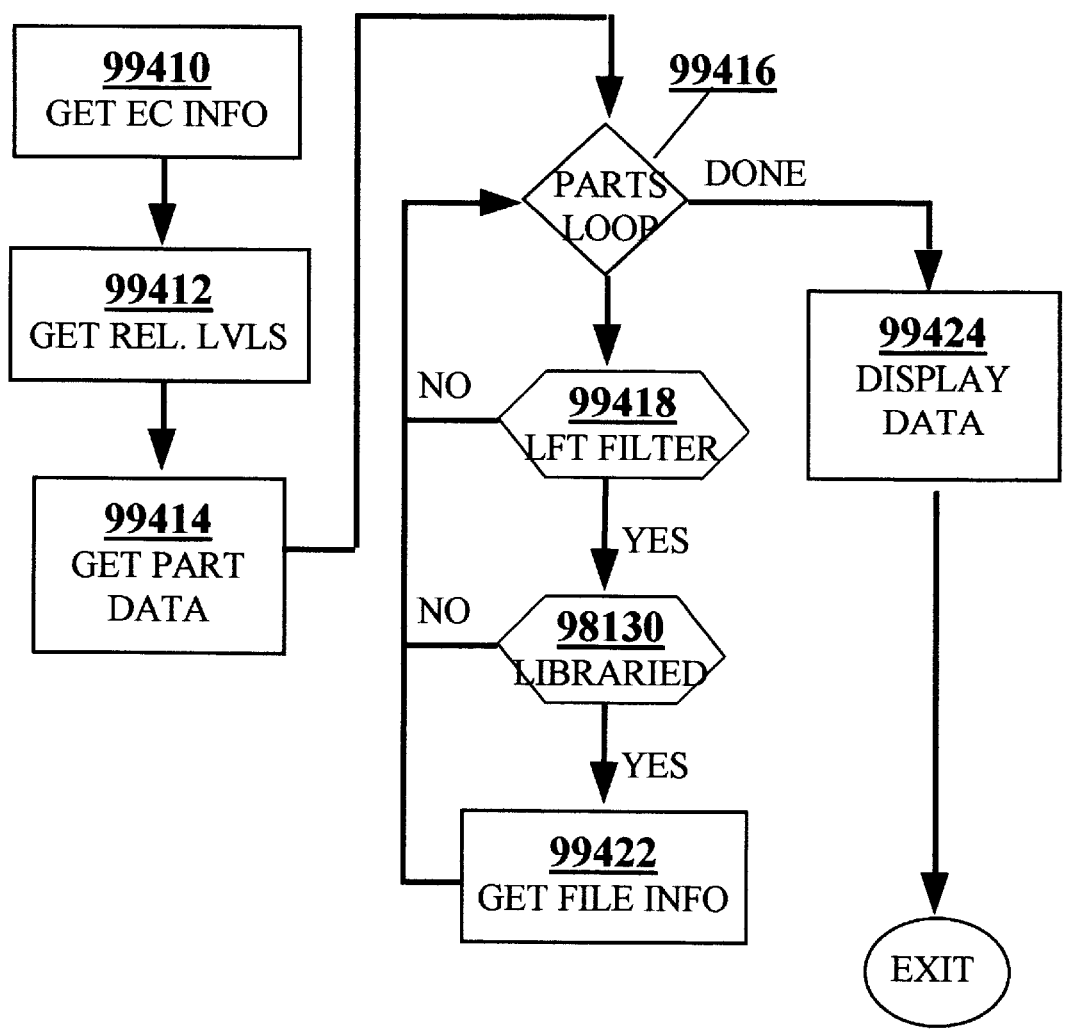
FIG. 53 illustrates the utility to display all the Release information for an EC.

A utility exists to display all the release information associated with a particular EC Number. It can be invoked through a sub-menu or command line interface, and the only required parameter is the EC Number. The algorithm begins with Step 99410 in FIG. 53. This step Gets the EC Info using the QRMECGET function. Next, Step 99412 employs the QRMLVGET function to Get Release Level Info associated with the current EC. This information is also stored into a data structure.

Control eventually proceeds to Step 99414, which invokes the QRPNDLST function to Get the Part Data. This returns all the part data associated with the EC and stores it into a third data structure. Step 99416 establishes a Parts Loop to process all the part data.

As the Parts Loop processes each entry in the part data structure, Step 99418 sets up an LFT Filter. This filter is designed to screen out any Library File Types that have part number information, but are not desirable to display. Those entries which pass the filter, are tagged for use later. Next, the entry is tested in Step 98130 to see if it is Libraried. If so, Step 99422 performs a QRFILGET to obtain the File information associated with the part data.

Upon completion of the Parts Loop in Step 99416, Step 99424 Displays the Data. The preferred embodiment contemplates display of the following information returned in Steps 99410 thru 99414:

Current EC Number, Previous EC Number, Type of EC, Description and Manufacturing Information.

For each Level associated with the EC, one line is displayed showing the Level, Library File Type, Version, and Status (Open/Frozen).

For each entry tagged in Step 99418, one line is displayed showing the P/N, File Name, PFVL Info, Est. Release Date, Actual Release Date, IEC Date and File Reference Number.

Our embodiment interacts with the Data Management Configuration Utility described in disclosure PO996-0007 to permit the Data Manager to start a new Collection REC for a Library. The utility enables the Data Manager to select Single Fix Tracking mode and enter default Problem Fix and EC numbers. Once committed to the Control Repository, all LFTs with the designated Fix Management flag will automatically be tracked under these default numbers.

Figure 54:
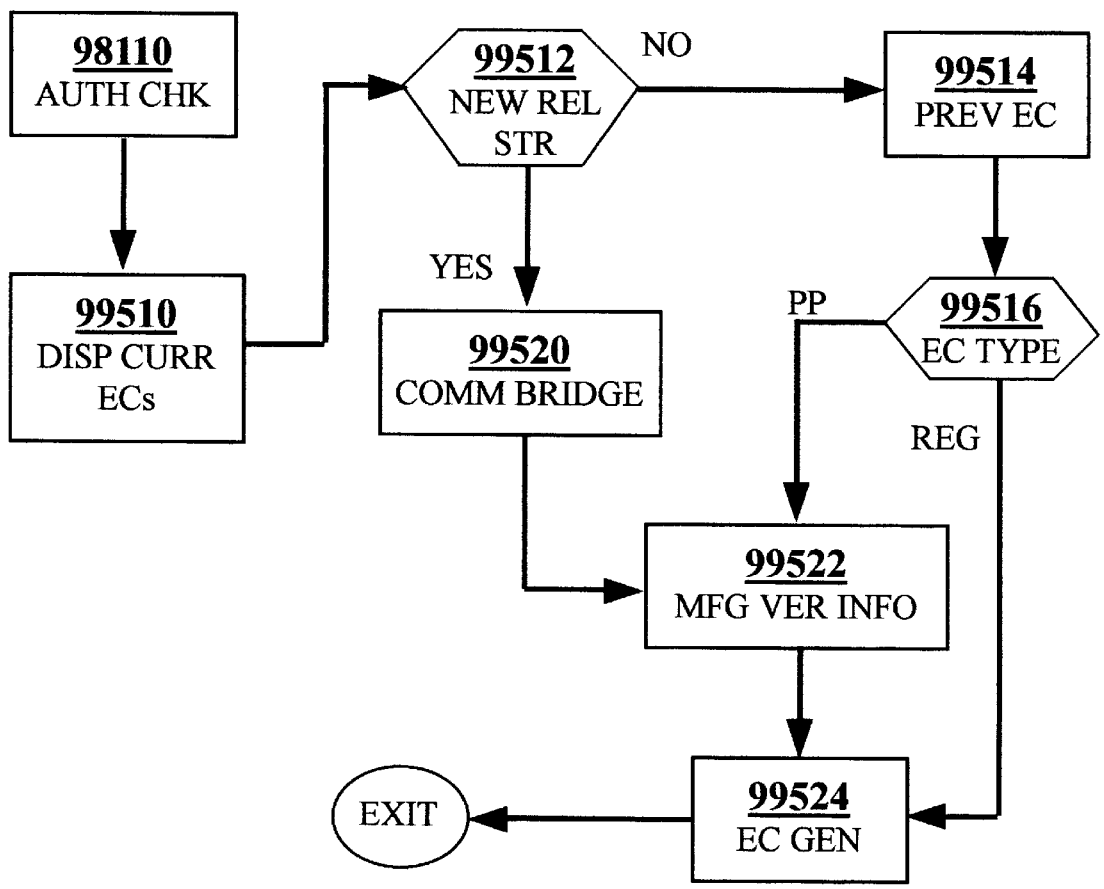
FIG. 54 illustrates the utility to begin a new Release Stream.

A utility exists to start a new Release (EC) Number for a Library. The utility may be invoked via the command line interface or through a sub-menu. The only required parameter is the Library name. The algorithm for this utility is illustrated in FIG. 54. The routine begins with Step 98110 which performs an Authorization Check to ensure the user is a valid Data Manager. Next, Step 99510 Displays all the Current ECs for the Library. This information is queried from the Control Repository using the QRMECGET function. Displayed information includes the EC Number, Previous EC Number, Description, and Type of EC. The user is prompted to continue or abort. Upon continuation, a subsequent dialog box requests the user to enter the type of Release.

Step 99512 tests the answer to the previous question. If the answer is a New Release Stream then control proceeds to Step 99520 which presents a dialog box to acquire the Commodity Bridge EC Number. Our embodiment allows a new Release to pick up commodities from a completely independent Release Stream by employing a Commodity Bridge to link the Releases. The Commodity Bridge is optional.

Next, control proceeds to Step 99522 to collect the Manufacturing Version Info. The preferred embodiment requires all New Releases to have unique Manufacturing Versions. This permits multiple New Releases to be manufactured simultaneously, whereas regular ECs must be processed sequentially. The user is prompted for all the information necessary to support the manufacturing process.

Returning to Step 99512, if the answer is not a new Release, then Step 99514 asks the user to enter the Previous EC Number to base the current EC on. Next, Step 99516 calculates the Type of EC based on the information gathered in the previous step. The program examines the previous EC to see if any other Release is based on it. If not, then this new EC will be a Regular EC and control proceeds to Step 99524. Otherwise, if this EC will be an additional release based on the previous EC, then it's considered a Parallel Path or Make-From EC. In our preferred embodiment, control would proceed to Step 99522 to collect new Manufacturing Version Info since this EC could be processed through the manufacturing line in parallel.

Figure 27:
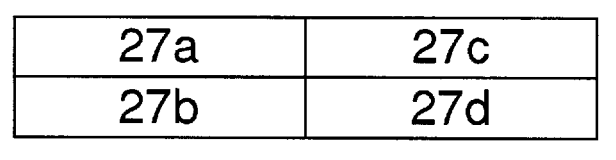

Eventually, control reaches Step 99524 which performs the EC Generation. This consists of prompting the user for a Description of the current Release, and also requests a review of all the collected and calculated information. If the user agrees that all the info is correct, the QRMEOGEN process, described in FIG. 27, is invoked to obtain the next available EC Number from the master EC Number pool. The number is returned to the user, and the utility exits.

A utility exists to allow EC Numbers to be assigned to Release Levels, and once assigned, the user may edit the information at a later time. The utility can be invoked through a command line interface or via sub-menus. The routine offers three methods of invocation depending on the information passed by the user. From the command line, the user may pass only an EC Number or an EC Number and the Level, Version and Library File Type.

When invoked through a sub-menu, a dialog box prompts the user to enter an EC Number or PFVL Information. Regardless of the method of invocation, the algorithm is described in FIG. 55.

Figure 55A:
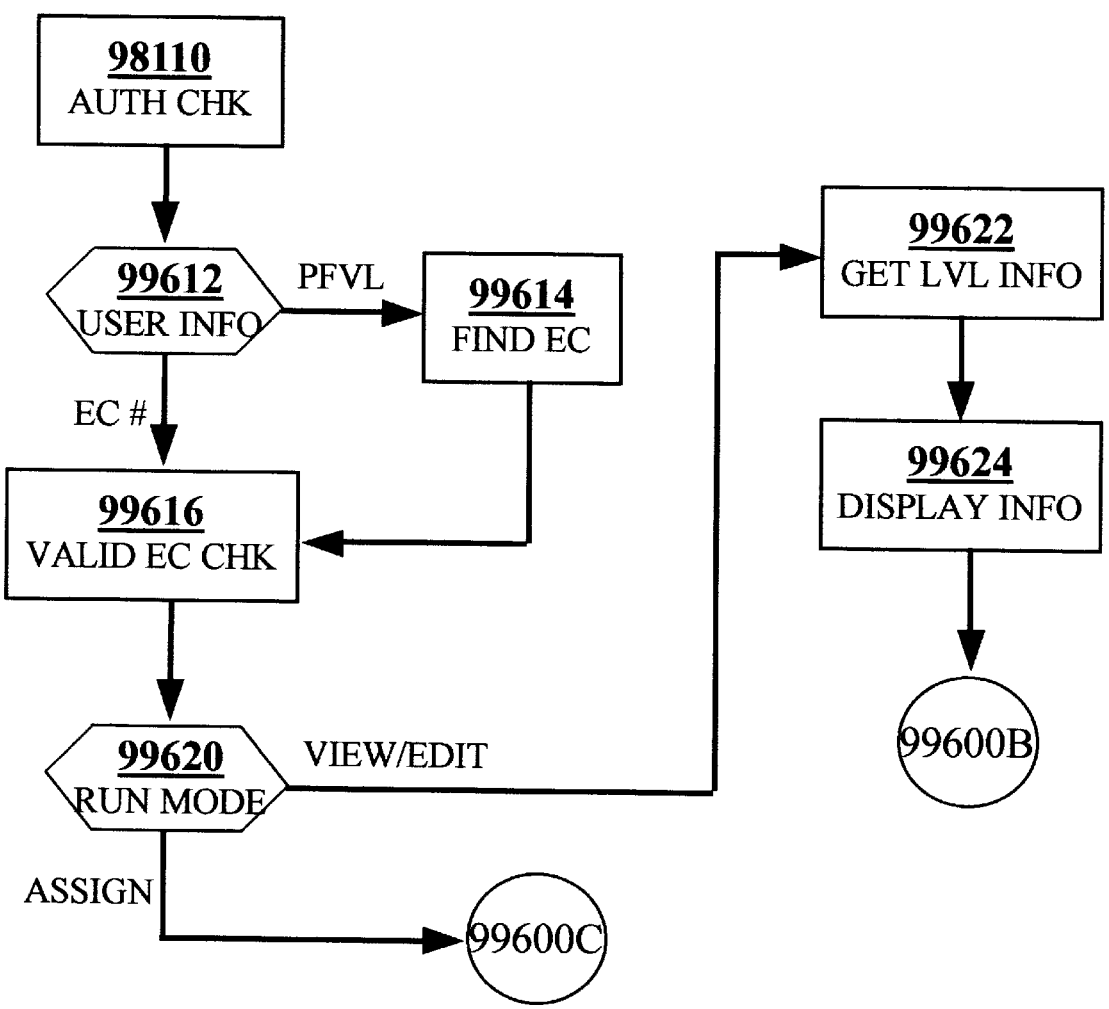
FIGS. 55a thru 55c illustrates the utility to assign EC Numbers to Release Levels.
Figure 55B:
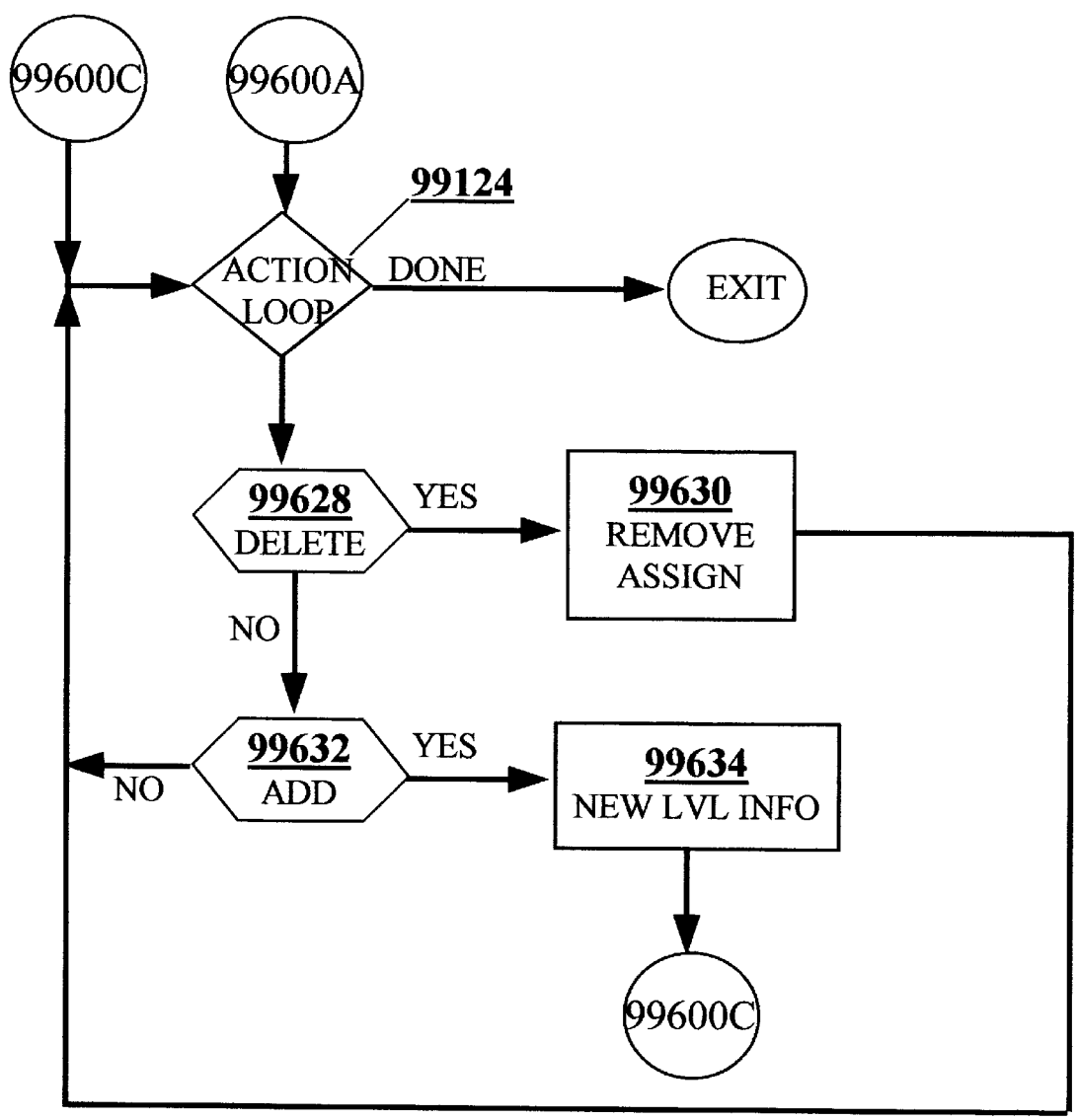
Figure 55C:
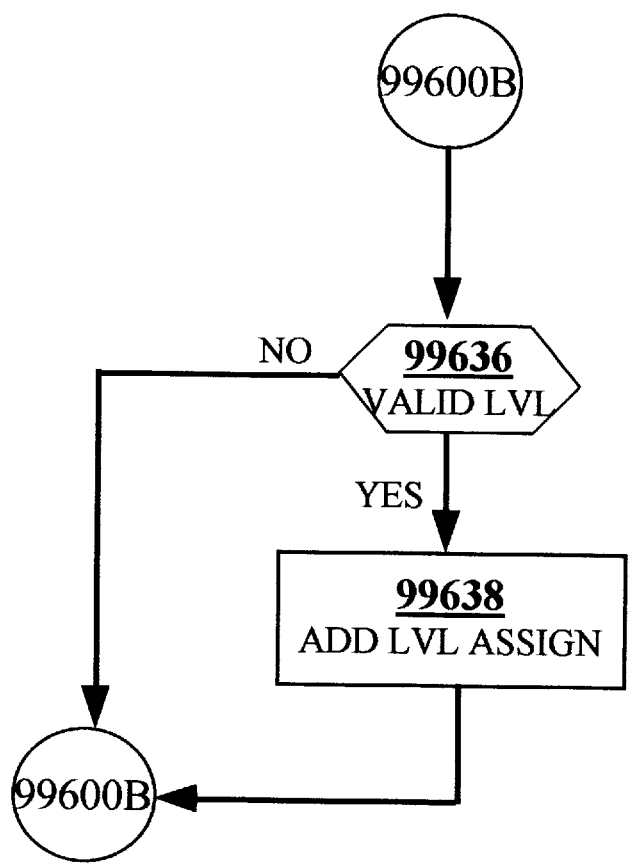

The routine begins with Step 98110, in FIG. 55a, which performs an Authorization Check to ensure the user is an authorized Data Manager. Next, the User Info is examined in Step 99612 to see whether an EC Number or PFVL information was passed in. If PFVL information was supplied without an EC Number, Step 99614 Finds the EC associated with that PFVL. Our preferred embodiment accomplishes this by performing two queries. QRLVLGET obtains the Level Reference Number for the PFVL, and QRMLVGET attempts to get an EC Reference Number for that Level. If no EC is currently associated to the Level, the user is informed and the utility exits. Otherwise, if an EC is associated to the Level, the EC Reference Number is passed to QRMECGET which returns an EC Number.

Otherwise, if an EC Number is supplied, Step 99616 performs a Valid EC Check to ensure the number exists. If so, control proceeds to Step 99620 which tests the Run Mode. In the preferred embodiment, the sub-menu will only pass an EC Number to Step 99620. However, if the user supplies PFVL information while invoking the routine through the command line, this info is also passed to Step 99620. The presence or absence of this PFVL information determines the branching. If PFVL information is passed, the routine assumes the user wants to assign the corresponding Level to the EC, so control branches to Step 99636.

The absence of PFVL information signifies the user's desire to View or Edit existing assignments. In this case, control branches to Step 99622 which performs a QRM-LVGET to Get the Existing Level Information for the current EC. Next, Step 99624 Displays this Information in the form of a table with columns representing the Level, Version, Library File Type and a flag indicating whether the Level is Open or Frozen. The display is designed to interact with the user so an Action Loop is established in Step 96124, in FIG. 55*b*. One skilled in the art would appreciate that the following if-then-else structure could be implemented with a case or select structure.

Step 99628 tests to see if the user wants to Delete an existing association. If so, the user indicates the selection to be deleted, and Step 99630 Removes the Assignment. The preferred embodiment employs the QRMLVDEL function to carry out the task. Control then returns to the top of the Action Loop.

Figure 29:
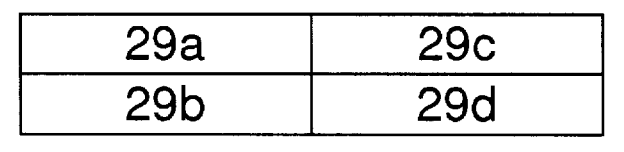

If the test in Step 99628 fails, then Step 99632 tests to see if the user wants to Add a new entry. If so, Step 99634 interacts with the user to acquire the New Level Information. The user is required to enter the Library, Version, Library File Type, and Level (PFVL) which should be assigned to this EC Number. Next, Step 99636, in, FIG. 55*c* employs the QRLVLGET to ensure the information gathered from the user corresponds to a Valid Level. If not, the user is informed and control returns to the top of the Action Loop. Otherwise, Step 99640 performs a simple audit to ensure that the ECs assigned to any existing LFTs are identical, and that number in turn matched the EC desired by the user. Assuming this audit passes, the QRMLVADD function, described in FIG. 29, is employed to Add the Level assignment. Upon completion, the display is refreshed to show the new entry, and control returns to the top of the Action Loop.

The Action Loop continues until the user intentionally exits the program.

A utility exists to permit the user to edit the EC Description. The routine simply performs the same authorization check done in Step 99110 of the aforementioned algorithms. As long as the user is an authorized Data Manager, the routine looks to see if an EC Number is supplied. If not, the user is prompted to enter one. Next, the QRMECGET function is employed to obtain the EC information from the Control Repository. The existing Description is displayed an the user is given the opportunity to edit it. If a change is made, the QRMECMOD function is invoked to store the changes in the Control Repository.

A utility exists to allow the user to edit the Commodity Bridge for an EC. It begins in a similar fashion to the previous utility, by performing an authorization check and invoking QRMECGET to obtain the current EC Type, Previous EC and Commodity Bridge. If the current EC Type is anything other than a Base EC or New Build, then the user is not permitted to build a Commodity Bridge. Otherwise, if a Commodity Bridge exists, it is displayed and the user can change it. Any changes are stored into the Control Repository using the QRMECMOD function.

Our embodiment contemplates a method for automatically generating an Incremental Engineering Change (IEC) comprising all the required information to release a Bill of Materials to manufacturing. The algorithm is depicted in FIG. 56. In our preferred embodiment an Automated Library Machine executes the algorithm once a day against all the data in the Control Repository. Any parts whose Estimated Release Dates are within a prescribed window of time from the current day, are included in the IEC.

Figure 56A:
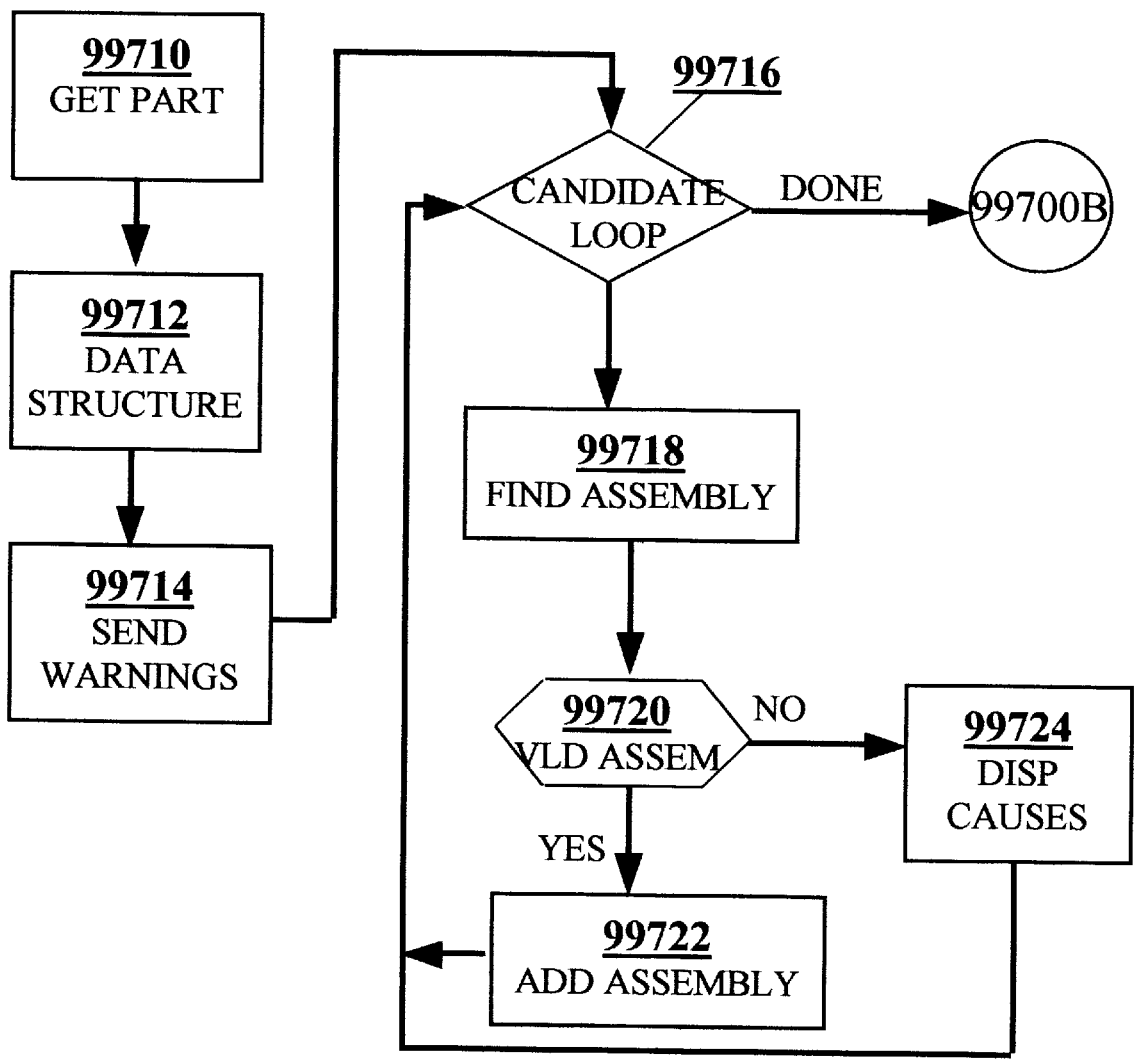
FIGS. 56a thru 56d illustrates the utility to generate IECs.
Figure 56B:
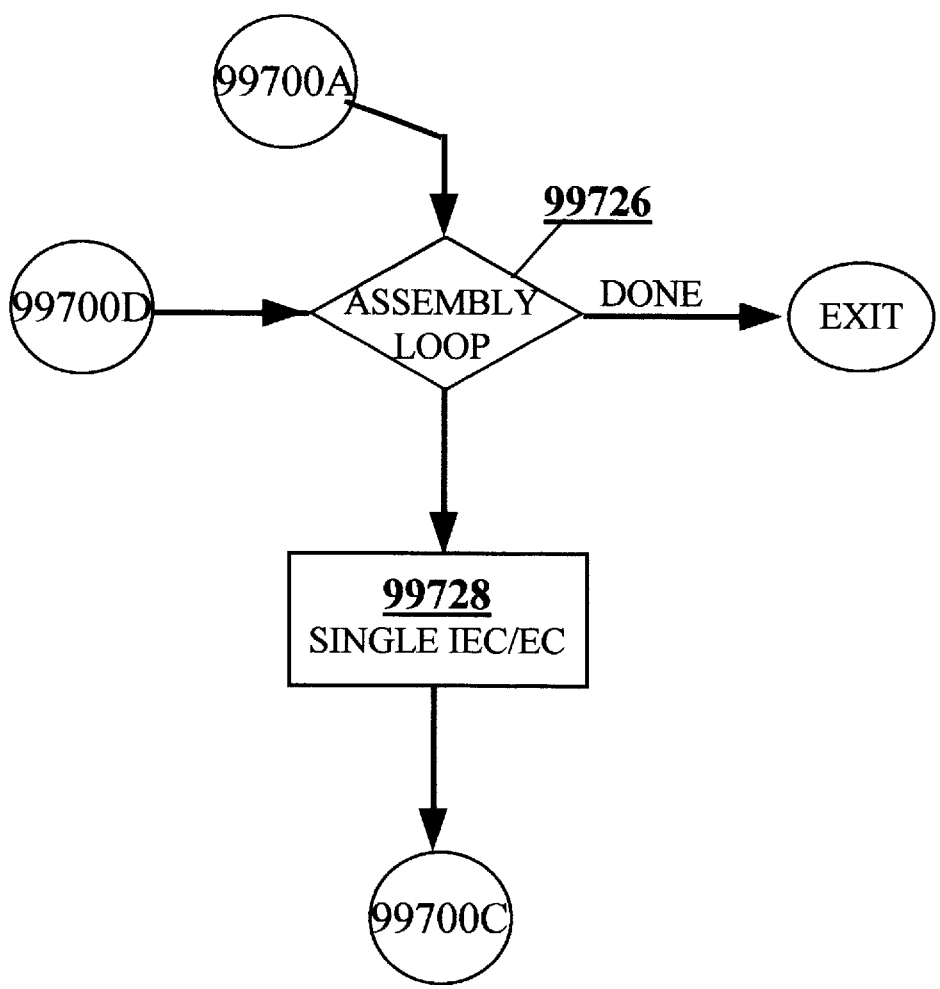
Figure 56C:
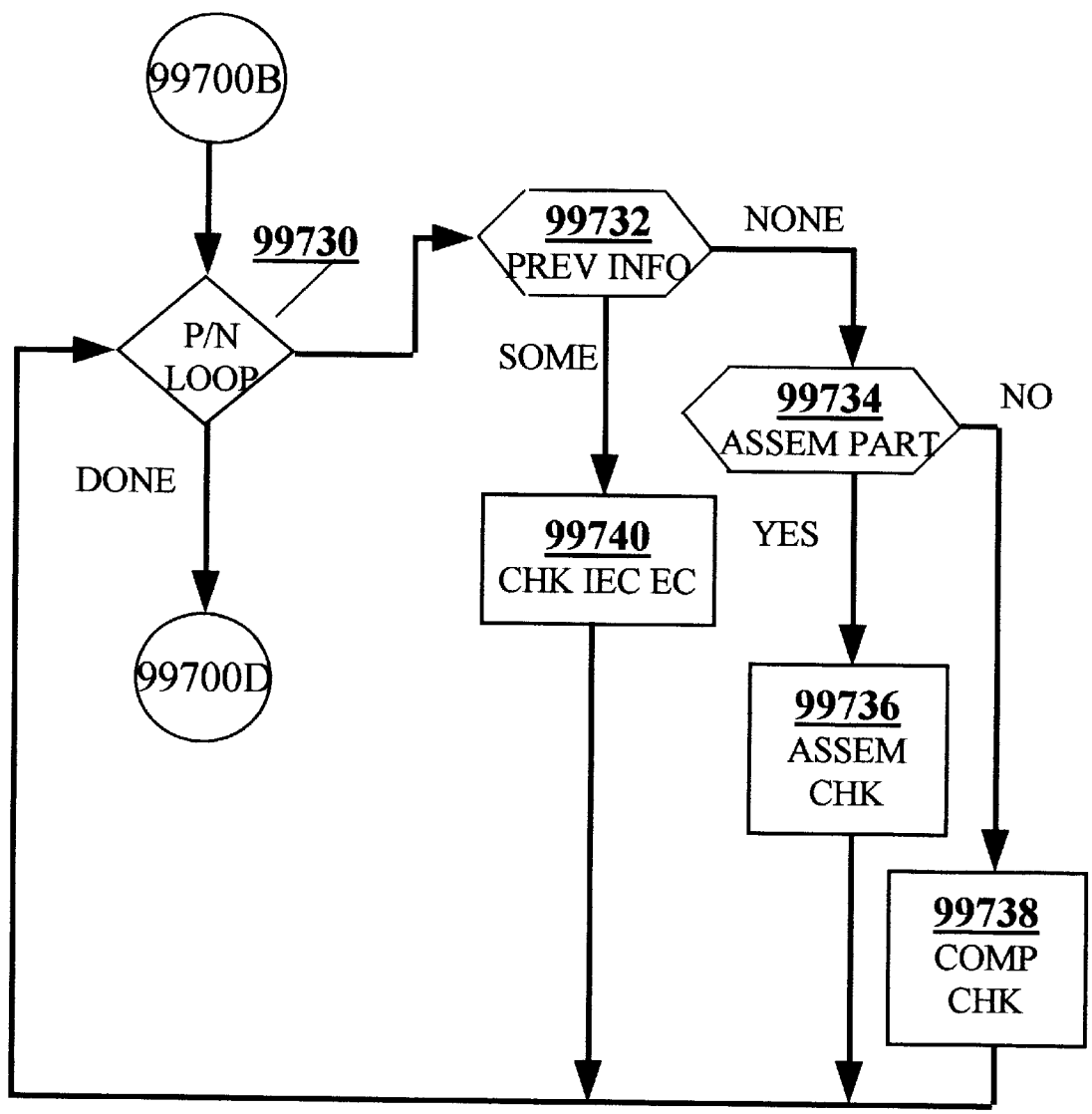
Figure 56D:
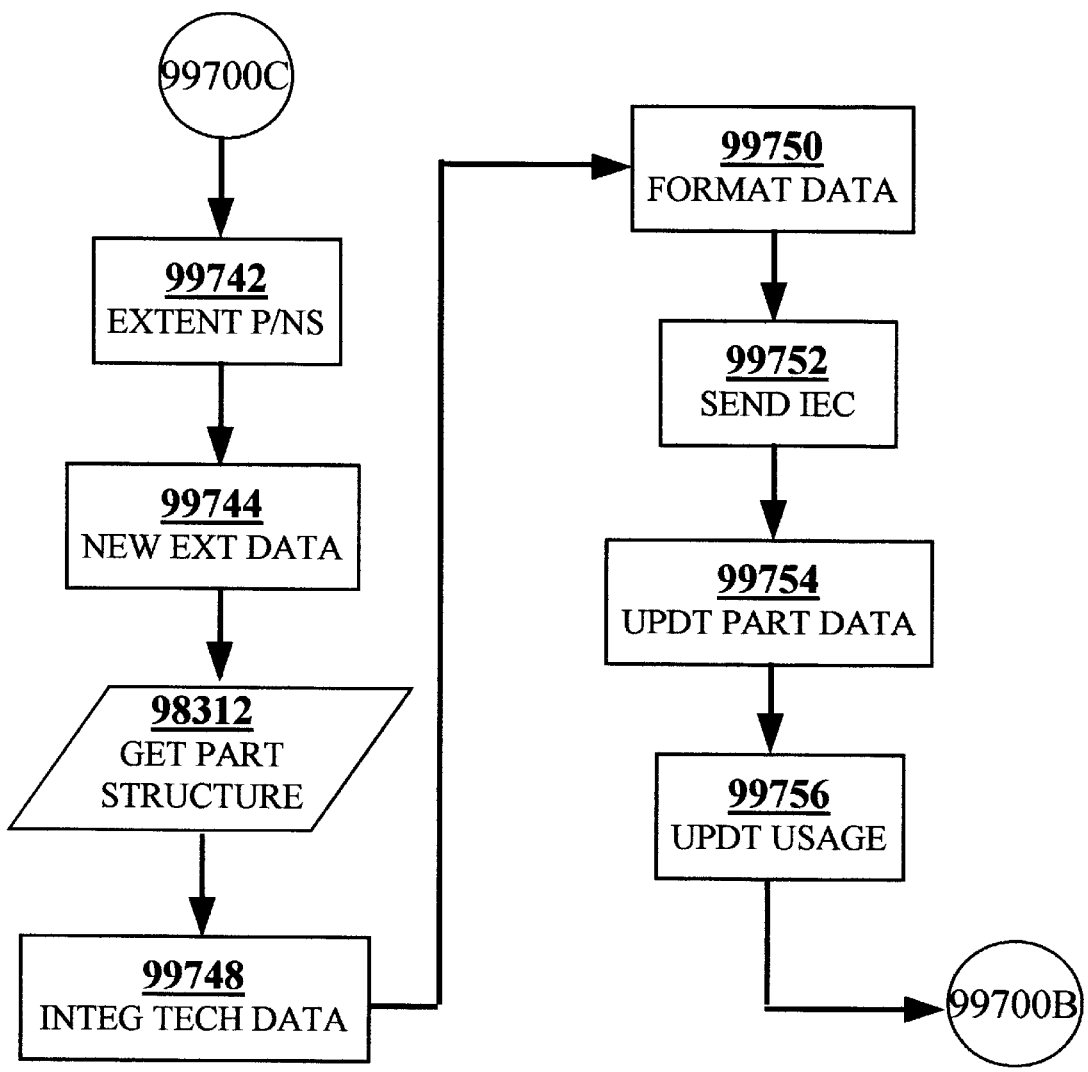

The algorithm begins with Step 99710 in FIG. 56*a* which invokes the QRPNDLST function to Get all the Part Data from the Control Repository. As previously stated, this data reflects all parts being tracked by the Control Repository. All data returned from the Control Repository is stored into a Data Structure in Step 99712. For each part, the REC data is checked to ensure that the part only belongs to one EC. The part number is added to one data structure which keeps track of all parts associated with a given object name and another data structure which lists all parts by EC. Finally, if the part has been IEC'd before, it's added to a data structure that tracks IEC'd parts by EC number.

Step 99714 is designed to Send Various Types of Warnings depending on the situation. The program loops through each part and calculates the number of days from the current date to the Required IEC Date for the part. The Required IEC Date is defined as the date by which manufacturing needs the IEC information in order to prepare for the release. In our preferred embodiment, the first IEC Warning is sent when the part is within 4 weeks of the Required IEC Date. The second warning is sent at the two week mark, and the final IEC Warning is sent 3 days prior to the IEC being sent. These warnings contain information which the owner of the part should review for correctness prior to the IEC being sent.

In addition to IEC Warnings, this step also prepares Release Warnings if the part is within 2 weeks or 1 week of the Estimated Release Date. In this case, the owner is reminded that any information which is incorrect needs to be corrected, and this usually requires an updated IEC to be sent to manufacturing immediately. The final type of warning is actually a Release Failure which occurs if the current date is 1 week after the Estimated Release Date and no Actual Release Date was recorded. Finally, if the current date is within the Required IEC Date, and the part hasn't been IEC'd yet, the part is added to the current day's IEC candidates list. All warnings issued are logged in a log file and the date of the warning is recorded in the Control Repository for each part using the QRPNMOD function. The warnings are also sent to any other user who has responsibility for releasing or managing parts.

Next, Step 99716 establishes a Candidate Loop in order to process each part number in the candidate list. Step 99718 attempts to Find the Assembly to which the current part is attached. In our preferred embodiment, most lower level components are always released as part of a higher level assembly. Some exceptions apply, thus Step 99716 determines whether this part is one of those exceptions. Examples of such exception are common parts and content parts.

Assuming the part requires an upper level assembly, the QRPNUGET function is invoked to obtain the assembly P/N where the current part is used, as well as its usage. If the assembly shares the same EC as the part, then it's checked to see if it's an assembly which can be released. If so, this P/N is remembered in a list. Otherwise, QRPNUGET is recursively called until the highest assembly part number is found within the EC to be used for the IEC.

Note: If the current P/N is already an assembly which can be released, QRPNUGET returns this information so the program can continue without wasting time searching for an upper level assembly part.

Step 99720 tests to see if a Valid Assembly was found in the previous step. If so, Step 99722 Adds the Assembly P/N to the List of assemblies for which IECs will be attempted. In addition, if the current part is a lower level part, a special flag is reset indicating that the Assembly being IEC'd has lower level components.

If Step 99720 tests negatively, then Step 99724 Displays Possible Causes for the failure to find a valid higher level assembly part. These causes may include:

1. The part being absent from the higher level design (netlist, schematic, BOM, etc.)
2. Neither the part or the assembly or both are in the correct EC.
3. The part doesn't have it's current EC or usage data recorded in the Control Repository.

At this point control returns to the top of the Candidate Loop and repeats Steps 99718 thru 99724 until all candidate parts are processed. Upon exit from the Candidate Loop, the program establishes an Assembly Loop, in Step 99726, to process the list of Assembly parts formed in Step 99722.

Step 99728 checks for a Single IEC/EC. This ensures that the current Assembly Part Number is the only commodity IEC'd under this EC, and no commodity was ever IEC'd under this EC. Our embodiment prohibits two assemblies from sharing the same EC numbers. Next, Step 99730 establishes a Part Number Loop to process all the parts in the EC associated with the current Assembly.

Control proceeds to Step 99732 which examines the current part's Previous Part Info. The two items which are examined are the Previous EC Number and Previous IEC EC Number. If neither exists, control branches to Step 99734 which tests to see if the current P/N is an Assembly Part. If so, Step 99736 performs an Assembly Check to see if the Assembly type is a New Build. This is the only acceptable type of assembly which can be missing Previous IEC and EC information. Our preferred embodiment requires Assembly Release Streams to be IEC'd in order, so the previous part must be IEC'd before the current part. In this case an error message is reported to the user.

Returning to Step 99734, if the current part is not an Assembly Part, then Step 99738 performs a Component Check. This results in an error message to the user if the Previous P/N has a part id identical to the current P/N. This indicates that the current P/N is an EC of the previous, and can't be IEC'd until the previous part has been IEC'd.

Returning to Step 99732, if some of the Previous Part Info exists, Step 99740 Checks the IEC EC. This results in an error if:

There's Previous IEC EC information but no Previous EC.
There's Previous a EC Number but no Previous IEC information.

As long as the part has both Previous IEC and EC information, the part will be IEC'd. In either case, control eventually returns to the top of the P/N Loop until all the parts in the current EC are processed.

At this point, Step 99742 employs the algorithm in FIG. 47 to either return any existing Extent Part Numbers for the current Assembly, or generate new ones, if the current Assembly technology requires them. Step 99744 examines any New Extent Part Data returned from the previous step to see if the existing part data structures already include the new Extents. For any Extent Parts absent from the current data structures, this step invokes the QRPNDLST function to obtain the information from the Control Repository. If no New Extent Part Data was returned from the previous step, this step proceeds immediately to the following step.

Once the Extent parts are processed, Step 98312 employs the Part Structure procedure described in FIG. 48 to obtain all the lower level parts associated with the current Assembly. The returned information includes all usage data. Lastly, Step 99748 Integrates all the Technology Data returned from the previous step with technology-specific information residing in external rules files. This type of information is required to drive manufacturing process, and is normally maintained outside of the DMS. The result is the complete structure of the assembly including Content Parts, Technology Information, Release-Only parts data fields required by the manufacturing process, etc.

Upon gathering all the Assembly information, Step 99750 Formats the Data. IECs in our preferred embodiment use the following criteria to determine which P/Ns should be included in the IEC:

The part has not been IEC'd OR it's a new Content Part AND

The part is in the same EC as the Assembly OR it's an Extent Part AND

The current part is NOT a lower level component on an Assembly-only Release

For all parts which meet the above criteria, the following information is displayed in the IEC:

The Part ID

The Type of Part

The Current Part Number and EC Number

The Previous Part Number and EC Number

The Estimated Release Date

The Technology Information

Finally, Step 99752 Sends the IEC to all the appropriate receivers. In our preferred embodiment, this entails sending copies to the Data Manager, and a recipient in manufacturing charged with accepting and processing IEC data. A log records the date and time that the IEC was sent as well as the names of those to whom it was sent.

At this point a successful IEC has been sent for the current Assembly, therefore Step 99754 Updates the Part Data Table for each part contained in the IEC. This is performed with the QRPNDIEC function, described in FIG. 14, which updates the IEC Date, Assembly EC, and. Previous P/N fields with the current information. Lastly, Step 99756 employs the QRPNUMOD function to Update the Usage Information for all content parts IEC'd under this Assembly. Control returns to the top of the Assembly Loop and continues until all the parts in the Assembly list are processed.

EC and PN Manager Processes

This section describes the processes that support the EC/PN Manager functions in Data Management Control Utilities. The processes are depicted in FIGS. 11 to 37. To support these processes the EC/PN Manager maintains the following tables in the Control Repository.

TABLE 1

| COMMODITY_FILES - Files having associated part numbers | |
|---|---|
| Column | Description |
| FILEREF | File Reference number |
| FILENAME | Filename |
| FILETYPE | CMS Filetype |
| LIBTYPE | Library Filetype |
| LVLREF | Level reference number |
| LEVEL | Library Level |
| PACKAGE | Package id |
| VERSION | Version |
| LIBUSER | Userid where file resides |
| LIBCUU | Disk address where file resides |
| FLAG | File flag - V if a virtual file, otherwise blank |
| SRCREF | Source file reference number for generated files |
| RECNO | REC number |
| MECNO | MEC number |

TABLE 1-continued

COMMODITY_FILES - Files having associated part numbers

| Column | Description |
|---|---|
| REQUEST | Request Number |
| PARTNO | Part number associated with file |
| SUPERCEDED | If "Y" this entry has been superceded |

TABLE 2

FILE_LEVEL -

| Column | Description |
|---|---|
| FILEREF | File Reference number |
| FILENAME | Filename |
| CMSTYPE | CMS Filetype |
| LVLREF | Level reference number |
| LEVEL | Level name |
| LIBTYPE | Library file type |
| PACKAGE | Package id |
| VERSION | Version |
| LIBUSER | USERID where level resides |
| LIBCUU | MINIDISK where level resides |
| LIBLAB | MINIDISK label where level resides |
| SRCREF | Source file reference number for generated files |
| FLAG | File flag - V if a virtual file, otherwise blank |
| NEXTLVL_REF | Reference number of next level |
| PUTABLE | Files can be put to this level |
| PROMOTABLE | File can be promoted from this level |
| PLATFORM | Platform where level resides |
| DIRECTORY | Directory under which level resides |

TABLE 3

LEVELS - Library Levels

| Column | Description |
|---|---|
| REF | Reference number |
| LEVEL | Level id |
| PACKAGE | Package id |
| FILETYPE | Library file type |
| VERSION | Version |
| USERID | USERID where level resides |
| CUU | MINIDISK where level resides |
| LABEL | Label of MINIDISK where level resides |
| NEXTLVL_REF | Pointer to next level |
| PUTABLE | Files can be put to this level |
| PROMOTABLE | File can be promoted from this level |
| LOG_REF | Pointer to log entry |
| AUXDISK | If "Y", then level is on auxilliary disk |
| PLATFORM | Platform where level resides |
| DIRECTORY | DIRECTORY under which level resides |

TABLE 4

LIB_MACHINES - Library Machine information

| Column | Description |
|---|---|
| REF | Reference number |
| USERID | USERID of the library machine |
| NODE | Node on which library machine is currently logged |
| DATE | Date of last update |
| TIME | Time of last update |
| AIX_IP_ADDR | AIX_IP_ADDR AIX Internet Protocol address |

TABLE 5

MEC_LEVEL - Relates MECS to levels

| Column | Description |
|---|---|
| REF | Reference number |
| MEC_REF | MEC reference number |
| LEVEL_REF | Reference number of associated level |
| FROZEN | Y if level is frozen |

TABLE 6

MECNO_POOL - Pool of available MEC numbers

| Column | Description |
|---|---|
| REF | Reference number |
| FIRST_NO | First MEC number in block |
| LAST_NO | Last MEC number in block |
| BLOCK_LENGTH | Number of consecutive MEC numbers in this block |

TABLE 7

MECS - Relates MECS to previous MECs

| Column | Description |
|---|---|
| REF | Reference number |
| MEC_NO | MEC number |
| PREV_MEC | MEC on which this MEC is based |
| PACKAGE | Package id |
| IEC_PREFIX | No longer used |
| FINAL_IEC | No longer used |
| MFG_ID | Manufacturing ID |
| MAKE_FROM_MEC | No longer used |
| REMARKS | Remarks |
| MEC_TYPE | Type of MEC: NEWBUILD, EC, MAKEFROM or TEMPFIX |

TABLE 8

PACKAGES - Packages

| Column | Description |
|---|---|
| REF | Reference number |
| ID | Package id |
| MANAGER | Userid of package manager |
| ALTERNATE | Userid of alternate package manager |
| REC_LEVEL | Level at which REC control begins |
| PARTNO_LEVEL | Level at which part numbers are required |
| CURRENT_RECNO | Current default REC number |
| CURRENT_MECNO | Current default MEC number |
| BYPASS_REC | If "Y", then bypass REC processing |

TABLE 9

PART_DATA_LOG - Part data log

| Column | Description |
|---|---|
| REF | Reference number |
| USERID | User causing entry |
| DATE | Date of log entry |
| TIME | Time of log entry |
| PARTNO | Part number |
| OWNER_ID | USERID of owner of part |
| OWNER_NODE | Node of owner of part |

TABLE 9-continued

PART_DATA_LOG - Part data log

| Column | Description |
| --- | --- |
| COMMODITY | Commodity type - CHIP, TCM, BOARD |
| PART_ID | ID of the part i.e Chip_id or TCM_id |
| ASSEMBLY_ID | ID of the primary assembly |
| TECHNOLOGY | Part Technology |
| REASON | Reason code for change |
| PNEUC | PNEUC to be used |
| OTHER_LAB | Other Lab/Plant where part is used |
| DISPOSITION | Part disposition code |
| ITERATION | Part iteration count |
| EST_RITDATE | Estimated RIT date |
| ACT_RITDATE | Actual RIT date |
| IEC_REQDATE | Date IEC was requested |
| WARN_DATE | Date last warning was issued |
| IEC_MEC | MEC under which IEC was made |
| TECHNOLOGY_DATA | Technology data |
| PREVIOUS_PARTNO | Previous part number |
| PIP_DATE | Date of PIP |

TABLE 10

PART_NUMBER_LOG - Part number log

| Column | Description |
| --- | --- |
| REF | Reference number |
| REASON | Reason for log entry |
| USERID | User causing entry |
| DATE | Date of log entry |
| TIME | Time of log entry |
| PARTNO | Part number |
| FILEASSOC | U-unassociated, A-on A disk, L-in Library, S-Superceded |
| FILEREF | Pointer to file if in library, else 0 |
| FILENAME | File name |
| LIBTYPE | Library file type |
| PARTREF | Pointer to entry in PART_NUMBERS table |
| REQUESTOR | Userid who requested the part number |

TABLE 11

PART_DATA - Part data

| Column | Description |
| --- | --- |
| REF | Reference number |
| PARTNO | Part number |
| OWNER_ID | USERID of owner of part |
| OWNER_NODE | Node of owner of part |
| COMMODITY | Commodity type - CHIP, TCM, BOARD |
| PART_ID | ID of the part i.e Chip_id or TCM_id |
| ASSEMBLY_ID | ID of the primary assembly |
| TECHNOLOGY | Part Technology |
| REASON | Reason code for change |
| PNEUC | PNEUC to be used |
| OTHER_LAB | Other Lab/Plant where part is used |
| DISPOSITION | Part disposition code |
| ITERATION | Part iteration count |
| EST_RITDATE | Estimated RIT date |
| ACT_RITDATE | Actual RIT date |
| IEC_REQDATE | Date IEC was requested |
| WARN_DATE | Date last warning was issued |
| LOG_REF | Reference number of the log entry |
| IEC_MEC | MEC under which IEC was made |
| TECHNOLOGY_DATA | Technology data |
| PREVIOUS_PARTNO | Previous part number |
| PIP_DATE | Date of PIP |

TABLE 12

PART_NUMBERS - Part numbers

| Column | Description |
| --- | --- |
| REF | Reference number |
| PARTNO | Part number |
| FILEASSOC | U-unassociated, A-on A disk, L-in Library, S-Superceded |
| FILEREF | Pointer to file if in library, else 0 |
| FILENAME | File name |
| LIBTYPE | Library file type |
| REQUESTOR | Userid who requested the part number |
| LOGREF | Pointer to log entry |

TABLE 13

PART_USAGE - Part usage

| Column | Description |
| --- | --- |
| REF | Reference number |
| COMPONENT_PNO | Component Part Number |
| COMPONENT_ID | Component ID |
| ASSEMBLY_PNO | Assembly Part Number |
| ASSEMBLY_ID | Assembly ID |
| USAGE | Number of times component is used on this assembly |
| IEC_REQDATE | Date IEC was requested for this usage |

TABLE 14

REC_FILES - Mapping of files to RECs

| Column | Description |
| --- | --- |
| REF | Reference number |
| REC_REF | Pointer to REC |
| FILENAME | File Name |
| FILETYPE | CMS file type |
| FILE_REF | Pointer to file |
| ORIGIN | Entry Origin - D=Done, I=Implicit, L-Librared, P=Panned, W-Working |
| SUPERSEDED | If "Y" this entry has been superseded |

TABLE 15

REC_HEADER - REC header information

| Column | Description |
| --- | --- |
| REF | Reference number |
| PACKAGE | Package Id |
| ORIGINATOR | Userid of Originator |
| MEC_REF | Pointer to MEC to which this REC is assigned |
| PROB_NO | Problem number which this REC fixes |
| DATE | Origination date |
| TITLE | REC title |
| MEC_NO | MEC number |
| REQUEST_NO | Request number |
| FIX_REASONS | FIX REASON CODES (CONCATENATED) |

TABLE 16

REC_TEXT - REC Text

| Column | Description |
| --- | --- |
| REC_REF | Pointer to REC header |
| TEXT | Text associated with this REC |

TABLE 17

SEC - TREMARKS

TABLE 18

VALID_PROBLEMS - Valid problem numbers

| Column | Description |
| --- | --- |
| REF | Reference number |
| REQUEST_NO | Request number |
| REMARKS | Remarks |

The QRPNDLST Process FIG 11. This process is used to Present a list of Part Numbers along with Part Data and associated REC information.

After initialization 91101, a check 91102 is made to determine which type of request is being made.

If a PN request, a check 91103 is made to determine if this is a single or multiple PN request. If a single PN request, a query 91104 is made to get the part number entry from the PART_DATA table in the Control Repository. Next, a check 91105 is made to determine if it was found. If not found, an error message is issued 91119 and the process aborted 91120 with Return Code=12. If it was found, the PARTPROC Process described in FIG. 12 is invoked 91106. Upon return from the above process, a check 91107 is made to determine if the process failed. If so, the process is aborted 91120 with Return Code=12. If not, stack 91108 the ROWCOUNT. Then, the process returns 91109 to the caller.

If this is a multiple PN request, setup 91110 to retrieve all entries from the PART_DATA table in the Control Repository. Then, a query 91111 is made to get an entry. Next, a check 91112 is made to determine if an entry was found. If not, the process is aborted 91120 with Return Code=12. If an entry was found, a check 91113 is made to determine if ALL was specified. If not, a check 91114 is made to determine if the part was RIT. If so, the process flows forward to 91117. If not or if ALL was specified, the PARTPROC Process described in FIG. 12 is invoked 91115. Upon return from the above process, a check 91116 is made to determine if the process failed. If so, the process is aborted 91120 with Return Code=12. If not, a check 91117 is made to determine if there are any more entries. If so, the process flows back to 91111. If not, stack 91108 the ROWCOUNT. Then, the process returns 91109 to the caller.

If this is a PROB request, setup 91119 to get all Part Number entries for the given request (problem). If this is a MEC request, setup 91121 to get all Part Number entries for the given MEC. In either case, a query 91122 is made to get a Part Number entry from the Control Repository. Next, a check 91123 is made to determine if an entry was found. If not, the process flows forward to 91128. If so, a query 91124 is made to get its entry from the PART_DATA table. Next, a check 91125 is made to determine if an entry was found. If not, an error message is issued 91119 and the process aborted 91120 with Return Code=12. If so, the PARTPROC Process described in FIG. 12 is invoked 91126. Upon return from the above process, a check 91127 is made to determine if the process failed. If so, the process is aborted 91120 with Return Code=12. If not, a check 91128 is made to determine if there are any more entries. If so, the process flows back to 91122. If not, stack 91108 the ROWCOUNT. Then, the process returns 91109 to the caller.

The PARTPROC Process FIG. 12: This process is used by the QRPNDLST Process to get Part Data information.

After initialization 91201, the RECCOUNT and FOUNDRLS are reset 91202. Next, Prepare 91203 to get entries with FILEASOC of "R", "L" or "S" from the PART_NUMBER table. Next, a query 91204 is made to get a "RLS" entry from the Control Repository. Then, a check 91205 is made to determine if an entry was found. If so, set 91206 the FOUNDRLS flag. Next, a query 91207 is made to get the FileName, FileType, Level and Package from the FILE_LEVEL table in Control Repository. Next, a check 91208 is made to determine if the information was found. If not, a check 91209 is made to determine if the FILEASOC was "S". If not, an error message is issued 91224 and the process returns 91225 to the caller with Return Code=12. If the information was found or the FILEASOC was "S", the PARTPRO1 Process described in FIG. 13 is invoked 91210. Upon return from the above process, a check 91211 is made to determine if there are any more Part Number entries. If so, the process flows back to 91204. If not, set 91213 PREVMEC and PREVPNO to null. Next, a check 91214 is made to determine if the FOUNDRLS flag was set. If so, a check 91215 is made to determine if an explicit Previous Part Number was set. If not, a check 91216 is made to determine if SAVEMNO is not zero. If not or if FOUNDRLS is not set, stack 91221 the Part Data. Then, increment 91222 ROWCOUNT. Then, the process returns 91223 to the caller. If an explicit Previous Part Number was set, a query 91213 is made to get the Previous Part Number's MEC from the PART_DATA table in the Control Repository. Next, set 91220 PREVMEC to the explicit Part Number's MEC. The process then flows back to 91221.

If SAVEMNO is not zero, try to find 91217 the Previous MEC and Part Number via the previous MEC chain as follows: Restore 91218 MECNO from SAVEMNO. Then, reset 91226 the MECLOOP counter.

For each MEC 91227, a check 91228 is made to determine if MECNO is not zero and if PREVPNO is still zero. If not, the process flows back to 91221. If so, a query 91229 is made to get the MECNO's previous MEC from the MECS table in the Control Repository. Next, a check 91230 is made to determine if it was found. If not, an error message is issued 91224 and the process returns 91225 to the caller with Return Code=12. If an entry was found, increment 91231 the MECLOOP. Next, a check 91232 is made to determine if MECLOOP exceeds MAXLOOPS. If so, an error message is issued 91224 and the process returns 91225 to the caller with Return Code=12. If not, a query 91233 is made to get the Previous Part Number from the PART_DATA table in the Control Repository using the retrieved PARTID. Next, set 91234 MECNO=PREVMEC. The process then flows back to 91227.

The PARTPRO1 Process FIG. 13: This process is used by the PARTPROC Process to get associated REC_FILE data.

First, reset 91301 the MECNO. Next, set up 91302 to get entries from the REC_FILES table in the Control Repository. Then, a query 91303 is made to get a RecFile entry. Next, a check 91304 is made to determine if an entry was found. If not, the process returns 91314 to the caller. If so, a query 91305 is made to get the MEC, Request and Fix Reasons from the REC_HEADER table in the Control Repository. Then, a check 91306 is made to determine if the entry was found. If not, an error message is issued 91307 and the process returns 91308 to the caller with Return Code=12. If so, a check 91309 is made to determine if the MECNO is blink. If not, set 91310 SAVEMNO to MECNO. In either case, stack 91311 the REC information. Then, increment 91312 the RECCOUNT. Next, a check 31313 is made to determine if there are any more RecFile entries. If so, the process flows back to 91303. If not, the process returns 91314 to the caller.

The QRPNDIEC Process FIG. 14: The QRPNDIEC process is used to set the IEC_REQDATE, IEC_MEC and PREVIOUS_PARTNO in the PART_DATA table.

After initialization, a query 91401 is made to get the entry from the PART_DATA table in the Control Repository. Then, a check 91402 is made to determine if the entry was found. If not, an error message is issued 91408 and the process aborted 91409 with Return Code=12. If so, a check 91403 is made to determine if the IECMEC is being reset. If so, the process flows forward to 91406. If not, a query 91404 is made to get the IECMEC entry from the MECS table in the Control Repository. Then, a check 91405 is made to determine if the entry was found. If not, an error message is issued 91408 and the process aborted 91409 with Return Code=12. If so, a check 91406 is made to determine if the Previous Part Number is being reset. If so, the process flows forward to 91413. If not, a check 91410 is made to determine if the Previous Part Number is the same as the Current Part Number. If so, an error message is issued 91408 and the process aborted 91409 with Return Code=12. If not, a query 91411 is made to get the Previous Part Number entry from the PART_NUMBERS table in the Control Repository. Then, a check 91412 is made to determine if the entry was found. If not, an error message is issued 91408 and the process aborted 91409 with Return Code=12. If so, a query 91413 is made to get a reference number for a Part Data Log entry. Next, update 91414 the entry in the PART_DATA table in the Control Repository. Then, insert 91415 a log entry in tie PART_DATA_LOG table in the Control Repository. Then, the process returns 91416 to the caller.

The QRPNDMOD Process FIG. 15: The QRPNDMOD process is used to modify part number data. Previous part numbers must be associated with a LIBRARIED file with the exception of files with "EXT" filetype.

After initialization, a query 91501 is made to get the entry from the PART_DATA table in the Control Repository. Then, a check 91502 is made to determine if the entry was found. If not, an error message is issued 91506 and the process aborted 91507 with Return Code=12. If so, a check 91503 is made to determine if the part has already been RIT. If so, an error message is issued 91506 and the process aborted 91507 with Return Code=12. If not, a query 91504 is made to get a reference number for a Part Data Log entry. Then, update 91505 all the indicated field in the PART_DATA table entry. Next, a check 91508 is made to determine if an IECMEC was specified. If not, the process flows forward to 91511. If so, a query 91509 is made to get its entry from the MECS table in the Control Repository. Then, a check 91510 is made to determine if the entry was found. If not, an error message is issued 91506 and the process aborted 91507 with Return Code=12. If so, a check 91511 is made to determine if a Previous Part number was specified. If not, the process flows forward to 91515. If so, a query 91512 is made to get the Previous Part Number entry from the PART_NUMBERS table in the Control Repository. Then, a check 91513 is made to determine if the entry was found. If not, an error message is issued 91506 and the process aborted 91507 with Return Code=12. If so, a check 91514 is made to determine if the FILEASOC is "A" and the FileType is Not "EXT". If so, an error message is issued 91506 and the process aborted 91507 with Return Code=12. If not, update 91515 the entry in the PART_DATA table in the Control Repository. Then, insert 91516 an entry in the PART_DATA_LOG table in the Control Repository. Then, the process returns 91517 to the caller.

The PNODIS Process FIG. 16: This process is used by the Library Manager QRSUPPRM, MDLPRM and QRSUPPUT Processes (See PO996-0010 Method for Managing Shared Libraries in D). to disassociate Part Numbers from Files.

First, a check 92101 is made to determine if there was an old file being over-laid. Next, a query 92102 is made to get the associated entries from the PART_NUMBERS table in the Control Repository. Next, a check 92103 is made to determine if the file was already RIT. If so, an error message is issued 92109 and the process returns 92110 to the caller with Return Code=12. If the file was not RIT, the Part Number entry is deleted 92104 from the PART_NUMBERS table in the Control Repository. Next, a query 92105 is made to determine if there are any more entries for this Part number in the PART_NUMBERS table. If not, a check 92106 is made to determine if the current entry is an "A" entry. If so, setup 92107 to insert a "U" entry. Then, delete 92113 the corresponding entry from the PART_DATA table in the Control Repository. Then, delete 92118 the corresponding entry from t he PART_USAGE table in the Control Repository. Next, a query 92114 is made to get reference numbers for the PART_NUMBERS an d PART_NUMBER_LOG tables. Then, insert 92115 the new entry in the PART_NUMBERS table and insert 92116 the new entry in the PART_NUMBER_LOG table. the process then returns 92117 to the caller. If there are more entries for this Part number in the PART_NUMBERS table, a check 92111 s made to determine if they are all "S" entries. If so, the process flows back to 92114. If not, set 92112 to insert an "A" entry. The process then flows back to 92114.

Figure 17:
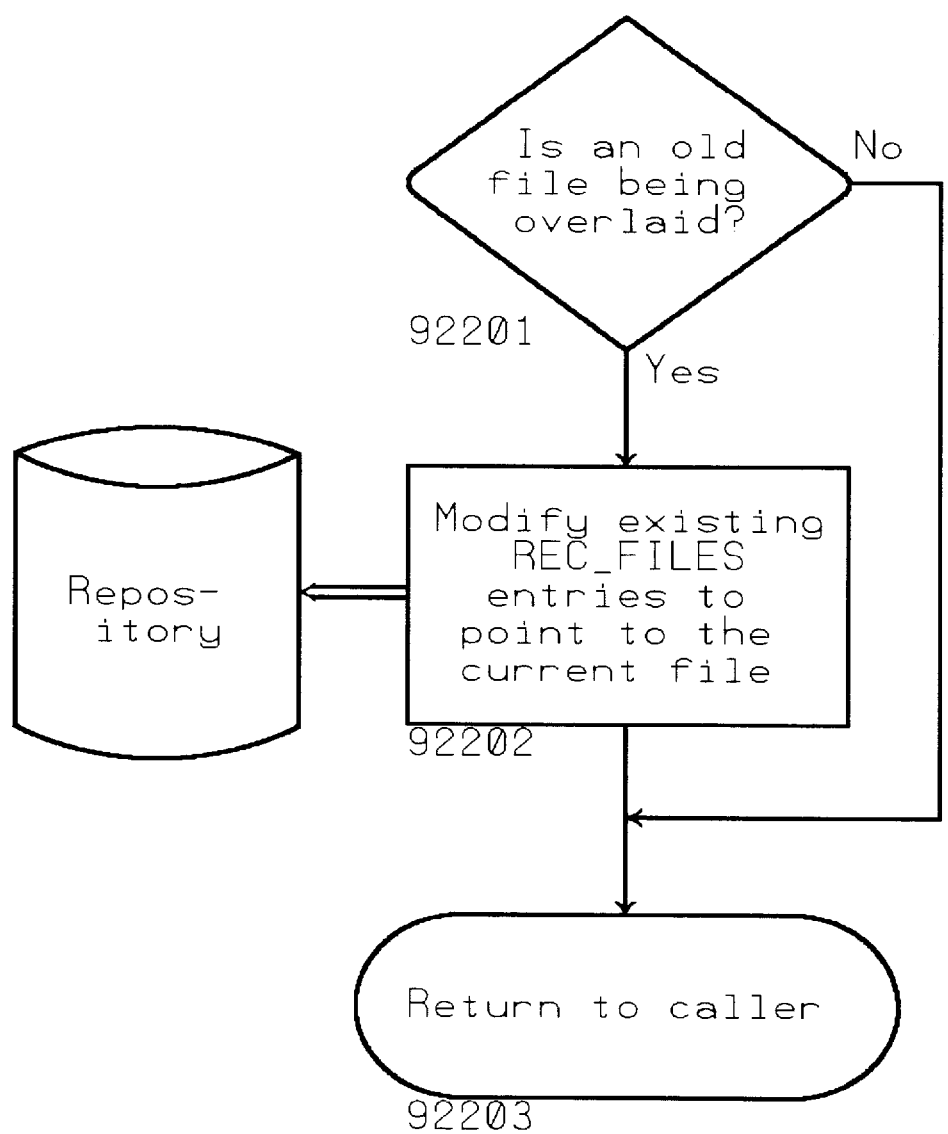
FIG. 17 describes the RECMOD1A Process.

The RECMOD1AA Process FIG. 17: This process is used by the Library Manager QRSUPGEN, FIGPRM, MDLPRM, QRSUPPUT and FIGPUT Processes (See PO996-0010 Method for Managing Shared Libraries in D). to modify existing REC_FILE entries in the Control Repository.

First, a check 92201 is made to determine if an old file had been overlaid. If not, the process returns 92203 to the caller. If so, modify 92202 existing REC_FILE entries to point to the current file. Then, the process returns 92203 to the caller.

Figure 18:
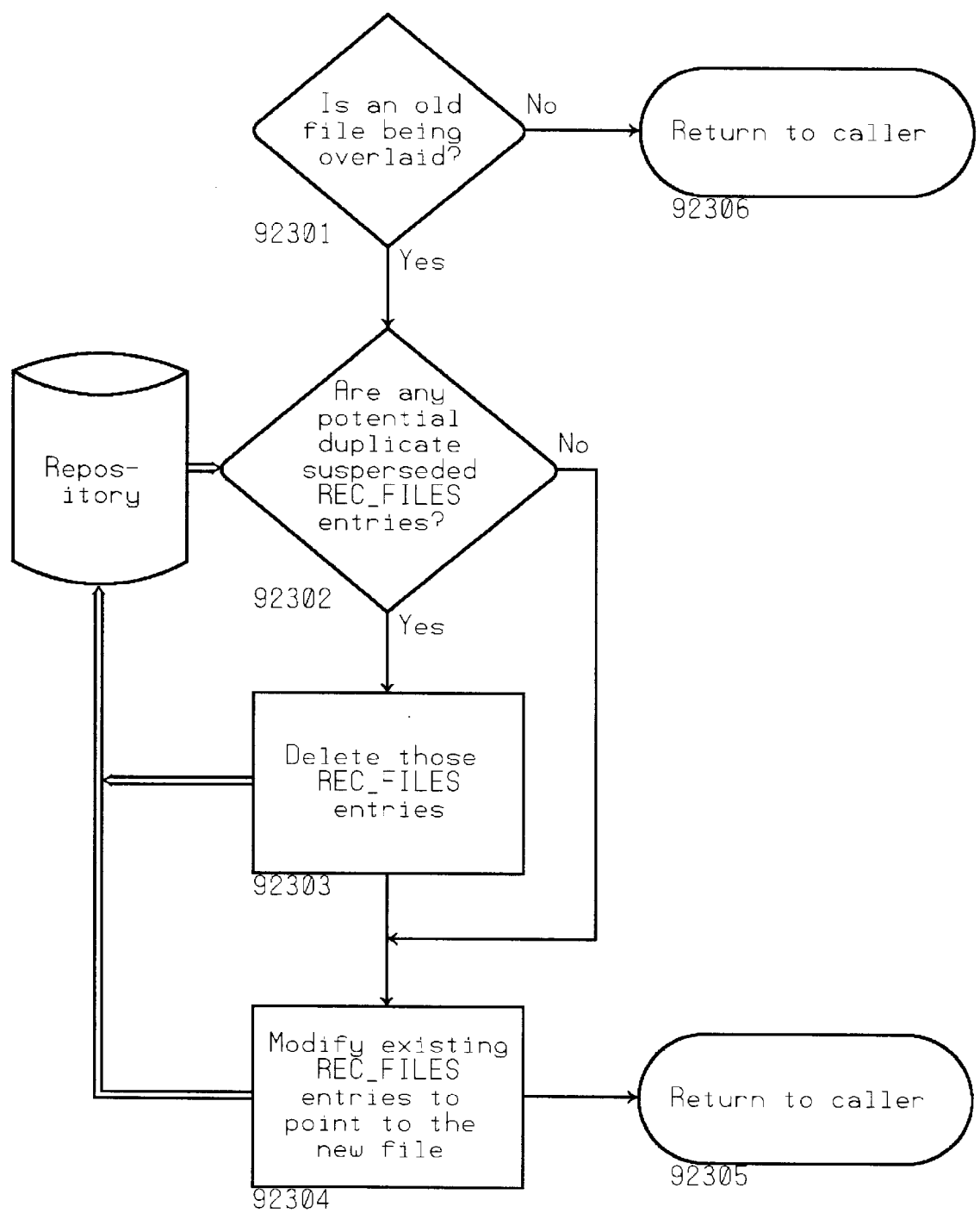
FIG. 18 describes the RECMOD1B Process.

The RECMOD1B Process FIG. 18: This process is used by the Library Manager QRSUPPRM Process (See PO996-0010 Method for Managing Shared Libraries in D) to modify existing REC_FILE entries in the Control. Repository.

First, a check 92301 is made to determine if an old file is being overlaid. If not, the process returns 92306 to the caller. If so, a query 92302 is made to determine if there are any potential duplicate superseded entries in the REC_FILES tables in the Control Repository. If so, delete 92303 those REC_FILES entries. In either case, modify 92304 the remaining REC_FILES entries to point to the new file. Then, the process returns 92305 to the caller.

Figure 19:
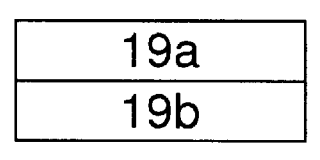
Figure 19A:
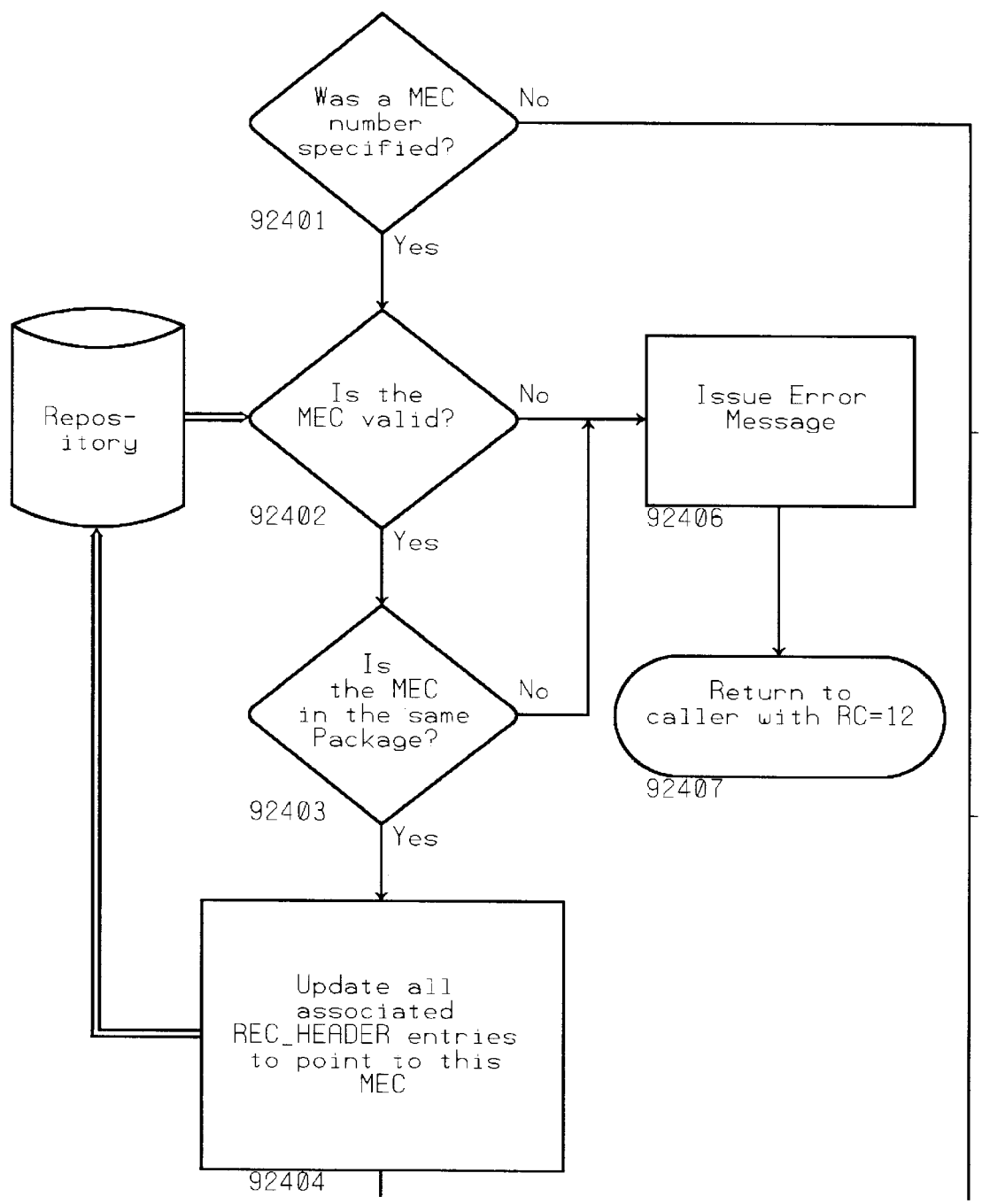
FIGS. 19a and 19b describe the RECMOD2 Process when viewed as laid out as how in FIG. 19.
Figure 19B:
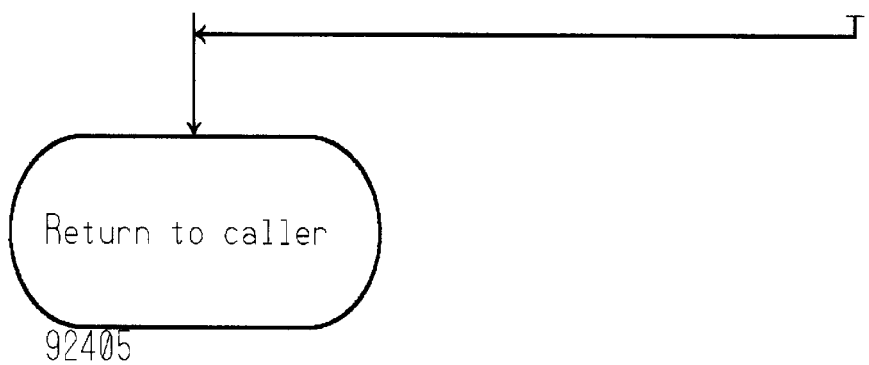
Figure 20A:
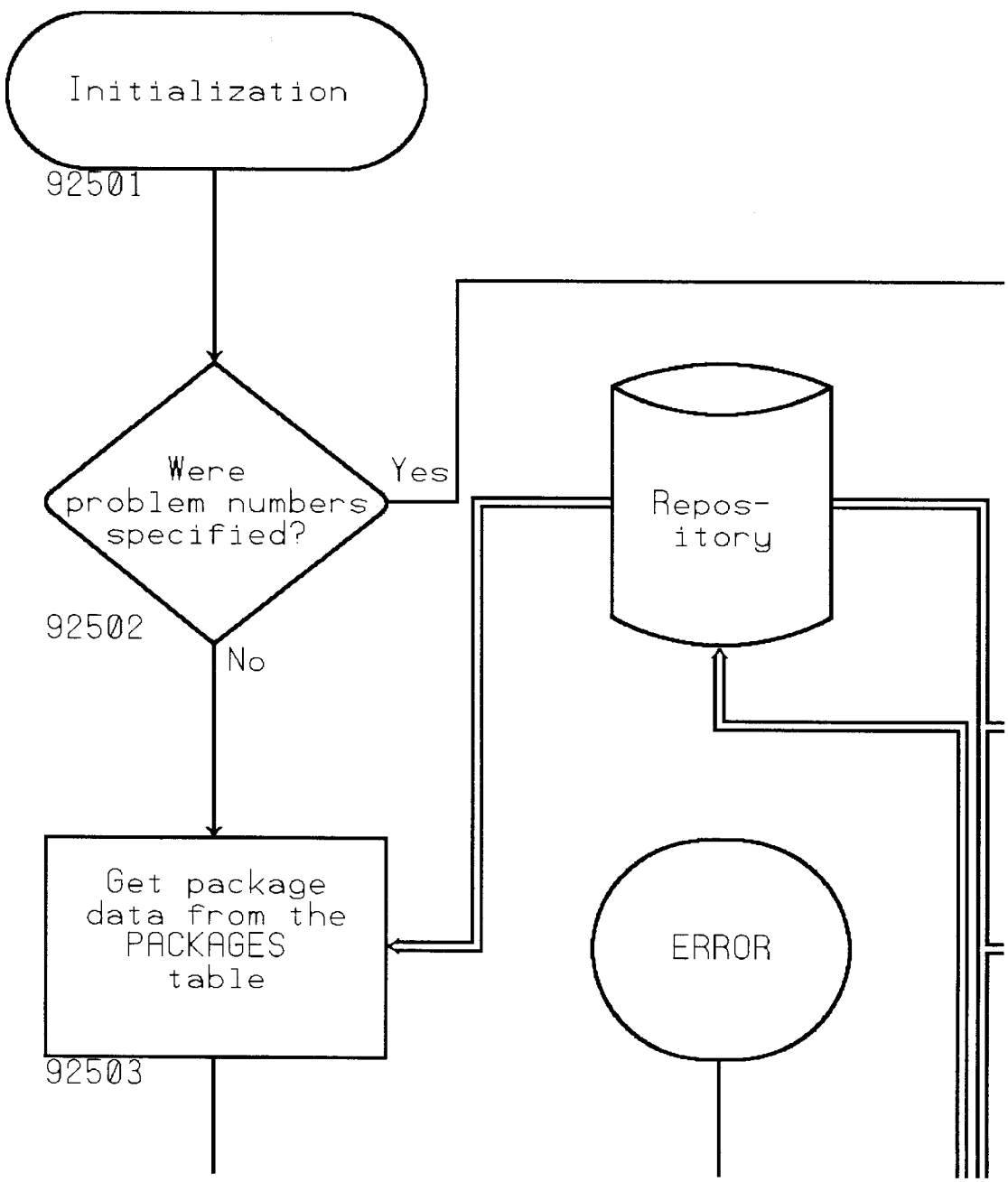
FIGS. 20a thru 20f describe the RECMOD3A Process when viewed as laid out as how in FIG. 20.
Figure 20B:
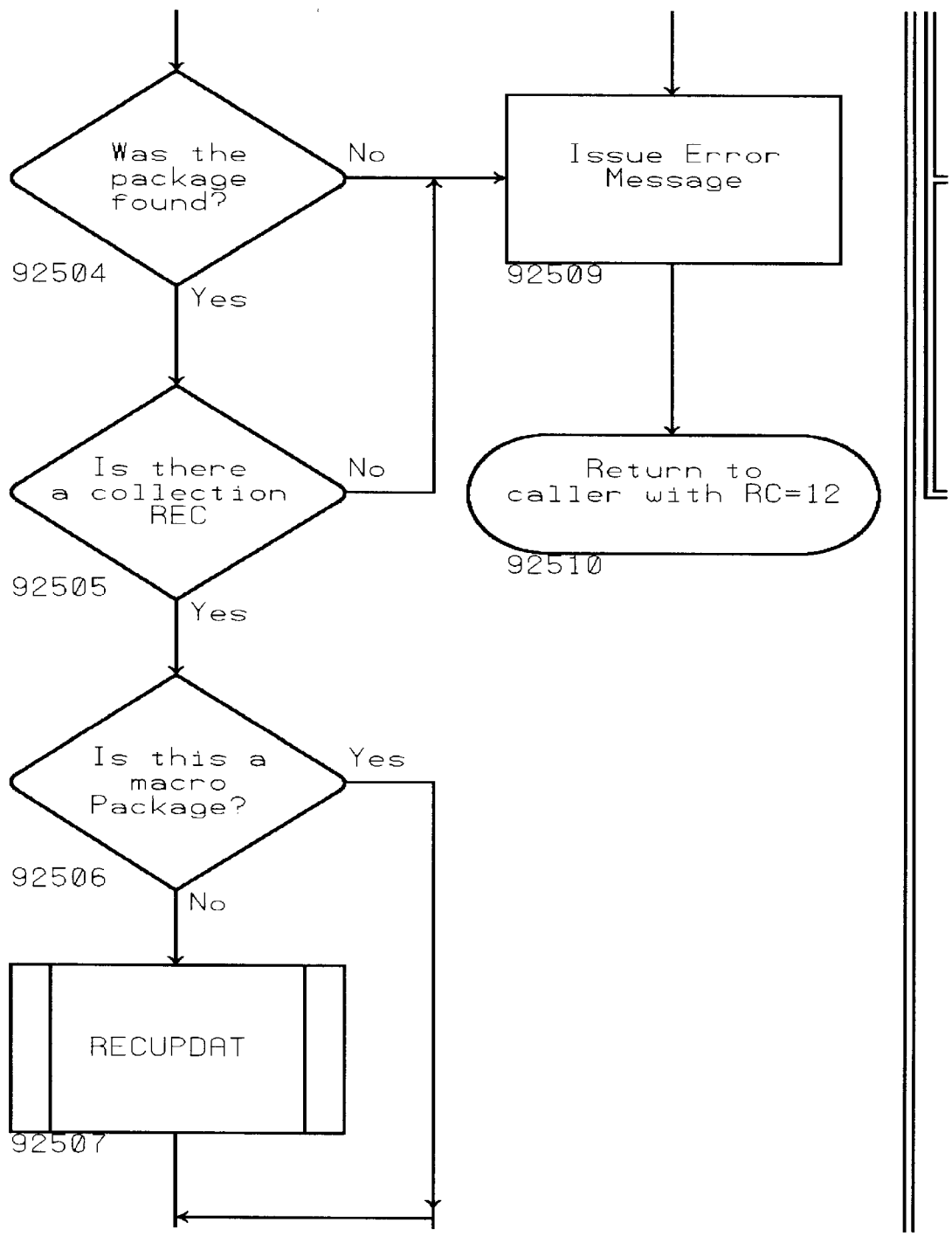
Figure 20C:
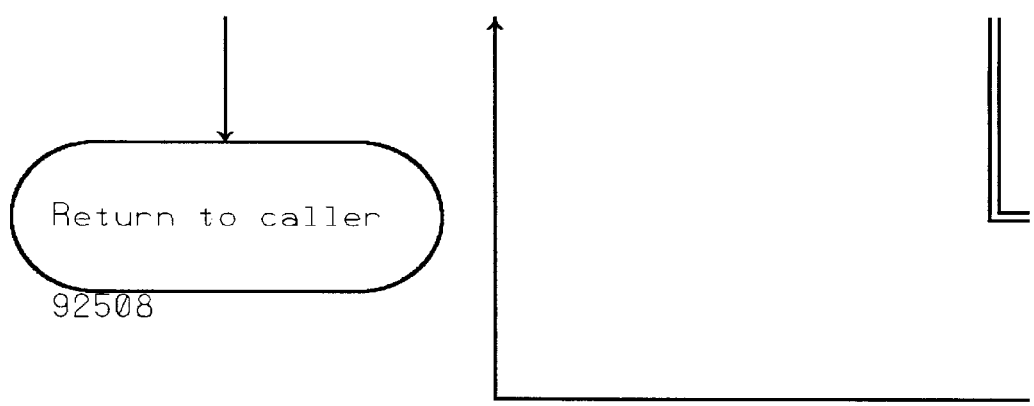
Figure 20D:
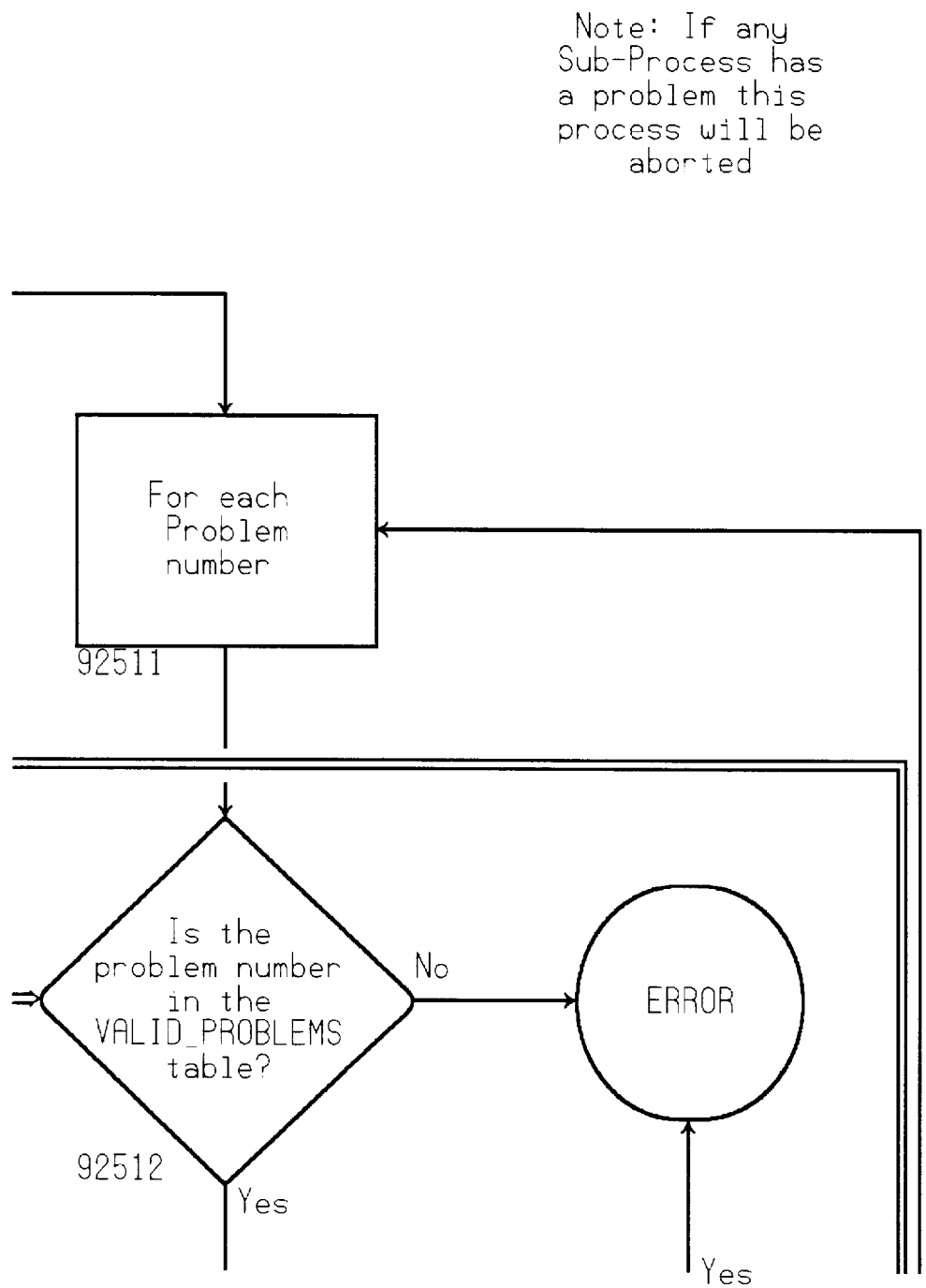
Figure 20E:
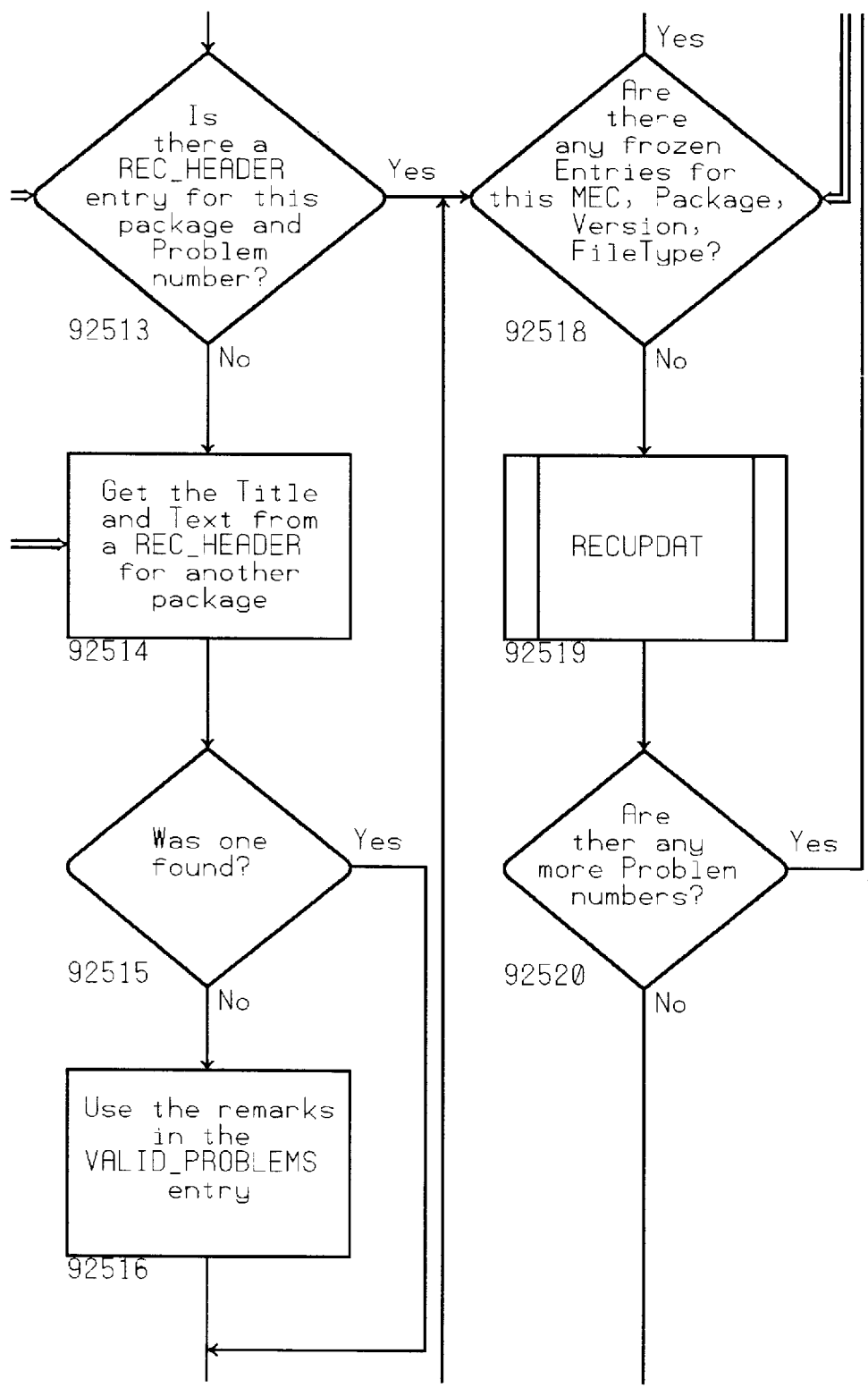
Figure 20F:
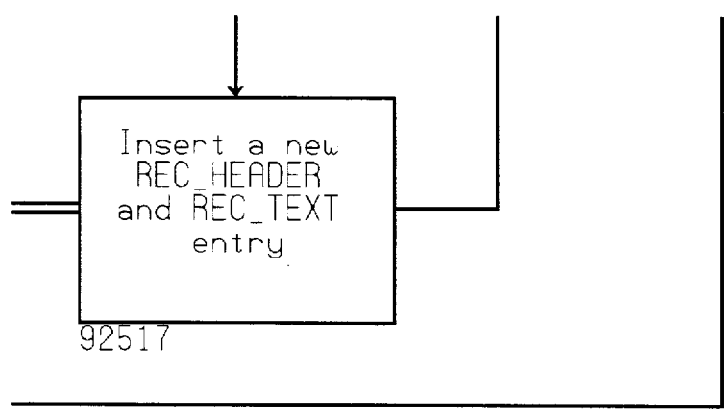

The RECMOD2 Process FIG. 19: This process is used by the Library Manager QRSUPPRM, FIGPRM and MDLPRM Processes (See PO996-0010 Method for Managing Shared Libraries in D). to update REC_HEADER entries in the Control Repository.

First, a check 92401 is made to determine if a MEC number was specified. If not, the process returns 92405 to the caller. If so, a query 92402 is made to determine if the MEC is valid. If not, an error message is issued 92406 and the process returns 92407 to the caller with Return Code=12. If the MEC is valid, a check 92403 is made to determine if the MEC is in the same Package as the file. If not, an error message is issued 92406 and the process returns 92407 to the caller with Return Code=12. If so, update 92404 all associated REC_HEADER entries to point to this MEC. then the process then returns 92405 to the caller.

The RECMOD3A Process FIG. 20: This process is used by the Library Manager QRSUPPUT and FIGPUT Processes (See PO996-0010 Method for Managing Shared Libraries in D). to update REC information in the Control Repository.

Figure 22:
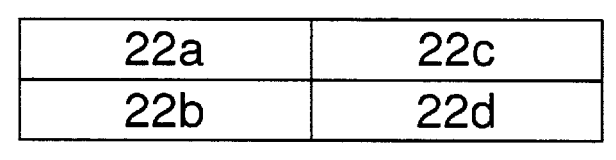

First, a check 92502 is made to determine if any problem numbers were specified. If not, a query 92503 is made to get Package data from the PACKAGES table in the Control Repository. Then, a check 92504 is made to determine if the package was found. If so, an error message is issued 92509 and the process returns 92510 to the caller with Return Code=12. If the package was found, a check 92505 is made to determine if there is a collection REC. If not, an error message is issued 92509 and the process returns 92510 to the caller with Return Code=12. If so, a check 92506 is made to determine if this is a Macro Package. If so, the process returns 92508 to the caller. If not, the RECUPDAT Process described in FIG. 22 is invoked 92507. Upon return the from the above process, the process returns 92508 to the caller.

If problem numbers were specified, for each problem number 92511, a query 92512 is made to determine if the problem number is in the VALID_PROBLEMS table in the Control Repository. If not, an error message is issued 92509 and the process returns 92510 to the caller with Return Code=12. If so, a query 92513 is made to determine if there is an entry in the REC_HEADER table for this Package and problem number. If not, a query 92514 is made to get the Title and text from the REC_HEADER for the problem in a different package. Then, a check 92515 is made to determine if one was found. If not, use 92516 the remarks in found in the VALID_PROBLEMS entry. In either case, insert 92517 a new REC_HEADER and REC_TEXT entry into the Control Repository. If either the insert in the above step was done or if there was a REC_HEADER found in 92513, a query 92518 is made to determine if there are any frozen entries for this MEC, Package, Version and FileType. If so, an error message is issued 92509 and the process returns 92510 to the caller with Return Code=12. If not, the RECUPDAT Process described in FIG. 22 is invoked 92507. Upon return from the above process, a check 92520 is made to determine if there are any more problem numbers. If so, the process flows back to 92511. If not, the process returns 92508 to the caller.

Figure 21:
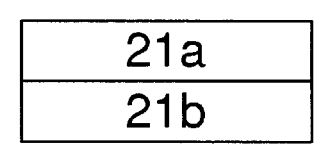
Figure 21A:
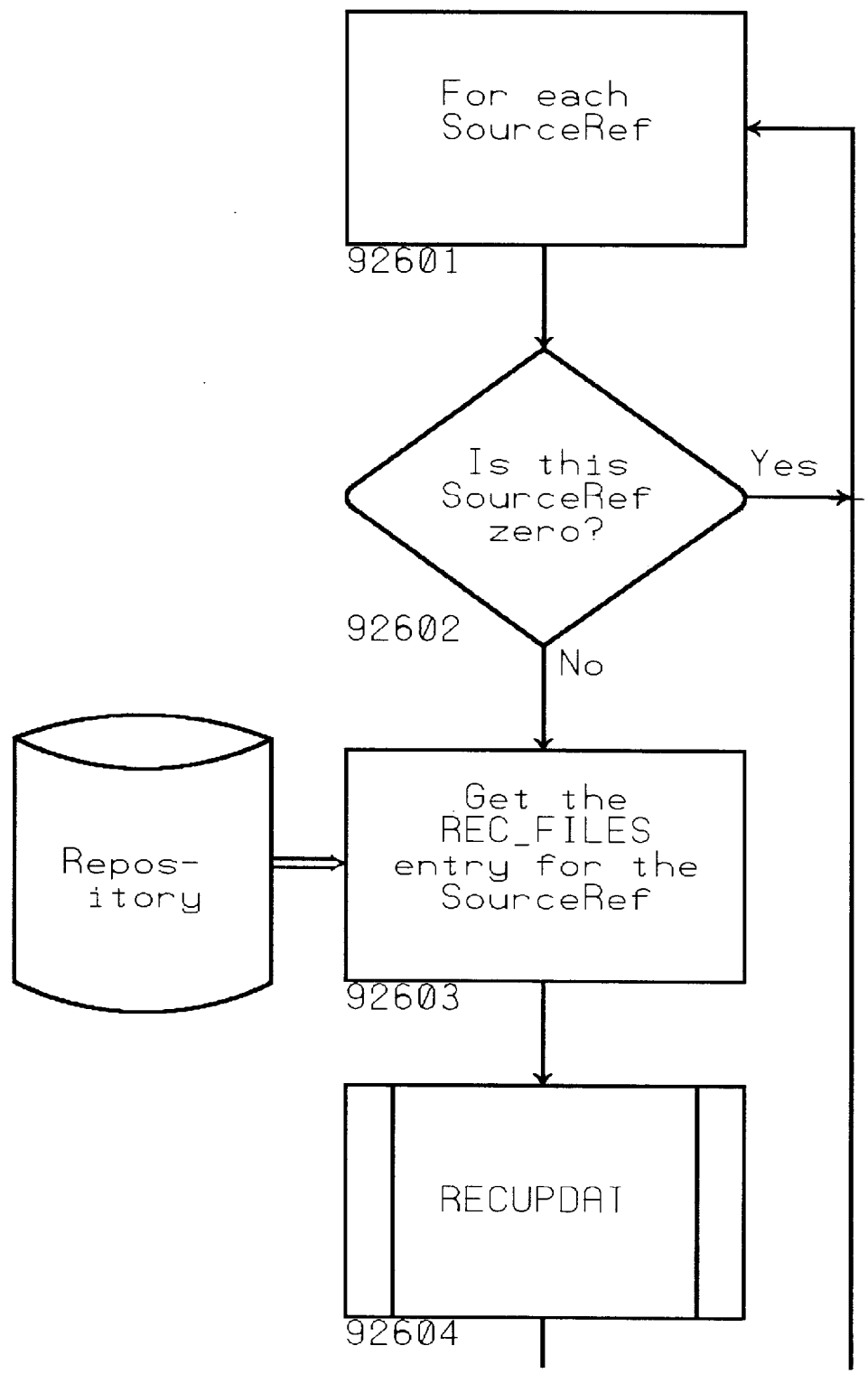
FIGS. 21a and 21b describe the RECMOD3B Process when viewed as laid out as how in FIG. 21.
Figure 21B:
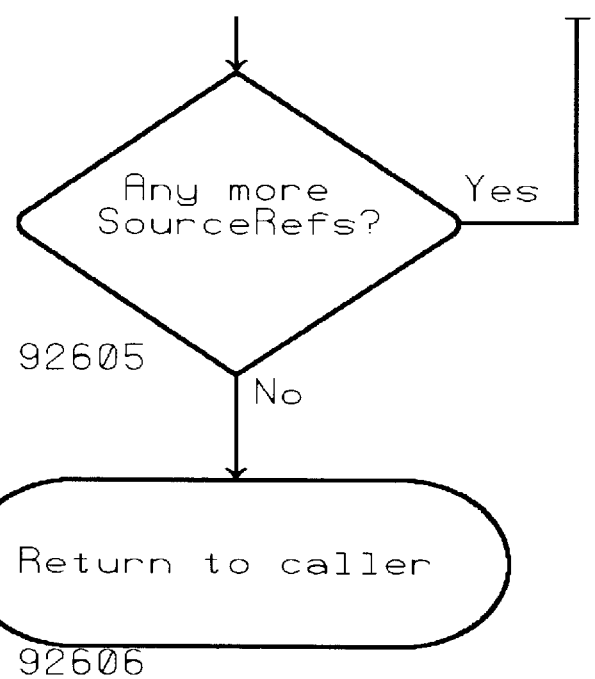
Figure 22A:
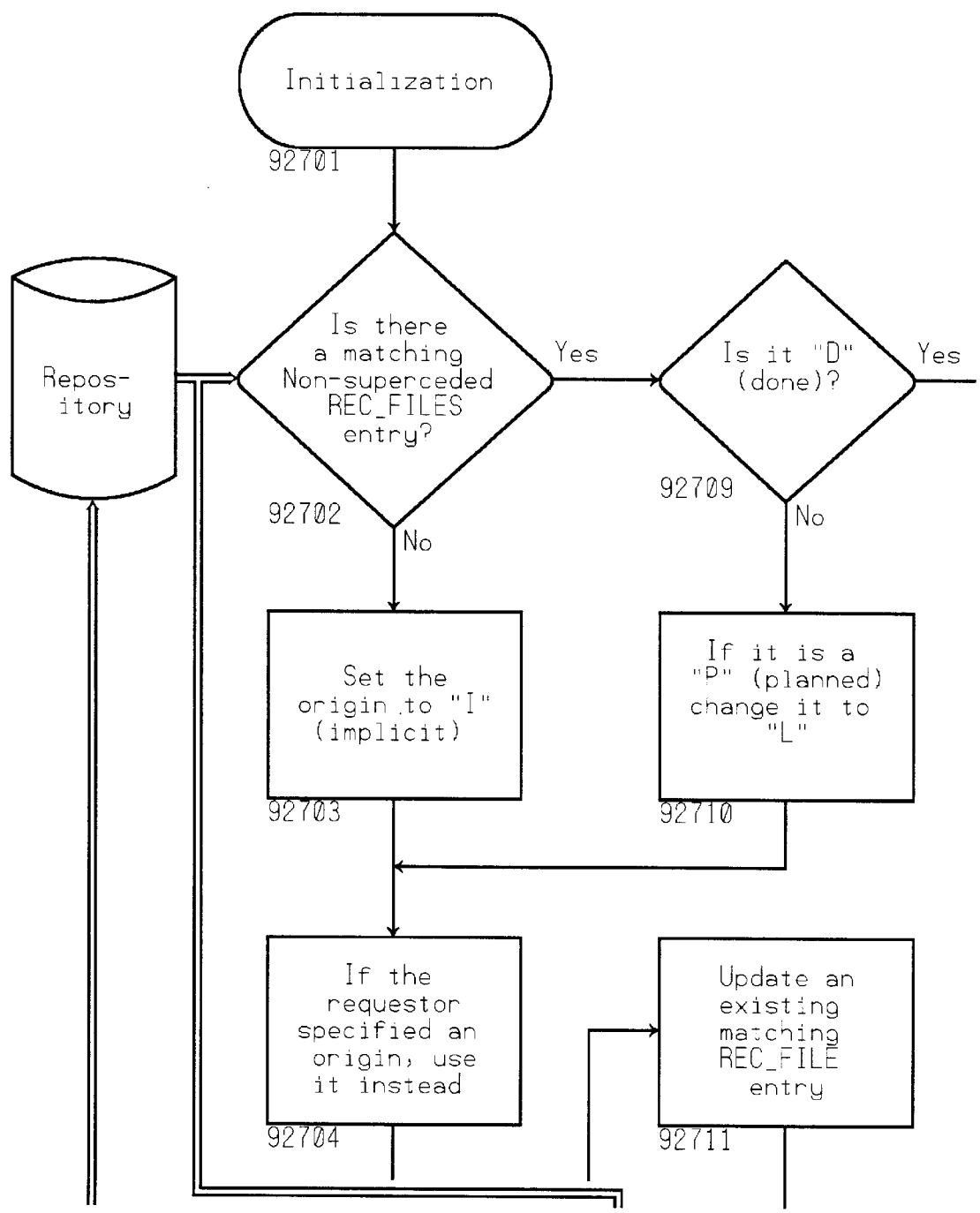
FIGS. 22a thru 22d describe the RECUPDAT Process when viewed as laid out as how in FIG. 22.
Figure 22B:
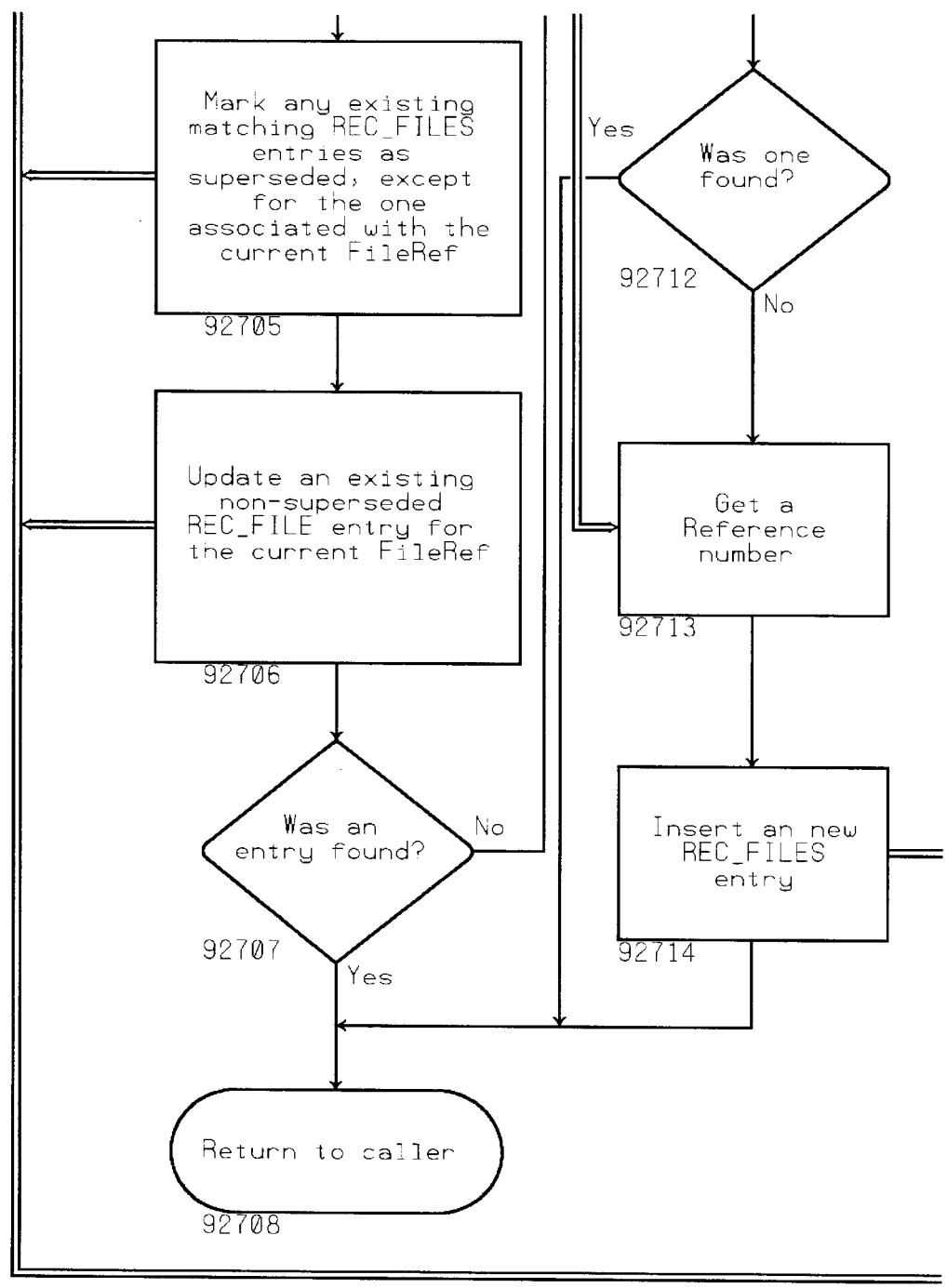
Figure 22C:
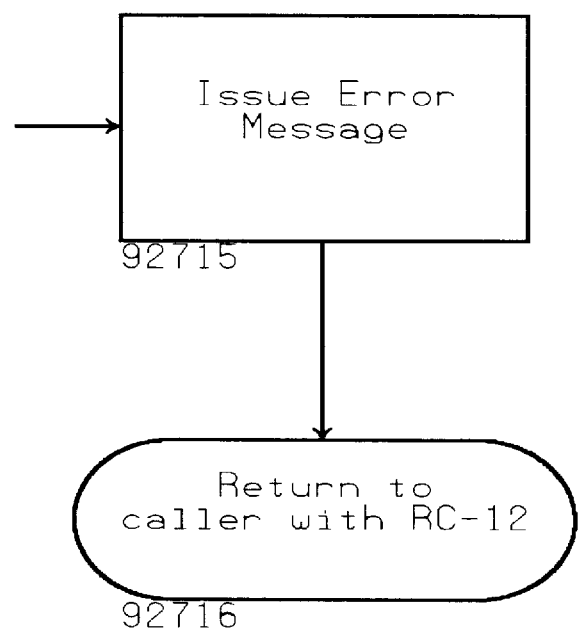
Figure 22D:

The RECMOD3B Process FIG. 21: This process is used by the Library Manager QRSUPGEN, QRSUPPUT and FIGPUT Processes (See PO996-0010 Method for Managing Shared Libraries in D). to update Source References in the Control Repository First, For each SourceRef 92601, a check 92602 is made to determine if the SourceRef is zero. If so, the process flows back to 92601. If not, a query 92603 is made to get the REC_FILES entry for the SourceRef. Then, the RECUPDAT Process described in FIG. 22 is invoked 92604. Upon return from the above process, a check 92605 is made to determine if there are any more SourceRefs. If so, the process flows back to 92601. If not, the process returns 92606 to the caller.

The RECUPDAT Process FIG. 22. This process is used by the Library Manager RECMOD3A and RECMOD3B Processes to update REC_FILES entries.

After initialization, a query 92702 is made to determine if there are any matching non-superseded REC_FILES entries in the Control Repository. If not, set 92703 the origin to "I" (implicit). If so, a check 92709 is made to determine if it is a "D" (Done) entry. If so, an error message is issued 92715 and the process returns 92716 to the caller with Return Code =12. If it is not a "D" entry, and it is a "P" (planned) set 92710 the origin to "L" (libraried). In any case, if the requester specified an origin, use 92704 it instead. Next, mark 92705 any existing matching REC_FILES entries in the Control Repository as superseded except the one for the current FileRef. Then, update 92706 any existing non-superseded REC_FILES entries for the current FileRef. Then, a check 92707 is made to determine if an entry was found. If so, the process returns 92708 to the caller. If not, update 92711 an existing matching REC_FILE entry. Next, a check 92712 is made to determine if an entry was found. If so, the process returns 92708 to the caller. If not, a query 92713 is made to get a Reference number. Then, insert 92714 a new entry into the REC_FILES table in the Control Repository. Then, the process returns 92708 to the caller.

Figure 23:
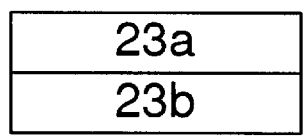
FIG. 23 shows how to layout FIGS. 23a and 23b to obtain a unified view of the dataflow for the process shown in FIGS. 23a and 23b.
Figure 23A:
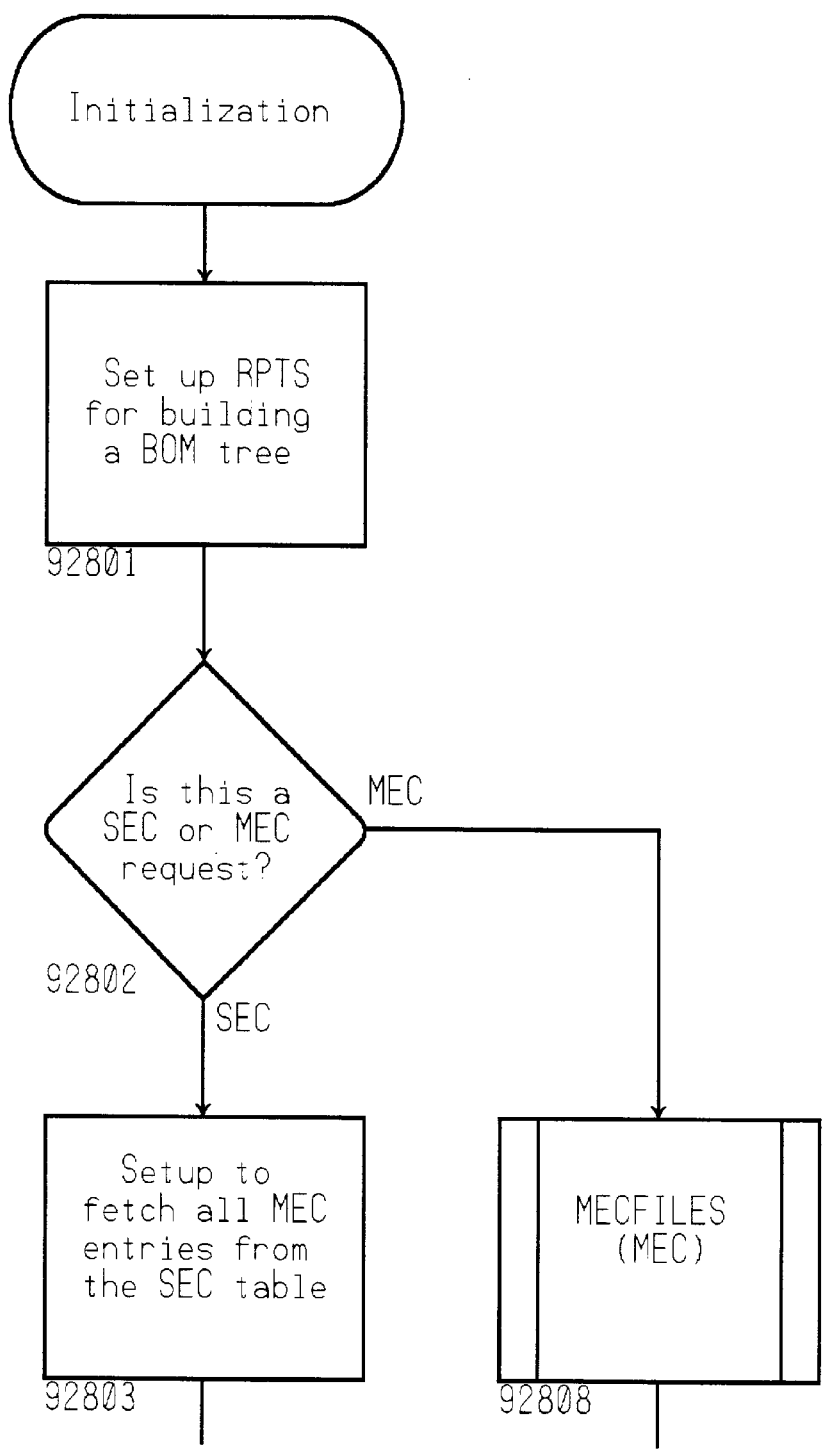
FIGS. 23a and 23b describe the QRBOMGET Process when viewed as laid out as how in FIG. 23.
Figure 23B:
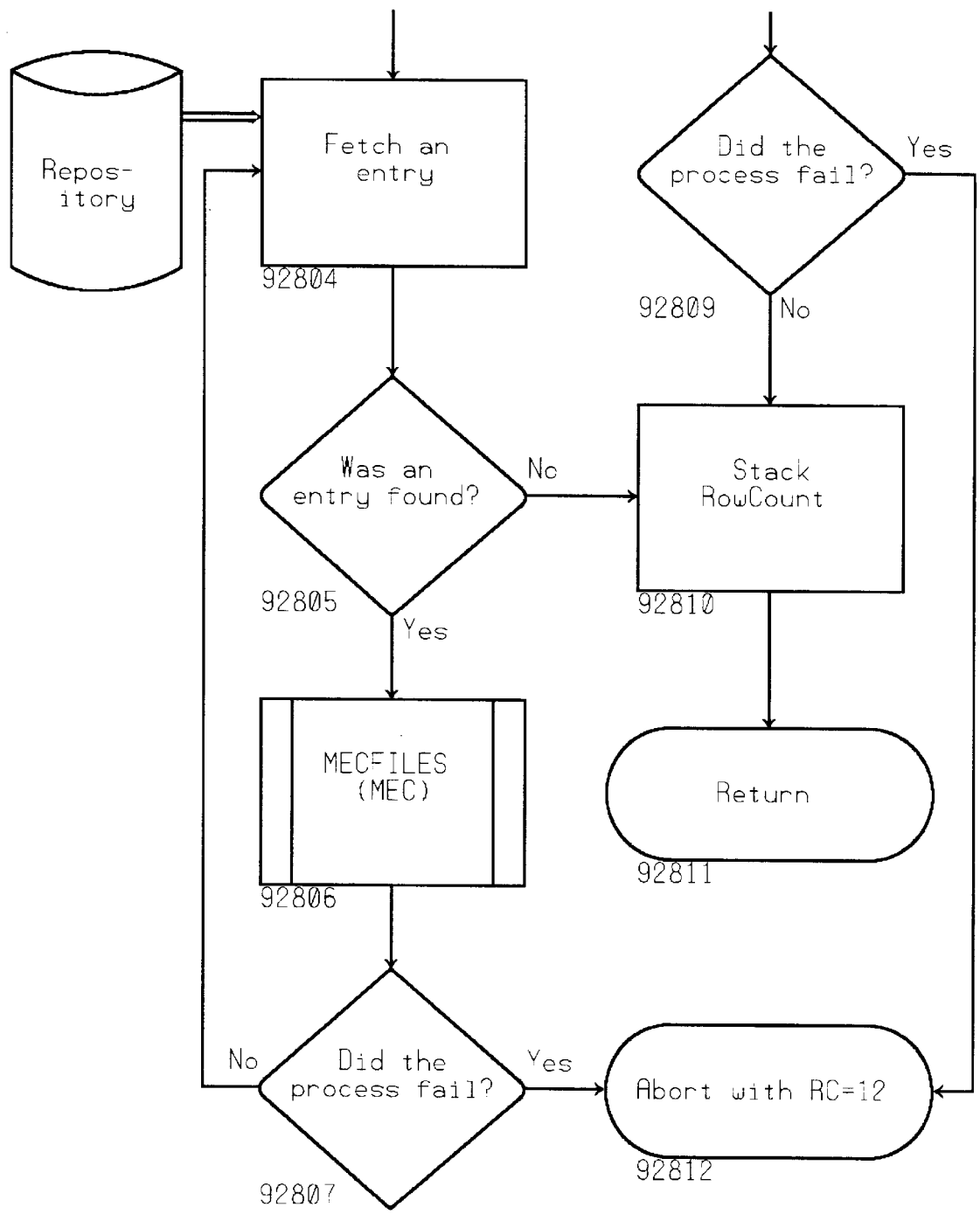
Figure 24A:
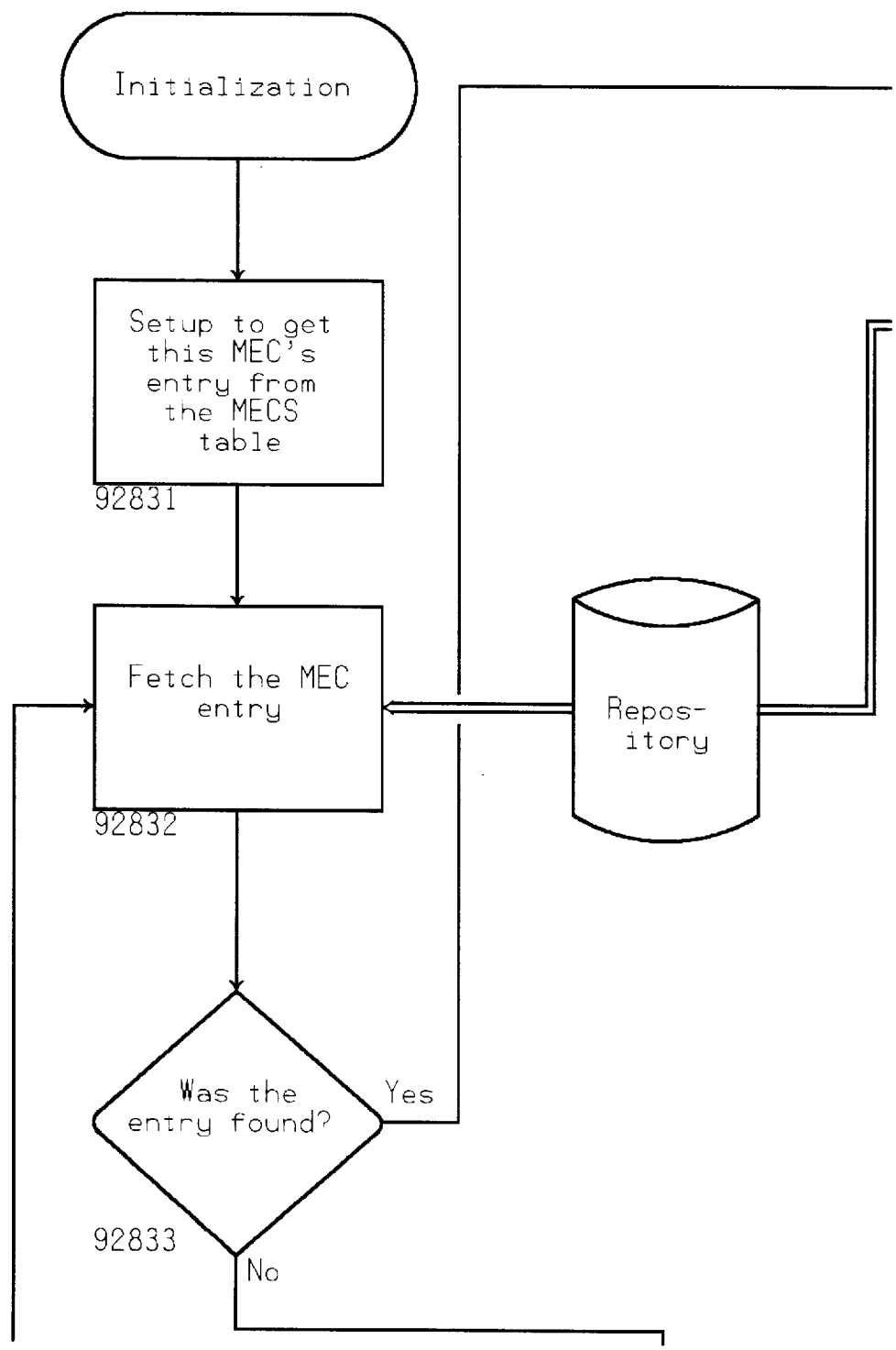
FIGS. 24a thru 24d describe the MECFILES Process when viewed as laid out as how in FIG. 24.
Figure 24B:
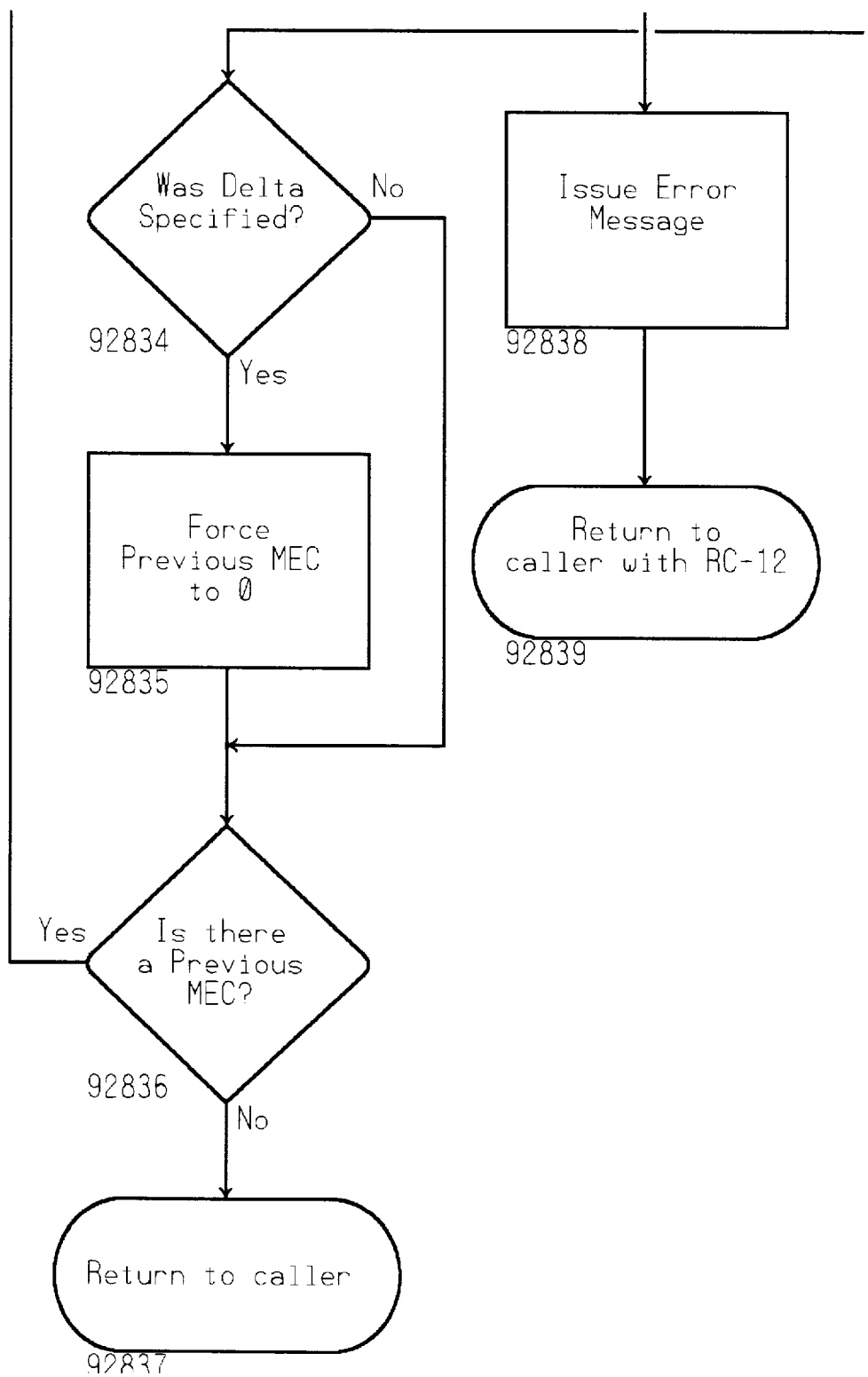
Figure 24C:
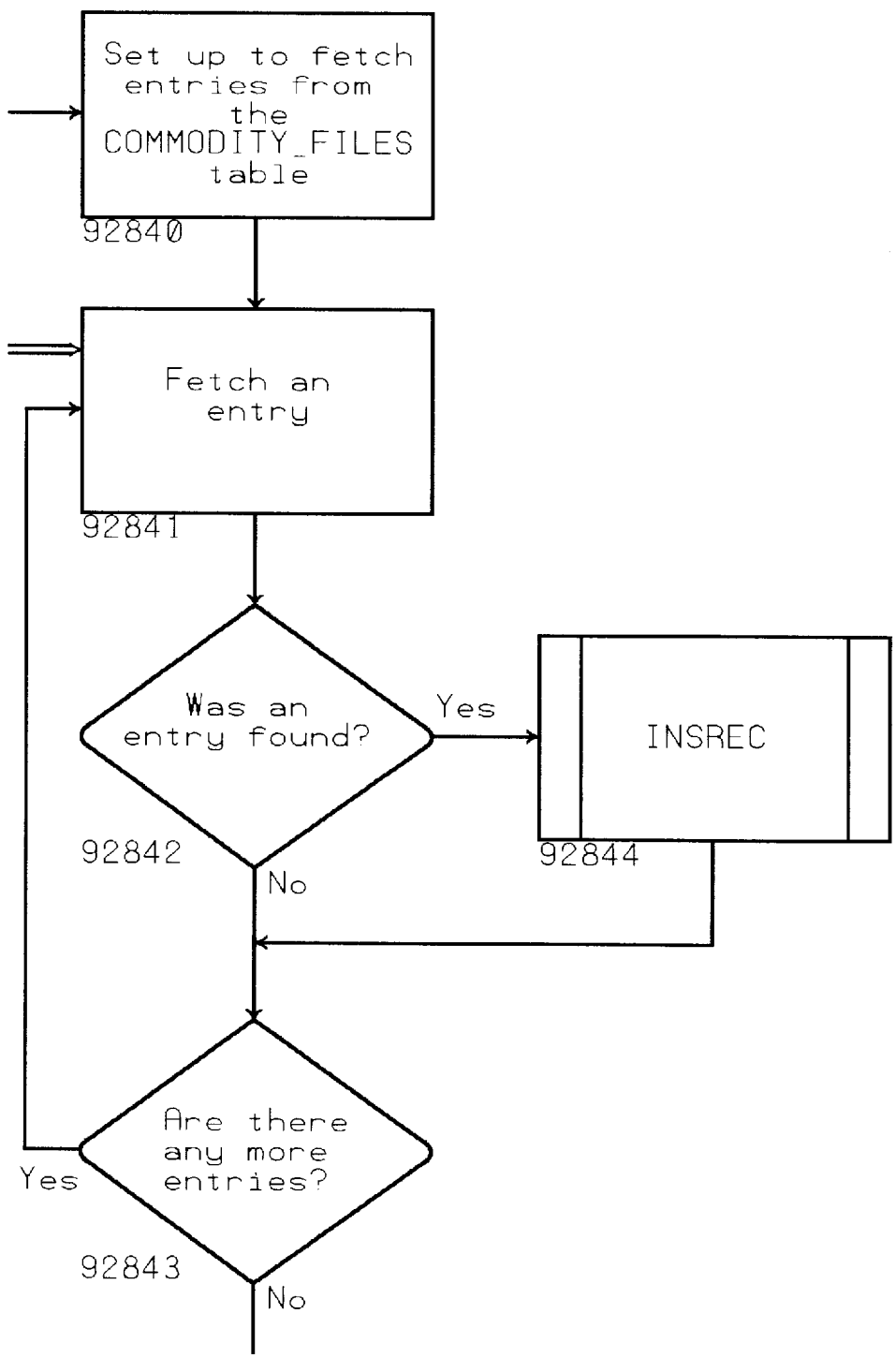
Figure 24D:

The QRBOMGET Process FIG. 23: The QRBOMGET process is used to get a bill-of-materials list for the selected SEC or MEC. Only libraried files will be returned.

After initialization, setup 92801 RPTS for building the BOM Tree. Next, a check 92802 is made to determine if this is a SEC or MEC request. If a SEC request, setup 92803 to fetch all MEC entries from the SEC table in the Control Repository. Next, a query 92804 is made to get the MEC entry from the SEC table in the Control Repository. Then, a check 92805 is made to determine if an entry was found. If not, stack 92810 the RowCount. Then, the process returns 92811 to the caller. If so, the MECFILES Process described in FIG. 24 is invoked 92806. Upon return from the above process, a check 92807 is made to determine if the process failed. If so, abort 92812 with Return Code=12. If not, the process flows back to 92804. If MEC was specified, the MECFILES Process described in FIG. 24 is invoked 92808. Upon return from the above process, a check 92809 is made to determine if the process failed. If so, abort 92812 with Return Code=12. If not, stack 92810 the RowCount. Then, the process returns 92811 to the caller.

The MECFILES Process FIG. 24: This process is used by the QRBOMGET Process to get the files associated with a MEC.

Figure 25:
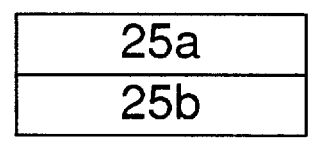
Figure 25A:
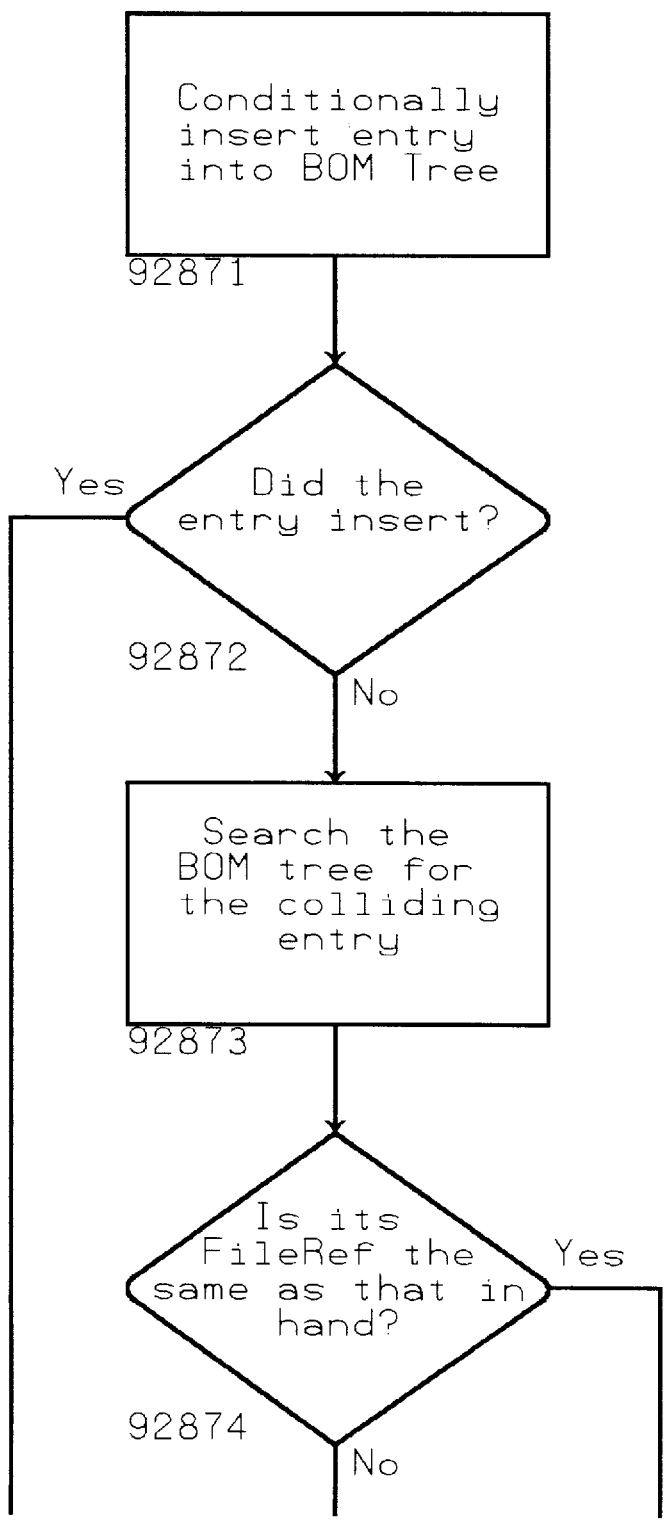
FIGS. 25a and 25b describe the INSREC Process when viewed as laid out as how in FIG. 25.
Figure 25B:
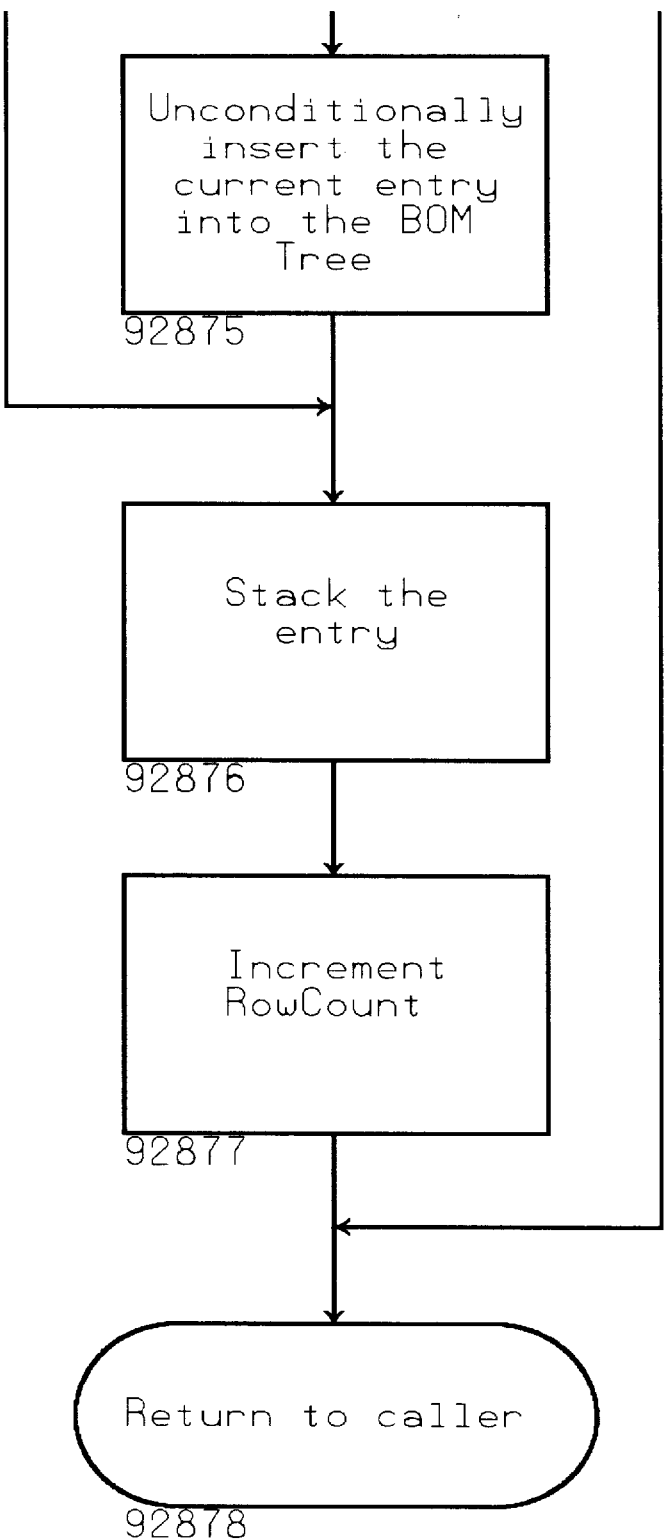
Figure 26A:
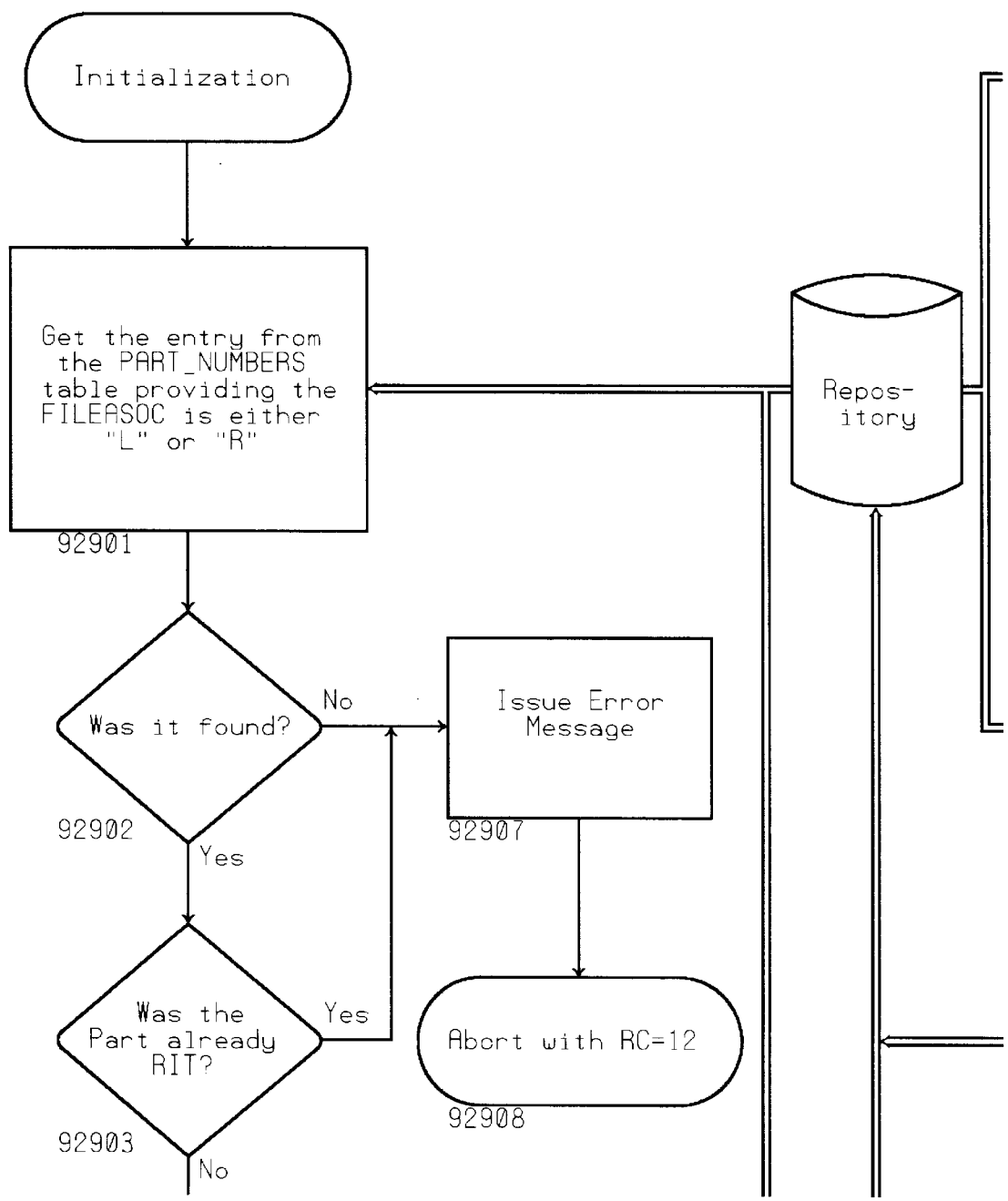
FIGS. 26a thru 26d describe the QRFILRIT Process when viewed as laid out as how in FIG. 26.
Figure 26B:
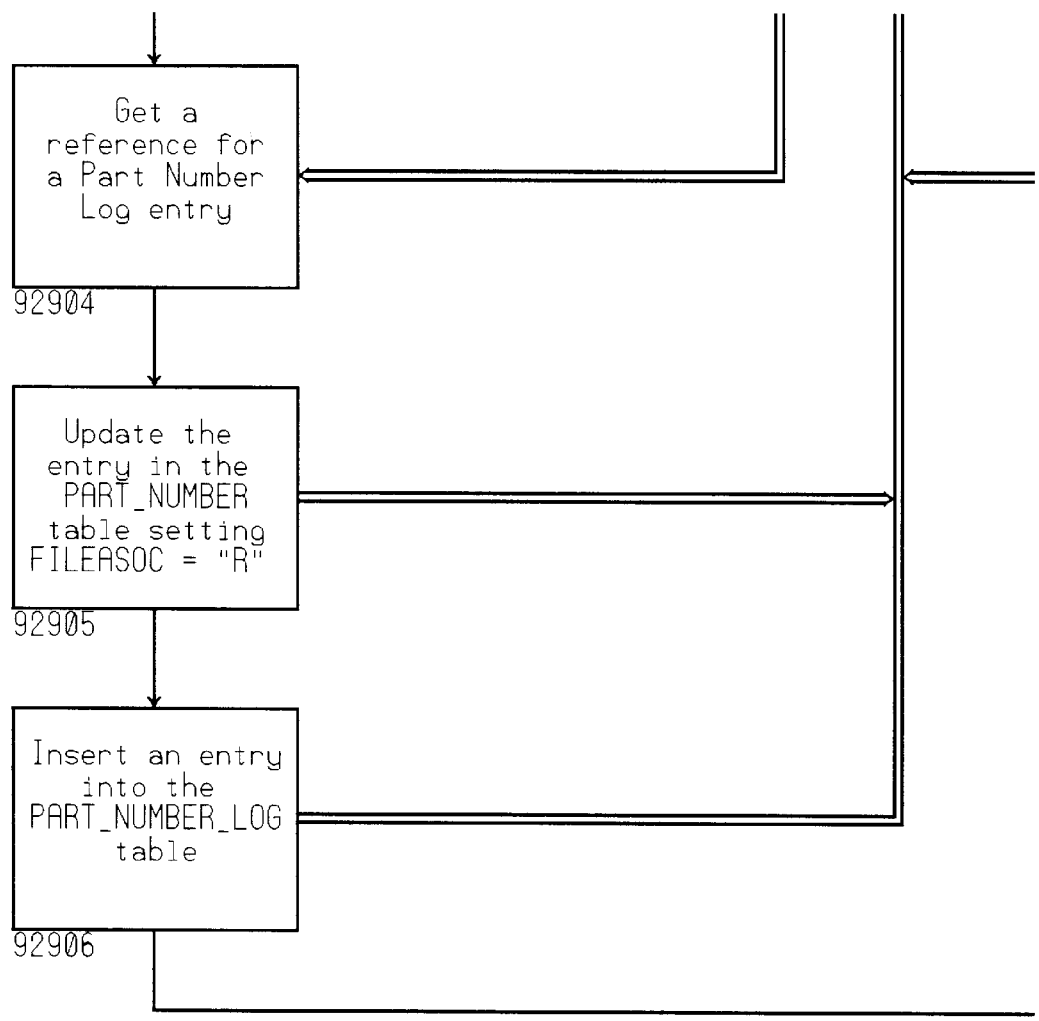
Figure 26C:
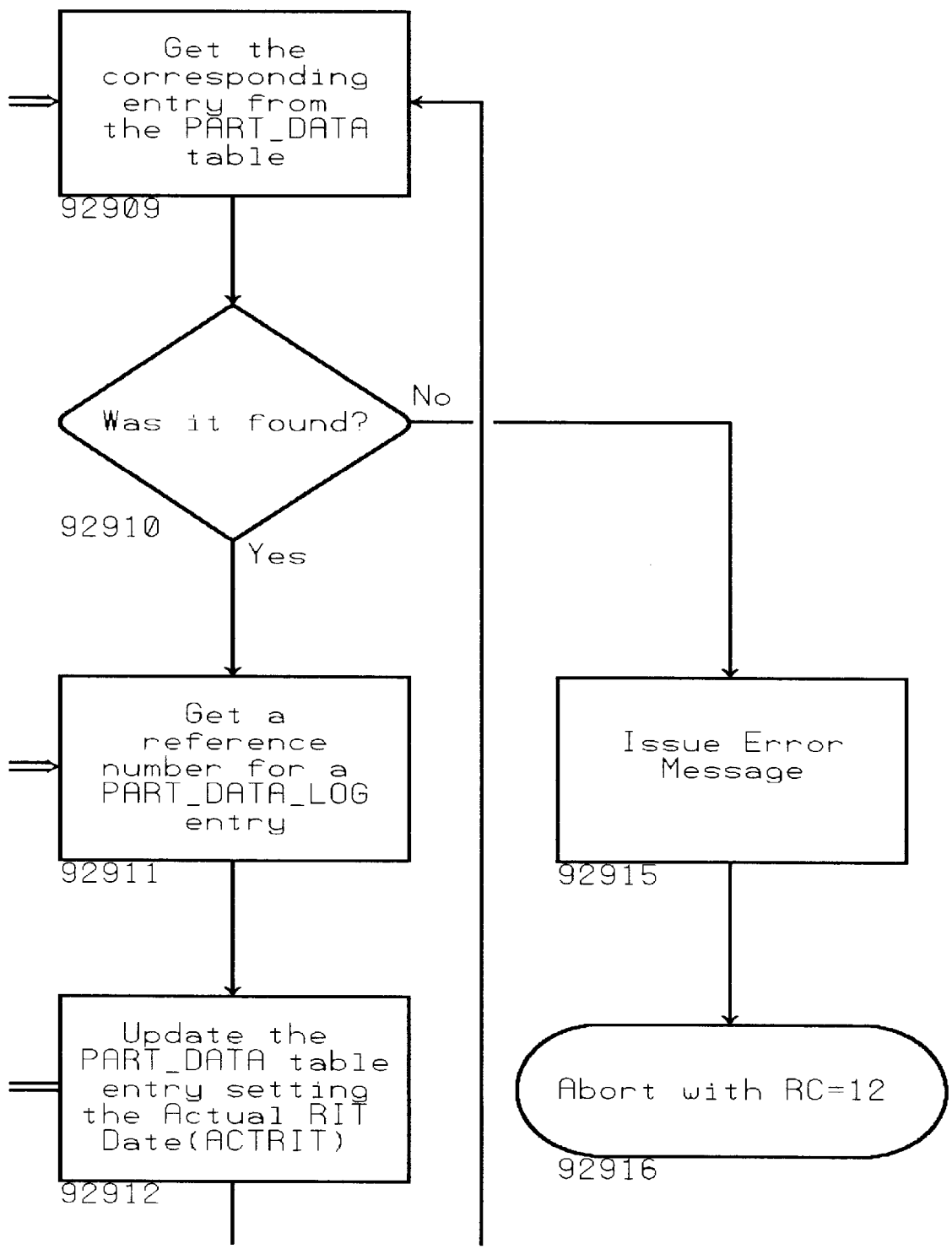
Figure 26D:
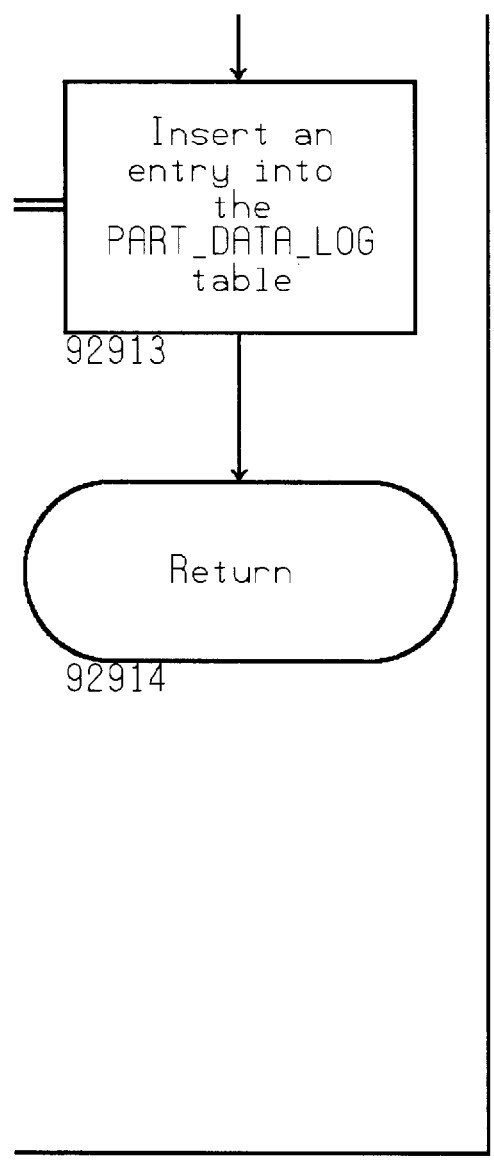
Figure 27A:
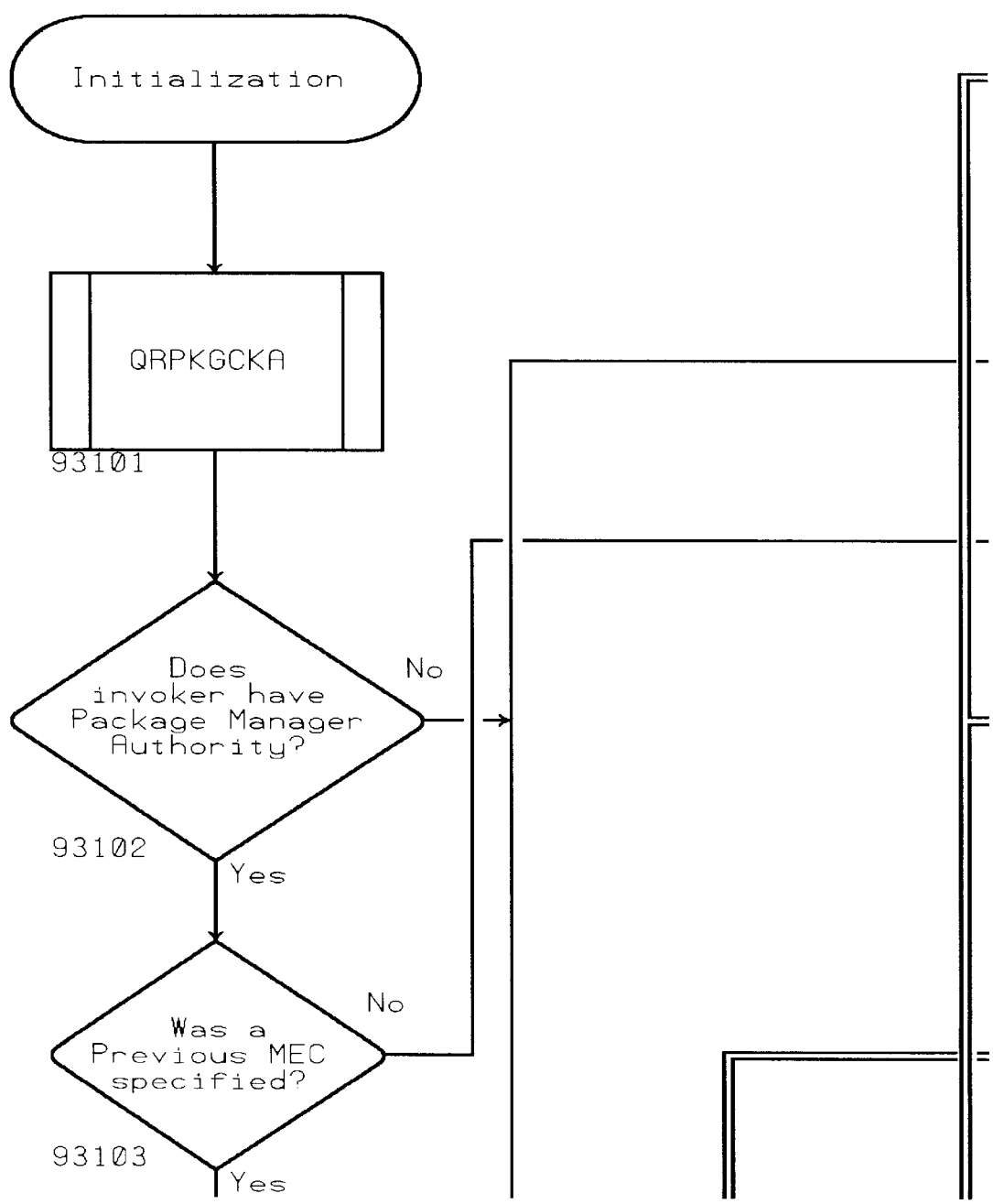
FIGS. 27a thru 27d describe the QRMECGEN Process when viewed as laid out as how in FIG. 27.
Figure 27B:
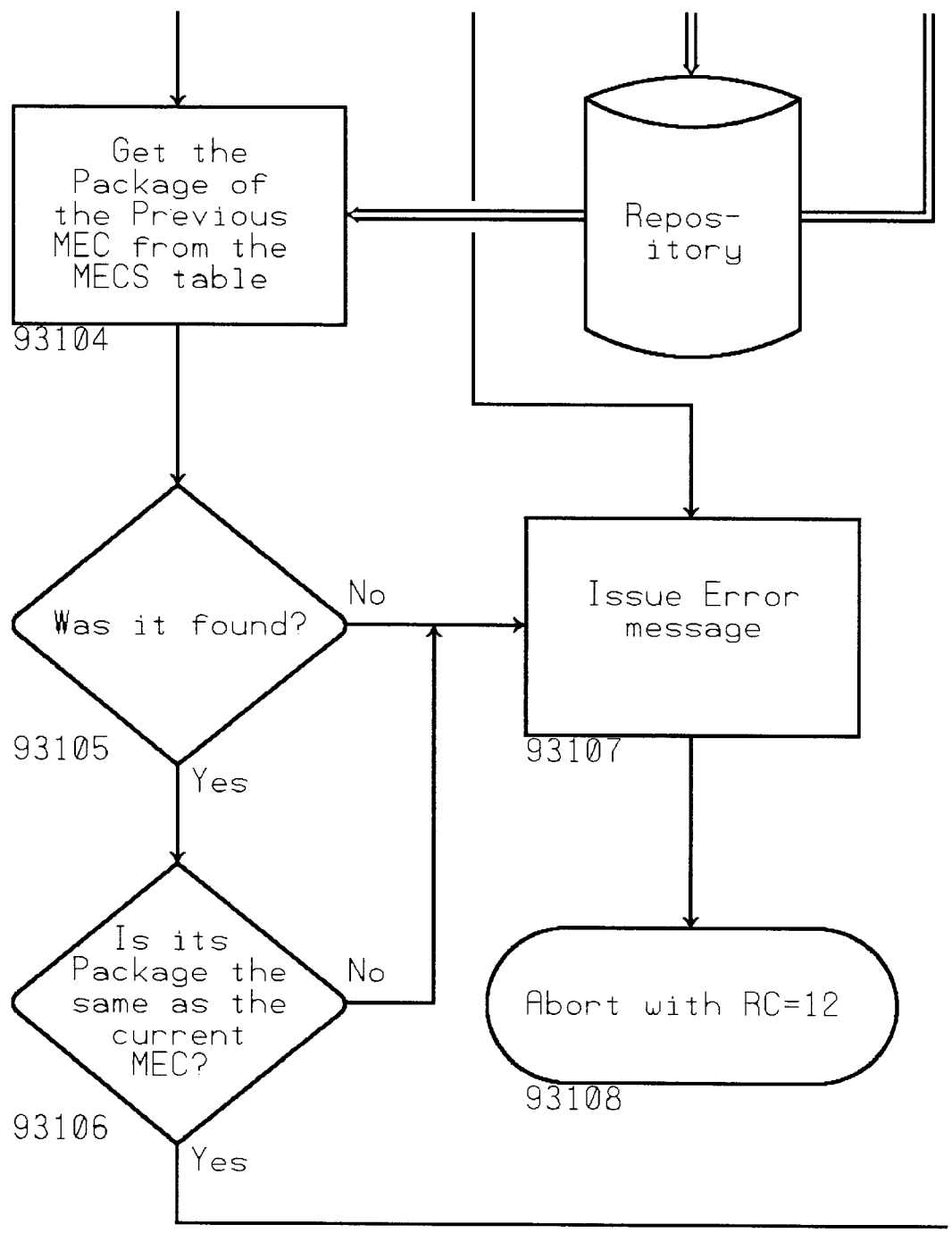
Figure 27C:
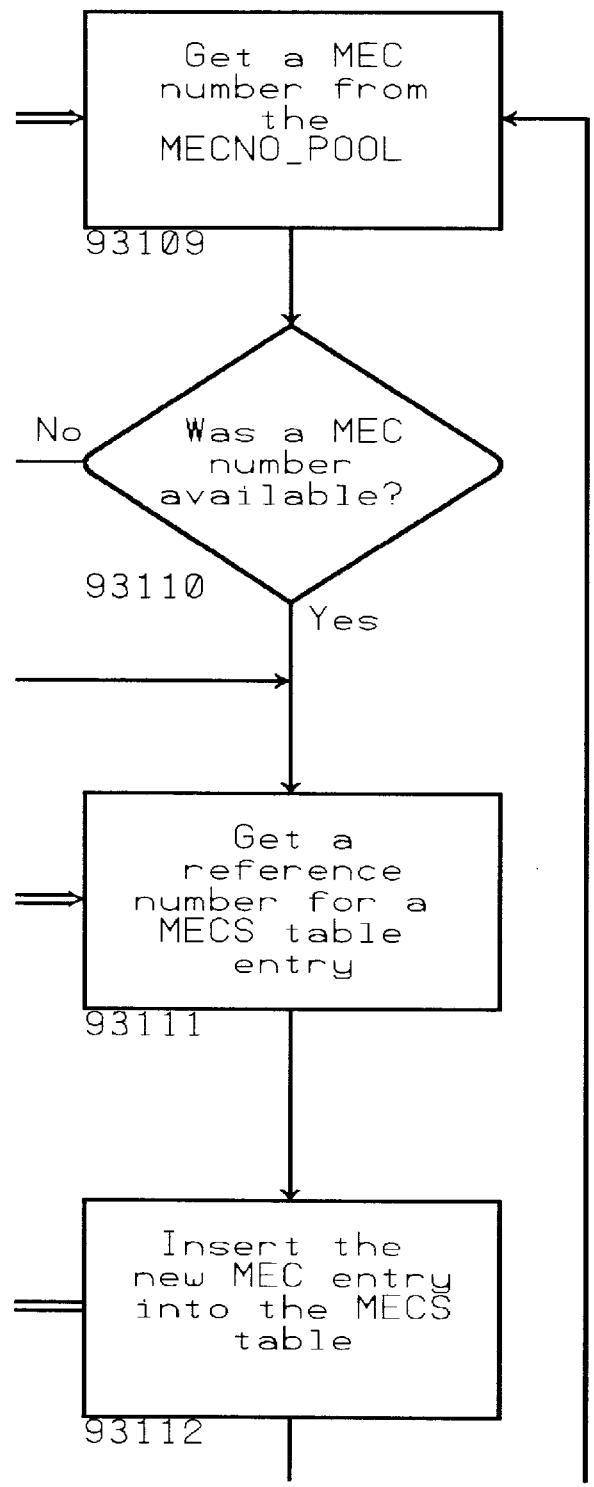
Figure 27D:
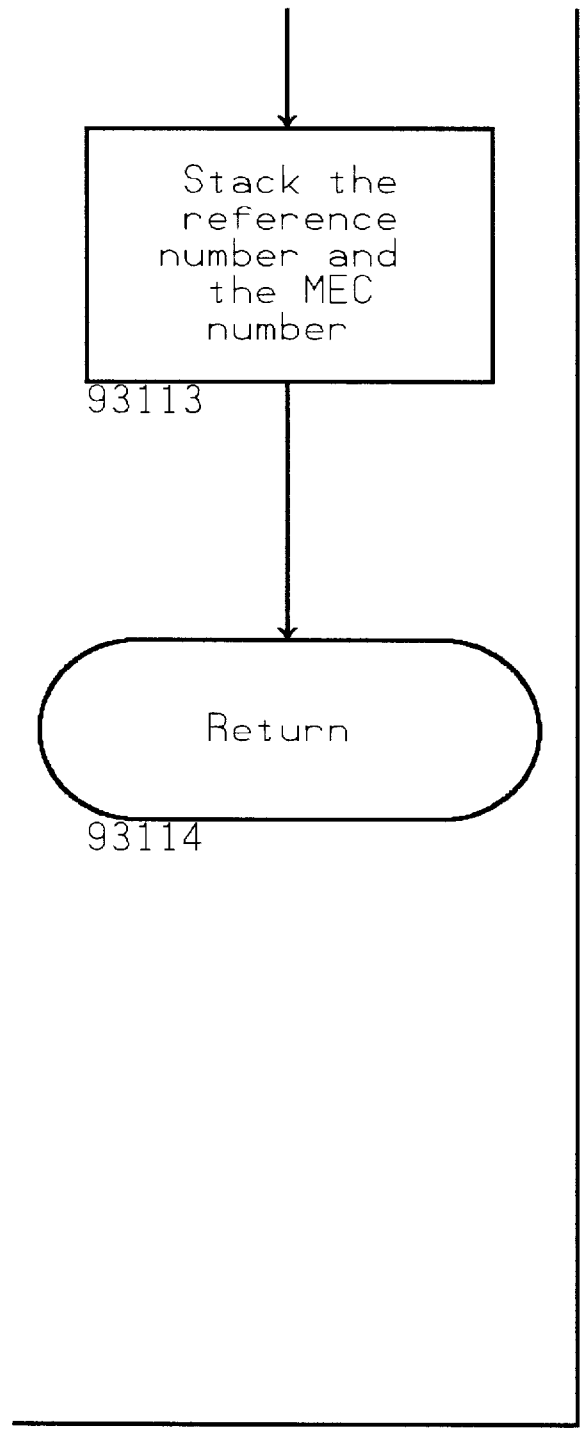

After initialization, setup 92831 to get this MEC's entry from the MECS table in the Control Repository. Then, a query 92832 is made to get the entry from the MECS table in the Control Repository. Next, a check 92833 is made to determine if the entry was found. If not, an error message is issued 92838. Then, the process returns 92839 to the caller with Return Code=12. If so, set up 92840 to fetch entries from the COMMODITY_FILES table. Then, a query 92841 is made to get an entry from the COMMODITY_FILES table in the Control Repository. Next, a check 92842 is made to determine if an entry was found. If so, the INSREC Process described in FIG. 25 is invoked 92844. In either case, a check 92843 is made to determine if there are any more entries. If so, the process flows back to 92841. If not, a check 92834 is made to determine if DELTA was specified. If so, force 92835 the Previous MEC to 0. In either case, a check 92836 is made to determine if there is a Previous MEC. If so, the process flows back to 92832. If not, the process returns 92837 to the caller.

The INSREC Process FIG. 25: This process is used to by the MECFILES Process to insert records into the BOM tree and to stack the unique records found.

First, conditionally insert 92871 the entry into the BOM tree. Next, a check 92872 is made to determine if the insert took place. If not, search 92873 the BOM tree for the colliding entry. Then, a check 92874 is made to determine if its FileRef is the same as the FileRef of the entry in hand. If so, the process returns 92878 to the caller. If not, unconditionally insert 92875 the current entry into the BOM tree. Then, stack 92876 the entry and increment 92877 the RowCount and the process returns 92878 to the caller. If the conditional insert did take place, the process flows back to 92876.

The QRFILRIT Process FIG. 26: This process is used to record that RIT has taken place for a given file.

After initialization, a query 92901 is made to get the entry from the PART_NUMBERS table in the Control Repository which have FILEASOC of "L" or "R". Next, a check 92902 is made to determine if the entry was found. If not, an error message is issued 92907 and the process aborted 92908 with Return Code=12. If the entry was found, a check 92903 is made to determine if the part was already RIT. If so, an error message is issued 92907 and the process aborted 92908 with Return Code=12. If not, a query 92904 is made to get a reference number forro a Part Number Log entry. Next, update 92905 the entry in the PART_NUMBER table in the Control Repository setting FILEASOC to "R". Next, insert 92906 an entry into the PART_NUMBER_LOG table in the Control Repository. Then, a query 92909 is made to get the corresponding entry from the PART_DATA table. Next, a check 92910 is made to determine if the entry was found. If not, an error message is issued 92915 and the process aborted 92916 with Return Code=12. If it was found, a query 92911 is made to get a reference number for a Part Data Log entry. Then, Update 92912 the PART_DATA table entry setting the Actual RIT date(ACT_RITDATE). Next, insert 92913 an entry into the PART_DATA_LOG table in the Control Repository. Then, the process returns 92914 to the caller.

The QRMECGEN Process FIG. 27: The QRMECGEN process is used to add a new MEC entry into the data base.

After initialization, the QRPKGCKA Process described in FIG. 41500 in PO996-0007 Data Management and Design Control System is invoked 93101. Upon return from the above process, a check 93102 is made to determine if the invoker has Package Manager Authority. If not, an error message is issued 93107 and the process aborted 93108 with Return Code=12. If so, a check 93103 is made to determine if a Previous MEC was specified. If so, a query 93104 is made to get the Package of the Previous MEC from the MECS table in the Control Repository. Then, a check 93105 is made to determine if the entry was found. If not, an error message is issued 93107 and the process aborted 93108 with Return Code=12. If it was found, a check 93106 is made to determine if its Package is the same as that of the current MEC. If not, an error message is issued 93107 and the process aborted 93108 with Return Code=12. If so, a query 93109 is made to get a MEC number from the MECNO_POOL table in the Control Repository. Next, a check 93110 is made to determine if a MEC number was available. If not, an error message is issued 93107 and the process aborted 93108 with Return Code=12. If it was available, or if a Previous MEC was not specified, a query 93111 is made to get a reference number for a MECs table entry. Then, insert 93112 the new entry in the MECS table. Next, stack 93113 the reference number and the MEC number. Then, the process returns 93114 to the caller.

Figure 28:
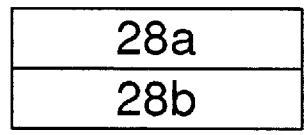
FIG. 28 shows how to layout FIGS. 28a and 28b to obtain a unified view of the dataflow for the process shown in FIGS. 28a and 28b.
Figure 28A:
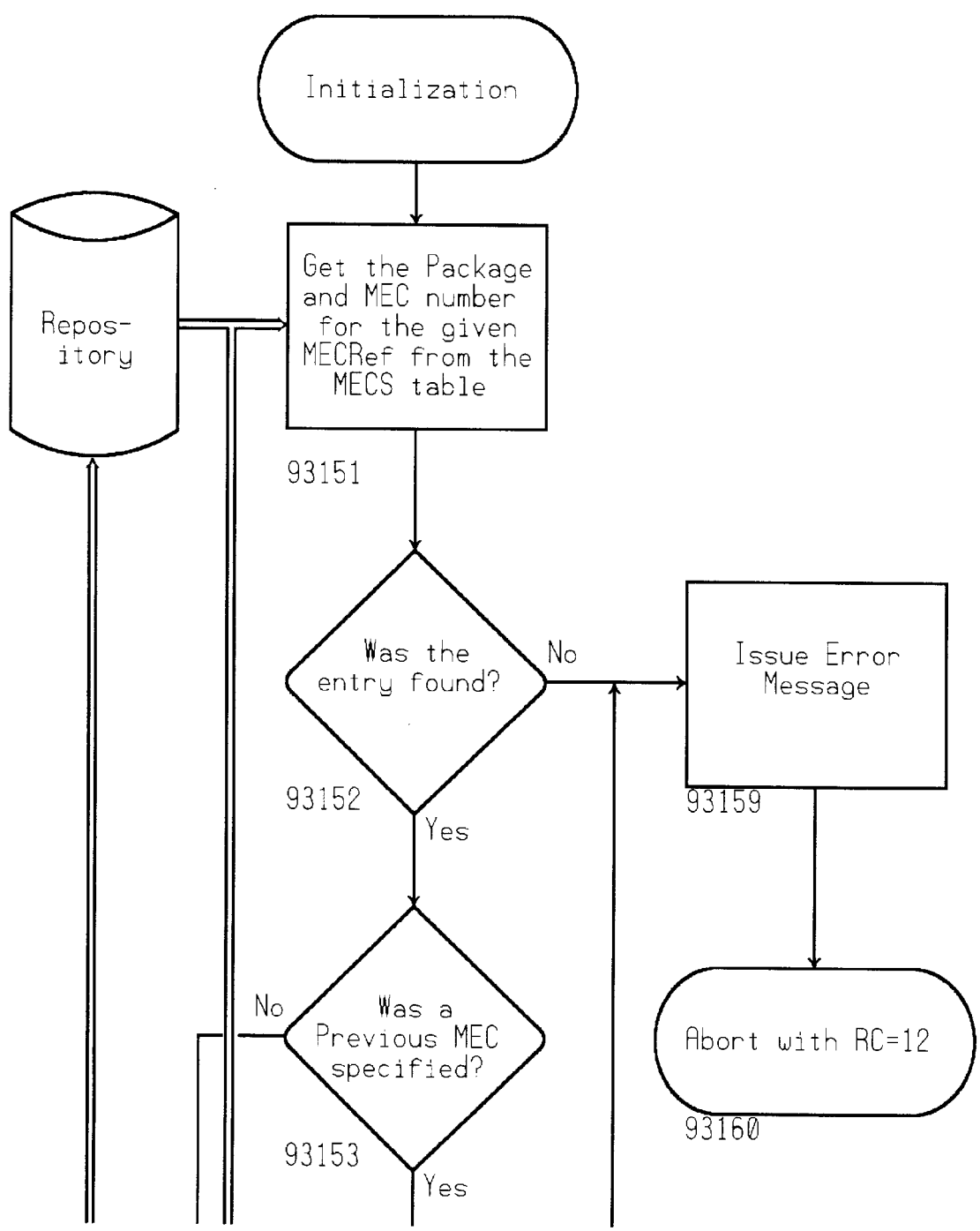
FIGS. 28a and 28b describe the QRMECMOD Process when viewed as laid out as how in FIG. 28.
Figure 28B:
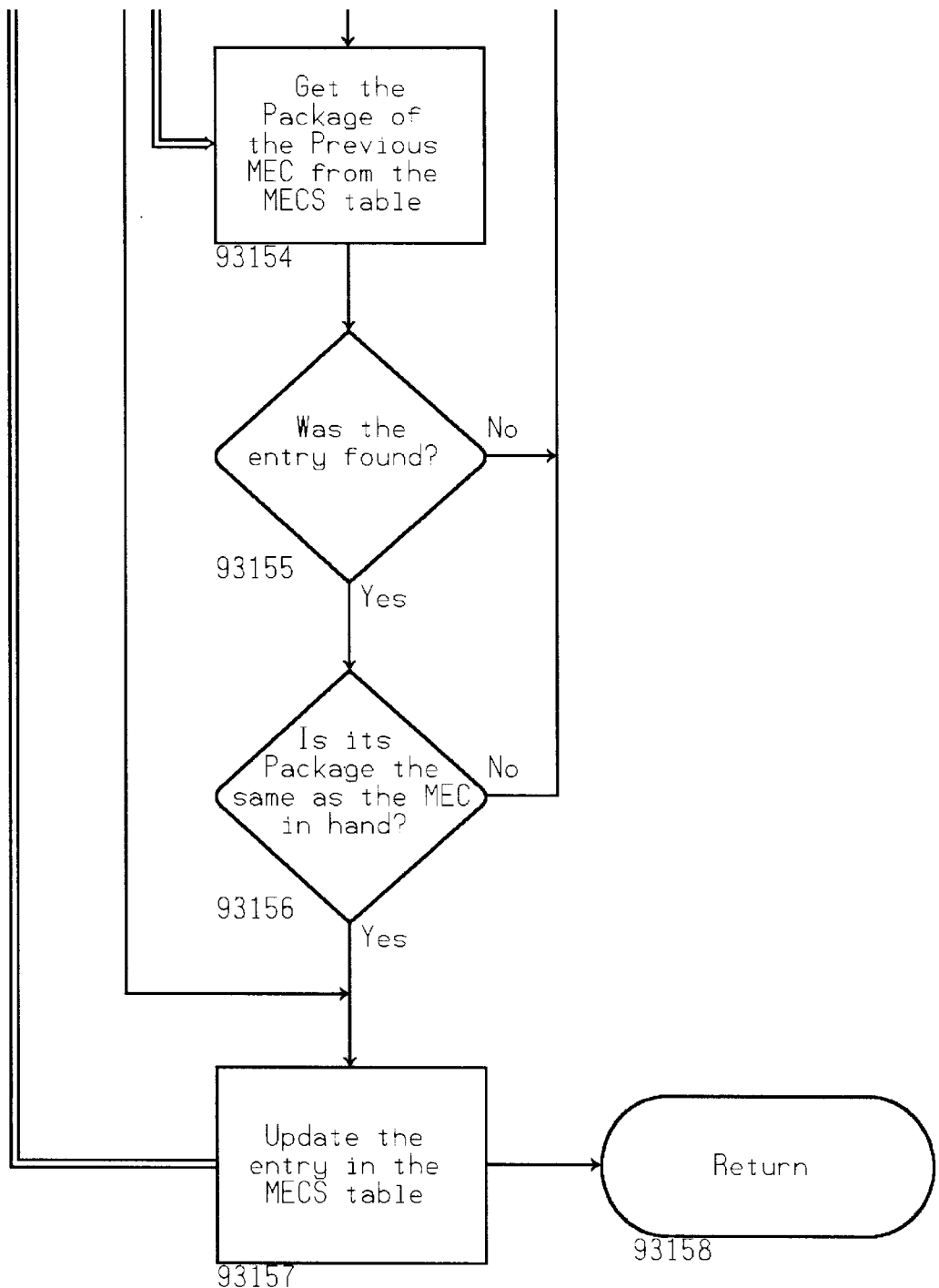
Figure 29A:
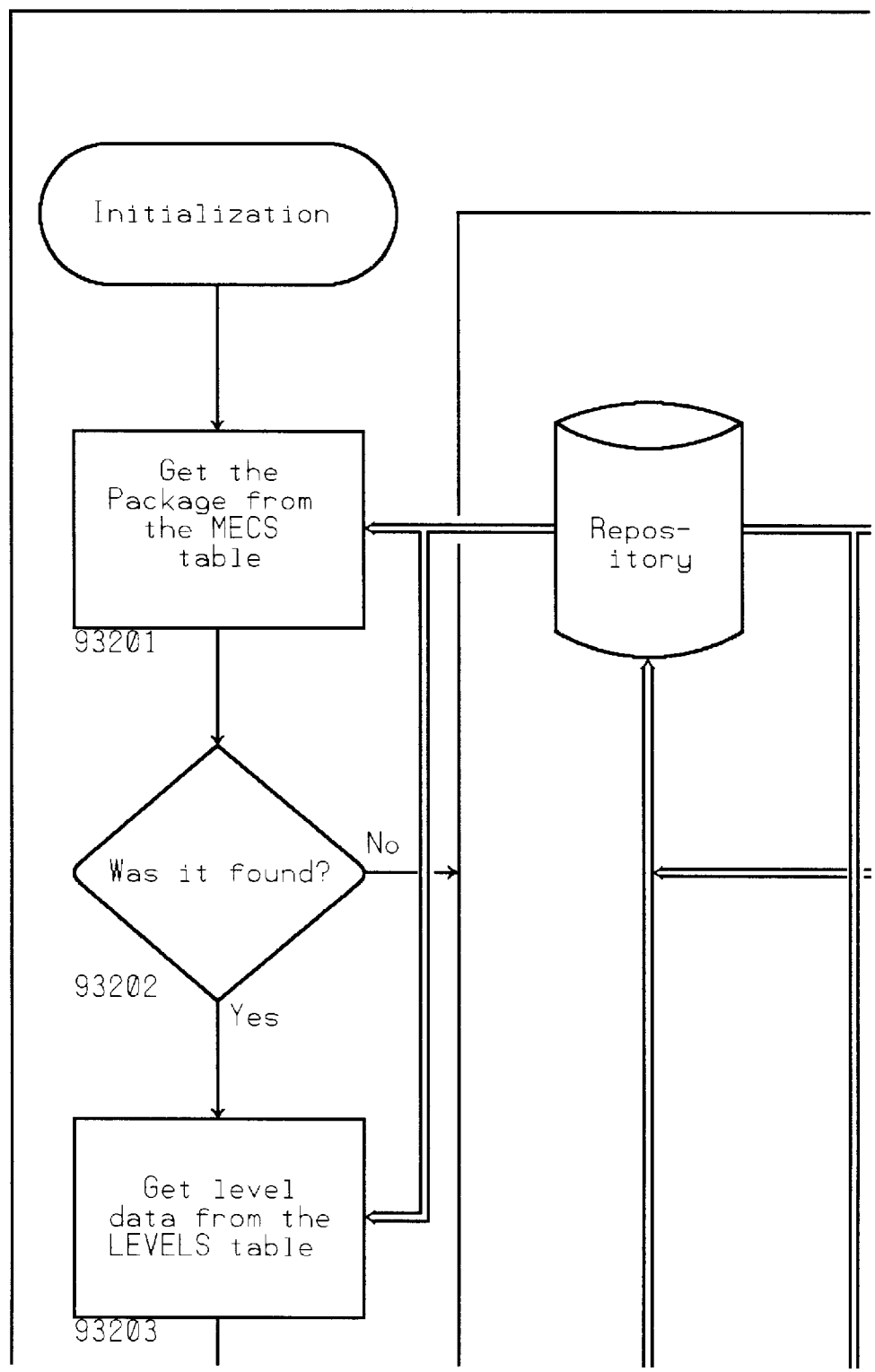
FIGS. 29a thru 29d describe the QRMLVADD Process when viewed as laid out as how in FIG. 29.
Figure 29B:
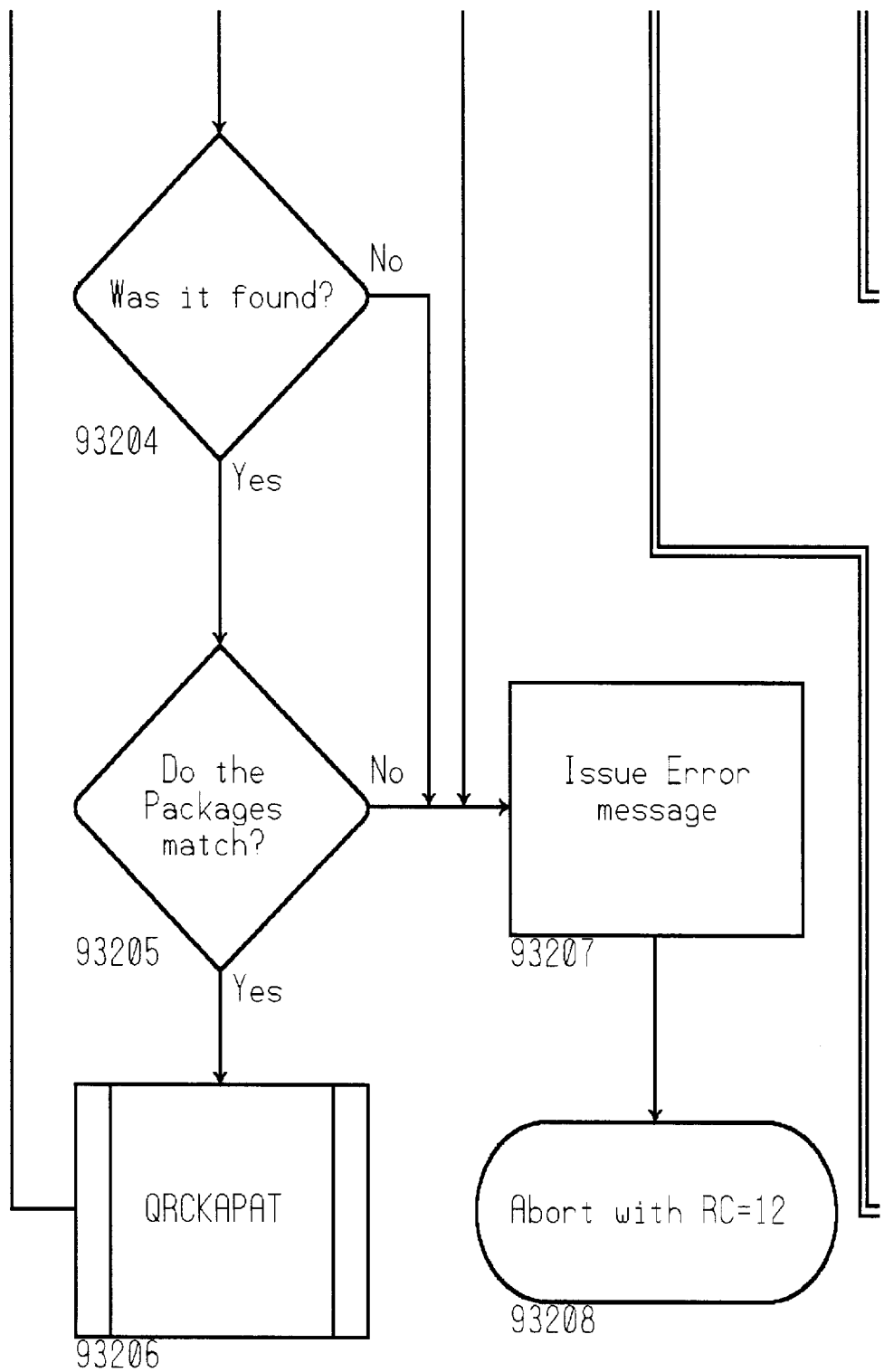
Figure 29C:
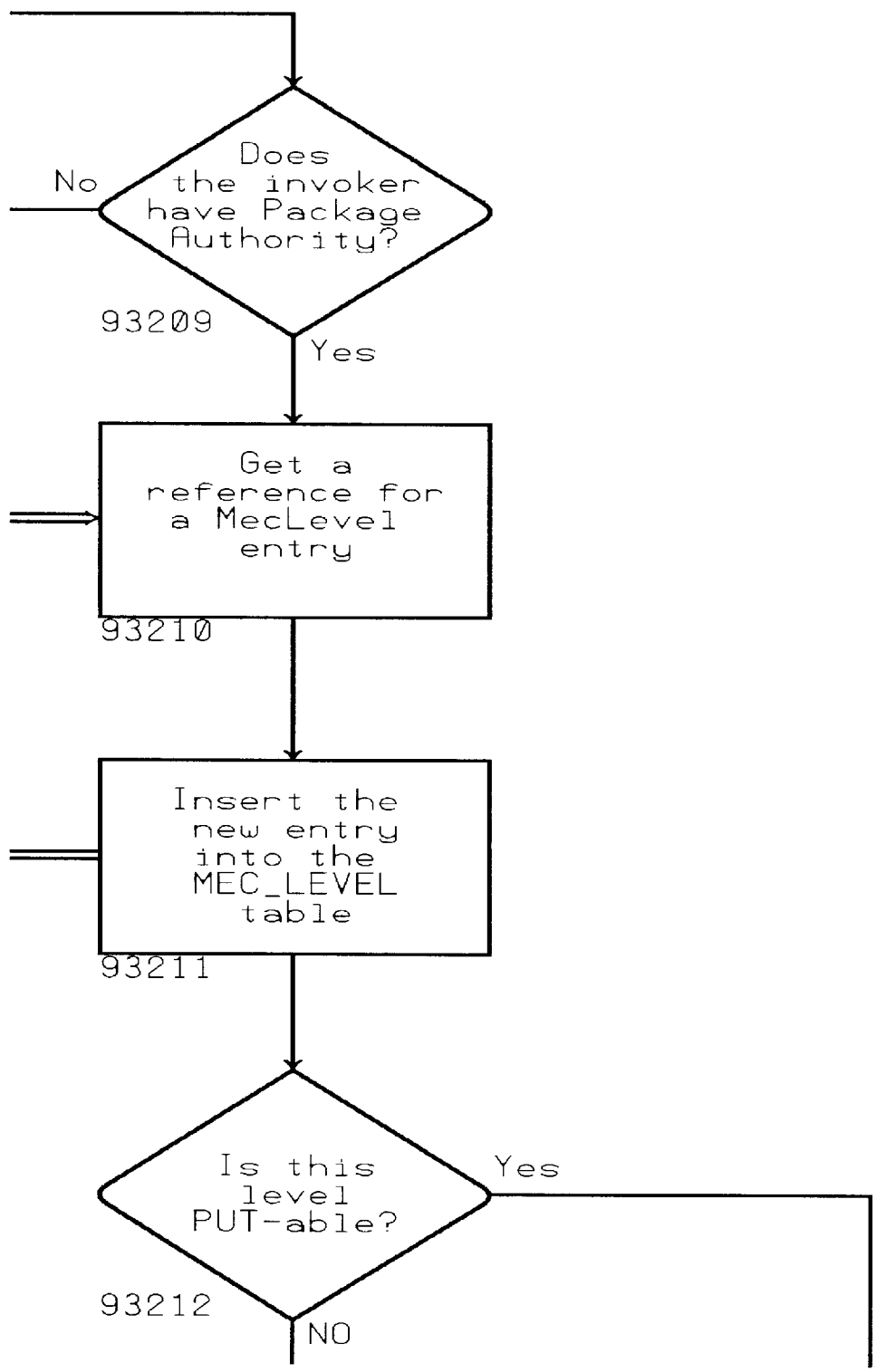
Figure 29D:
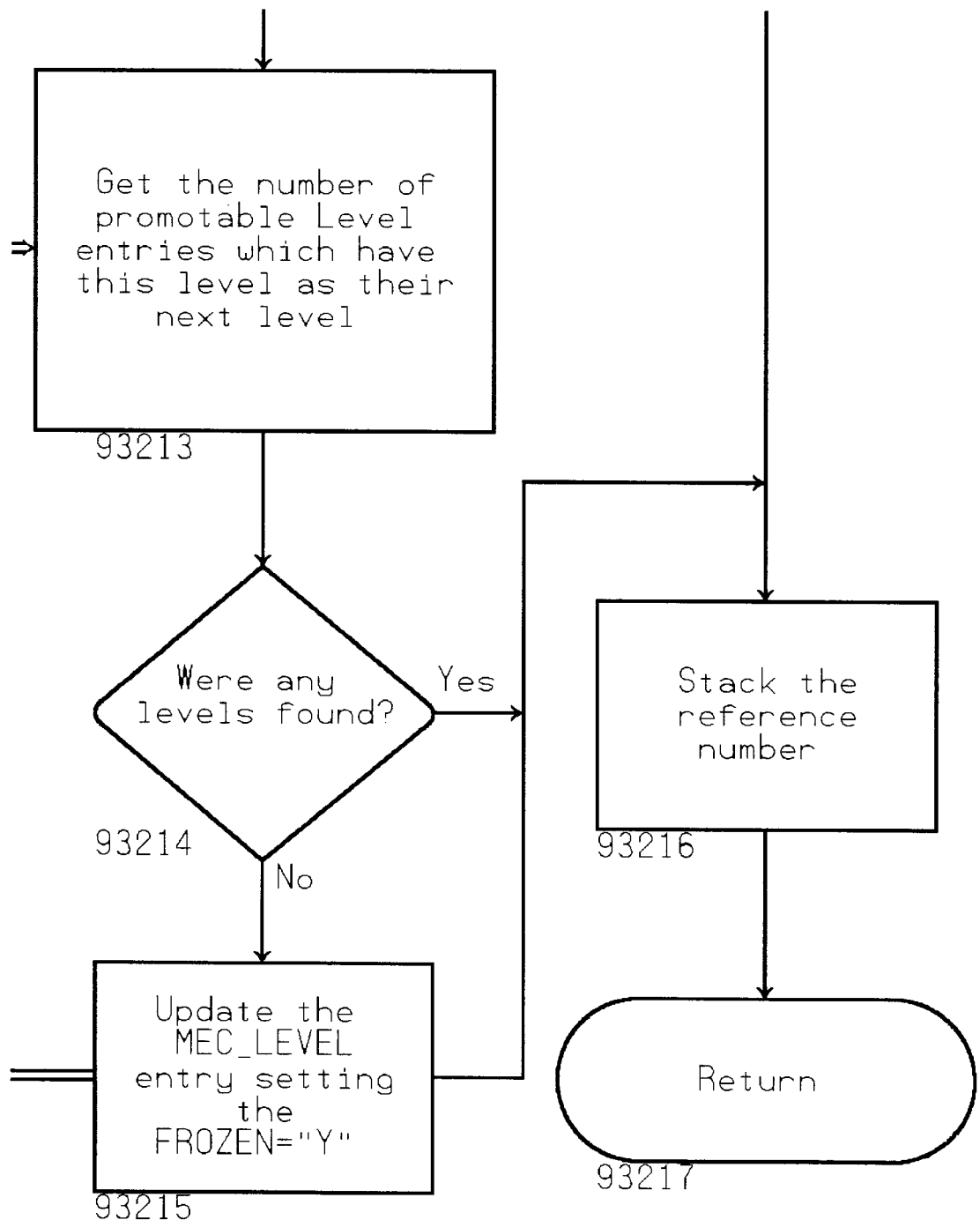
Figure 30A:
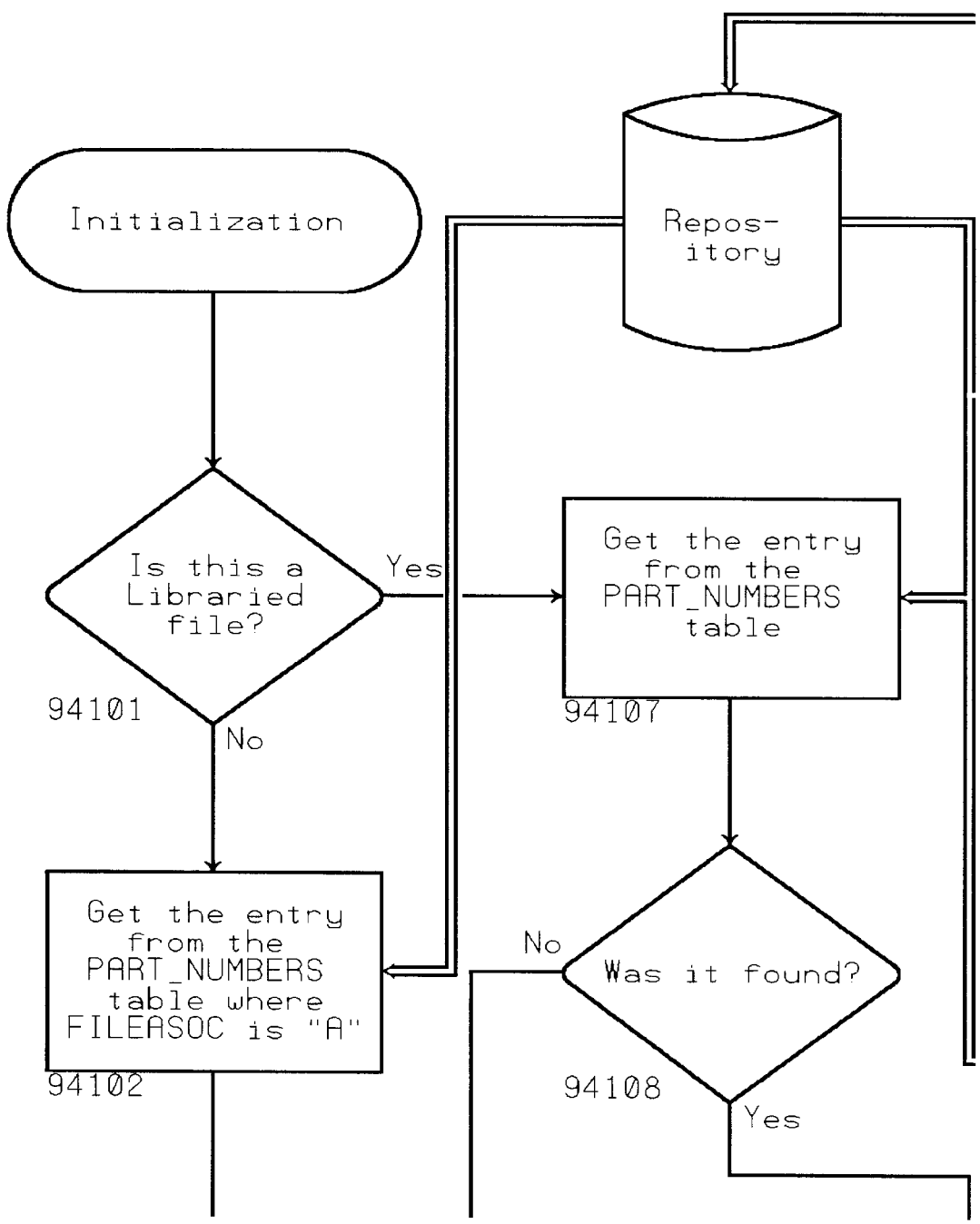
FIGS. 30a thru 30f describe the QRPNODIS Process when viewed as laid out as how in FIG. 30.
Figure 30B:
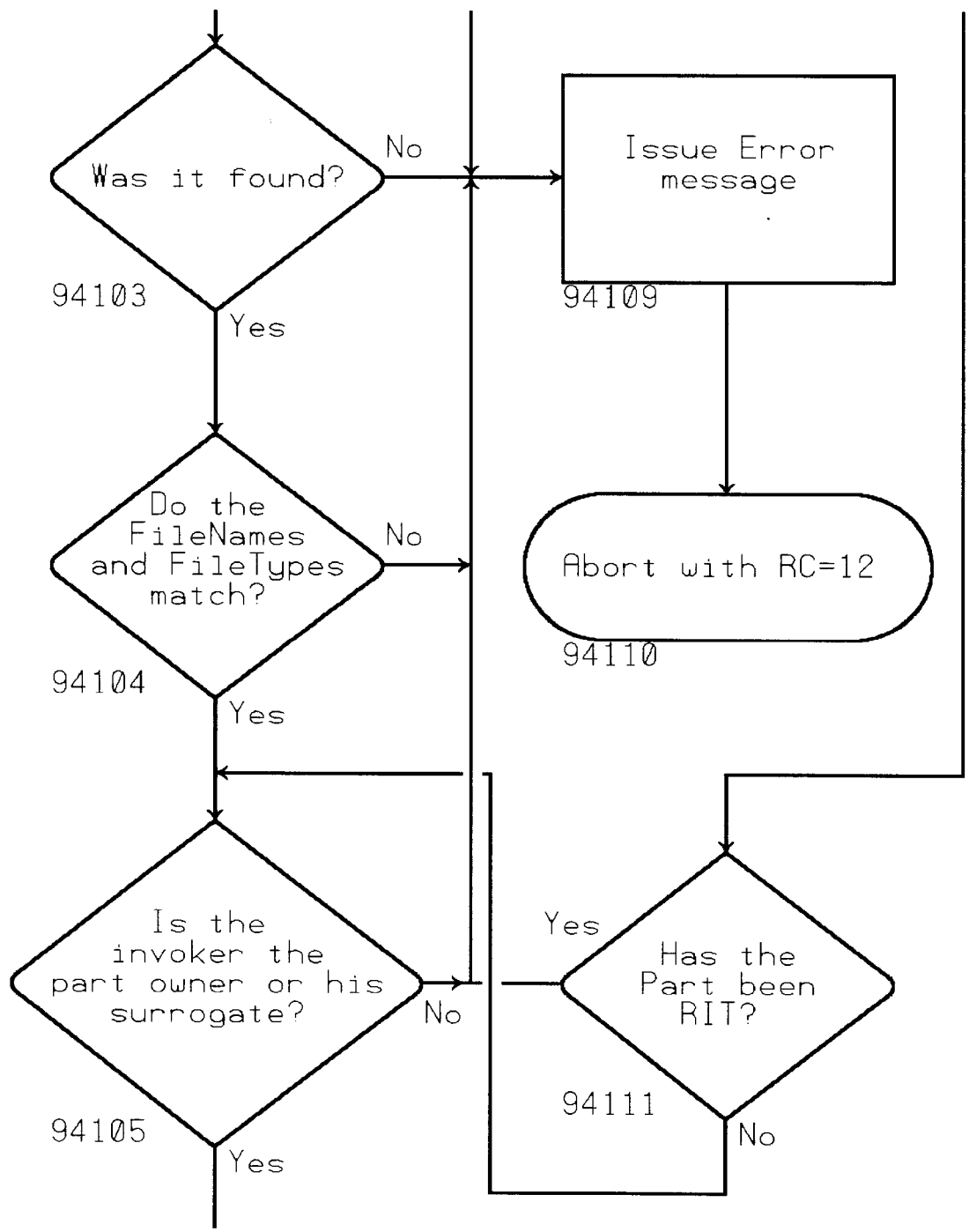
Figure 30C:
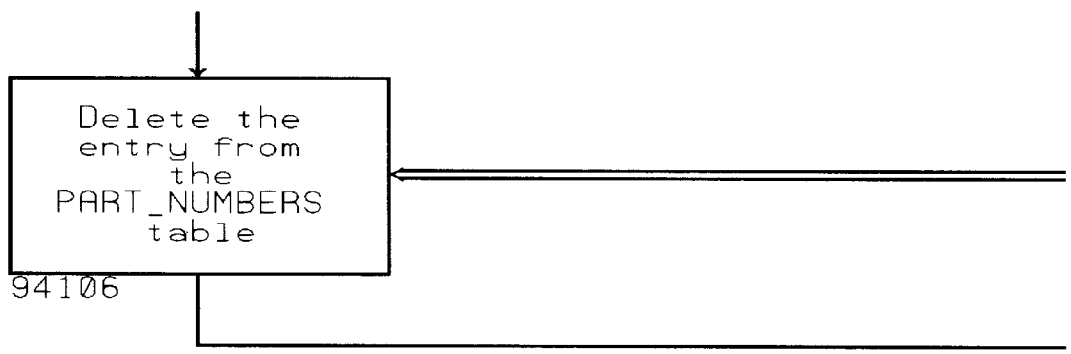
Figure 30D:
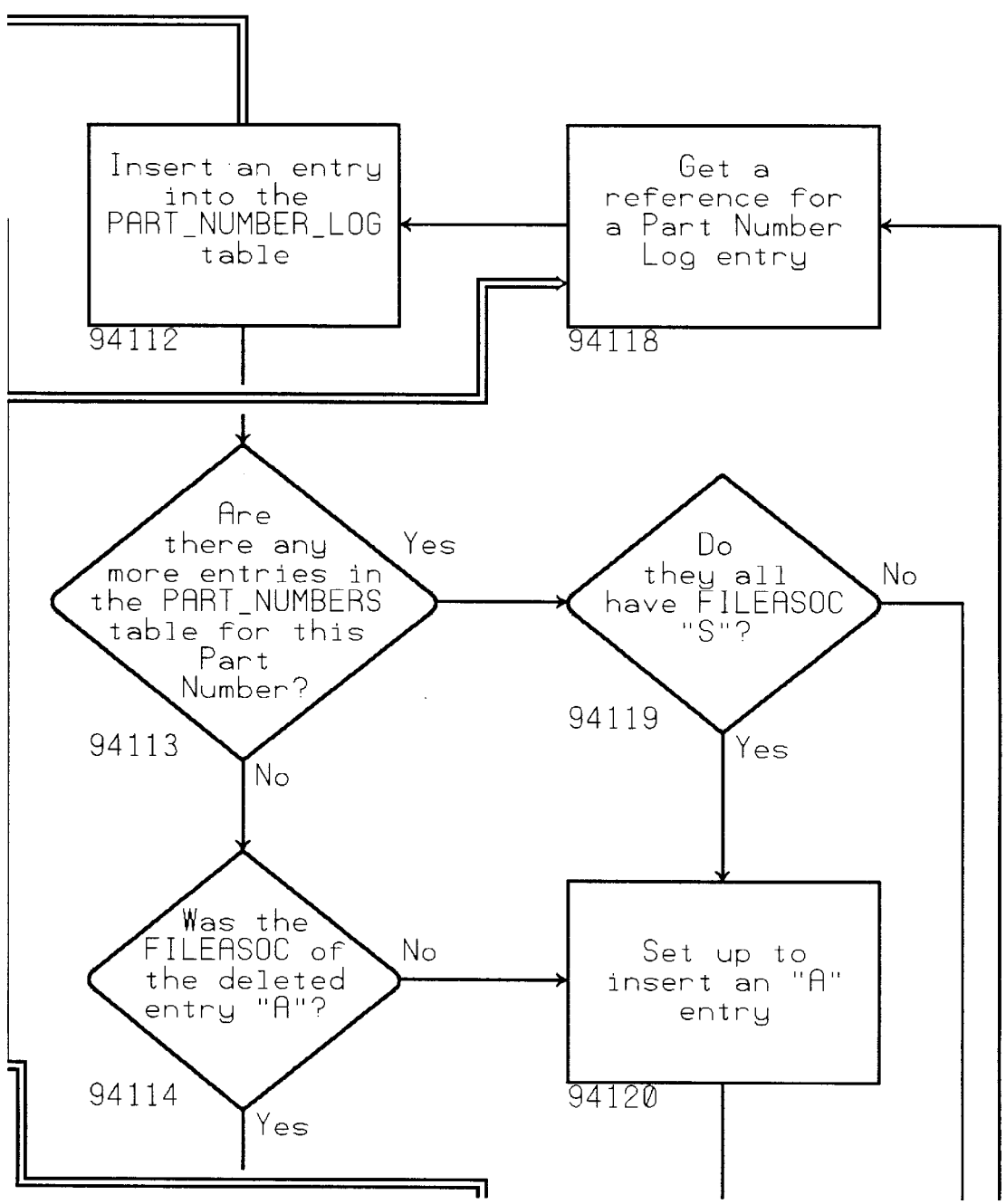
Figure 30E:
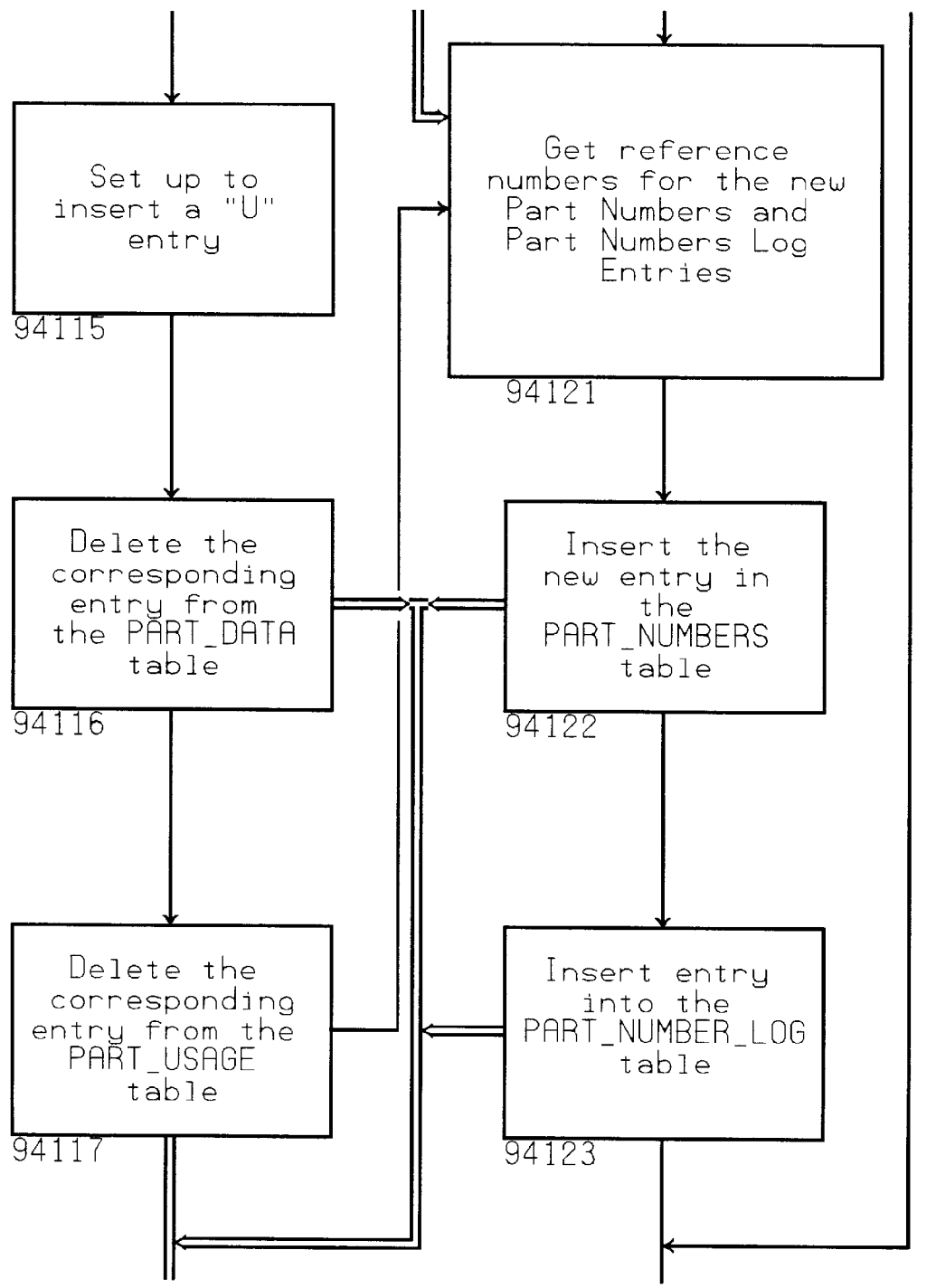
Figure 30F:
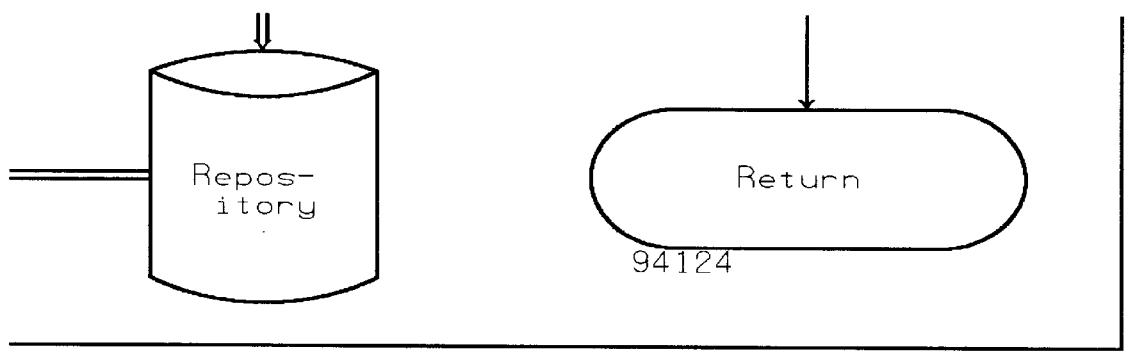
Figure 31A:
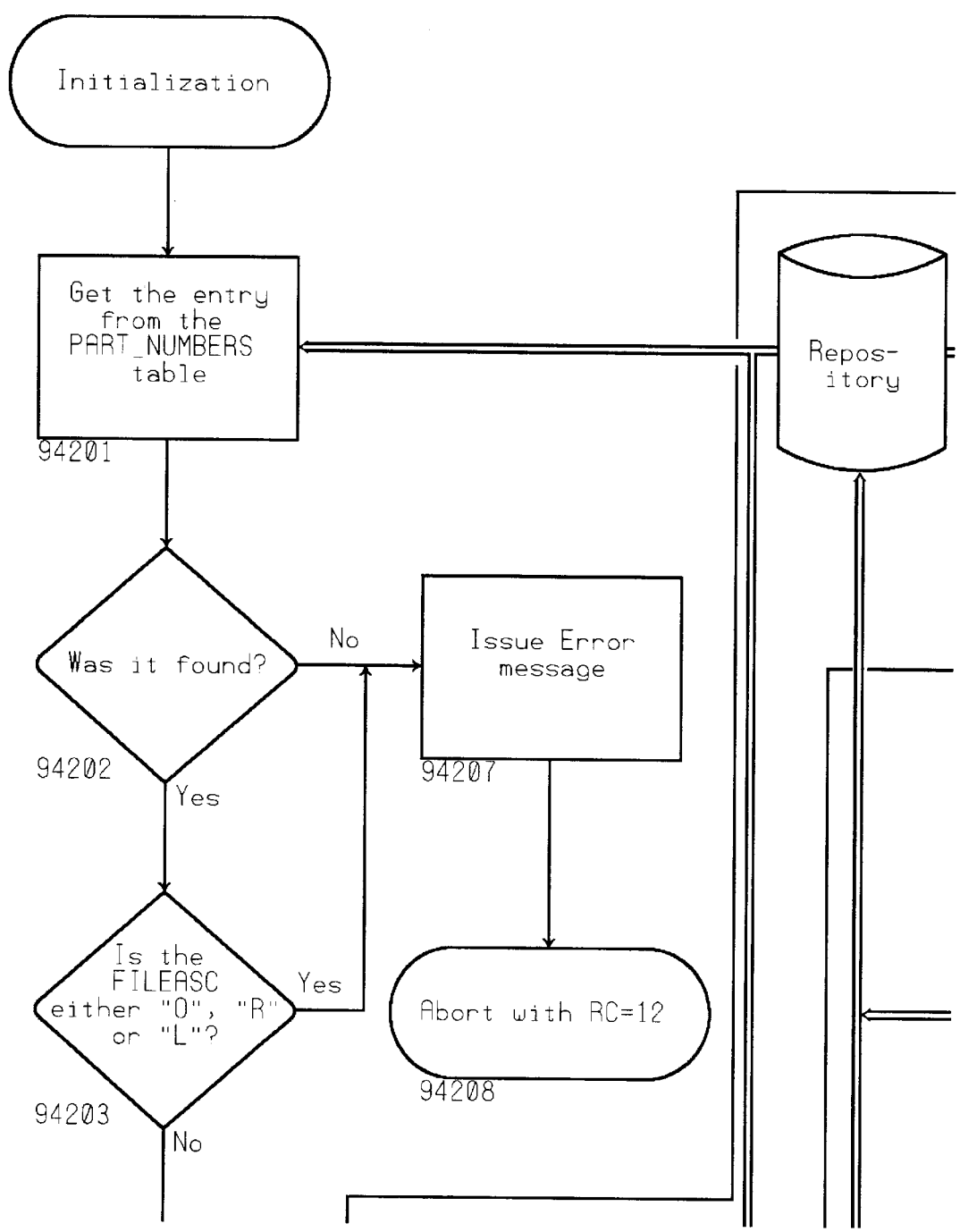
FIGS. 31a thru 31d describe the QRPNOOBS Process when viewed as laid out as how in FIG. 31.
Figure 31B:
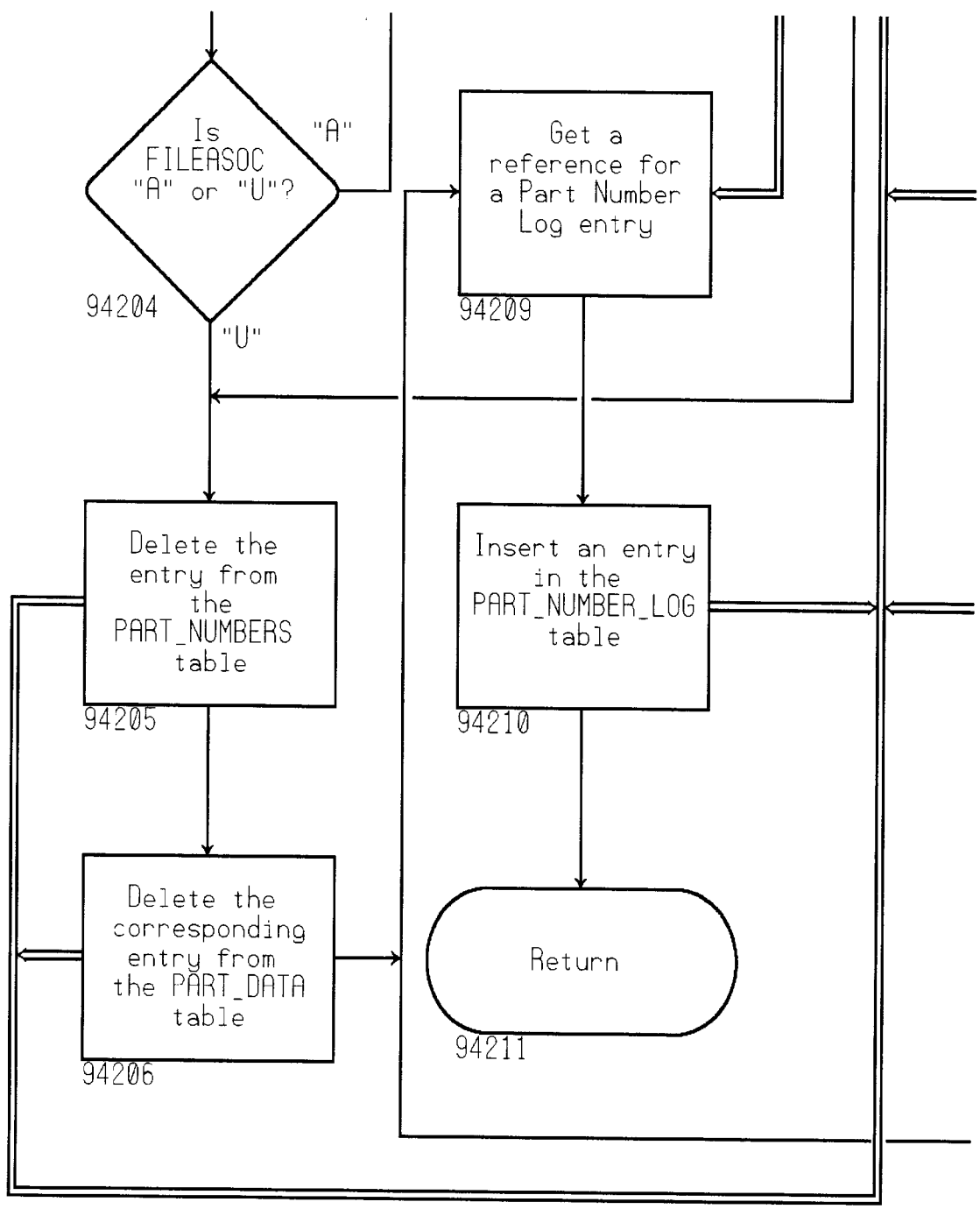
Figure 31C:
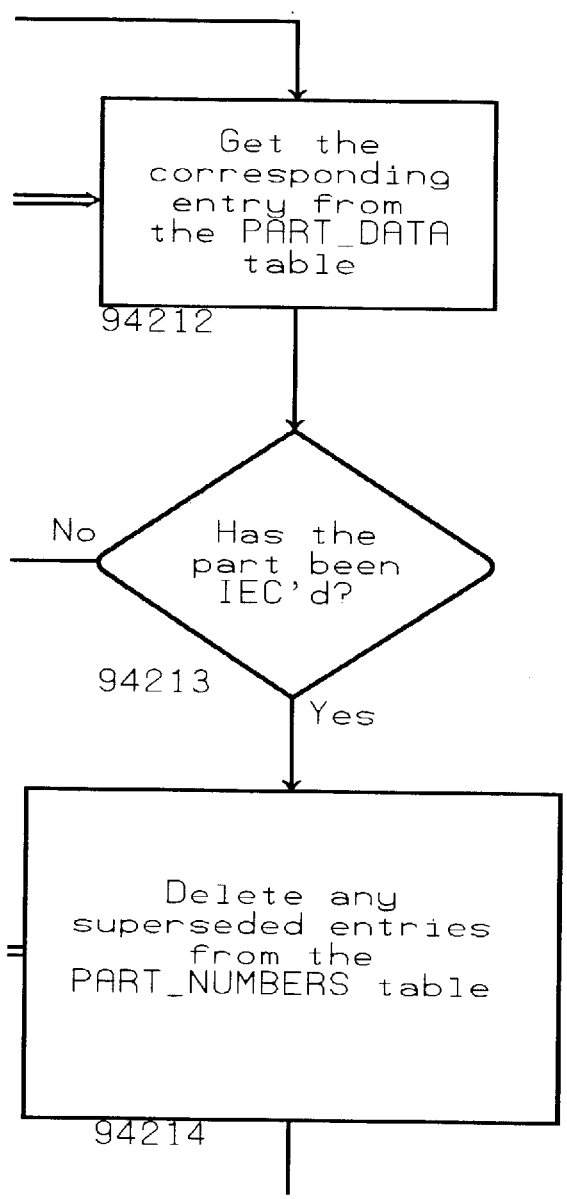
Figure 31D:
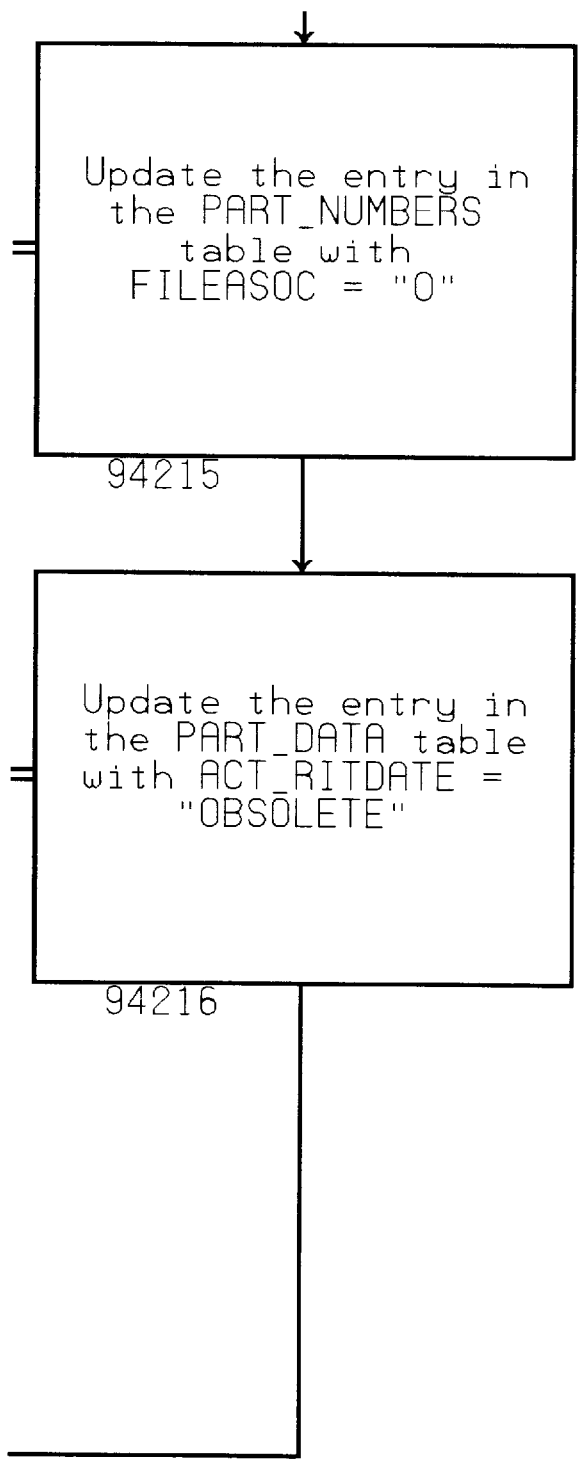
Figure 32A:
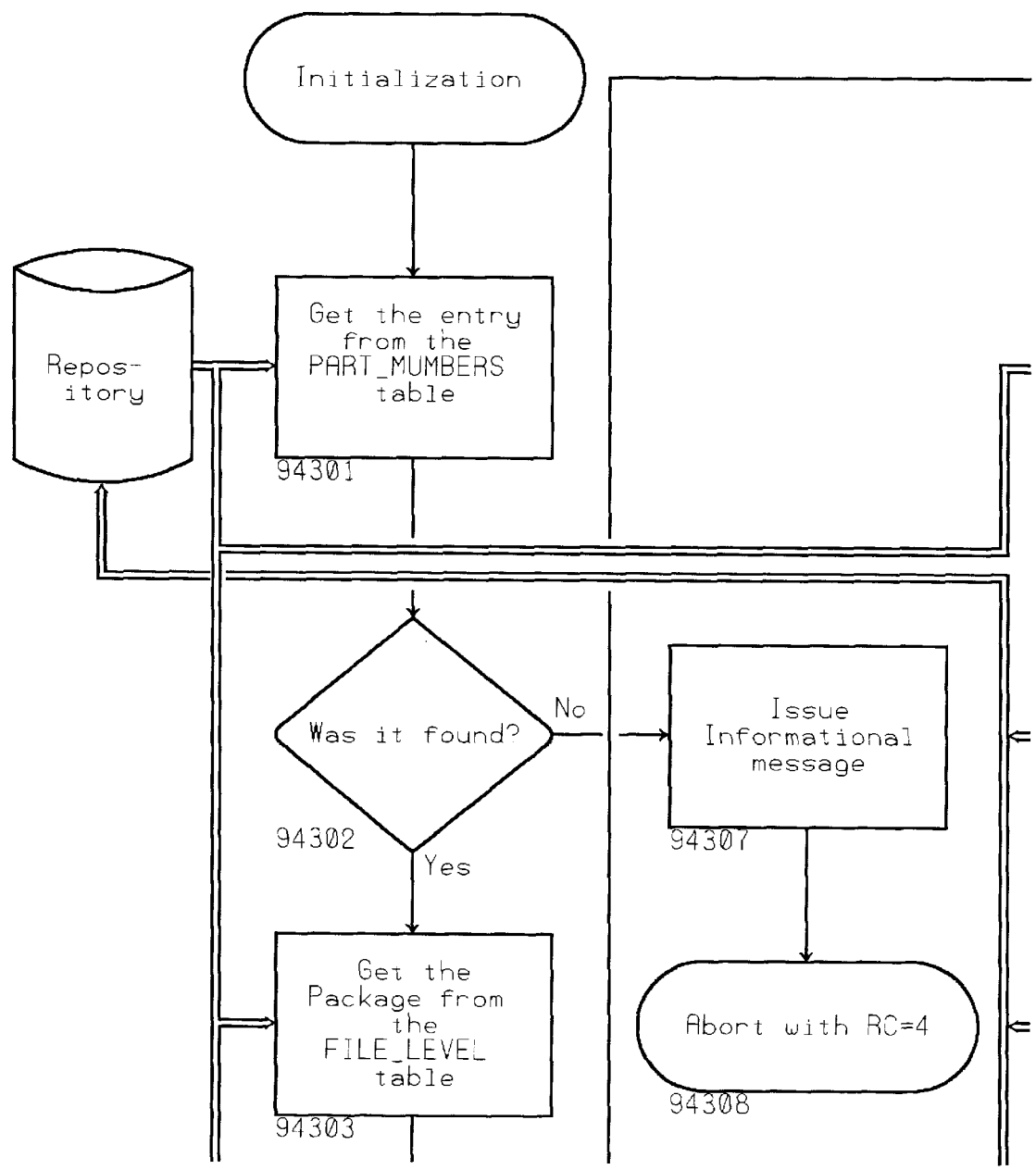
FIGS. 32a thru 32d describe the QRPNOUNR Process when viewed as laid out as how in FIG. 32.
Figure 32B:
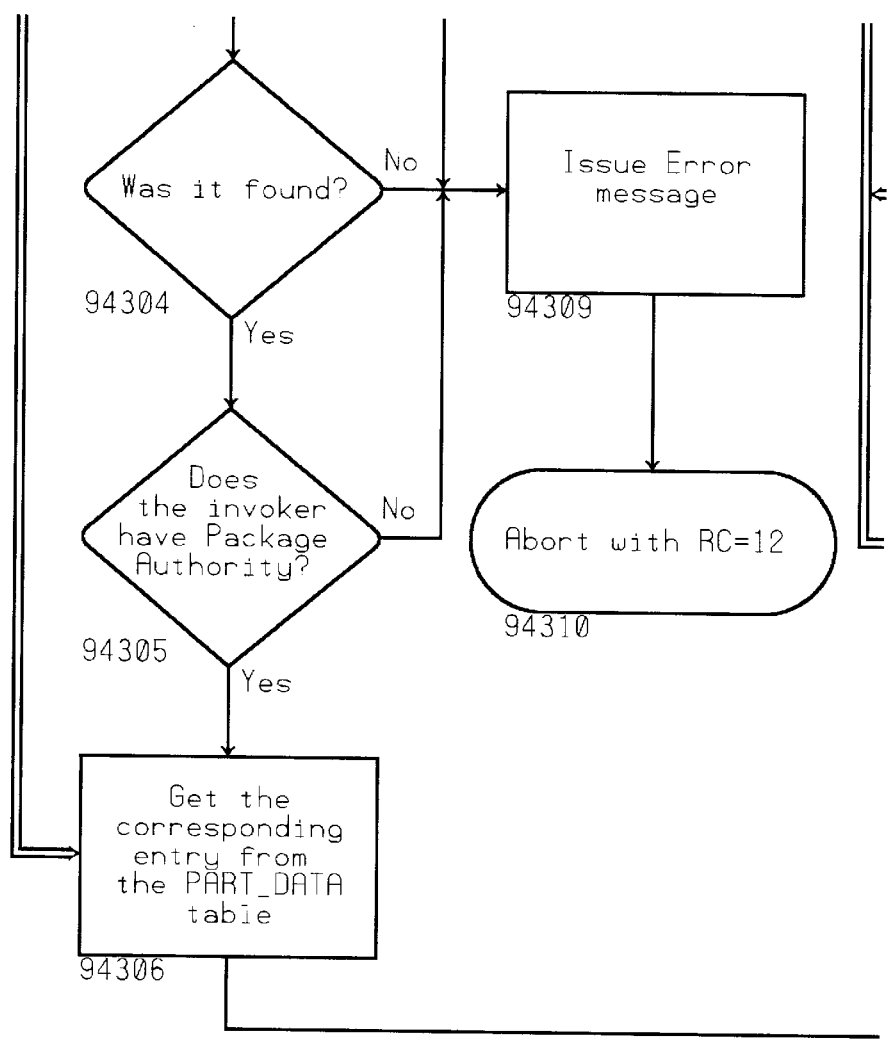
Figure 32C:
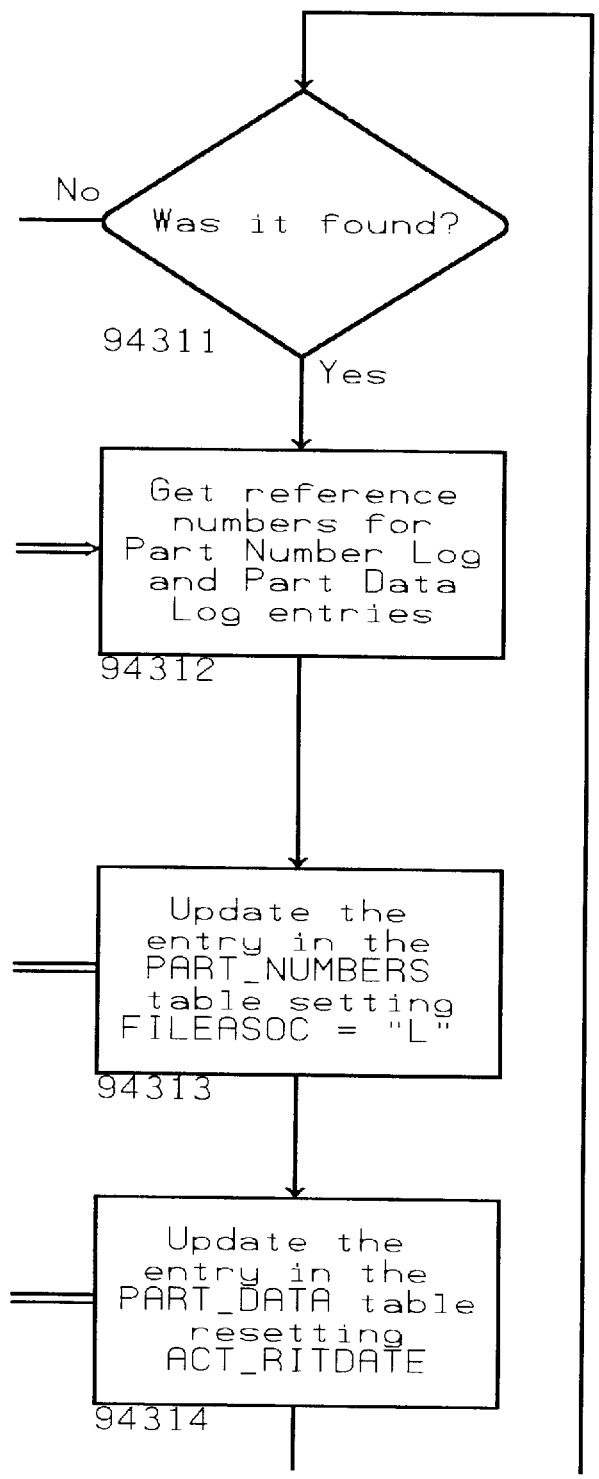
Figure 32D:
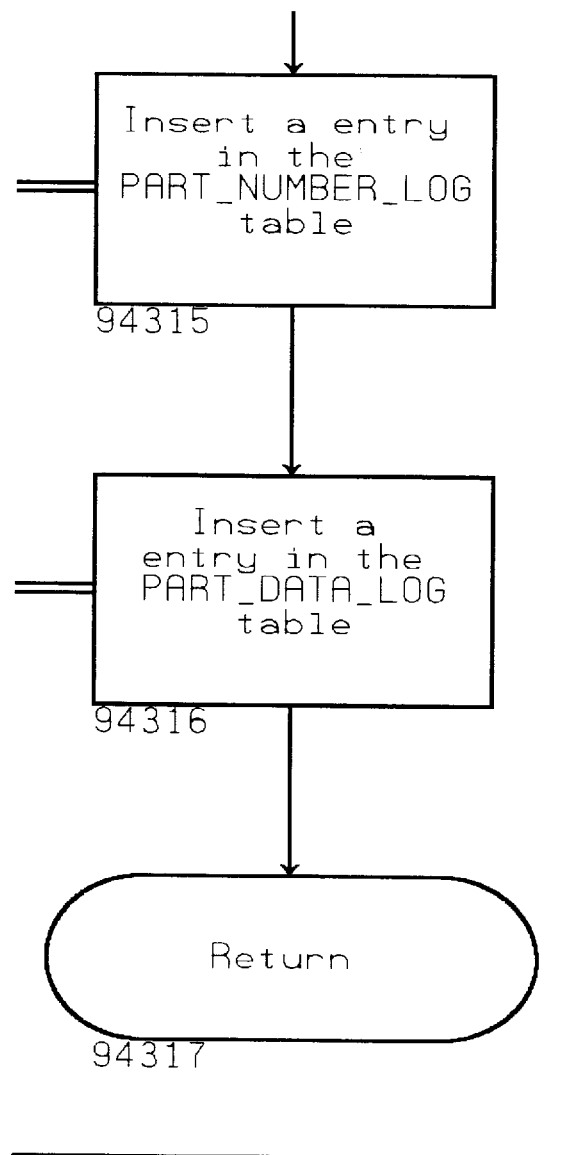
Figure 33A:
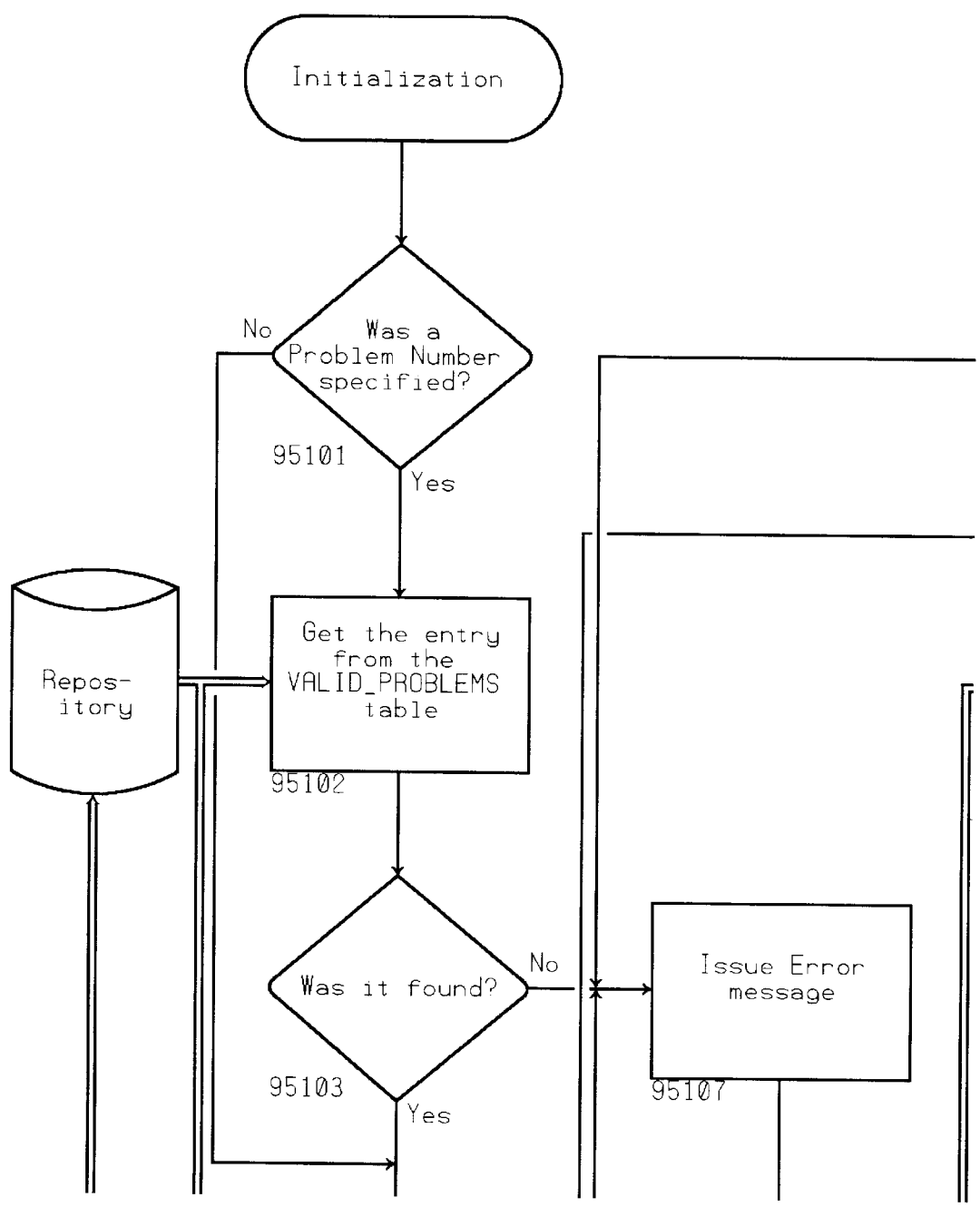
FIGS. 33a thru 33d describe the QRRECADD Process when viewed as laid out as how in FIG. 33.
Figure 33B:
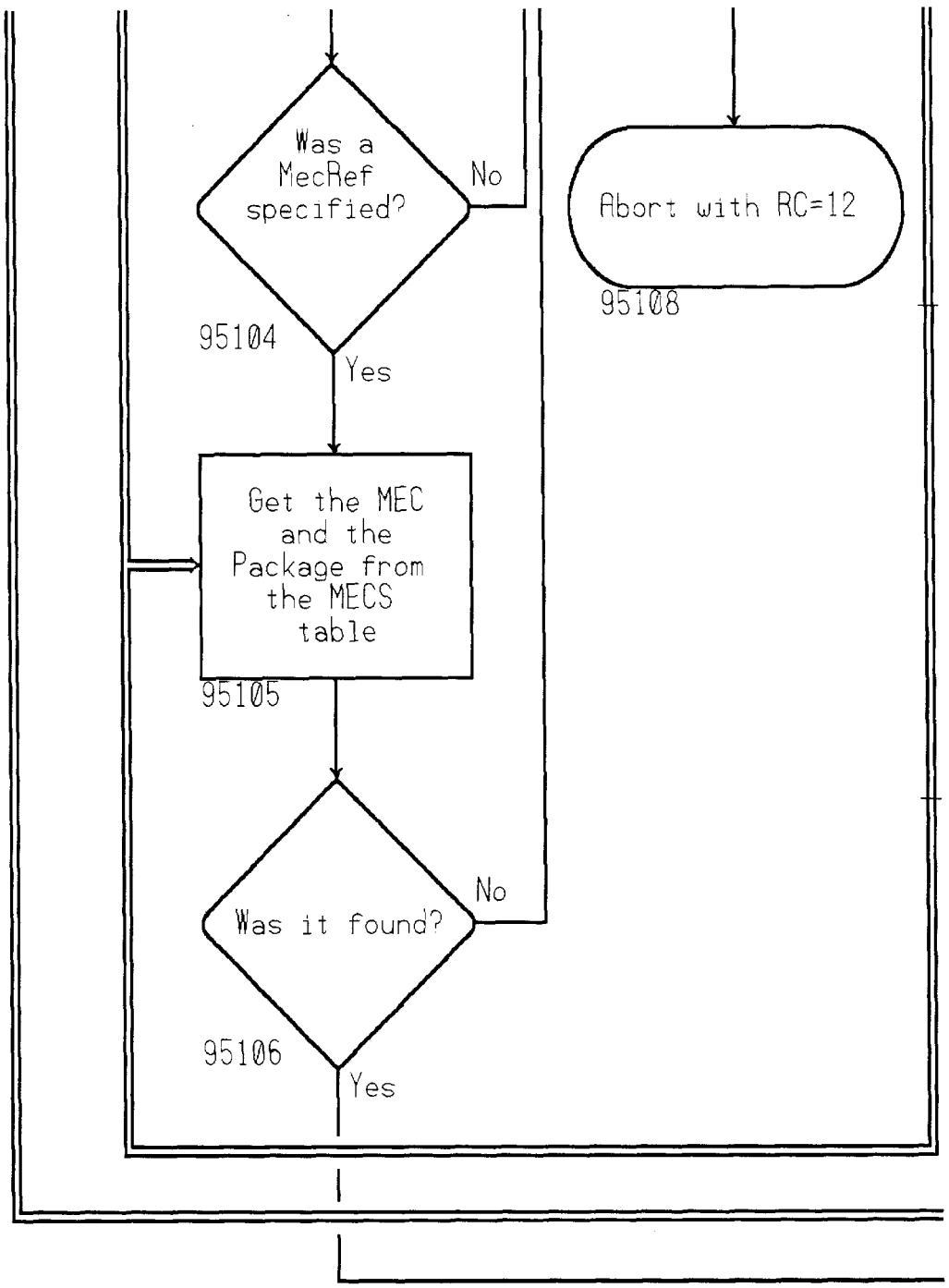
Figure 33C:
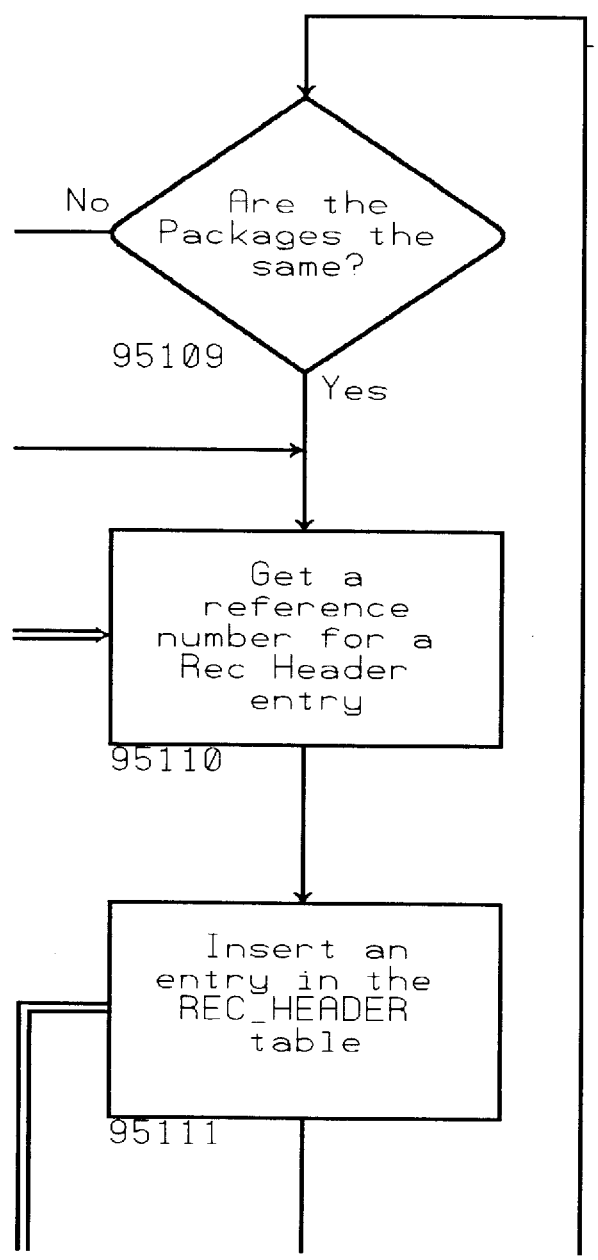
Figure 33D:
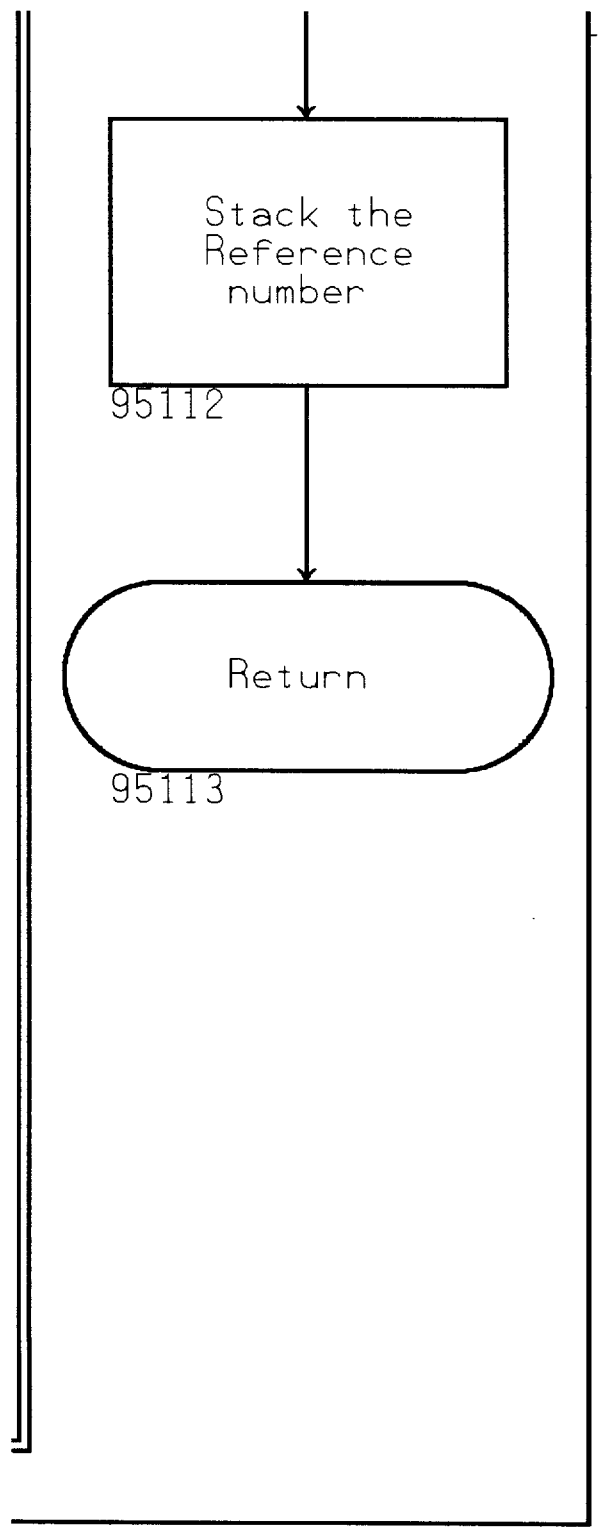
Figure 34A:
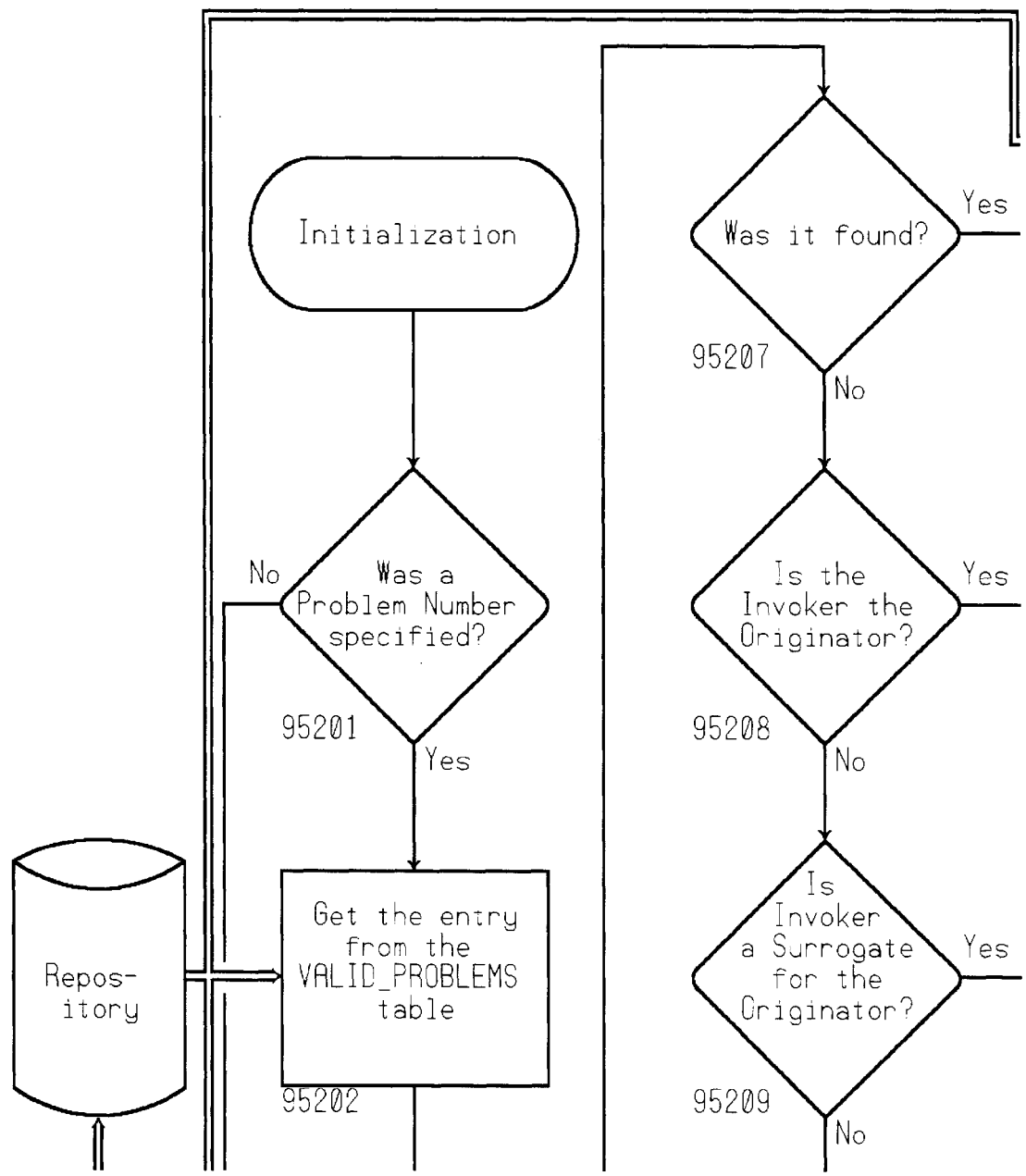
FIGS. 34a thru 34d describe the QRRECMOD Process when viewed as laid out as how in FIG. 34.
Figure 34B:
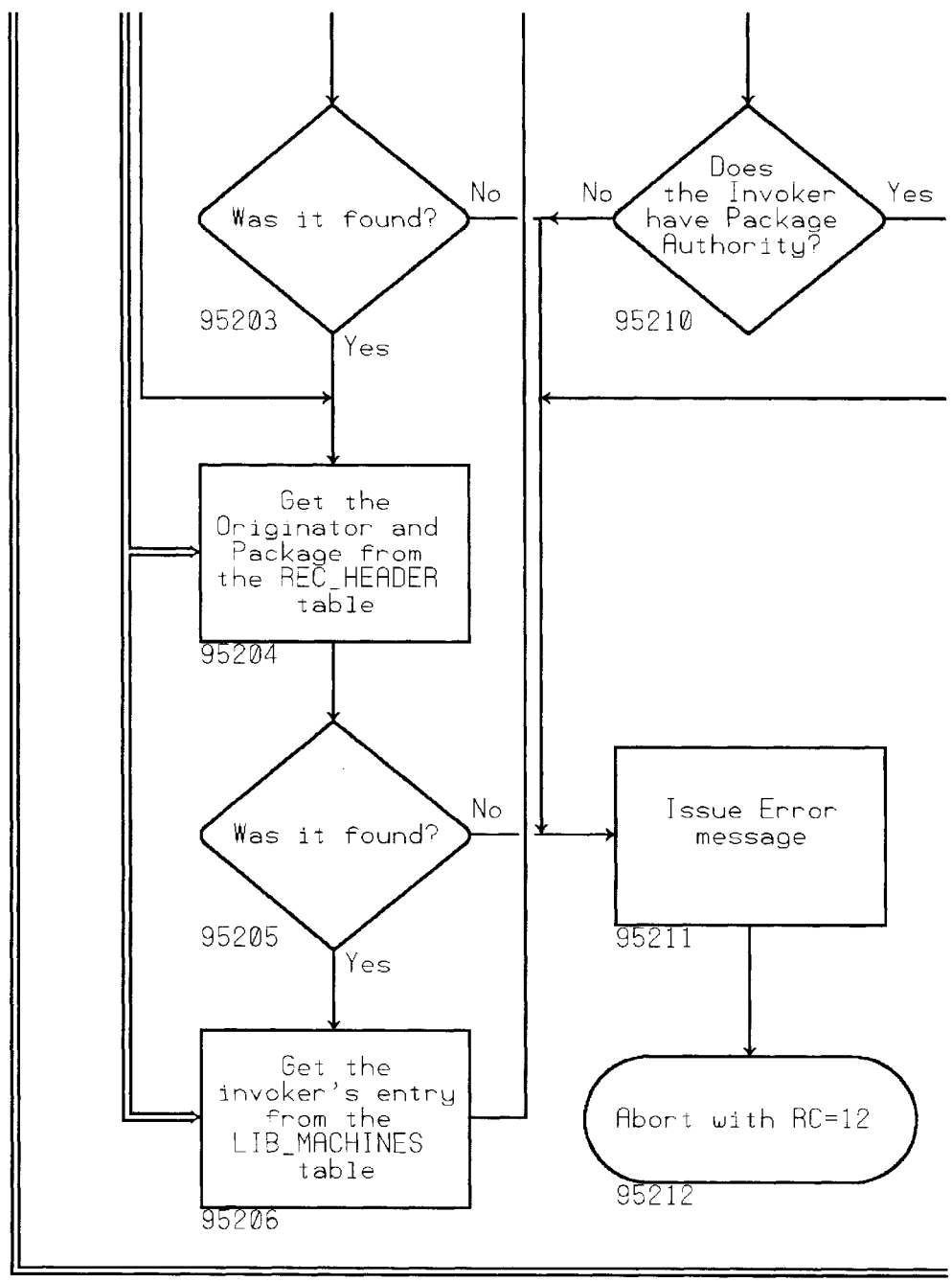
Figure 34C:
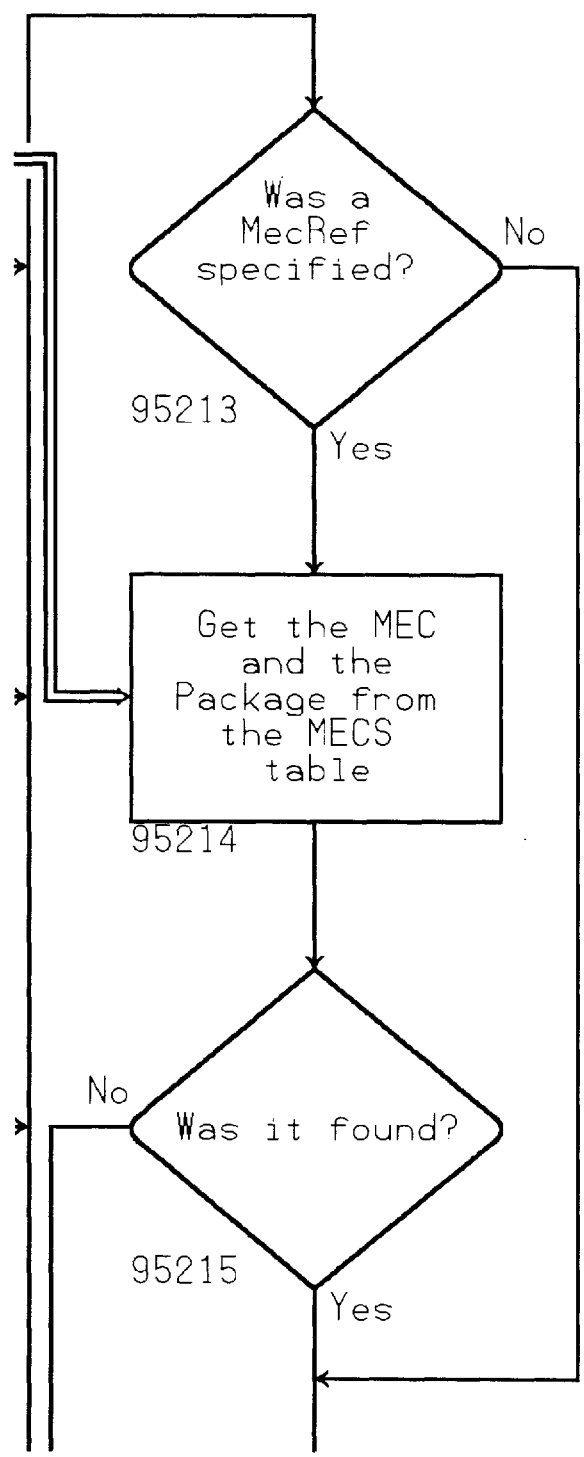
Figure 34D:
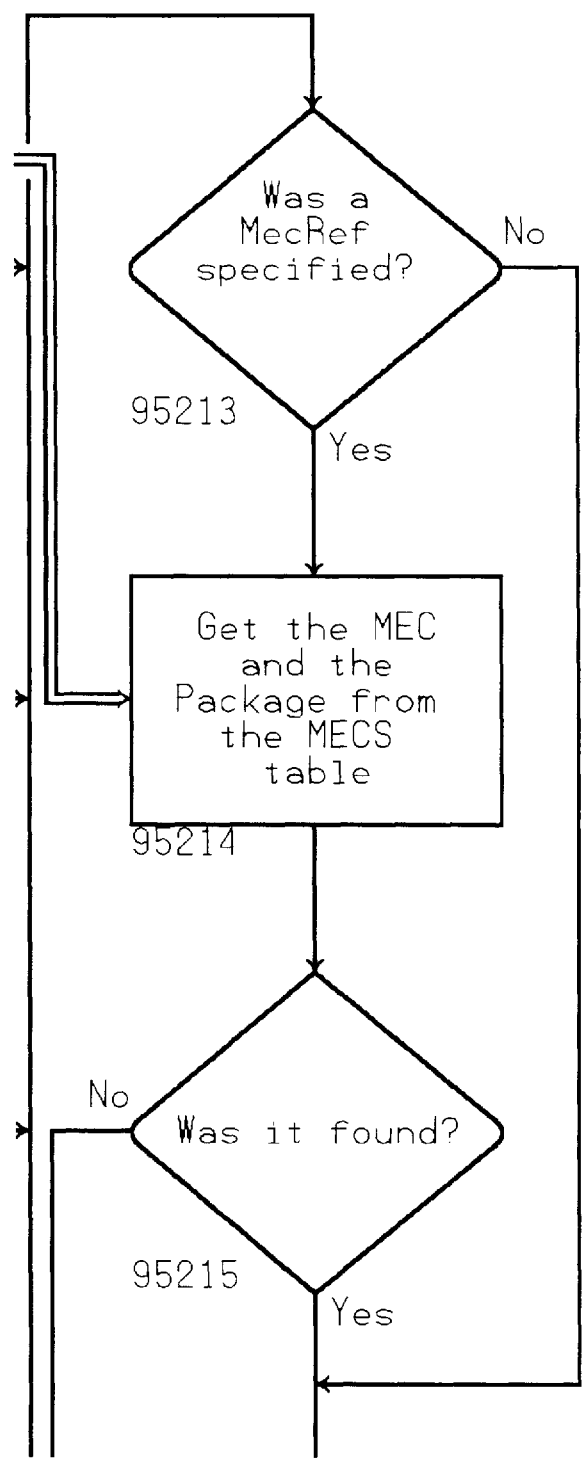
Figure 35A:
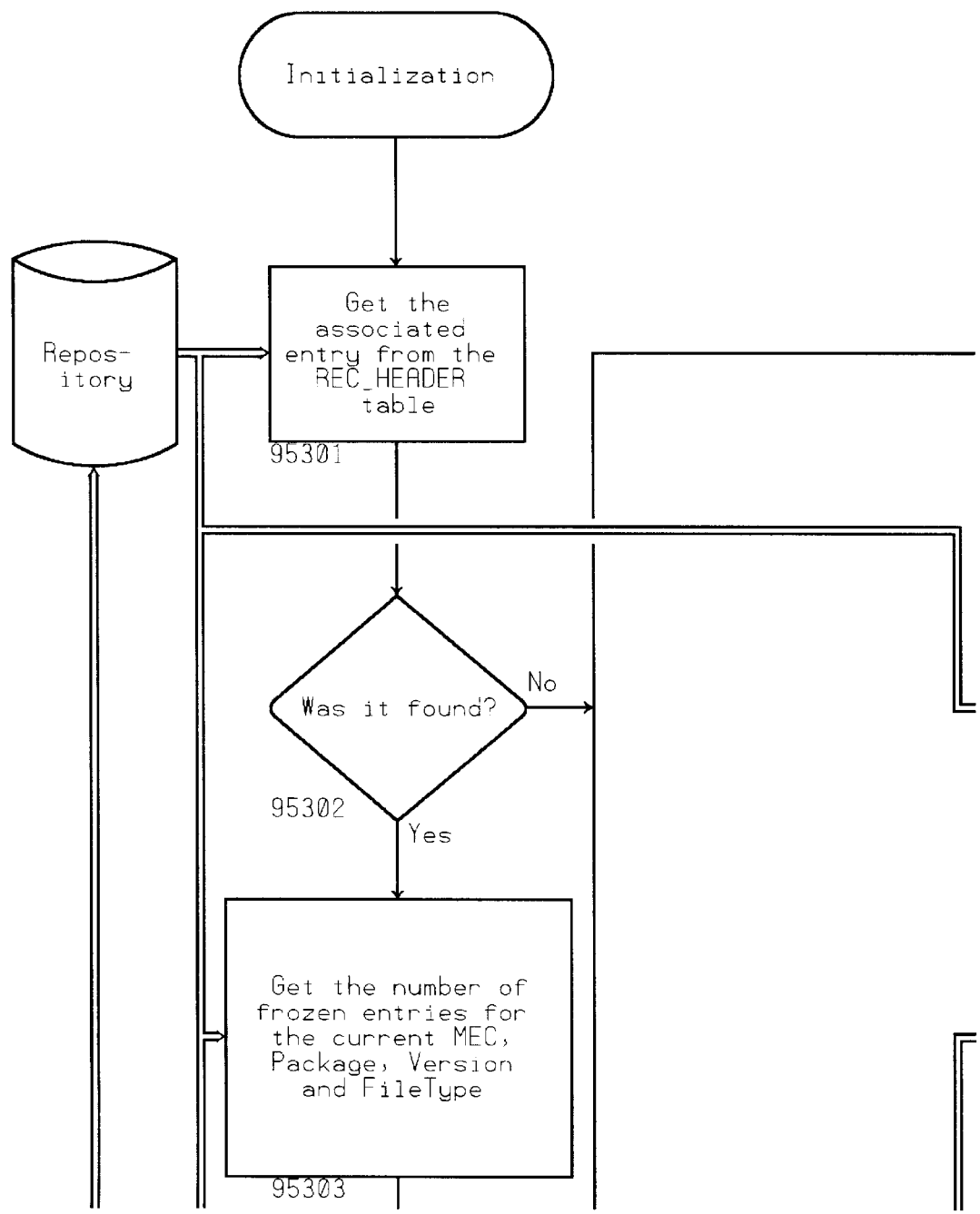
FIGS. 35a thru 35d describe the QRRFIADD Process when viewed as laid out as how in FIG. 35.
Figure 35B:
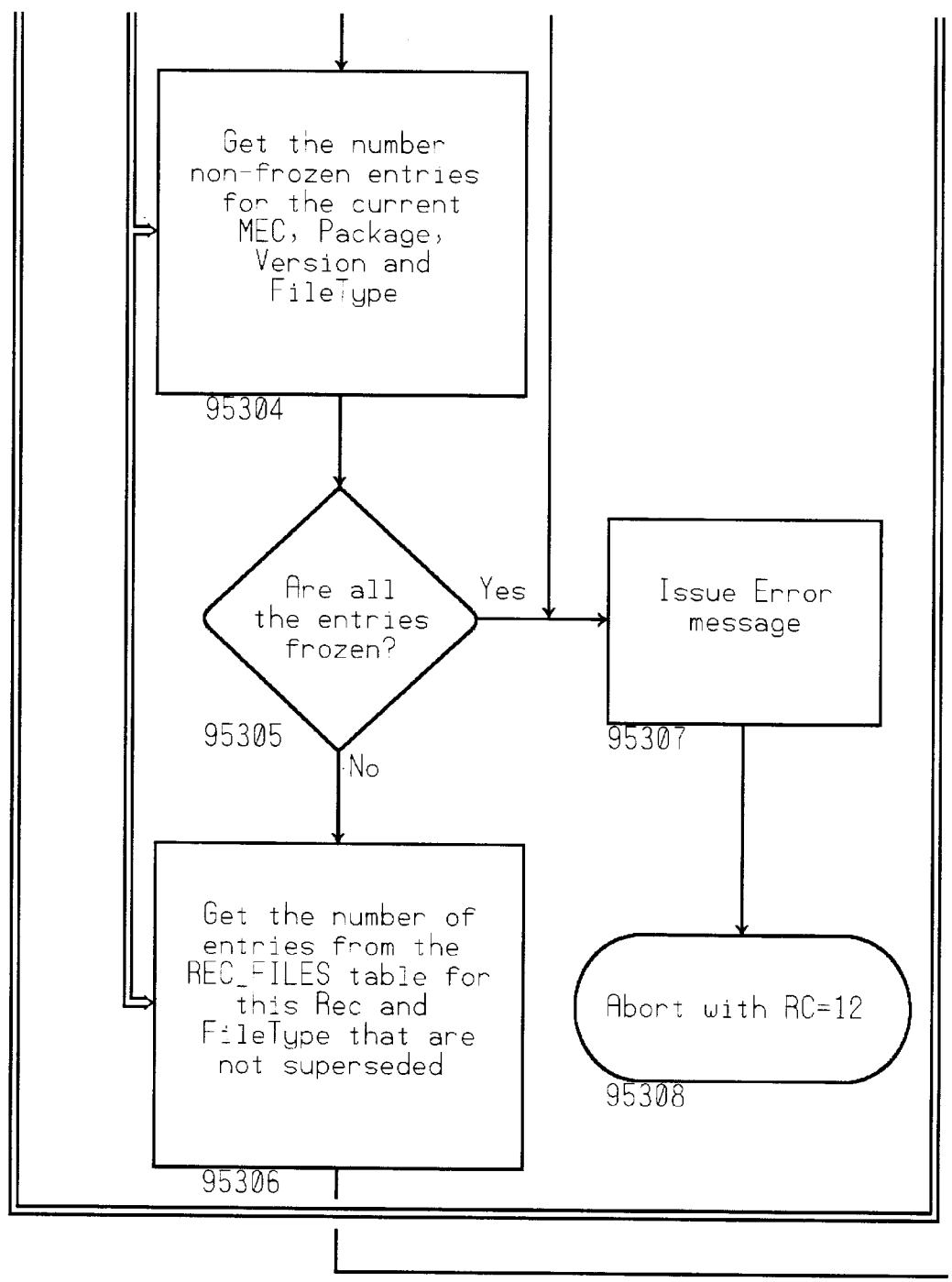
Figure 35C:
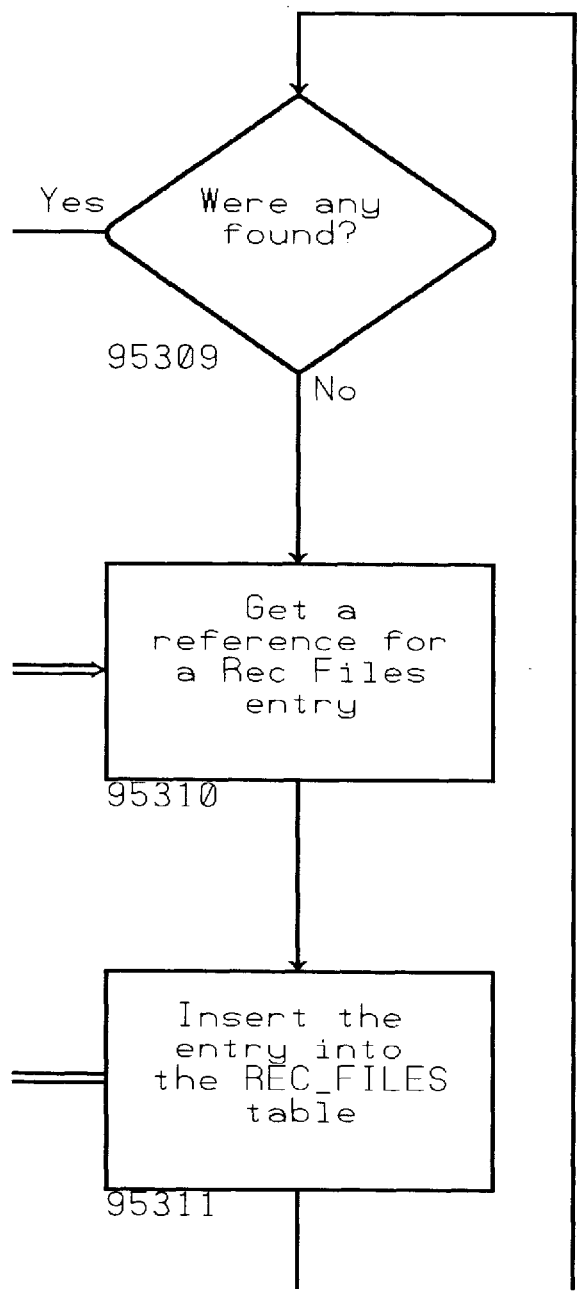
Figure 35D:
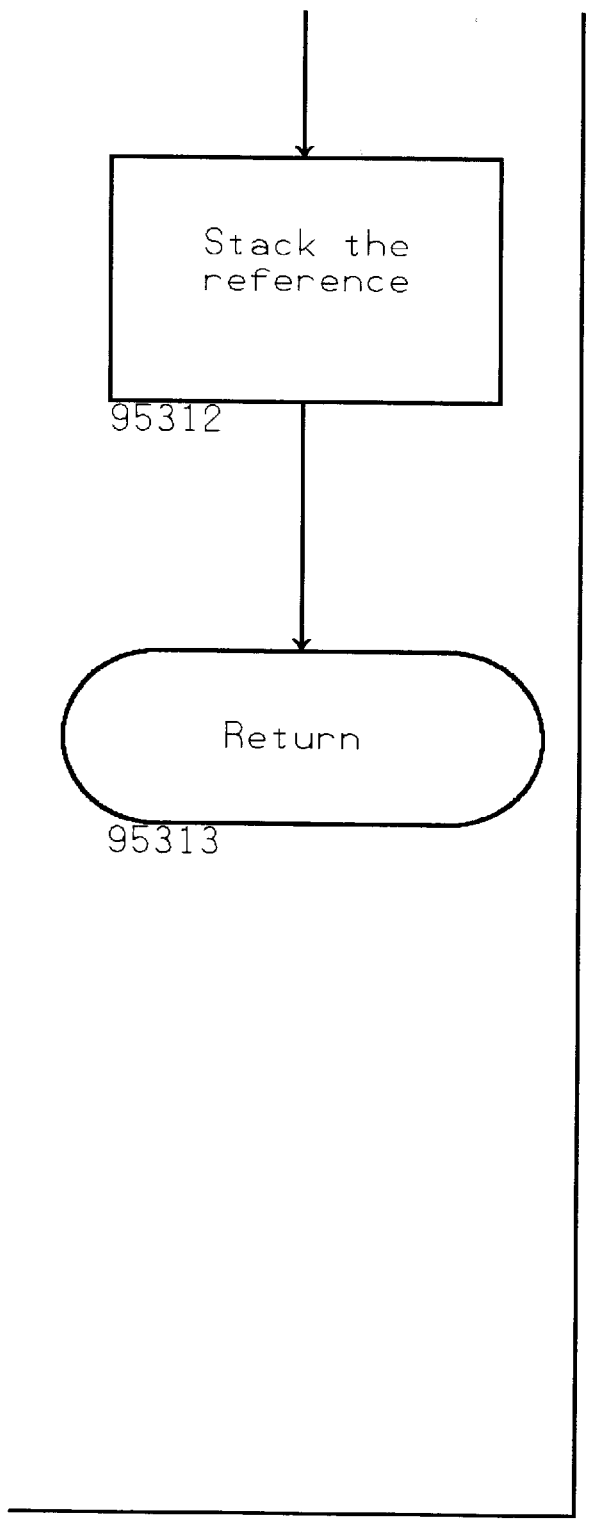
Figure 36A:
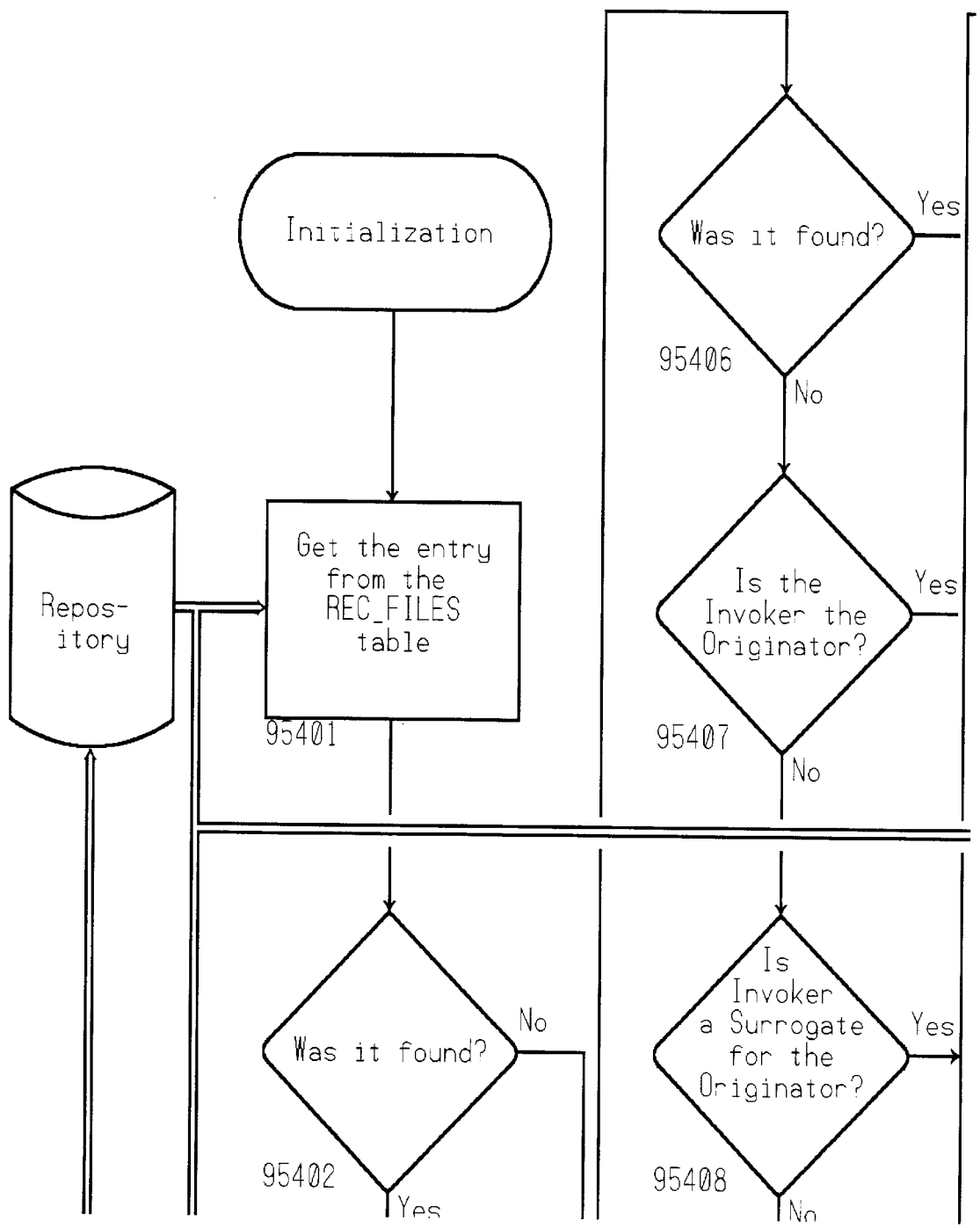
FIGS. 36a thru 36d describe the QRRFIDEL Process when viewed as laid out as how in FIG. 36.
Figure 36B:
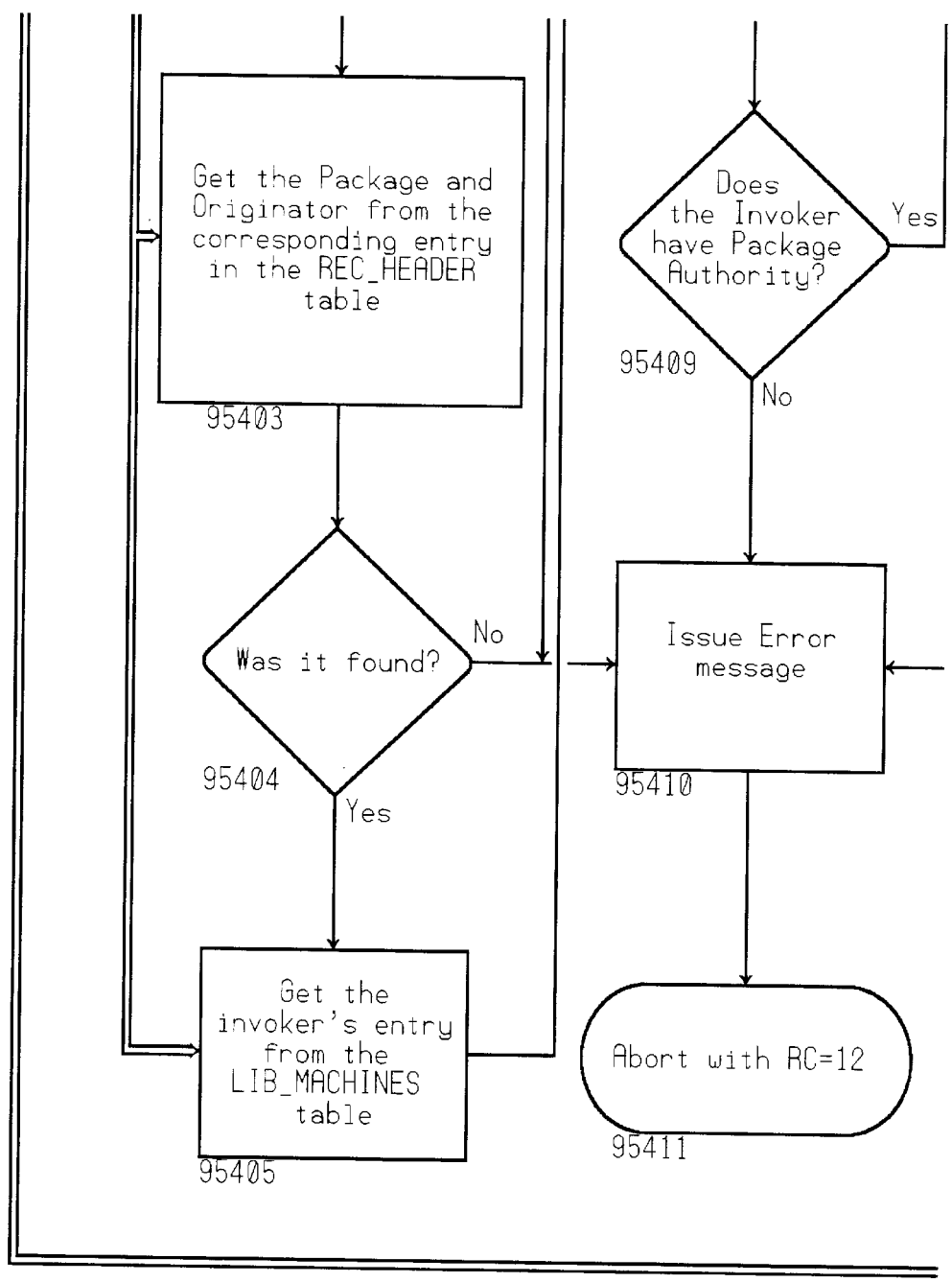
Figure 36C:
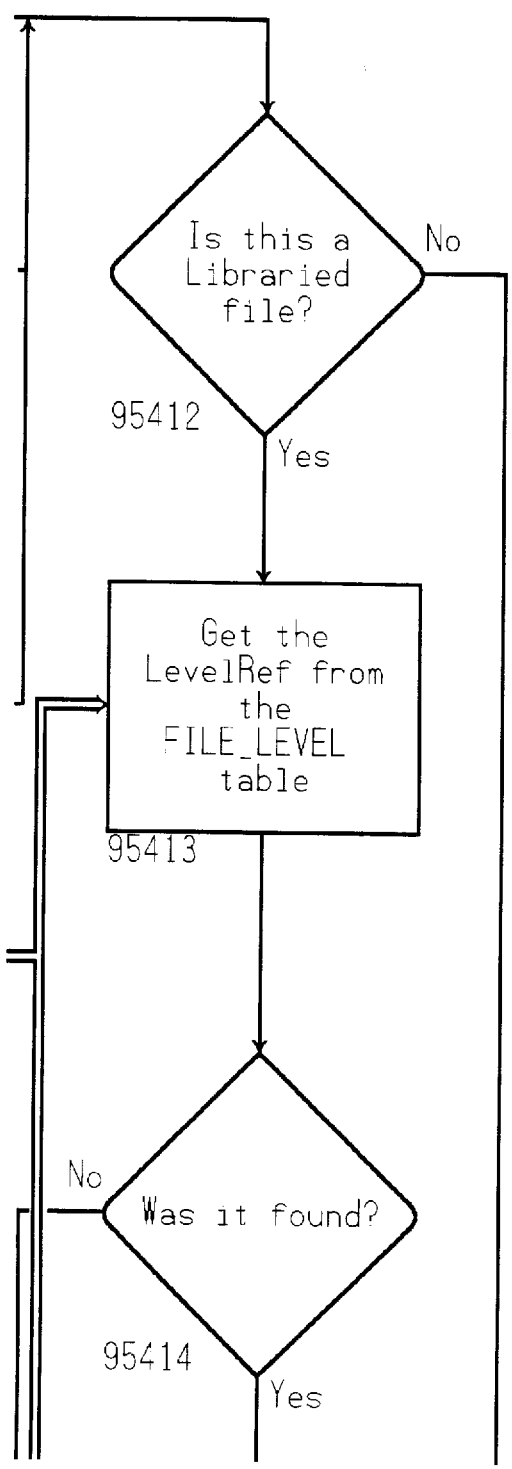
Figure 36D:
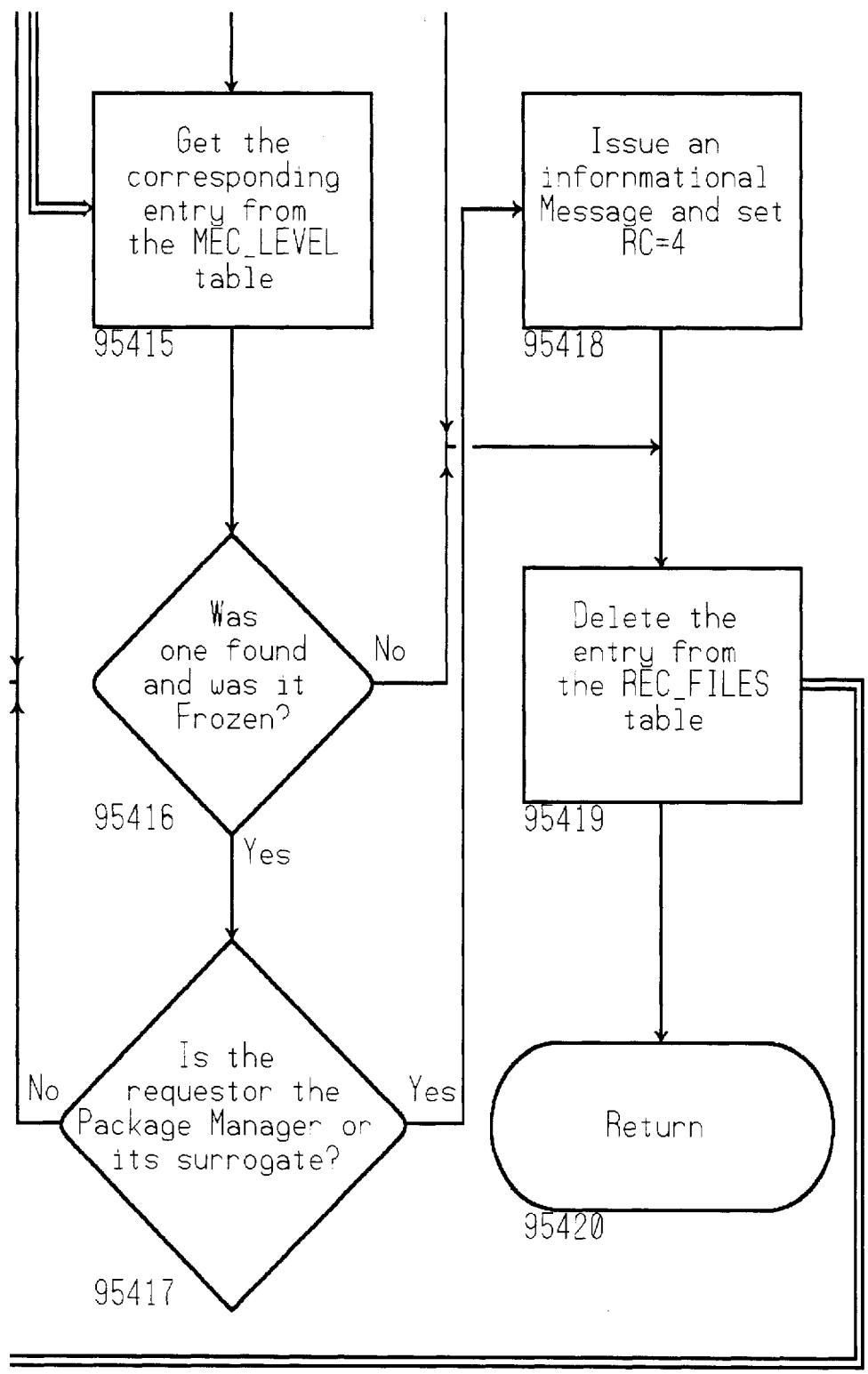
Figure 37A:
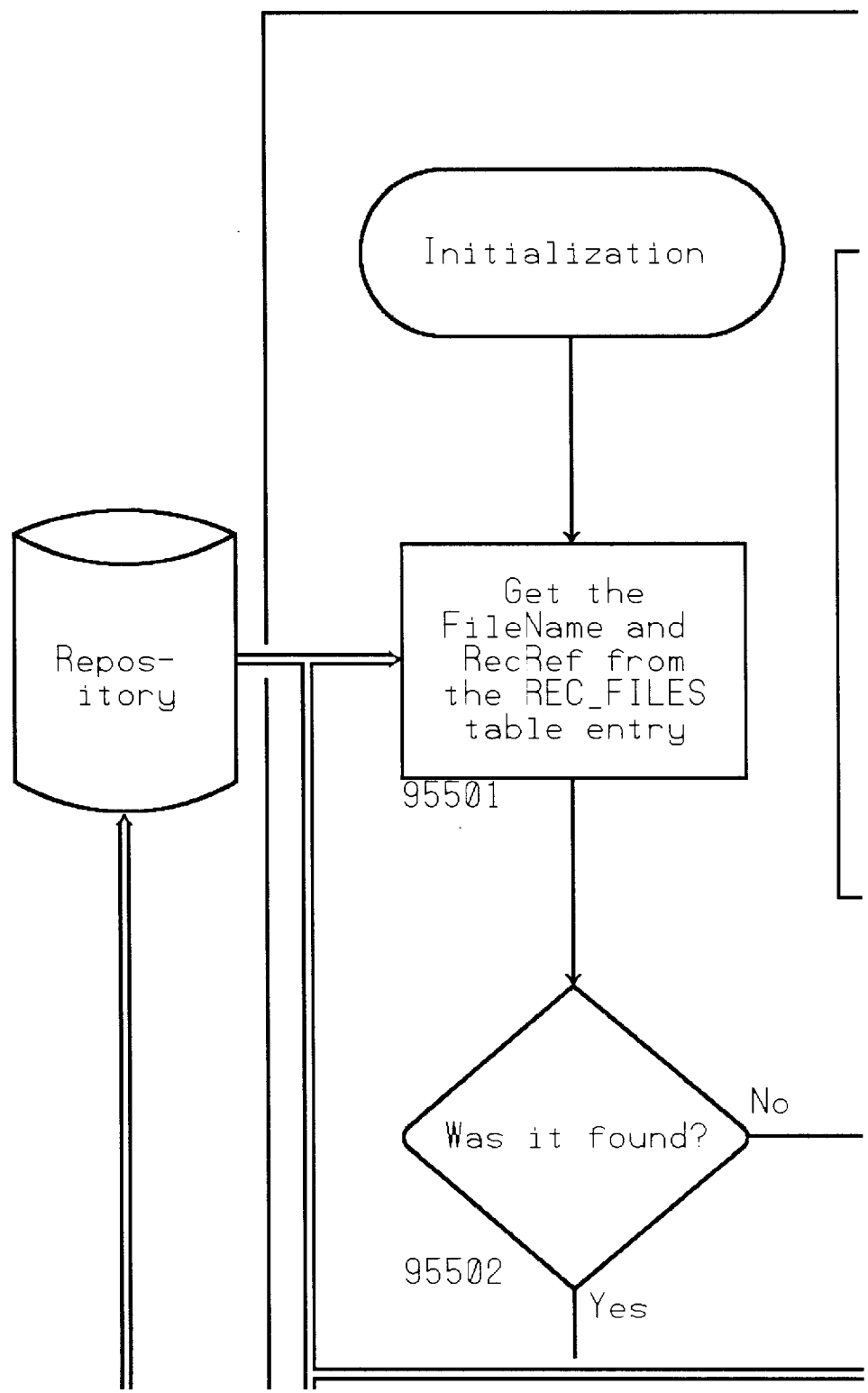
FIGS. 37a thru 37f describe the QRRFIMOD Process when viewed as laid out as how in FIG. 37.
Figure 37B:
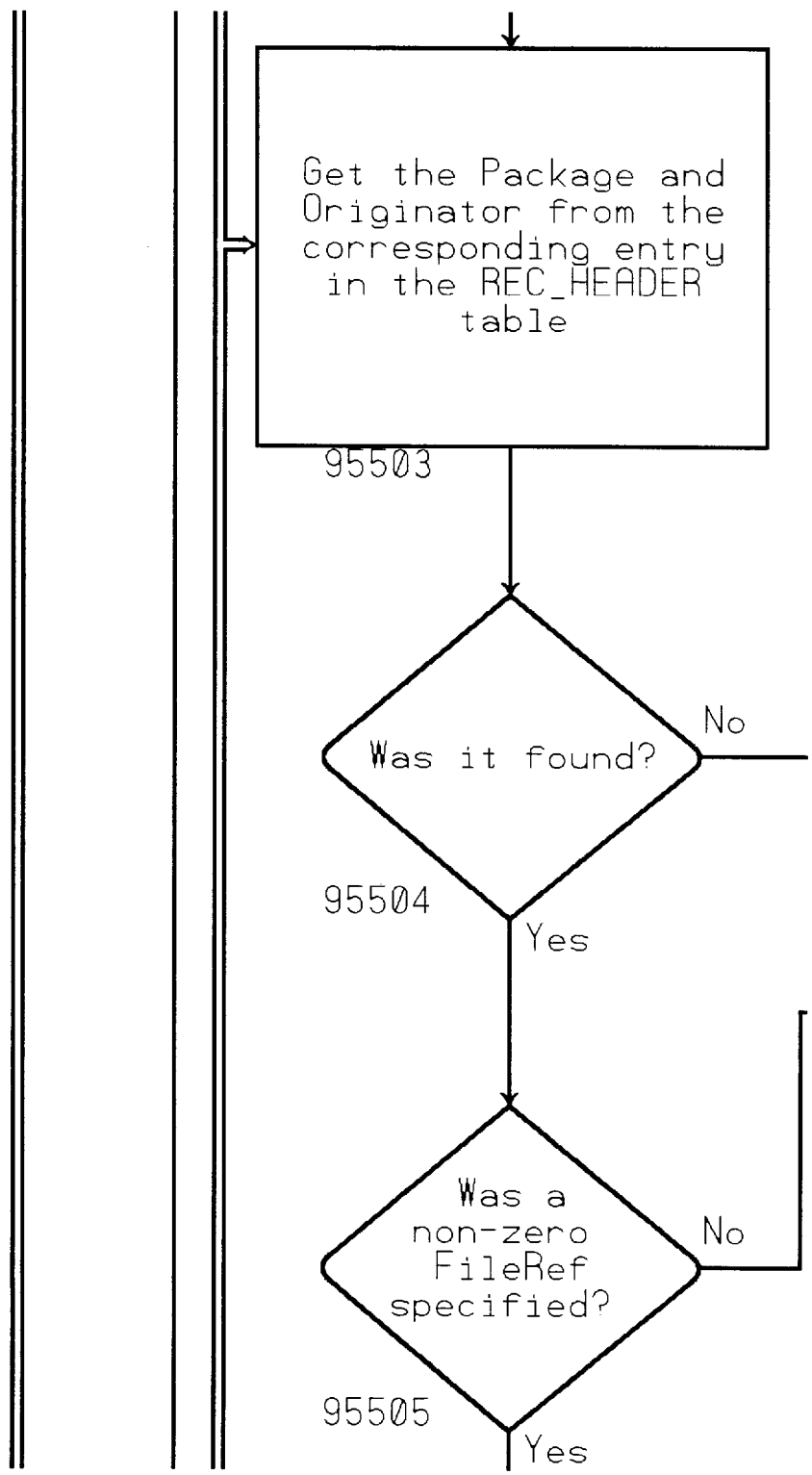
Figure 37C:
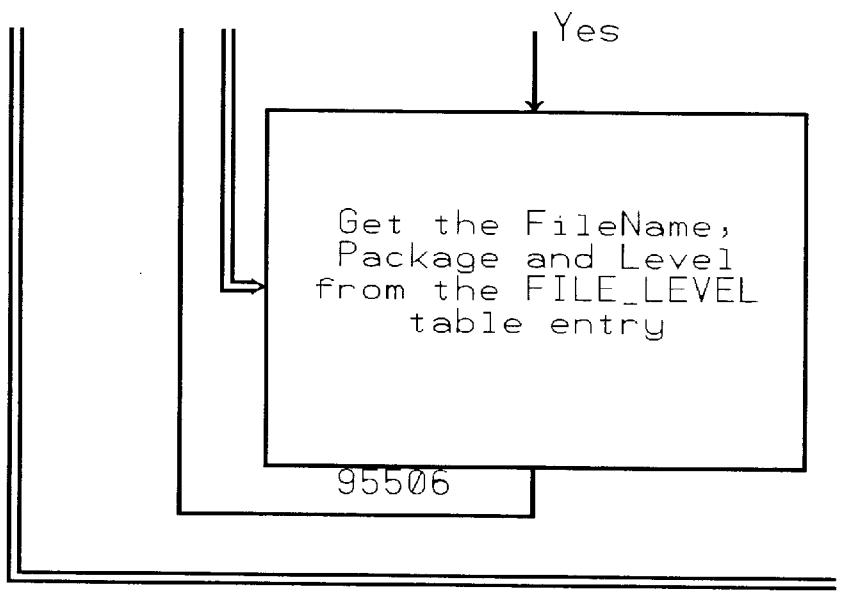
Figure 37D:
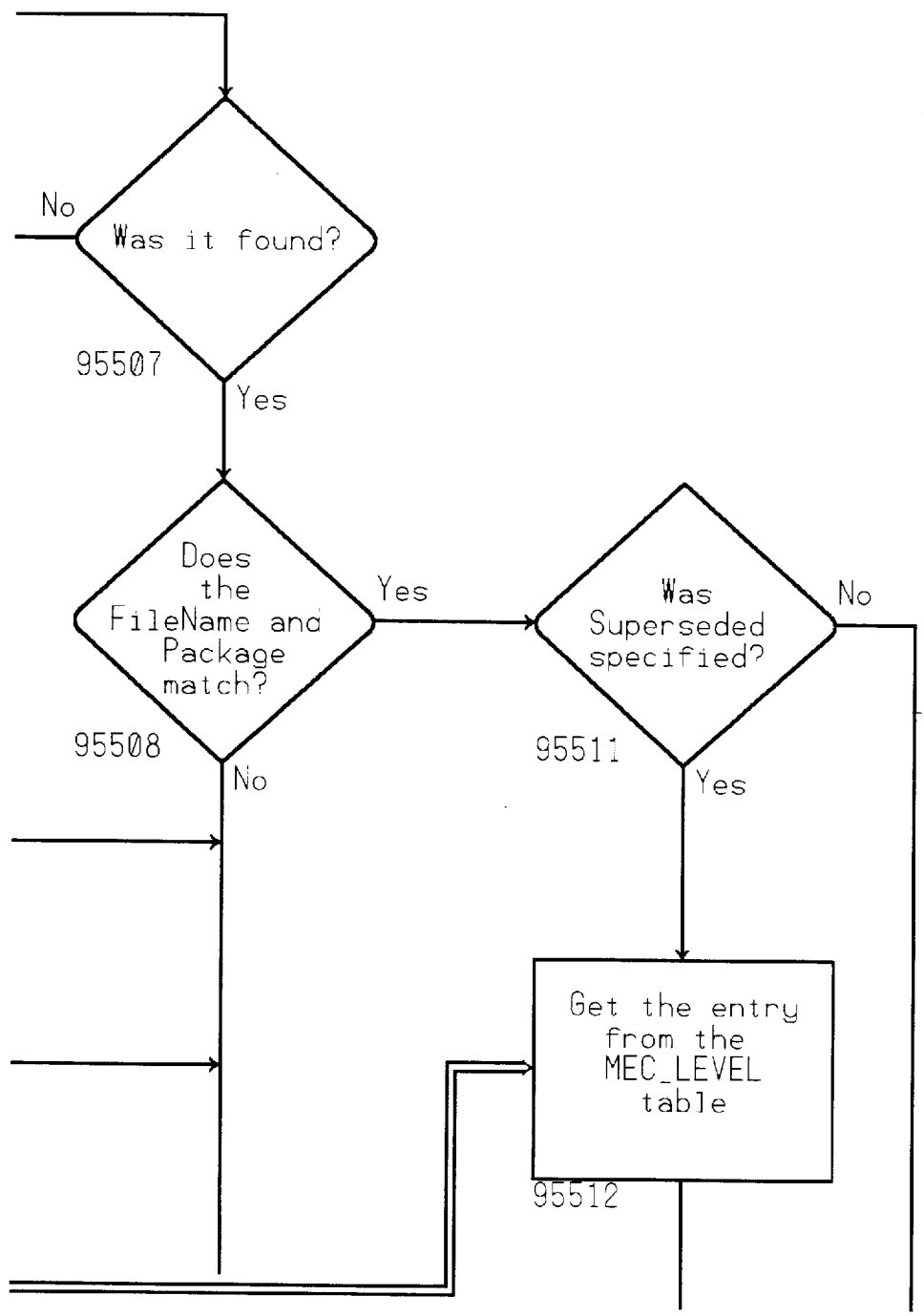
Figure 37E:
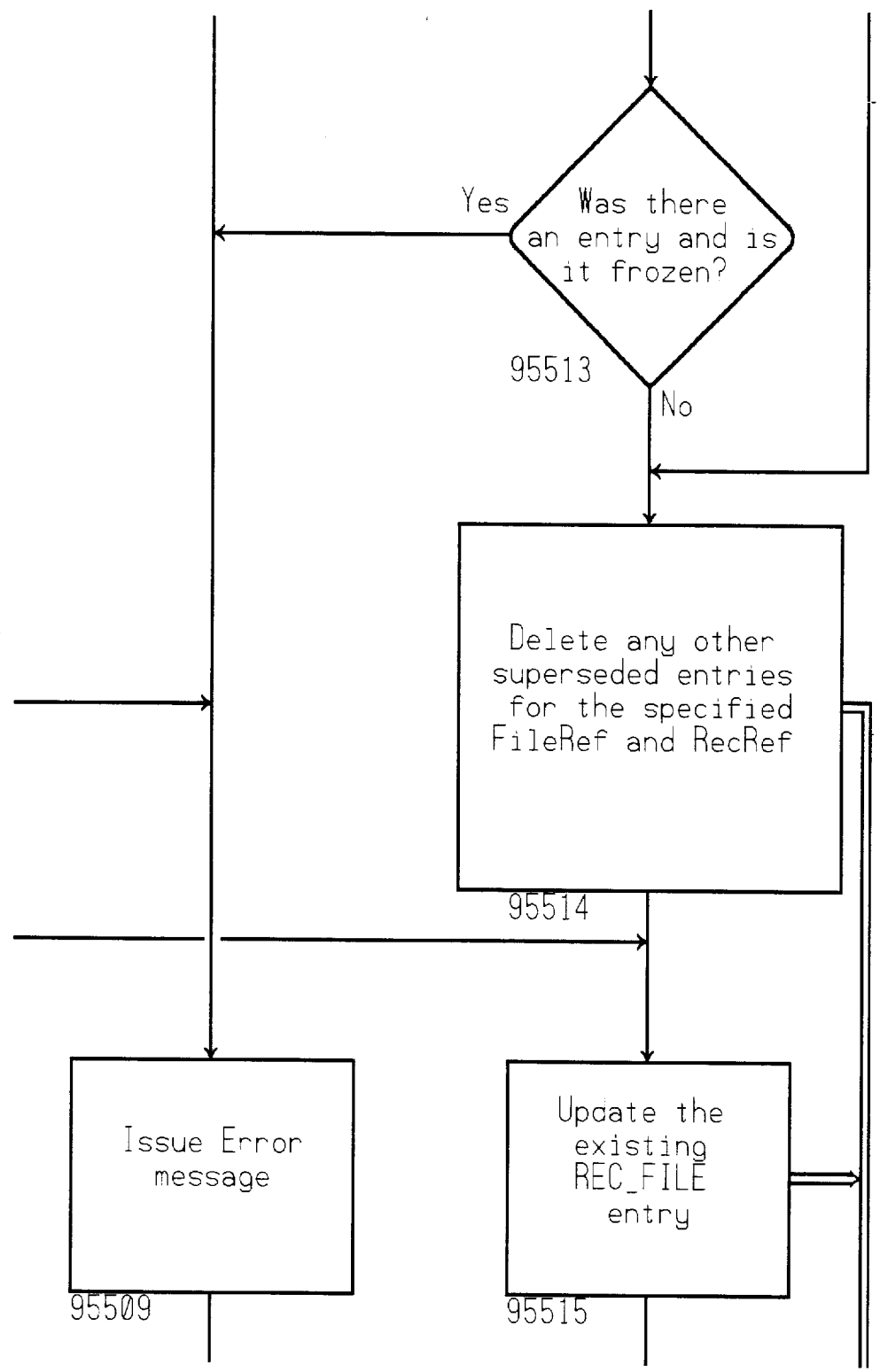
Figure 37F:
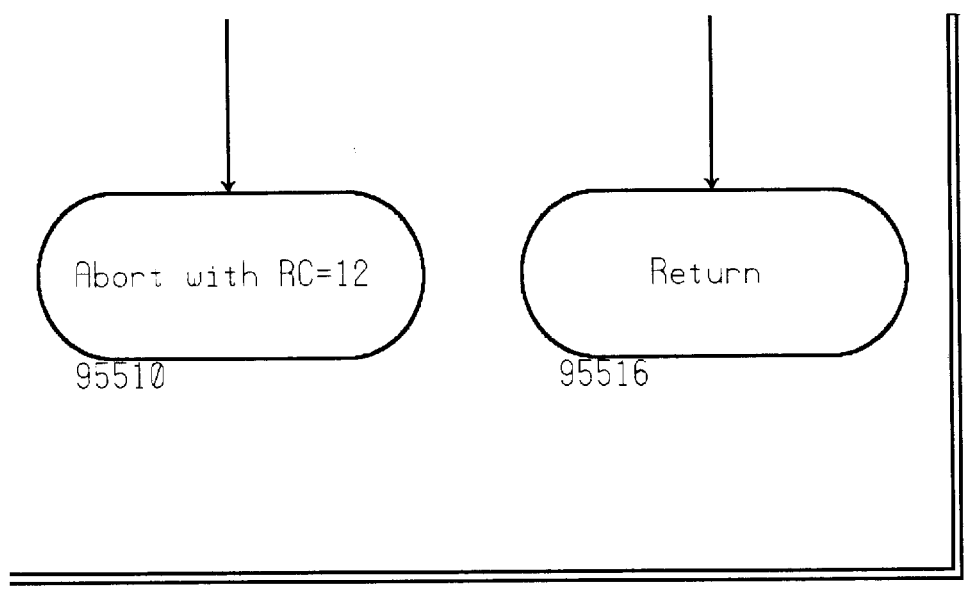

The QRMECMOD Process FIG. 28: The QRMECMOD process is used to modify a MEC entry.

After initialization, a query 93151 is made to get the Package and MEC number for the given MecRef from the MECS table in the Control Repository Next, a check 93152 is made to determine if an entry was found. If not, an error message is issued 93159 and the process aborted 93160. If so, a check 93153 is made to determine if a Previous MEC was specified. If so, a query 93154 is made to get the Package of the Previous MEC from the MECS table in the Control Repository. Next, a check 93155 is made to determine if the entry was found. If not, an error message is issued 93159 and the process aborted 93160. If so, a check 93156 is made to determine if its Package is the same as the MEC in hand. If not, an error message is issued 93159 and the process aborted 93160. If so or if a previous MEC was not specified, update 93157 the entry in the MECS table in the Control Repository. Then, the process returns 93158 to the caller.

The QRMLVADD Process FIG. 29: The QRMLVADD process is used add a MEC_LEVEL entry into the data base.

After initialization, a query 93201 is made to get the Package from the MEC table in the Control Repository. Then, a check 93202 is made to determine if the entry was found. If not, an error message is issued 93207 and the process aborted 93208. If so, a query 93203 is made to get the level data from the LEVELS table in the Control Repository. Then, a check 93204 is made to determine if the entry was found. If not, an error message is issued 93207 and the process aborted 93208. If so, a check 93205 is made to determine if the Packages match. If not, an error message is issued 93207 and the process aborted 93208. If so, the QRCKAPAT Process described in FIG. 41300 is invoked 93206. Upon return from the above process, a check 93209 is made to determine if the invoker has Package authority. If not, an error message is issued 93207 and the process aborted 93208. If so, a query 93210 is made to get a reference number for a MecLevel entry. Then, insert 93211 the new entry into the MEC_LEVEL table in the Control Repository. Next, a check 93512 is made to determine if the level is PUT-able. If not, a query 93513 is made to get the number of Promotable level entries having the current level as their next level from the LEVELS table in the Control Repository. Then, a check 93514 is made to determine if any such entries were found. If not, update 93515 the entry in the MEC_LEVEL table setting FROZEN to "Y". In any case, stack 93216 the reference number. Then, the process returns 93217 to the caller.

The QRPNDIEC Process FIG. 14: The QRPNDIEC process is used to set the IEC_REQDATE, IEC_MEC and PREVIOUS_PARTNO in the PART_DATA table.

After initialization, a query 91401 is made to get the entry from the PART_DATA table in the Control Repository. Then, a check 91402 is made to determine if the entry was found. If not, an error message is issued 91408 and the process aborted 91400 with Return Code=12. If so, a check 91403 is made to determine if the IECMEC is being reset. If so, the process flows forward to 91406. If not, a query 91404 is made to get the IECMEC entry from the MECS table in the Control Repository. Then, a check 91405 is made to determine if the entry was found. If not, an error message is issued 91408 and the process aborted 91409 with Return Code=12. If so, a check 91406 is made to determine if the Previous Part Number is being reset. If so, the process flows forward to 91413. If not, a check 91410 is made to determine if the Previous Part Number is the same as the Current Part Number. If so, an error message is issued 91408 and the process aborted 91409 with Return Code=12. If not, a query 91411 is made to get the Previous Part Number entry from the PART_NUMBERS table in the Control Repository. Then, a check 91412 is made to determine if the entry was found. If not, an error message is issued 91408 and the process aborted 91409 with Return Code=12. If so, a query 91413 is made to get a reference number for a Part Data Log entry. Next, update 91414 the entry in the PART_DATA table in the Control Repository. Then, insert 91415 a log entry in the PART_DATA_LOG table in the Control Repository. Then, the process returns 91416 to the caller.

The QRPNDMOD Process FIG. 15: The QRPNDMOD process is used to modify part number data. Previous part numbers must be associated with a LIBRARIED file with the exception of files with "EXT" filetype.

After initialization, a query 91501 is made to get the entry from the PART_DATA table in the Control Repository. Then, a check 91502 is made to determine if the entry was found. If not, an error message is issued 91506 and the process aborted 91507 with Return Code=12. If so, a check 91503 is made to determine if the part has already been RIT. If so, an error message is issued 91506 and the process aborted 91507 with Return Code=12. If not, a query 91504 is made to get a reference number for a Part Data Log entry. Then, update 91505 all the indicated field in the PART_DATA table entry. Next, a check 91508 is made to determine if an IECMEC was specified. If not, the process flows forward to 91511. If so, a query 91509 is made to get its entry from the MECS table in the Control Repository. Then, a check 91510 is made to determine if the entry was found. If not, an error message is issued 91506 and the process aborted 91507 with Return Code=12. If so, a check 91511 is made to determine if a Previous Part number was specified. If not, the process flows forward to 91515. If so, a query 91512 is made to get the Previous Part Number entry from the PART_NUMBERS table in the Control Repository. Then, a check 91513 is made to determine if the entry was found. If not, an error message is issued 91506 and the process aborted 91507 with Return Code=12. If so, a check 91514 is made to determine if the FILEASOC is "A" and the FileType is Not "EXT". If so, an error message is issued 91506 and the process aborted 91507 with Return Code=12. If not, update 91515 the entry in the PART_DATA table in the Control Repository. Then, insert 91516 an entry in the PART_DATA_LOG table in the Control Repository. Then, the process returns 91517 to the caller.

The QRPNODIS Process FIG. 30: The QRPNODIS process is used to disassociate a file from a part number.

After initialization, a check 94101 is made to determine if this is a Libraried file. If so, a query 94107 is made to get the entry from the PART_NUMBERS table in the Control Repository. Then, a check 94108 is made to determine if the entry was found. If not, an error message is issued 94109 and the process aborted 94110 with Return Code=12. If so, a check 94111 is made to determine if the part has been RIT. If so, an error message is issued 94109 and the process aborted 94110 with Return Code=12. If not, the process flows forward to 94105. If this is not a Libraried file, a query 94102 is made to get the entry with FILEASOC "A" from the PART_NUMBERS table in the Control Repository. Then, a check 94103 is made to determine if the file was found. If not, an error message is issued 94109 and the process aborted 94110 with Return Code=12. If so, a check 94104 is made to determine if the FileName and FileType match. If not, an error message is issued 94109 and the process aborted 94110 with Return Code=12. If so, a check 94105 is made to determine if the invoker is the Part Owner or his/her Surrogate. If not, an error message is issued 94109 and the process aborted 94110 with Return Code=12. If so, delete 94106 the entry in the PART_NUMBERS table in the Control Repository. Next, a query 94118 is made to get a reference number for a Part Number Log entry. Then, insert 94112 an entry into the PART_NUMBER_LOG table in the Control Repository. Next, a check 94113 is made to determine if there are any more entries in the PART_NUMBERS table for this Part Number. If so, a check 94119 is made to determine if the all have FILEASOC="S". If not, the process returns 94124 to the caller. If so, set up 94120 to insert an "A" entry. Then, a query 94121 is made to get reference numbers for the new Part Numbers and Part Number Log entries. Then, insert 94122 the new entry into the PART_NUMBERS table in the Control Repository. Next, insert 94123 an entry into the PART_NUMBER_LOG table in the Control Repository. Then, the process returns 94124 to the caller. If there were no more entries for this Part Number, a check 94114 is made to determine if the FILEASOC of the deleted entry was "A". If not, the process flows back to 94120. If so, set up 94115 to insert a "U" entry. Next, delete 94116 the corresponding entry from the PART_DATA table in the Control Repository. Then, delete 94117 the corresponding entry from the PART_USAGE table in the Control Repository. Then, the process flows back to 94121.

The QRPNOOBS Process FIG. 31: The QRPNOOBS process is used to make a part number obsolete.

After initialization, a query 94201 is made to get the entry from the PART_NUMBERS table in the Control Repository. Then, a check 94202 is made to determine if the entry was found. If not, an error message is issued 94207 and the process aborted 94208 with Return Code=12. If so, a check 94203 is made to determine if the FILEASOC is either "O", "R" or "L". If so, an error message is issued 94207 and the process aborted 94208 with Return Code=12. If not, a check 94204 is made to determine if the FILEASOC is either "A" or "U". If "U", delete 94205 the entry from the PART_NUMBERS table in the Control Repository. Next, delete 94206 the corresponding entry from the PART_DATA table in the Control Repository. Next, a query 94209 is made to get a reference number fro a Part Number Log entry table in the Control Repository. Then, insert 94210 an entry into the PART_NUMBER_LOG table in the Control Repository. Then, the process returns 94211 to the caller. If the FILEASOC was "A", a query 94212 is made to get the corresponding entry from the PART_DATA table in the Control Repository. Then, a check 94213 is made to determine if the part has been IEC'd. If not, the process flows back to 94205. If so, delete 94214 any superseded entries from the PART_NUMBERS table in the Control Repository. Next, update 94215 the entry in the PART_NUMBERS table in the Control Repository with FILEASOC="O". Then, update 94216 the entry in the PART_DATA table in the Control Repository with ACT_RITDATE="OBSOLETE". Then, the process flows back to 94209.

The QRPNOUNR Process FIG. 32. The QRPNOUNR process is used to unRIT a part number.

After initialization, a query 94301 is made to get the entry from the PART_NUMBERS table in the Control Repository. Then, a check 94302 is made to determine if the entry was found. If not, an informational message is issued 94307 and the process aborted 94308 with Return Code=4. If so, a query 94303 is made to get the Package from the FILE_LEVEL table in the Control Repository. Then, a check 94304 is made to determine if the entry was found. If not, an error message is issued 94309 and the process aborted 94310 with Return Code=12. If so, a check 94305 is made to determine if the invoker has Package Authority. If not, an error message is issued 94309 and the process aborted 94310 with Return Code=12. If so, a query 94306 is made to get the corresponding entry from the PART_DATA table in the Control Repository. Then, a check 94311 is made to determine if the entry was found. If not, an error message is issued 94309 and the process aborted 94310 with Return Code=12. If so, a query 94312 is made to get reference numbers for Part Number Log and Part Data Log entries. Next, update 94313 the entry in the PART_NUMBERS table setting FILEASOC="L". Then, update 94314 the entry in the PART_DATA table resetting ACT_RITDATE. Next, insert 94315 an entry into the PART_NUMBER_LOG table in the Control Repository. Then, insert 94316 an entry into the PART_DATA_LOG table in the Control Repository. Then, the process returns 94317 to the caller.

The QRRECADD Process FIG. 33: The QRRECADD process is used add a new REC to the data base.

After initialization, a check 95101 is made to determine if a Problem Number was specified. If so, a query 95102 is made to get the entry from the VALID_PROBLEMS table in the Control Repository. Then, a check 95103 is made to determine if the entry was found. If not, an error message is issued 95107 and the process aborted 95108 with Return Code=12. If so or if a Problem Number was not specified, a check 95104 is made to determine if a MecRef was specified. If so, a query 95105 is made to get the MEC and the Package from the MECS table in the Control Repository. Then, a check 95106 is made to determine if the entry was found. If not, an error message is issued 95107 and the process aborted 95108 with Return Code=12. If so, a check 95109 is made to determine if the Packages are the same?. If not, an error message is issued 95107 and the process aborted 95108 with Return Code=12. If so or if a MecRef was not specified, a query 95110 is made to get a reference number for a REC Header entry table in the Control Repository. Then, insert 95111 an entry into the REC_HEADER table in the Control Repository. Next, stack 95112 the reference number. Then, the process returns 95113 to the caller.

The QRRECMOD Process FIG. 34: The QRRECMOD process is used to modify an existing REC header.

After initialization, a check 95201 is made to determine if a Problem Number was specified. If so, a query 95202 is made to get the entry from the VALID_PROBLEMS table in the Control Repository. Then, a check 95203 is made to determine if the entry was found. If not, an error message is issued 95211 and the process aborted 95212 with Return Code=12. If so, a query 95204 is made to get the Originator and the Package from the REC_HEADER table in the Control Repository. Then, a check 95205 is made to determine if the entry was found. If not, an error message is issued 95211 and the process aborted 95212 with Return Code=12. If so, a query 95206 is made to get the invoker's entry from the LIB_MACHINES table in the Control Repository. Then, a check 95207 is made to determine if the entry was found. If not, a check 95208 is made to determine if the Invoker is the Originator. If not, a check 95209 is made to determine if the Invoker is the Originator's Surrogate. If not, a check 95210 is made to determine if the Invoker has Package authority. If not, an error message is issued 95211 and the process aborted. 95212 with Return Code=12. If the Invoker is a Library Machine, the Originator or its Surrogate, or has Package Authority, a check 95213 is made to determine if a MecRef was specified. If so, a query 95214 is made to get the Package and MEC from the MECS table in the Control Repository. Then, a check 95215 is made to determine if the entry was found. If not, an error message is issued 95211 and the process aborted 95212 with Return Code=12. If so, or if a MecRef was not specified, update 95216 the entry in the REC_HEADER table in the Control Repository. Then, the process returns 95217 to the caller.

The QRRFIADD Process FIG. 35: The QRRFIADD module is used add a file to a specified REC.

After initialization, a query 95301 is made to get the associated entry from the REC_HEADER table in the Control Repository. Then, a check 95302 is made to determine if the entry was found. If not, an error message is issued 95307 and the process aborted 95308 with Return Code=12. If so, a query 95303 is made to get the number if frozen entries for the current MEC, Package, Version and FileType. Next a query 95304 is made to get the number if none-frozen entries for the current MEC, Package, Version and FileType. Next, a check 95305 is made to determine if all the entries are frozen. If so, an error message is issued 95307 and the process aborted 95308 with Return Code=12. If not, a query 95306 is made to get the number of entries from the REC_FILES table in the Control Repository for this REC and FileType that are not superseded. Then, a check 95309 is made to determine if any entries were found. If so, an error message is issued 95307 and the process aborted 95308 with Return Code=12. If not, a query 95310 is made to get a reference for a REC File entry. Then, insert 95311 the entry into the REC_FILES table in the Control Repository. Next, stack 95312 the reference. Then, the process returns 95313 to the caller.

The QRRFIDEL Process FIG. 36: The QRRFIDEL process is used to delete a file from a REC.

After initialization, a query 95401 is made to get the entry from the REC_FILES table in the Control Repository. Then, a check 95402 is made to determine if the entry was found. If not, an error message is issued 95410 and the process aborted 95411 with Return Code=12. If so, a query 95403 is made to get the Package and Originator from the corresponding entry from the REC_HEADER table in the Control Repository. Then, a check 95404 is made to determine if the entry was found. If not, an error message is issued 95410 and the process aborted 95411 with Return Code=12. If so, a query 95405 is made to get the invoker's entry from the LIB_MACHINES table in the Control Repository. Then, a check 95406 is made to determine if the entry was found. If not, a check 95407 is made to determine if the Invoker is the Originator. If not, a check 95408 is made to determine if the Invoker is the Originator's Surrogate. If not, a check 95409 is made to determine if the Invoker has Package authority. If not, an error message is issued 95410 and the process aborted 95411 with Return Code=12. If the Invoker is a Library Machine, the Originator or its Surrogate, or has Package Authority, a check 95412 is made to determine if this is a Libraried file. If so, a query 95413 is made to get the LevelRef from the FILE_LEVEL table in the Control Repository. Then, a check 95414 is made to determine if the entry was found. If not, an error message is issued 95410 and the process aborted 95411 with Return Code=12. If so, a query 95415 is made to get the corresponding entry from the MEC_LEVEL table in the Control Repository. Then, a check 95416 is made to determine if the entry was found and was it frozen. If so, a check 95417 is made to determine if the requester is the Package Manager or Surrogate. If not, an error message is issued 95410 and the process aborted 95411 with Return Code=12. If so, an informational message is issued 95418 and the Return code is set to 4. If a MEC_LEVEL entry was not found or the informational message was issued, select 95419 the enty from the REC_FILES table in the Control Repository. Then, the process returns 95420 to the caller.

The QRRFIMOD Process FIG. 37: The QRRFIMOD process is used add the library FileRef to a given REC file.

After initialization, a query 95501 is made to get the FileName and RecRef from the REC_FILES table in the Control Repository. Then, a check 95502 is made to determine if the entry was found. If not, an error message is issued 95509 and the process aborted 95510 with Return Code=12. If so, a query 95503 is made to get the Package and Originator from the corresponding entry from the REC_HEADER table in the Control Repository. Then, a check 95504 is made to determine if the entry was found. If not, an error message is issued 95509 and the process aborted 95510 with Return Code=12. If so, a check 95505 is made to determine if a none-zero FileRef was specified. If not, the process flows forward to 95515 If so, a query 95506 is made to get the FileName, Package and Level from the FILE_LEVEL table in the Control Repository. Then, a check 95507 is made to determine if the entry was found. If not, an error message is issued 95509 and the process aborted 95510 with Return Code=12. If so, a check 95508 is made to determine if the FileName and Package Match. If not, an error message is issued 95509 and the process aborted 95510 with Return Code=12. If so, a check 95511 is made to determine if Superseded was specified. If so, a query 95512 is made to get the entry from the MEC_LEVEL table in the Control Repository. Then, a check 95513 is made to determine if an entry was found and if it is frozen. If so, an error message is issued 95509 and the process aborted 95510 with Return Code=12. If not or if Superseded was not specified, delete 95514 any other superseded entries for the specified FileRef and RecRef. Next, update 95515 the existing REC_FILE entry in the Control Repository. Then, the process returns 95516 to the caller.

While we have described our preferred embodiments of our inventions it will be understood that those skilled in the art, both now and in the future, may make various improvements and enhancements which fall within the scope of the claims which follow. These claims should be construed to maintain the proper protection for the inventions disclosed.

What is claimed is:

1. A data management system for file and database management useful in concurrent engineering processes, comprising: a design control system for fulfilling requests of a user initiated from a computer system client system coupled to a network, including a data management control system for managing a plurality of projects, each project having a data repository for data records and a control repository comprising a common access interface and one or more databases, said control repository communicating with users of said design control system for fulfilling requests of a user and the data repositories of said data management control system through a plurality of managers, each manager performing a unique function wherein said managers act as building blocks which can be combined in a plurality of manners to support an environment for suitable for multiple users of a user community, and wherein one of said managers is a library manager enabling automated library processing of any application program or tool to be launched using input data from said data management control system and after processing enabling results to be recorded as output data in any data control repository of said data management control system as a record in said data control repository; and one of said managers is a fix manager for tracking specific iterations of a data object and for associating them with unique problem identifier for a problem, request or enhancement; and one of said managers is a part number manager for tracking data requiring control of items or parts so as to eliminate the accidental assignment of the same number to two different items or parts; and one of said managers is a release manager for tracking a coherent collection of data objects in said control repository for release as a collection to an external organization to permit the external organization to prepare for a release; and said data management control system has a client/server domain and permits data to span multiple computer heterogeneous computer systems; and each of said records in said data control repository includes data indicating the record filename, library, filetype, version and level, and said fix manager provides means for associating each record with problem identifiers; and wherein said fix manager provides operations for multiple modes of tracking problems, including:
  disabling all problem fix tracking in all data objects;
  collecting any selected data types to be tracked under a single, default problem identifier; and
  enabling each data object to have a unique set of problem identifiers whereby multiple pieces of data can be associated with a single problem or a single piece of data for resolving multiple problems and wherein a library function enables multiple versions of a component data element to be developed in tandem while using the same object name and residing in the same library and at the same level simultaneously.

2. A data management system for file and database management according to claim 1 wherein said fix manager enables a library process to be run on automated library machines (ALMs), including single ALMs, remote execution machines, and in an actor/object environment.

3. A data management system for file and database management useful in concurrent engineering processes, comprising: a design control system for fulfilling requests of a user initiated from a computer system client system coupled to a network, including a data management control system for managing a plurality of projects, each project having a data repository for data records and a control repository comprising a common access interface and one or more databases, said control repository communicating with users of said design control system for fulfilling requests of a user and the data repositories of said data management control system through a plurality of managers, each manager performing a unique function, wherein said managers act as building blocks which can be combined in a plurality of manners to support an environment for suitable for multiple users of a user community, and wherein one of said managers is a library manager enabling automated library processing of any application program or tool to be launched using input data from said data management control system and after processing enabling results to be recorded as output data in any data control repository of said data management control system as a record in said data control repository; and one of said managers is a fix manager for tracking specific iterations of a data object and for associating them with unique problem identifier for a problem, request or enhancement; and one of said managers is a part number manager for tracking data requiring control of items or parts so as to eliminate the accidental assignment of the same number to two different items or parts; and one of said managers is a release manager for tracking a coherent collection of data objects in said control repository for release as a collection to an external organization to permit the external organization to prepare for a release; and said data management control system has a client/server domain and permits data to span multiple computer heterogeneous computer systems; and each of said records in said data control repository includes data indicating the record filename, library, filetype, version and level, and said fix manager provides means for associating each record with problem identifiers; and wherein said data management system includes flags in records which are subject to tracking, and wherein restricting the library filetypes by setting and resetting said flags controls the library file types being tracked.

4. A data management system for file and database management according to claim 3 wherein said library manager enables two methods for initiating a library process, a first method being library initiated processing, and a second method being designer initiated library processing.

5. A data management system for file and database management useful in concurrent engineering processes, comprising: a design control system for fulfilling requests of a user initiated from a computer system client system coupled to a network, including a data management control system for managing a plurality of projects, each project having a data repository for data records and a control repository comprising a common access interface and one or more databases, said control repository communicating with users of said design control system for fulfilling requests of a user and the data repositories of said data management control system through a plurality of managers, each manager performing a unique function, wherein said managers act as building blocks which can be combined in a plurality of manners to support an environment for suitable for multiple users of a user community, and wherein one of said managers is a library manager enabling automated library processing of any application program or tool to be launched using input data from said data management control system and after processing enabling results to be recorded as output data in any data control repository of said data management control system as a record in said data control repository; and one of said managers is a fix manager for tracking specific iterations of a data object and for associating them with unique problem identifier for a problem, request or enhancement; and one of said managers is a part number manager for tracking data requiring control of items or parts so as to eliminate the accidental assignment of the same number to two different items or parts; and one of said managers is a release manager for tracking a coherent collection of data objects in said control repository for release as a collection to an external organization to permit the external organization to prepare for a release; and said data management control system has a client/server domain and permits data to span multiple computer heterogeneous computer systems; and each of said records in said data control repository includes data indicating the record filename, library, filetype, version and level, and said fix manager provides means for associating each record with problem identifiers; and wherein a data object may exist at multiple library levels, and a superseded flag is provided for denoting whether a particular data object reference is superseded by a later iteration at a lower level, the lowest level file being the active or non-superseded data object.

6. A data management system for file and database management according to claim 5 wherein each data object may sit at multiple levels and, within the common repository:

(a) the data objects at each level may have the same set of problem identifiers associated to them; or (b) the data objects may have some problem identifiers in common and some unique problem identifiers associated to the; or (c) the data object may have no problem identifiers in common.

7. A data management system for file and database management useful in concurrent engineering processes, comprising: a design control system for fulfilling requests of a user initiated from a computer system client system coupled to a network, including a data management control system for managing a plurality of projects, each project having a data repository for data records and a control repository comprising a common access interface and one or more databases, said control repository communicating with users of said design control system for fulfilling requests of a user and the data repositories of said data management control system through a plurality of managers, each manager performing a unique function, wherein said managers act as building blocks which can be combined in a plurality of manners to support an environment for suitable for multiple users of a user community, and wherein one of said managers is a library manager enabling automated library processing of any application program or tool to be launched using input data from said data management control system and after processing enabling results to be recorded as output data in any data control repository of said data management control system as a record in said data control repository; and one of said managers is a fix manager for tracking specific iterations of a data object and for associating them with unique problem identifier for a problem, request or enhancement; and one of said managers is a part number manager for tracking data requiring control of items or parts so as to eliminate the accidental assignment of the same number to two different items or parts; and one of said managers is a release manager for tracking a coherent collection of data objects in said control repository for release as a collection to an external organization to permit the external organization to prepare for a release; and said data management control system has a client/server domain and permits data to span multiple computer heterogeneous computer systems; and each of said records in said data control repository includes data indicating the record filename, library, filetype, version and level, and said fix manager provides means for associating each record with problem identifiers; and wherein said release control manager maintains a pool of release or engineering change (EC) numbers which are associated to problem fix numbers and part numbers via interaction between said fix manager, part number manager, release control manager and library manager enabling both association during file movement through the data management system and manual associations so as to enable a user regarding a release to view all the problems, data and Part Number information included in the entire release.

8. A data management system for file and database management according to claim 7 wherein said release control manager has an engineering change collision avoidance mechanism for constantly monitoring all of the problem identifier, part number and engineering change information in the control repository to detect a known set of violations or or illegal conditions.

9. A data management system for file and database management according to claim 8 wherein said release control manager has means for detecting if a data object, part number or problem identifier is associated with multiple releases, and for ensuring that any released problem identifiers, part number or file reference numbers are never reused in a different release while permitting a data manager to assign an engineering change number to a release level.

10. A data management system for file and database management according to claim 8 wherein said release control manager has means for engineering change collision avoidance mechanism polices the library records to ensure only data associated with a desired engineering change actually resides in that level.

11. A data management system for file and database management according to claim 9 wherein said release control manager has means for notification of user recipients to assist in coordinating the delivery of a release with a release date defined for any part numbers in the data management system sent as the release date approaches at a predetermined interval prior to the release date which contains a list of all the part numbers, along with any other pertinent information, included in that release and to assist the recipient in planning their resources accordingly and react to any design changes in advance.

12. A data management system for file and database management according to claim 7 wherein said release control manager has means for grouping lower level data objects within a higher level data object library, and supports multiple release streams.

13. A data management system for file and database management according to claim 7 wherein said release control manager has means for providing system engineering change numbers to hierarchically group a collection of lower level engineering change numbers.

14. A data management system for file and database management according to claim 7 wherein said release control manager has means for creating collections of engineering changes into system engineering changes and for creating listings of all data objects in an engineering change, which listings can be combined to show all data objects in a system engineering change.

15. A data management system for file and database management according to claim 7 wherein said part number manager for tracking data requiring control of items or parts provides means for tracking extents with extent part numbers, and said data management system assigns extent part numbers, tracks and releases extends in the same manner as component part numbers.

16. A data management system for file and database management according to claim 13 wherein said release manager processes extent and component releases the same regardless of the underlying technology or process employed.

17. A data management system for file and database management according to claim 3 wherein said library manager enables two methods for initiating a library process, a first method being library initiated processing, and a second method being designer initiated library processing for problem fix management, release management and part number control.

18. A data management system for file and database management according to claim 7 wherein there is a data manager for setting starting level for a set of data objects being tracked.

* * * * *